US012579758B2

(12) United States Patent
Dreyer et al.

(10) Patent No.: US 12,579,758 B2
(45) Date of Patent: Mar. 17, 2026

(54) DEVICES, METHODS, AND GRAPHICAL USER INTERFACES FOR INTERACTING WITH VIRTUAL OBJECTS USING HAND GESTURES

(71) Applicant: Apple Inc., Cupertino, CA (US)

(72) Inventors: Mylene E. Dreyer, San Francisco, CA (US); Marisa R. Lu, San Francisco, CA (US); Julian K. Missig, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 18/102,036

(22) Filed: Jan. 26, 2023

(65) Prior Publication Data

US 2023/0252737 A1    Aug. 10, 2023

Related U.S. Application Data

(60) Provisional application No. 63/308,012, filed on Feb. 8, 2022.

(51) Int. Cl.
| | |
|---|---|
| *G06T 19/00* | (2011.01) |
| *G06F 3/01* | (2006.01) |
| *G06T 13/20* | (2011.01) |
| *G06T 19/20* | (2011.01) |

(52) U.S. Cl.
CPC ............ *G06T 19/006* (2013.01); *G06F 3/017* (2013.01); *G06T 13/20* (2013.01); *G06T 19/20* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 4,803,487 | A | 2/1989 | Willard et al. |
| 5,483,261 | A | 1/1996 | Yasutake |
| 5,488,204 | A | 1/1996 | Mead et al. |
| 5,617,031 | A | 4/1997 | Tuttle |
| | | (Continued) | |

FOREIGN PATENT DOCUMENTS

| | | |
|---|---|---|
| AU | 2015101019 A4 | 9/2015 |
| CN | 1556955 A | 12/2004 |
| | (Continued) | |

OTHER PUBLICATIONS

Applicant-Initiated Interview Summary received for U.S. Appl. No. 18/122,625, mailed on May 22, 2024, 2 pages.

(Continued)

*Primary Examiner* — Yi Wang
(74) *Attorney, Agent, or Firm* — YHE Law LLP

(57) ABSTRACT

The present disclosure generally relates to interacting with virtual objects using hand gestures. In some embodiments, methods and user interfaces for navigating content using hand gestures are described. In some embodiments, methods and user interfaces for using hand gestures to perform various operations are described. In some embodiments, methods and user interfaces for activating virtual objects are described. In some embodiments, methods and user interfaces for displaying information is described. In some embodiments, methods and user interfaces for manipulating the display of virtual objects is described.

41 Claims, 39 Drawing Sheets

(56) References Cited

U.S. PATENT DOCUMENTS

| | | | |
|---|---|---|---|
| 5,793,366 A | 8/1998 | Mano et al. |
| 5,825,352 A | 10/1998 | Bisset et al. |
| 5,825,353 A | 10/1998 | Will |
| 5,835,079 A | 11/1998 | Shieh |
| 5,853,327 A | 12/1998 | Gilboa |
| 5,880,411 A | 3/1999 | Gillespie et al. |
| 6,008,807 A | 12/1999 | Bretschneider et al. |
| 6,016,248 A | 1/2000 | Anzai et al. |
| 6,031,531 A | 2/2000 | Kimble |
| 6,128,010 A | 10/2000 | Baxter et al. |
| 6,167,353 A | 12/2000 | Piernot et al. |
| 6,188,391 B1 | 2/2001 | Seely et al. |
| 6,190,174 B1 | 2/2001 | Lam et al. |
| 6,232,972 B1 | 5/2001 | Arcuri et al. |
| 6,310,610 B1 | 10/2001 | Beaton et al. |
| 6,323,846 B1 | 11/2001 | Westerman et al. |
| 6,323,884 B1 | 11/2001 | Bird et al. |
| 6,359,837 B1 | 3/2002 | Tsukamoto |
| 6,424,376 B1 | 7/2002 | Hirasawa |
| 6,429,896 B1 | 8/2002 | Aruga et al. |
| 6,522,347 B1 | 2/2003 | Sakai et al. |
| 6,650,894 B1 | 11/2003 | Berstis et al. |
| 6,690,387 B2 | 2/2004 | Zimmerman et al. |
| 6,809,724 B1 | 10/2004 | Shiraishi et al. |
| 6,809,759 B1 | 10/2004 | Chiang |
| 6,819,867 B2 | 11/2004 | Mayer et al. |
| 6,857,105 B1 | 2/2005 | Fox et al. |
| 6,889,138 B1 | 5/2005 | Krull et al. |
| 7,015,894 B2 | 3/2006 | Morohoshi |
| 7,184,064 B2 | 2/2007 | Zimmerman et al. |
| 7,463,304 B2 | 12/2008 | Murray |
| 7,537,162 B1 | 5/2009 | Siu |
| 7,571,014 B1 | 8/2009 | Lambourne et al. |
| 7,616,110 B2 | 11/2009 | Crump et al. |
| 7,653,883 B2 | 1/2010 | Hotelling et al. |
| 7,656,393 B2 | 2/2010 | King et al. |
| 7,663,607 B2 | 2/2010 | Hotelling et al. |
| 7,843,471 B2 | 11/2010 | Doan et al. |
| 7,905,815 B2 | 3/2011 | Ellis et al. |
| 8,170,656 B2 | 5/2012 | Tan et al. |
| 8,189,087 B2 | 5/2012 | Misawa et al. |
| 8,196,043 B2 | 6/2012 | Crow et al. |
| 8,290,603 B1 | 10/2012 | Lambourne |
| 8,341,537 B2 | 12/2012 | Ray et al. |
| 8,378,811 B2 | 2/2013 | Crump et al. |
| 8,447,704 B2 | 5/2013 | Tan et al. |
| 8,479,122 B2 | 7/2013 | Hotelling et al. |
| 8,508,472 B1 | 8/2013 | Wieder |
| 8,618,930 B2 | 12/2013 | Papadopoulos et al. |
| 8,624,836 B1 | 1/2014 | Miller et al. |
| 8,634,808 B1 | 1/2014 | Zhong et al. |
| 8,675,084 B2 | 3/2014 | Bolton et al. |
| 8,742,890 B2 | 6/2014 | Gocho et al. |
| 8,762,895 B2 | 6/2014 | Mehta et al. |
| 8,769,554 B2 | 7/2014 | Onda et al. |
| 8,872,760 B2 | 10/2014 | Tsurumi |
| 8,894,462 B2 | 11/2014 | Huang et al. |
| 8,924,894 B1 | 12/2014 | Yaksick et al. |
| 8,963,806 B1 | 2/2015 | Starner et al. |
| 8,983,539 B1 | 3/2015 | Kim et al. |
| 9,071,945 B1 | 6/2015 | Rubin et al. |
| 9,112,849 B1 | 8/2015 | Werkelin Ahlin et al. |
| 9,146,124 B2 | 9/2015 | Parada et al. |
| 9,171,268 B1 | 10/2015 | Penilla et al. |
| 9,172,866 B2 | 10/2015 | Ito et al. |
| 9,195,219 B2 | 11/2015 | Hong et al. |
| 9,223,296 B2 | 12/2015 | Yang et al. |
| 9,329,831 B1 | 5/2016 | Fullerton et al. |
| 9,369,537 B1 | 6/2016 | Mathew et al. |
| 9,389,694 B2 | 7/2016 | Ataee et al. |
| D765,118 S | 8/2016 | Bachman et al. |
| 9,405,766 B2 | 8/2016 | Robbin et al. |
| 9,414,115 B1 | 8/2016 | Mao et al. |
| 9,423,868 B2 | 8/2016 | Iwasaki |
| 9,451,144 B2 | 9/2016 | Dye |
| 9,462,340 B1 | 10/2016 | Mathurin |
| 9,495,575 B2 | 11/2016 | Kim et al. |
| D773,510 S | 12/2016 | Foss et al. |
| 9,532,723 B2 | 1/2017 | Kim et al. |
| 9,544,563 B1 | 1/2017 | Cheng et al. |
| 9,547,419 B2 | 1/2017 | Yang et al. |
| 9,560,629 B2 | 1/2017 | Migicovsky et al. |
| 9,574,896 B2 | 2/2017 | Mcgavran et al. |
| 9,594,354 B1 | 3/2017 | Kahn et al. |
| 9,628,950 B1 | 4/2017 | Noeth et al. |
| 9,652,741 B2 | 5/2017 | Goldberg et al. |
| D789,381 S | 6/2017 | Okumura et al. |
| 9,668,676 B2 | 6/2017 | Culbert |
| 9,704,386 B2 | 7/2017 | Yoon et al. |
| 9,753,543 B2 | 9/2017 | Jeon et al. |
| 9,820,323 B1 | 11/2017 | Young et al. |
| 9,832,697 B2 | 11/2017 | Kotecha et al. |
| 9,892,715 B2 | 2/2018 | Komulainen et al. |
| 9,927,957 B1 | 3/2018 | Sagar et al. |
| 9,939,899 B2 | 4/2018 | Allec et al. |
| 9,942,463 B2 | 4/2018 | Kuo et al. |
| 9,973,674 B2 | 5/2018 | Dye et al. |
| 9,977,566 B2 | 5/2018 | Jitkoff et al. |
| 10,001,817 B2 | 6/2018 | Zambetti et al. |
| 10,019,599 B1 | 7/2018 | Moran et al. |
| 10,135,905 B2 | 11/2018 | Chaudhri et al. |
| 10,182,138 B2 | 1/2019 | Motika et al. |
| 10,216,392 B2 | 2/2019 | Zhao |
| 10,261,595 B1 | 4/2019 | Kin |
| 10,299,300 B1 | 5/2019 | Young |
| 10,310,697 B2 | 6/2019 | Roberts et al. |
| 10,318,034 B1 | 6/2019 | Hauenstein et al. |
| 10,324,590 B2 | 6/2019 | Yang et al. |
| 10,356,070 B2 | 7/2019 | Cha et al. |
| 10,466,881 B2 | 11/2019 | Sasaki et al. |
| 10,524,300 B2 | 12/2019 | Ueda et al. |
| 10,627,914 B2 | 4/2020 | Ang et al. |
| 10,643,246 B1 | 5/2020 | Suprasadachandran Pillai |
| 10,656,720 B1 | 5/2020 | Holz |
| 10,671,174 B2 | 6/2020 | Ang et al. |
| 10,684,693 B2 | 6/2020 | Kletsov et al. |
| 10,691,332 B2 | 6/2020 | Offenberg et al. |
| 10,721,711 B2 | 7/2020 | Kirov et al. |
| 10,802,598 B2 | 10/2020 | Ang et al. |
| 10,895,979 B1 | 1/2021 | Boyers |
| 10,926,135 B1 | 2/2021 | Mckirdy |
| 10,936,067 B1 | 3/2021 | Chand et al. |
| 10,966,149 B2 | 3/2021 | Yoon et al. |
| 11,048,334 B2 | 6/2021 | Rothberg et al. |
| 11,050,873 B2 | 6/2021 | Kim et al. |
| 11,099,647 B2 | 8/2021 | Ang et al. |
| 11,150,730 B1 | 10/2021 | Anderson et al. |
| 11,331,045 B1 | 5/2022 | Moschella et al. |
| 11,347,320 B1 | 5/2022 | Shin et al. |
| 11,543,887 B2 | 1/2023 | Ang et al. |
| 11,604,510 B2 | 3/2023 | Henderek et al. |
| 11,868,531 B1 | 1/2024 | Tasci |
| 2001/0030597 A1 | 10/2001 | Inoue et al. |
| 2001/0031622 A1 | 10/2001 | Kivela et al. |
| 2002/0024500 A1 | 2/2002 | Howard |
| 2002/0068600 A1 | 6/2002 | Chihara et al. |
| 2002/0140803 A1 | 10/2002 | Gutta et al. |
| 2002/0142734 A1 | 10/2002 | Wickstead |
| 2002/0171737 A1 | 11/2002 | Tullis et al. |
| 2003/0025802 A1 | 2/2003 | Mayer, Jr. et al. |
| 2003/0128237 A1 | 7/2003 | Sakai |
| 2003/0151982 A1 | 8/2003 | Brewer et al. |
| 2003/0158927 A1 | 8/2003 | Sagey et al. |
| 2003/0171984 A1 | 9/2003 | Wodka et al. |
| 2004/0044953 A1 | 3/2004 | Watkins et al. |
| 2004/0100389 A1 | 5/2004 | Naito et al. |
| 2004/0264916 A1 | 12/2004 | Van et al. |
| 2005/0117601 A1 | 6/2005 | Anderson et al. |
| 2005/0134695 A1 | 6/2005 | Deshpande et al. |
| 2005/0198319 A1 | 9/2005 | Chan et al. |
| 2005/0237194 A1 | 10/2005 | Voba et al. |
| 2005/0246642 A1 | 11/2005 | Valderas et al. |
| 2006/0010402 A1 | 1/2006 | Undasan |
| 2006/0079973 A1 | 4/2006 | Bacharach et al. |

(56)          References Cited

U.S. PATENT DOCUMENTS

| | | |
|---|---|---|
| 2006/0107226 A1 | 5/2006 | Matthews et al. |
| 2006/0135064 A1 | 6/2006 | Cho et al. |
| 2006/0197753 A1 | 9/2006 | Hotelling |
| 2006/0217104 A1 | 9/2006 | Cho |
| 2007/0021153 A1 | 1/2007 | Novak |
| 2007/0025711 A1 | 2/2007 | Marcus et al. |
| 2007/0040810 A1 | 2/2007 | Dowe et al. |
| 2007/0096283 A1 | 5/2007 | Ljung et al. |
| 2007/0109417 A1 | 5/2007 | Hyttfors et al. |
| 2007/0143495 A1 | 6/2007 | Porat |
| 2007/0165103 A1 | 7/2007 | Arima et al. |
| 2007/0180392 A1 | 8/2007 | Russo |
| 2007/0191008 A1 | 8/2007 | Bucher et al. |
| 2007/0236451 A1 | 10/2007 | Ofek et al. |
| 2007/0254640 A1 | 11/2007 | Bliss |
| 2007/0259654 A1 | 11/2007 | Oijer |
| 2008/0004113 A1 | 1/2008 | Avery et al. |
| 2008/0052643 A1* | 2/2008 | Ike ......................... G06F 3/017 |
| | | 715/863 |
| 2008/0077673 A1 | 3/2008 | Thomas et al. |
| 2008/0120029 A1 | 5/2008 | Zelek et al. |
| 2008/0122796 A1 | 5/2008 | Jobs et al. |
| 2008/0165136 A1 | 7/2008 | Christie et al. |
| 2008/0214191 A1 | 9/2008 | Yach et al. |
| 2008/0219151 A1 | 9/2008 | Ma et al. |
| 2008/0259829 A1 | 10/2008 | Rosenblatt |
| 2008/0284855 A1 | 11/2008 | Umeyama et al. |
| 2008/0300055 A1 | 12/2008 | Lutnick et al. |
| 2008/0320394 A1 | 12/2008 | Womack |
| 2009/0060170 A1 | 3/2009 | Coughlan et al. |
| 2009/0068984 A1 | 3/2009 | Burnett |
| 2009/0088207 A1 | 4/2009 | Sweeney et al. |
| 2009/0102933 A1 | 4/2009 | Harris et al. |
| 2009/0143114 A1 | 6/2009 | Vargas et al. |
| 2009/0144391 A1 | 6/2009 | Jung et al. |
| 2009/0176532 A1 | 7/2009 | Chae et al. |
| 2009/0195402 A1 | 8/2009 | Izadi et al. |
| 2009/0195497 A1 | 8/2009 | Fitzgerald et al. |
| 2009/0203315 A1 | 8/2009 | Kawabata et al. |
| 2009/0207743 A1 | 8/2009 | Huq et al. |
| 2009/0222748 A1 | 9/2009 | Lejeune et al. |
| 2009/0225060 A1 | 9/2009 | Rizoiu et al. |
| 2009/0228868 A1 | 9/2009 | Forstall et al. |
| 2009/0231960 A1 | 9/2009 | Hutcheson |
| 2009/0239587 A1 | 9/2009 | Negron et al. |
| 2009/0251410 A1 | 10/2009 | Mori et al. |
| 2009/0284476 A1 | 11/2009 | Bull et al. |
| 2009/0306487 A1 | 12/2009 | Crowe et al. |
| 2009/0311993 A1 | 12/2009 | Horodezky |
| 2009/0315671 A1 | 12/2009 | Gocho et al. |
| 2009/0325630 A1 | 12/2009 | Tiitola et al. |
| 2010/0026626 A1 | 2/2010 | Macfarlane |
| 2010/0026640 A1 | 2/2010 | Kim et al. |
| 2010/0054497 A1 | 3/2010 | Bull et al. |
| 2010/0088182 A1 | 4/2010 | Ryder et al. |
| 2010/0125785 A1 | 5/2010 | Moore et al. |
| 2010/0138764 A1 | 6/2010 | Hatambeiki et al. |
| 2010/0149090 A1 | 6/2010 | Morris et al. |
| 2010/0162160 A1 | 6/2010 | Stallings et al. |
| 2010/0169790 A1 | 7/2010 | Vaughan et al. |
| 2010/0178873 A1 | 7/2010 | Lee et al. |
| 2010/0182126 A1 | 7/2010 | Martis et al. |
| 2010/0199232 A1 | 8/2010 | Mistry et al. |
| 2010/0228836 A1 | 9/2010 | Lehtovirta et al. |
| 2010/0284389 A1 | 11/2010 | Ramsay et al. |
| 2010/0287513 A1 | 11/2010 | Singh et al. |
| 2010/0289740 A1 | 11/2010 | Kim et al. |
| 2010/0289772 A1 | 11/2010 | Miller |
| 2010/0289910 A1 | 11/2010 | Kamshilin et al. |
| 2010/0321201 A1 | 12/2010 | Huang et al. |
| 2011/0012772 A1 | 1/2011 | Chuang et al. |
| 2011/0016425 A1 | 1/2011 | Homburg et al. |
| 2011/0029750 A1 | 2/2011 | Jang et al. |
| 2011/0037712 A1 | 2/2011 | Kim et al. |
| 2011/0054360 A1 | 3/2011 | Son et al. |
| 2011/0058052 A1 | 3/2011 | Bolton et al. |
| 2011/0059769 A1 | 3/2011 | Brunolli |
| 2011/0081860 A1 | 4/2011 | Brown et al. |
| 2011/0090407 A1 | 4/2011 | Friedman |
| 2011/0106921 A1 | 5/2011 | Brown et al. |
| 2011/0111735 A1 | 5/2011 | Pietrow |
| 2011/0115932 A1 | 5/2011 | Shin et al. |
| 2011/0130168 A1 | 6/2011 | Vendrow et al. |
| 2011/0138284 A1 | 6/2011 | Wigdor et al. |
| 2011/0148568 A1 | 6/2011 | Lim et al. |
| 2011/0153435 A1 | 6/2011 | Pisaris-Henderson |
| 2011/0153628 A1 | 6/2011 | Basu et al. |
| 2011/0157055 A1 | 6/2011 | Tilley et al. |
| 2011/0159469 A1 | 6/2011 | Hwang et al. |
| 2011/0159927 A1 | 6/2011 | Choi |
| 2011/0173204 A1 | 7/2011 | Murillo et al. |
| 2011/0181520 A1 | 7/2011 | Boda et al. |
| 2011/0183613 A1 | 7/2011 | Nocera |
| 2011/0210931 A1 | 9/2011 | Shai |
| 2011/0225492 A1 | 9/2011 | Boettcher et al. |
| 2011/0235926 A1 | 9/2011 | Yokono |
| 2011/0237221 A1 | 9/2011 | Prakash et al. |
| 2011/0252318 A1 | 10/2011 | Helms |
| 2011/0316884 A1 | 12/2011 | Giambalvo et al. |
| 2012/0019400 A1 | 1/2012 | Patel et al. |
| 2012/0044062 A1 | 2/2012 | Jersa et al. |
| 2012/0051560 A1 | 3/2012 | Sanders |
| 2012/0069206 A1 | 3/2012 | Hsieh |
| 2012/0071146 A1 | 3/2012 | Shrivastava et al. |
| 2012/0089300 A1 | 4/2012 | Wolterman et al. |
| 2012/0115608 A1 | 5/2012 | Pfeifer et al. |
| 2012/0120277 A1 | 5/2012 | Tsai et al. |
| 2012/0127070 A1 | 5/2012 | Ryoo et al. |
| 2012/0146899 A1 | 6/2012 | Teng |
| 2012/0188158 A1 | 7/2012 | Tan et al. |
| 2012/0192094 A1 | 7/2012 | Goertz et al. |
| 2012/0197419 A1 | 8/2012 | Dhruv et al. |
| 2012/0198531 A1 | 8/2012 | Ort et al. |
| 2012/0236037 A1 | 9/2012 | Lessing et al. |
| 2012/0266093 A1 | 10/2012 | Park et al. |
| 2012/0287290 A1 | 11/2012 | Jain et al. |
| 2012/0290965 A1 | 11/2012 | Ignor et al. |
| 2012/0306748 A1 | 12/2012 | Fleizach et al. |
| 2012/0316777 A1 | 12/2012 | Kitta et al. |
| 2012/0320141 A1 | 12/2012 | Bowen et al. |
| 2013/0016048 A1 | 1/2013 | So et al. |
| 2013/0016818 A1 | 1/2013 | Cohn |
| 2013/0017846 A1 | 1/2013 | Schoppe |
| 2013/0027341 A1 | 1/2013 | Mastandrea |
| 2013/0038771 A1 | 2/2013 | Brunner et al. |
| 2013/0057472 A1 | 3/2013 | Dizac et al. |
| 2013/0065482 A1 | 3/2013 | Trickett et al. |
| 2013/0076591 A1 | 3/2013 | Sirpal et al. |
| 2013/0085931 A1 | 4/2013 | Runyan |
| 2013/0093904 A1 | 4/2013 | Wagner et al. |
| 2013/0106603 A1 | 5/2013 | Weast et al. |
| 2013/0111550 A1 | 5/2013 | Naveh et al. |
| 2013/0117693 A1 | 5/2013 | Anderson et al. |
| 2013/0125016 A1 | 5/2013 | Pallakoff et al. |
| 2013/0134212 A1 | 5/2013 | Chang et al. |
| 2013/0135203 A1 | 5/2013 | Croughwell, III |
| 2013/0138272 A1 | 5/2013 | Louise-babando et al. |
| 2013/0141325 A1 | 6/2013 | Bailey et al. |
| 2013/0141331 A1 | 6/2013 | Shiu et al. |
| 2013/0141362 A1 | 6/2013 | Asanuma et al. |
| 2013/0143512 A1 | 6/2013 | Hernandez et al. |
| 2013/0145316 A1 | 6/2013 | Heo |
| 2013/0154913 A1 | 6/2013 | Genc et al. |
| 2013/0162411 A1 | 6/2013 | Moses et al. |
| 2013/0166679 A1 | 6/2013 | Kuwahara et al. |
| 2013/0168444 A1 | 7/2013 | Hsieh et al. |
| 2013/0201098 A1 | 8/2013 | Schilit et al. |
| 2013/0219285 A1 | 8/2013 | Iwasaki et al. |
| 2013/0219303 A1 | 8/2013 | Eriksson et al. |
| 2013/0222270 A1 | 8/2013 | Winkler et al. |
| 2013/0223279 A1 | 8/2013 | Tinnakornsrisuphap et al. |
| 2013/0225152 A1 | 8/2013 | Matthews et al. |
| 2013/0234926 A1 | 9/2013 | Rauber |
| 2013/0239046 A1 | 9/2013 | Platzer et al. |

(56) References Cited

U.S. PATENT DOCUMENTS

| | | |
|---|---|---|
| 2013/0244633 A1 | 9/2013 | Jacobs et al. |
| 2013/0286251 A1 | 10/2013 | Wood et al. |
| 2013/0300651 A1 | 11/2013 | Lim |
| 2013/0314204 A1 | 11/2013 | Ho et al. |
| 2013/0325524 A1 | 12/2013 | Boudville |
| 2013/0329074 A1 | 12/2013 | Zhang et al. |
| 2013/0329924 A1 | 12/2013 | Fleizach et al. |
| 2013/0331130 A1 | 12/2013 | Lee |
| 2013/0339436 A1 | 12/2013 | Gray |
| 2013/0346882 A1 | 12/2013 | Shiplacoff et al. |
| 2014/0006949 A1 | 1/2014 | Briand et al. |
| 2014/0007021 A1 | 1/2014 | Akiyama et al. |
| 2014/0015546 A1 | 1/2014 | Frederick et al. |
| 2014/0022399 A1 | 1/2014 | Rashid et al. |
| 2014/0028546 A1 | 1/2014 | Jeon et al. |
| 2014/0031698 A1 | 1/2014 | Moon et al. |
| 2014/0033100 A1 | 1/2014 | Noda et al. |
| 2014/0037107 A1 | 2/2014 | Marino et al. |
| 2014/0040831 A1 | 2/2014 | Akasaka et al. |
| 2014/0057569 A1 | 2/2014 | Toivanen et al. |
| 2014/0068526 A1 | 3/2014 | Figelman et al. |
| 2014/0068755 A1 | 3/2014 | King et al. |
| 2014/0073252 A1 | 3/2014 | Lee et al. |
| 2014/0075003 A1 | 3/2014 | Tanaka et al. |
| 2014/0075311 A1 | 3/2014 | Boettcher et al. |
| 2014/0078318 A1 | 3/2014 | Alameh |
| 2014/0078371 A1 | 3/2014 | Kinoshita |
| 2014/0084857 A1 | 3/2014 | Liu et al. |
| 2014/0095225 A1* | 4/2014 | Williams .............. G06Q 10/06 |
| | | 705/5 |
| 2014/0104180 A1 | 4/2014 | Schaffer |
| 2014/0104449 A1 | 4/2014 | Masarik et al. |
| 2014/0118563 A1 | 5/2014 | Mehta et al. |
| 2014/0122331 A1 | 5/2014 | Vaish et al. |
| 2014/0123043 A1 | 5/2014 | Schmidt et al. |
| 2014/0135612 A1 | 5/2014 | Yuen et al. |
| 2014/0139454 A1 | 5/2014 | Mistry et al. |
| 2014/0139637 A1 | 5/2014 | Mistry et al. |
| 2014/0141721 A1 | 5/2014 | Kim et al. |
| 2014/0142851 A1 | 5/2014 | Larmo et al. |
| 2014/0143678 A1 | 5/2014 | Mistry et al. |
| 2014/0143737 A1 | 5/2014 | Mistry et al. |
| 2014/0143784 A1 | 5/2014 | Mistry et al. |
| 2014/0149859 A1 | 5/2014 | Van Dyken et al. |
| 2014/0155705 A1 | 6/2014 | Papadopoulos et al. |
| 2014/0156801 A1 | 6/2014 | Fernandes et al. |
| 2014/0160033 A1 | 6/2014 | Brikman et al. |
| 2014/0160078 A1 | 6/2014 | Seo et al. |
| 2014/0160304 A1 | 6/2014 | Galor et al. |
| 2014/0164544 A1 | 6/2014 | Gagneraud |
| 2014/0164907 A1 | 6/2014 | Jung et al. |
| 2014/0164930 A1 | 6/2014 | Lieb et al. |
| 2014/0167986 A1 | 6/2014 | Parada et al. |
| 2014/0168056 A1 | 6/2014 | Swaminathan et al. |
| 2014/0173455 A1 | 6/2014 | Shimizu et al. |
| 2014/0176298 A1 | 6/2014 | Kumar et al. |
| 2014/0180582 A1 | 6/2014 | Pontarelli et al. |
| 2014/0181654 A1 | 6/2014 | Kumar et al. |
| 2014/0184524 A1 | 7/2014 | Schiefer et al. |
| 2014/0191715 A1 | 7/2014 | Wechlin et al. |
| 2014/0195943 A1 | 7/2014 | Zheng et al. |
| 2014/0204229 A1 | 7/2014 | Leung et al. |
| 2014/0210708 A1 | 7/2014 | Simmons et al. |
| 2014/0218599 A1 | 8/2014 | Nakamura et al. |
| 2014/0228063 A1 | 8/2014 | Harris et al. |
| 2014/0237389 A1 | 8/2014 | Ryall et al. |
| 2014/0240216 A1 | 8/2014 | Bukurak et al. |
| 2014/0240577 A1 | 8/2014 | Masugi |
| 2014/0269614 A1 | 9/2014 | Maguire et al. |
| 2014/0273975 A1 | 9/2014 | Barat et al. |
| 2014/0282068 A1 | 9/2014 | Levkovitz et al. |
| 2014/0282270 A1 | 9/2014 | Slonneger |
| 2014/0293755 A1 | 10/2014 | Geiser et al. |
| 2014/0302834 A1 | 10/2014 | Jones |
| 2014/0310350 A1 | 10/2014 | Borggaard et al. |
| 2014/0310598 A1 | 10/2014 | Sprague et al. |
| 2014/0320387 A1 | 10/2014 | Eriksson et al. |
| 2014/0320434 A1 | 10/2014 | Pantel |
| 2014/0328147 A1 | 11/2014 | Yang et al. |
| 2014/0331314 A1 | 11/2014 | Fujioka |
| 2014/0333602 A1 | 11/2014 | Yang et al. |
| 2014/0337450 A1 | 11/2014 | Choudhary et al. |
| 2014/0337748 A1 | 11/2014 | Lee |
| 2014/0343843 A1 | 11/2014 | Yanku |
| 2014/0344951 A1 | 11/2014 | Brewer |
| 2014/0358707 A1 | 12/2014 | Perkins et al. |
| 2014/0359124 A1 | 12/2014 | Adimatyam et al. |
| 2014/0359481 A1 | 12/2014 | Graham et al. |
| 2014/0359522 A1 | 12/2014 | Kim et al. |
| 2014/0365113 A1 | 12/2014 | Yue et al. |
| 2014/0365979 A1 | 12/2014 | Yoon et al. |
| 2014/0368719 A1 | 12/2014 | Kaneko et al. |
| 2014/0370807 A1 | 12/2014 | Pierce et al. |
| 2014/0375985 A1 | 12/2014 | Deliwala |
| 2014/0380187 A1 | 12/2014 | Gardenfors et al. |
| 2015/0011199 A1 | 1/2015 | Lee et al. |
| 2015/0017956 A1 | 1/2015 | Jeong |
| 2015/0019135 A1 | 1/2015 | Kacyvenski et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0022674 A1 | 1/2015 | Koss et al. |
| 2015/0026615 A1 | 1/2015 | Choi et al. |
| 2015/0026647 A1 | 1/2015 | Park et al. |
| 2015/0033136 A1 | 1/2015 | Sasaki et al. |
| 2015/0035762 A1 | 2/2015 | Lu |
| 2015/0036853 A1 | 2/2015 | Solum et al. |
| 2015/0046876 A1 | 2/2015 | Goldenberg |
| 2015/0049033 A1 | 2/2015 | Kim et al. |
| 2015/0049233 A1 | 2/2015 | Choi |
| 2015/0061842 A1 | 3/2015 | Yoon et al. |
| 2015/0061972 A1 | 3/2015 | Kang et al. |
| 2015/0065035 A1 | 3/2015 | Son et al. |
| 2015/0067580 A1 | 3/2015 | Um et al. |
| 2015/0084660 A1 | 3/2015 | Knierim et al. |
| 2015/0084860 A1 | 3/2015 | Aleem et al. |
| 2015/0085621 A1 | 3/2015 | Hong et al. |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0100621 A1 | 4/2015 | Pan |
| 2015/0106221 A1 | 4/2015 | Tapley et al. |
| 2015/0121231 A1 | 4/2015 | Edwardson et al. |
| 2015/0131121 A1 | 5/2015 | Kang |
| 2015/0156803 A1 | 6/2015 | Ballard et al. |
| 2015/0163788 A1 | 6/2015 | Karunakaran |
| 2015/0169171 A1 | 6/2015 | Fotland |
| 2015/0185877 A1 | 7/2015 | Watanabe et al. |
| 2015/0189162 A1 | 7/2015 | Kuo et al. |
| 2015/0193130 A1 | 7/2015 | Cho et al. |
| 2015/0193138 A1 | 7/2015 | Relyea et al. |
| 2015/0194050 A1 | 7/2015 | Lee |
| 2015/0199780 A1 | 7/2015 | Beyk |
| 2015/0205358 A1 | 7/2015 | Lyren |
| 2015/0205511 A1 | 7/2015 | Vinna et al. |
| 2015/0220149 A1 | 8/2015 | Plagemann et al. |
| 2015/0242065 A1 | 8/2015 | Ko et al. |
| 2015/0242083 A1 | 8/2015 | Rainisto |
| 2015/0243246 A1 | 8/2015 | Mun et al. |
| 2015/0248235 A1 | 9/2015 | Offenberg et al. |
| 2015/0261310 A1 | 9/2015 | Walmsley et al. |
| 2015/0261410 A1 | 9/2015 | Kumar et al. |
| 2015/0261493 A1 | 9/2015 | Lemmon et al. |
| 2015/0264202 A1 | 9/2015 | Pawlowski |
| 2015/0268821 A1 | 9/2015 | Ramsby et al. |
| 2015/0286295 A1 | 10/2015 | Pepe |
| 2015/0287403 A1 | 10/2015 | Holzer Zaslansky et al. |
| 2015/0297185 A1 | 10/2015 | Mccormack et al. |
| 2015/0312617 A1 | 10/2015 | Chen et al. |
| 2015/0324057 A1 | 11/2015 | Chaji et al. |
| 2015/0332031 A1 | 11/2015 | Mistry et al. |
| 2015/0339261 A1 | 11/2015 | Jha et al. |
| 2015/0346834 A1 | 12/2015 | Martinez Fernandez et al. |
| 2015/0350029 A1 | 12/2015 | Skrobotov |

(56) References Cited

U.S. PATENT DOCUMENTS

| | | |
|---|---|---|
| 2015/0358043 A1 | 12/2015 | Jeong et al. |
| 2015/0370333 A1 | 12/2015 | Ataee et al. |
| 2015/0373172 A1 | 12/2015 | Boesen |
| 2016/0004408 A1 | 1/2016 | Yun |
| 2016/0011724 A1 | 1/2016 | Wheeler et al. |
| 2016/0014266 A1 | 1/2016 | Bhatt |
| 2016/0018846 A1 | 1/2016 | Zenoff |
| 2016/0018900 A1 | 1/2016 | Tu et al. |
| 2016/0021168 A1 | 1/2016 | Chaudhri et al. |
| 2016/0026425 A1 | 1/2016 | Lee et al. |
| 2016/0028869 A1 | 1/2016 | Bhatt |
| 2016/0029899 A1 | 2/2016 | Kim et al. |
| 2016/0034742 A1 | 2/2016 | Kim et al. |
| 2016/0041580 A1 | 2/2016 | Inoue et al. |
| 2016/0041680 A1 | 2/2016 | Chi et al. |
| 2016/0043905 A1 | 2/2016 | Fiedler |
| 2016/0048215 A1 | 2/2016 | Shin et al. |
| 2016/0048369 A1 | 2/2016 | Zenoff |
| 2016/0048370 A1 | 2/2016 | Zenoff |
| 2016/0050476 A1 | 2/2016 | Patil |
| 2016/0054710 A1 | 2/2016 | Jo et al. |
| 2016/0061613 A1 | 3/2016 | Jung et al. |
| 2016/0062567 A1 | 3/2016 | Yang et al. |
| 2016/0062572 A1 | 3/2016 | Yang et al. |
| 2016/0062582 A1 | 3/2016 | Wilson et al. |
| 2016/0062606 A1 | 3/2016 | Vega et al. |
| 2016/0062719 A1 | 3/2016 | Romano et al. |
| 2016/0085266 A1 | 3/2016 | Lee et al. |
| 2016/0091980 A1 | 3/2016 | Baranski et al. |
| 2016/0092053 A1 | 3/2016 | Loganathan et al. |
| 2016/0094698 A1 | 3/2016 | Lee et al. |
| 2016/0098137 A1 | 4/2016 | Kim et al. |
| 2016/0116941 A1 | 4/2016 | Kuwabara et al. |
| 2016/0124514 A1 | 5/2016 | Cha et al. |
| 2016/0134737 A1 | 5/2016 | Pulletikurty |
| 2016/0142763 A1 | 5/2016 | Kim et al. |
| 2016/0156597 A1 | 6/2016 | Meng et al. |
| 2016/0156957 A1 | 6/2016 | Yun |
| 2016/0165037 A1 | 6/2016 | Youn et al. |
| 2016/0191511 A1 | 6/2016 | Tijerina et al. |
| 2016/0195864 A1 | 7/2016 | Kim |
| 2016/0196692 A1 | 7/2016 | Kjallstrom et al. |
| 2016/0202866 A1 | 7/2016 | Zambetti |
| 2016/0209939 A1 | 7/2016 | Zambetti et al. |
| 2016/0246566 A1 | 8/2016 | Fullerton et al. |
| 2016/0248899 A1 | 8/2016 | Lee et al. |
| 2016/0259489 A1 | 9/2016 | Yang |
| 2016/0260414 A1 | 9/2016 | Yang |
| 2016/0269176 A1 | 9/2016 | Pang et al. |
| 2016/0283194 A1 | 9/2016 | Patil et al. |
| 2016/0291768 A1 | 10/2016 | Cho et al. |
| 2016/0296142 A1 | 10/2016 | Culbert |
| 2016/0313798 A1 | 10/2016 | Connor |
| 2016/0313875 A1 | 10/2016 | Williams et al. |
| 2016/0327911 A1 | 11/2016 | Eim et al. |
| 2016/0328108 A1 | 11/2016 | Li |
| 2016/0337206 A1 | 11/2016 | Bugenhagen et al. |
| 2016/0345039 A1 | 11/2016 | Billmeyer |
| 2016/0357507 A1 | 12/2016 | Decker et al. |
| 2017/0006210 A1 | 1/2017 | Dye et al. |
| 2017/0011210 A1 | 1/2017 | Cheong et al. |
| 2017/0031453 A1 | 2/2017 | Presura |
| 2017/0031648 A1 | 2/2017 | So et al. |
| 2017/0034253 A1 | 2/2017 | Jiang et al. |
| 2017/0046872 A1 | 2/2017 | Geselowitz et al. |
| 2017/0053542 A1 | 2/2017 | Wilson et al. |
| 2017/0065184 A1 | 3/2017 | Barak |
| 2017/0083188 A1 | 3/2017 | Yang et al. |
| 2017/0090567 A1 | 3/2017 | Allec et al. |
| 2017/0123487 A1 | 5/2017 | Hazra et al. |
| 2017/0134553 A1 | 5/2017 | Jeon et al. |
| 2017/0134872 A1 | 5/2017 | Silva et al. |
| 2017/0149795 A1 | 5/2017 | Day |
| 2017/0156110 A1 | 6/2017 | Ueno et al. |
| 2017/0160098 A1 | 6/2017 | Mcgavran et al. |
| 2017/0160819 A1* | 6/2017 | Yi ............................. G06F 3/03 |
| 2017/0180843 A1 | 6/2017 | Perianu et al. |
| 2017/0185373 A1 | 6/2017 | Kim et al. |
| 2017/0192743 A1 | 7/2017 | Chun et al. |
| 2017/0195772 A1 | 7/2017 | Han et al. |
| 2017/0205854 A1 | 7/2017 | Zenoff |
| 2017/0205878 A1 | 7/2017 | Hoste et al. |
| 2017/0212590 A1 | 7/2017 | Vanblon et al. |
| 2017/0220224 A1 | 8/2017 | Kodali et al. |
| 2017/0230236 A1 | 8/2017 | Kim et al. |
| 2017/0308227 A1 | 10/2017 | Park |
| 2017/0308292 A1* | 10/2017 | Choi ..................... G06F 16/248 |
| 2017/0322711 A1 | 11/2017 | Robinson et al. |
| 2017/0322713 A1 | 11/2017 | Hwang et al. |
| 2017/0331901 A1 | 11/2017 | Sarlandie De La Robertie et al. |
| 2017/0357426 A1 | 12/2017 | Wilson et al. |
| 2017/0357477 A1 | 12/2017 | Im et al. |
| 2018/0004287 A1 | 1/2018 | Yoo et al. |
| 2018/0013815 A1 | 1/2018 | Gold |
| 2018/0036469 A1 | 2/2018 | Crnkovich et al. |
| 2018/0046788 A1 | 2/2018 | Ohtani et al. |
| 2018/0059894 A1 | 3/2018 | Kim |
| 2018/0062691 A1 | 3/2018 | Barnett, Jr. |
| 2018/0067712 A1 | 3/2018 | Behzadi et al. |
| 2018/0069957 A1 | 3/2018 | Mushikabe et al. |
| 2018/0081453 A1 | 3/2018 | Ely |
| 2018/0101235 A1 | 4/2018 | Bodensteiner et al. |
| 2018/0121036 A1 | 5/2018 | Moore et al. |
| 2018/0137266 A1 | 5/2018 | Kim et al. |
| 2018/0153430 A1 | 6/2018 | Ang et al. |
| 2018/0181261 A1 | 6/2018 | Saurabh |
| 2018/0199137 A1 | 7/2018 | Mate et al. |
| 2018/0218636 A1 | 8/2018 | Alaouf et al. |
| 2018/0253151 A1 | 9/2018 | Kletsov et al. |
| 2018/0259915 A1 | 9/2018 | Hosoi et al. |
| 2018/0262677 A1 | 9/2018 | Dye et al. |
| 2018/0267773 A1 | 9/2018 | Kim et al. |
| 2018/0288560 A1 | 10/2018 | Naik et al. |
| 2018/0294844 A1 | 10/2018 | Choi et al. |
| 2018/0307303 A1* | 10/2018 | Powderly ................ G06F 3/017 |
| 2018/0321842 A1 | 11/2018 | Lee et al. |
| 2018/0329585 A1 | 11/2018 | Carrigan et al. |
| 2018/0329586 A1 | 11/2018 | Sundstrom et al. |
| 2018/0335903 A1 | 11/2018 | Coffman et al. |
| 2018/0341448 A1 | 11/2018 | Behzadi et al. |
| 2018/0352435 A1 | 12/2018 | Donley et al. |
| 2019/0011703 A1 | 1/2019 | Robaina et al. |
| 2019/0018506 A1 | 1/2019 | Bernstein et al. |
| 2019/0028865 A1 | 1/2019 | Raleigh et al. |
| 2019/0033964 A1 | 1/2019 | Kulkarni et al. |
| 2019/0037004 A1 | 1/2019 | Chaudhri et al. |
| 2019/0113889 A1 | 4/2019 | Kumar et al. |
| 2019/0121300 A1 | 4/2019 | Peterson et al. |
| 2019/0121522 A1 | 4/2019 | Davis et al. |
| 2019/0129661 A1 | 5/2019 | Hirota et al. |
| 2019/0138696 A1 | 5/2019 | Carpenter et al. |
| 2019/0146219 A1 | 5/2019 | Rodriguez, II |
| 2019/0146422 A1 | 5/2019 | Meyer et al. |
| 2019/0179423 A1 | 6/2019 | Rose et al. |
| 2019/0182749 A1 | 6/2019 | Breaux et al. |
| 2019/0187861 A1 | 6/2019 | Yang |
| 2019/0191208 A1 | 6/2019 | Coenen et al. |
| 2019/0196600 A1 | 6/2019 | Rothberg et al. |
| 2019/0220040 A1 | 7/2019 | Wu et al. |
| 2019/0238675 A1 | 8/2019 | Soni et al. |
| 2019/0265849 A1 | 8/2019 | Yang et al. |
| 2019/0268771 A1 | 8/2019 | Seo et al. |
| 2019/0281547 A1 | 9/2019 | Yoon et al. |
| 2019/0297439 A1 | 9/2019 | Maeda |
| 2019/0306607 A1 | 10/2019 | Clayton et al. |
| 2019/0317608 A1 | 10/2019 | Ono et al. |
| 2019/0340348 A1 | 11/2019 | Yu et al. |
| 2019/0347181 A1 | 11/2019 | Cranfill et al. |
| 2019/0349469 A1 | 11/2019 | Skogen et al. |
| 2019/0357787 A1 | 11/2019 | Barachant et al. |
| 2019/0370094 A1 | 12/2019 | Louch et al. |
| 2019/0372862 A1 | 12/2019 | Carrigan et al. |
| 2020/0042087 A1 | 2/2020 | Ang et al. |
| 2020/0042088 A1 | 2/2020 | Ang et al. |

(56) References Cited

U.S. PATENT DOCUMENTS

| | | |
|---|---|---|
| 2020/0042089 A1 | 2/2020 | Ang et al. |
| 2020/0042094 A1 | 2/2020 | Ang et al. |
| 2020/0042095 A1 | 2/2020 | Ang et al. |
| 2020/0042145 A1 | 2/2020 | Williams et al. |
| 2020/0042311 A1 | 2/2020 | Shin |
| 2020/0067245 A1 | 2/2020 | Maley |
| 2020/0073481 A1 | 3/2020 | Mizunuma et al. |
| 2020/0073483 A1 | 3/2020 | Berenzweig et al. |
| 2020/0097081 A1 | 3/2020 | Stone et al. |
| 2020/0097082 A1 | 3/2020 | Berenzweig et al. |
| 2020/0111260 A1 | 4/2020 | Osborn et al. |
| 2020/0125165 A1 | 4/2020 | Pace et al. |
| 2020/0150772 A1 | 5/2020 | Quinn et al. |
| 2020/0159340 A1 | 5/2020 | Bernstein et al. |
| 2020/0159374 A1 | 5/2020 | Yang et al. |
| 2020/0174734 A1 | 6/2020 | Gomes et al. |
| 2020/0213437 A1 | 7/2020 | Bhatt |
| 2020/0228646 A1 | 7/2020 | Hotes et al. |
| 2020/0249752 A1 | 8/2020 | Parshionikar |
| 2020/0264764 A1* | 8/2020 | Seymour ............... G09B 21/008 |
| 2020/0285379 A1 | 9/2020 | George-svahn |
| 2020/0301509 A1 | 9/2020 | Liu et al. |
| 2020/0304917 A1 | 9/2020 | Ryu |
| 2020/0310540 A1 | 10/2020 | Hussami et al. |
| 2020/0310541 A1 | 10/2020 | Reisman et al. |
| 2020/0342144 A1 | 10/2020 | Alameh et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379712 A1 | 12/2020 | Carrigan |
| 2020/0379713 A1 | 12/2020 | Carrigan |
| 2020/0379716 A1 | 12/2020 | Carrigan et al. |
| 2020/0401292 A1 | 12/2020 | Lorenz et al. |
| 2021/0064132 A1 | 3/2021 | Rubin et al. |
| 2021/0076091 A1 | 3/2021 | Shohara |
| 2021/0103338 A1 | 4/2021 | Ang et al. |
| 2021/0124417 A1 | 4/2021 | Ma |
| 2021/0216654 A1 | 7/2021 | Ko et al. |
| 2021/0232225 A1 | 7/2021 | Cipoletta et al. |
| 2021/0255750 A1 | 8/2021 | Al et al. |
| 2021/0263702 A1 | 8/2021 | Carrigan |
| 2021/0349552 A1 | 11/2021 | Bernstein et al. |
| 2021/0373718 A1 | 12/2021 | Yang et al. |
| 2021/0405760 A1 | 12/2021 | Schoen |
| 2021/0407507 A1 | 12/2021 | Zhou et al. |
| 2022/0019284 A1 | 1/2022 | Kaifosh et al. |
| 2022/0043626 A1 | 2/2022 | Carrigan |
| 2022/0044309 A1 | 2/2022 | Jose |
| 2022/0050425 A1 | 2/2022 | Connor |
| 2022/0083183 A1 | 3/2022 | Patton |
| 2022/0101719 A1 | 3/2022 | Bojic et al. |
| 2022/0121344 A1 | 4/2022 | Pastrana Vicente et al. |
| 2022/0129068 A1 | 4/2022 | Anderson et al. |
| 2022/0156353 A1 | 5/2022 | Duffy et al. |
| 2022/0179497 A1 | 6/2022 | Jung et al. |
| 2022/0240408 A1 | 7/2022 | Faulkner et al. |
| 2022/0244782 A1 | 8/2022 | Robert et al. |
| 2022/0253146 A1 | 8/2022 | Erivantcev et al. |
| 2022/0276780 A1 | 9/2022 | Ko et al. |
| 2022/0291753 A1 | 9/2022 | Erivantcev et al. |
| 2022/0326779 A1 | 10/2022 | Chung et al. |
| 2022/0374085 A1 | 11/2022 | Nguyen et al. |
| 2023/0024627 A1 | 1/2023 | Bernstein et al. |
| 2023/0052490 A1 | 2/2023 | Chaudhri et al. |
| 2023/0072423 A1 | 3/2023 | Osborn et al. |
| 2023/0074476 A1 | 3/2023 | Bae et al. |
| 2023/0090410 A1 | 3/2023 | Sharma et al. |
| 2023/0113991 A1 | 4/2023 | Ang et al. |
| 2023/0131489 A1 | 4/2023 | Marzorati et al. |
| 2023/0177870 A1 | 6/2023 | Chao et al. |
| 2023/0179700 A1 | 6/2023 | Bhatt |
| 2023/0195237 A1 | 6/2023 | Nguyen et al. |
| 2023/0214089 A1 | 7/2023 | Yang et al. |
| 2023/0259207 A1 | 8/2023 | Lam et al. |
| 2023/0270363 A1 | 8/2023 | Qazi et al. |
| 2023/0335139 A1 | 10/2023 | Breton et al. |
| 2023/0353862 A1* | 11/2023 | Yi ........................ H04N 23/90 |
| 2023/0376193 A1 | 11/2023 | Han et al. |
| 2023/0376268 A1 | 11/2023 | Carrigan et al. |
| 2024/0061513 A1 | 2/2024 | Reisman et al. |
| 2024/0085992 A1 | 3/2024 | Bernstein et al. |
| 2024/0094819 A1 | 3/2024 | Nie et al. |
| 2024/0220009 A1 | 7/2024 | Dryer et al. |
| 2024/0310982 A1 | 9/2024 | Chaudhri et al. |
| 2024/0370093 A1 | 11/2024 | Nie et al. |
| 2024/0385691 A1 | 11/2024 | Nie et al. |
| 2025/0047777 A1 | 2/2025 | Bhatt |
| 2025/0085791 A1 | 3/2025 | Bernstein et al. |
| 2025/0094021 A1 | 3/2025 | Yang et al. |
| 2025/0321646 A1 | 10/2025 | Chao et al. |

FOREIGN PATENT DOCUMENTS

| | | |
|---|---|---|
| CN | 1705346 A | 12/2005 |
| CN | 101243383 A | 8/2008 |
| CN | 101427574 A | 5/2009 |
| CN | 101433034 A | 5/2009 |
| CN | 202309894 U | 7/2012 |
| CN | 102830795 A | 12/2012 |
| CN | 102833345 A | 12/2012 |
| CN | 103415084 A | 11/2013 |
| CN | 103778082 A | 5/2014 |
| CN | 103839023 A | 6/2014 |
| CN | 103914238 A | 7/2014 |
| CN | 103970208 A | 8/2014 |
| CN | 104024987 A | 9/2014 |
| CN | 203930358 U | 11/2014 |
| CN | 104205785 A | 12/2014 |
| CN | 104272854 A | 1/2015 |
| CN | 104281430 A | 1/2015 |
| CN | 104346297 A | 2/2015 |
| CN | 104423581 A | 3/2015 |
| CN | 104956182 A | 9/2015 |
| CN | 105208511 A | 12/2015 |
| CN | 105388998 A | 3/2016 |
| CN | 105574378 A | 5/2016 |
| CN | 105657465 A | 6/2016 |
| CN | 105959906 A | 9/2016 |
| CN | 106060772 A | 10/2016 |
| CN | 103914238 B | 2/2017 |
| CN | 106797415 A | 5/2017 |
| CN | 106851528 A | 6/2017 |
| CN | 106936929 A | 7/2017 |
| CN | 107637073 A | 1/2018 |
| CN | 107683470 A | 2/2018 |
| CN | 107797657 A | 3/2018 |
| CN | 107852572 A | 3/2018 |
| CN | 107949879 A | 4/2018 |
| CN | 108289239 A | 7/2018 |
| CN | 108292203 A | 7/2018 |
| CN | 108958608 A | 12/2018 |
| CN | 208188782 U | 12/2018 |
| CN | 109347581 A | 2/2019 |
| CN | 109461462 A | 3/2019 |
| CN | 109584879 A | 4/2019 |
| CN | 109584879 B | 7/2021 |
| CN | 108958608 B | 7/2022 |
| EP | 0836074 A2 | 4/1998 |
| EP | 1406176 A1 | 4/2004 |
| EP | 1614992 A1 | 1/2006 |
| EP | 1705883 A1 | 9/2006 |
| EP | 1858238 A2 | 11/2007 |
| EP | 1953663 A1 | 8/2008 |
| EP | 2096413 A1 | 9/2009 |
| EP | 2290583 A1 | 3/2011 |
| EP | 2306692 A1 | 4/2011 |
| EP | 2367098 A2 | 9/2011 |
| EP | 2428947 A2 | 3/2012 |
| EP | 2466260 A1 | 6/2012 |
| EP | 2523439 A1 | 11/2012 |
| EP | 2565765 A1 | 3/2013 |
| EP | 2629483 A1 | 8/2013 |
| EP | 2632131 A1 | 8/2013 |
| EP | 1614992 B1 | 10/2013 |

(56) References Cited

FOREIGN PATENT DOCUMENTS

| | | |
|---|---|---|
| EP | 2698686 A2 | 2/2014 |
| EP | 2703972 A1 | 3/2014 |
| EP | 2720442 A1 | 4/2014 |
| EP | 2813921 A1 | 12/2014 |
| EP | 2892240 A1 | 7/2015 |
| EP | 2980715 A1 | 2/2016 |
| EP | 2999208 A1 | 3/2016 |
| EP | 3001282 A1 | 3/2016 |
| EP | 3032537 A2 | 6/2016 |
| EP | 3057342 A1 | 8/2016 |
| EP | 3073703 A1 | 9/2016 |
| EP | 3125097 A2 | 2/2017 |
| EP | 3276905 A1 | 1/2018 |
| EP | 3379853 A1 | 9/2018 |
| GB | 0412212 | 7/2004 |
| GB | 2402105 A | 12/2004 |
| JP | 11-183183 A | 7/1999 |
| JP | 2000-163031 A | 6/2000 |
| JP | 2000-227832 A | 8/2000 |
| JP | 2001-216069 A | 8/2001 |
| JP | 2001-309455 A | 11/2001 |
| JP | 2002-33795 A | 1/2002 |
| JP | 2002342033 A | 11/2002 |
| JP | 2006-209563 A | 8/2006 |
| JP | 2009-502048 A | 1/2009 |
| JP | 2011-217000 A | 10/2011 |
| JP | 2013-146557 A | 8/2013 |
| JP | 2014-53692 A | 3/2014 |
| JP | 2014-123169 A | 7/2014 |
| JP | 2014-128032 A | 7/2014 |
| JP | 2014-143575 A | 8/2014 |
| JP | 2015-61318 A | 3/2015 |
| JP | 2016-13151 A | 1/2016 |
| JP | 2017-34563 A | 2/2017 |
| JP | 2017-510912 A | 4/2017 |
| JP | 2017-143357 A | 8/2017 |
| JP | 2018-113544 A | 7/2018 |
| JP | 2018-147265 A | 9/2018 |
| JP | 2018-536933 A | 12/2018 |
| KR | 10-2016-0000330 A | 1/2016 |
| KR | 10-2016-0092363 A | 8/2016 |
| KR | 10-2017-0027435 A | 3/2017 |
| KR | 10-2017-0032471 A | 3/2017 |
| KR | 10-2017-0082022 A | 7/2017 |
| KR | 10-2017-0124954 A | 11/2017 |
| KR | 10-2019-0020850 A | 3/2019 |
| KR | 10-2019-0022883 A | 3/2019 |
| TW | 201012152 A | 3/2010 |
| TW | 201215086 A | 4/2012 |
| TW | M474482 U | 3/2014 |
| TW | 201509168 A | 3/2015 |
| WO | 2007/008321 A2 | 1/2007 |
| WO | 2007/105937 A1 | 9/2007 |
| WO | 2007/142703 A1 | 12/2007 |
| WO | 2007/149731 A1 | 12/2007 |
| WO | 2009/137419 A2 | 11/2009 |
| WO | 2009/140095 A2 | 11/2009 |
| WO | 2011/063516 A1 | 6/2011 |
| WO | 2012/138663 A2 | 10/2012 |
| WO | 2012/172970 A1 | 12/2012 |
| WO | 2013/169849 A2 | 11/2013 |
| WO | 2013/169875 A2 | 11/2013 |
| WO | 2014/113987 A1 | 7/2014 |
| WO | 2014/117125 A1 | 7/2014 |
| WO | 2014/171734 A2 | 10/2014 |
| WO | 2015/060856 A1 | 4/2015 |
| WO | 2015/061831 A1 | 5/2015 |
| WO | 2015/065402 A1 | 5/2015 |
| WO | 2015/119637 A1 | 8/2015 |
| WO | 2015/121100 A1 | 8/2015 |
| WO | 2015/185123 A1 | 12/2015 |
| WO | 2016/022203 A1 | 2/2016 |
| WO | 2016/022205 A1 | 2/2016 |
| WO | 2016/036472 A1 | 3/2016 |
| WO | 2016/036541 A2 | 3/2016 |
| WO | 2016/053459 A1 | 4/2016 |
| WO | 2016/200603 A1 | 12/2016 |
| WO | 2016/204186 A1 | 12/2016 |
| WO | 2017/062621 A1 | 4/2017 |
| WO | 2017/112003 A1 | 6/2017 |
| WO | 2018/032085 A1 | 2/2018 |
| WO | 2018/048510 A1 | 3/2018 |
| WO | 2018/084802 A1 | 5/2018 |
| WO | 2018/098136 A1 | 5/2018 |
| WO | 2018/131251 A1 | 7/2018 |
| WO | 2019/173136 A1 | 9/2019 |
| WO | 2019/200350 A1 | 10/2019 |
| WO | 2019/217086 A2 | 11/2019 |
| WO | 2020/063762 A1 | 4/2020 |
| WO | 2021/006903 A1 | 1/2021 |
| WO | 2023/230354 A1 | 11/2023 |

OTHER PUBLICATIONS

Minutes of the Oral Proceedings received for European Patent Application No. 17184710.6, mailed on May 22, 2024, 4 pages.

"3C Blogger Kisplay Share, Samsung Galaxy Tab S Hands-on SideSync 3.0 Is Amazing", Online Available at: <http://www.samsung.com/tw/article/galaxy-tab-s-blogger-kisplay>, Jul. 4, 2014, 4 pages. (Official Copy Only) {See Communication under 37 CFR § 1.98(a) (3)}.

Advisory Action received for U.S. Appl. No. 14/863,099, mailed on Sep. 8, 2016, 3 pages.

Apple Previews Powerful Software Updates Designed for People with Disabilities, Available online at: <https://www.apple.com/newsroom/2021/05/apple-previews-powerful-software-updates-designed-for-people-with-disabilities/>, May 19, 2021, 10 pages.

Applicant Initiated Interview Summary received for U.S. Appl. No. 14/973,573, mailed on Jul. 10, 2017, 3 pages.

Applicant Initiated Interview Summary received for U.S. Appl. No. 16/583,994, mailed on Apr. 3, 2020, 5 pages.

Applicant Initiated Interview Summary received for U.S. Appl. No. 17/188,228, mailed on Jun. 14, 2022, 9 pages.

Applicant-Initiated Interview Summary received for U.S. Appl. No. 16/144,264, mailed on Jul. 22, 2020, 5 pages.

Applicant-Initiated Interview Summary received for U.S. Appl. No. 16/147,523, mailed on Apr. 27, 2020, 3 pages.

Applicant-Initiated Interview Summary received for U.S. Appl. No. 16/147,523, mailed on Dec. 10, 2021, 4 pages.

Applicant-Initiated Interview Summary received for U.S. Appl. No. 16/147,523, mailed on Jun. 13, 2022, 4 pages.

Applicant-Initiated Interview Summary received for U.S. Appl. No. 16/147,523, mailed on Oct. 26, 2020, 3 pages.

Applicant-Initiated Interview Summary received for U.S. Appl. No. 16/147,523, mailed on Sep. 14, 2021, 3 pages.

Applicant-Initiated Interview Summary received for U.S. Appl. No. 16/281,838, mailed on Jun. 2, 2020, 5 pages.

Applicant-Initiated Interview Summary received for U.S. Appl. No. 16/583,981, mailed on Mar. 9, 2020, 5 pages.

Applicant-Initiated Interview Summary received for U.S. Appl. No. 16/583,981, mailed on Sep. 14, 2020, 6 pages.

Applicant-Initiated Interview Summary received for U.S. Appl. No. 16/583,994, mailed on May 28, 2021, 5 pages.

Applicant-Initiated Interview Summary received for U.S. Appl. No. 16/583,994, mailed on Nov. 24, 2020, 4 pages.

Applicant-Initiated Interview Summary received for U.S. Appl. No. 16/653,857, mailed on Dec. 14, 2020, 3 pages.

Applicant-Initiated Interview Summary received for U.S. Appl. No. 16/653,857, mailed on May 3, 2021, 4 pages.

Applicant-Initiated Interview Summary received for U.S. Appl. No. 16/679,967, mailed on Feb. 10, 2022, 2 pages.

Applicant-Initiated Interview Summary received for U.S. Appl. No. 16/679,967, mailed on Jun. 1, 2022, 2 pages.

Applicant-Initiated Interview Summary received for U.S. Appl. No. 16/679,967, mailed on Oct. 25, 2021, 2 pages.

Applicant-Initiated Interview Summary received for U.S. Appl. No. 16/723,583, mailed on Dec. 28, 2020, 6 pages.

(56) References Cited

OTHER PUBLICATIONS

Applicant-Initiated Interview Summary received for U.S. Appl. No. 16/749,929, mailed on Oct. 13, 2020, 4 pages.

Applicant-Initiated Interview Summary received for U.S. Appl. No. 17/041,350, mailed on Aug. 18, 2021, 2 pages.

Applicant-Initiated Interview Summary received for U.S. Appl. No. 17/041,350, mailed on Feb. 2, 2022, 2 pages.

Applicant-Initiated Interview Summary received for U.S. Appl. No. 17/188,228, mailed on Sep. 23, 2022, 2 pages.

Applicant-Initiated Interview Summary received for U.S. Appl. No. 17/314,948, mailed on Oct. 21, 2022, 6 pages.

Applicant-Initiated Interview Summary received for U.S. Appl. No. 17/410,169, mailed on Nov. 7, 2022, 5 pages.

"Axiang's Network Notebook, Deep Analysis on Samsung's 2013 New Flagship: tell you what kind of mobile phone Galaxy S4 is!", Online Available at: <https://axiang.cc/archives/6115>, Apr. 22, 2013, 4 pages. (Official Copy Only) {See Communication under 37 CFR § 1.98(a) (3)}.

Baar Marius, "Fitbit Ace—Unboxing, Setup and 24 Hour Test", YouTube [online] [video], Retrieved from: <https://youtu.be/ekvkfqOyrls>.See especially 4:44, Oct. 24, 2018, 3 pages.

Brief Communication regarding Oral Proceedings received for European Patent Application No. 17184710.6, mailed on Feb. 19, 2020, 2 pages.

Brief Communication regarding Oral Proceedings received for European Patent Application No. 17184710.6, mailed on Mar. 9, 2020, 2 pages.

Brief Communication Regarding Oral Proceedings received for European Patent Application No. 20192404.0, mailed on May 4, 2022, 3 pages.

Brief Communication Regarding Oral Proceedings received for European Patent Application No. 20192404.0, mailed on May 18, 2022, 1 page.

Chenzai, "Apple, please don't screw up notifications on the Apple Watch", Available online at:—<https://digi.tech.qq.com/a/20140918/060747.htm. also published on the English webpage https://www.theverge.com/2014/9/9/6127913/apple-please-dont-screw-up-notifications-on-the-apple-watch>, Sep. 18, 2014, 8 pages (4 pages of English Translation and 4 pages of Official Copy).

Corrected Notice of Allowance received for U.S. Appl. No. 14/641,251, mailed on Jun. 17, 2016, 2 pages.

Corrected Notice of Allowance received for U.S. Appl. No. 14/839,897, mailed on Jan. 23, 2019, 6 pages.

Corrected Notice of Allowance received for U.S. Appl. No. 14/839,903, mailed on Feb. 13, 2019, 2 pages.

Corrected Notice of Allowance received for U.S. Appl. No. 14/839,903, mailed on Mar. 1, 2019, 2 pages.

Corrected Notice of Allowance received for U.S. Appl. No. 15/268,115, mailed on Apr. 13, 2018, 11 pages.

Corrected Notice of Allowance received for U.S. Appl. No. 15/268,115, mailed on Mar. 21, 2018, 9 pages.

Corrected Notice of Allowance received for U.S. Appl. No. 16/281,838, mailed on Oct. 30, 2020, 2 pages.

Corrected Notice of Allowance received for U.S. Appl. No. 16/583,981, mailed on Apr. 6, 2021, 3 pages.

Corrected Notice of Allowance received for U.S. Appl. No. 16/583,981, mailed on May 17, 2021, 3 pages.

Corrected Notice of Allowance received for U.S. Appl. No. 16/583,994, mailed on Jul. 6, 2021, 3 pages.

Corrected Notice of Allowance received for U.S. Appl. No. 17/041,350, mailed on Apr. 4, 2022, 3 pages.

Corrected Notice of Allowance received for U.S. Appl. No. 17/041,350, mailed on Mar. 15, 2022, 3 pages.

Decision on Appeal received for U.S. Appl. No. 14/774,664, mailed on Sep. 12, 2019, 8 pages.

Decision on Appeal received for U.S. Appl. No. 14/863,099, mailed on Aug. 22, 2019, 9 pages.

Decision to Grant received for Danish Patent Application No. PA201570664, mailed on Feb. 20, 2017, 2 pages.

Decision to grant received for Danish Patent Application No. PA201570788, mailed on Jul. 10, 2017, 2 pages.

Decision to Grant received for Danish Patent Application No. PA201570791, mailed on Jun. 7, 2017, 2 pages.

Decision to Grant received for Danish Patent Application No. PA202070609, mailed on May 3, 2021, 2 pages.

Decision to Grant received for European Patent Application No. 15712218.5, mailed on Jun. 7, 2018, 2 pages.

Decision to Grant received for European Patent Application No. 15787091.6, mailed on Dec. 3, 2020, 2 pages.

Decision to Refuse received for European Patent Application No. 17184710.6, mailed on Jun. 16, 2020, 9 pages.

Decision to Refuse received for European Patent Application No. 20192404.0, mailed on Jun. 14, 2022, 15 pages.

Dharmasena Anusha, "iMessage-send as text message Option", YouTube, Available online at: <https://www.youtube.com/watch?v=hXG-MdIW6FA>, Feb. 18, 2013, 1 page.

Eisenstein et al., "Analysis of Clustering Techniques to Detect Hand Signs", Intelligent Multimedia, Video and Speech Processing, of 2001 International Symposium, Piscataway, NJ, USA, IEEE, 2001, 4 pages.

European Search Report received for European Patent Application No. 20192404.0, mailed on Nov. 20, 2020, 4 pages.

Examiner's Answer to Appeal Brief received for U.S. Appl. No. 14/774,664, mailed on May 31, 2018, 28 pages.

Examiner's Answer to Appeal Brief received for U.S. Appl. No. 14/863,099, mailed on Jul. 28, 2017, 31 pages.

Farmboyreef, "Apple watch controlling your tv", Available online at: https://www.youtube.com/watch?v=xaJPG0Wm3Tg, Jun. 23, 2015, 3 pages.

Final Office Action received for U.S. Appl. No. 14/774,664, mailed on Aug. 25, 2017, 23 pages.

Final Office Action received for U.S. Appl. No. 14/839,897, mailed on Jan. 10, 2018, 16 pages.

Final Office Action received for U.S. Appl. No. 14/863,099, mailed on Apr. 21, 2016, 20 pages.

Final Office Action received for U.S. Appl. No. 15/268,115, mailed on Oct. 11, 2017., 48 pages.

Final Office Action received for U.S. Appl. No. 16/147,523, mailed on Aug. 4, 2020, 15 pages.

Final Office Action received for U.S. Appl. No. 16/147,523, mailed on Oct. 14, 2021, 22 pages.

Final Office Action received for U.S. Appl. No. 16/583,981, mailed on Apr. 16, 2020, 19 pages.

Final Office Action received for U.S. Appl. No. 16/583,994, mailed on Jul. 23, 2020, 16 pages.

Final Office Action received for U.S. Appl. No. 16/653,857, mailed on Feb. 10, 2021, 43 pages.

Final Office Action received for U.S. Appl. No. 16/679,967, mailed on Nov. 10, 2021, 14 pages.

Final Office Action received for U.S. Appl. No. 16/723,583, mailed on Feb. 5, 2021, 15 pages.

Final Office Action received for U.S. Appl. No. 17/041,350, mailed on Sep. 17, 2021, 25 pages.

Final Office Action received for U.S. Appl. No. 17/188,228, mailed on Jul. 6, 2022, 13 pages.

Final Office Action received for U.S. Appl. No. 14/839,903, mailed on Sep. 18, 2018, 11 pages.

Final Office Action received for U.S. Appl. No. 15/135,328 mailed on Nov. 9, 2018, 55 pages.

Final Office Action received for U.S. Appl. No. 14/616,573 mailed Mar. 10, 2017, 5 pages.

Franks Tech Help, "DSLR Camera Remote Control on Android Tablet, DSLR Dashboard, Nexus 10, Canon Camera, OTG Host Cable", Available online at : https://www.youtube.com/watch?v=DD4dCVinreU, Dec. 10, 2013, 1 page.

Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.

Gil Lory, "How to control Apple TV with your Apple Watch", Available online at: https://www.imore.com/how-control-your-apple-tv-remote-app%ADapple-watch], Jun. 6, 2016, 24 pages.

(56) References Cited

OTHER PUBLICATIONS

"GT-19500 (Galaxy S4) User Manual, Samsung, Rev.1.1", May 2013, 14 pages. (Official Copy Only) {See Communication under 37 CFR § 1.98(a) (3)}.

Hobbyistsoftwareltd,"VLC Remote", Online available at: https://watchaware.com/watch-apps/297244048, 2016, 7 pages.

Intention to Grant received for Danish Patent Application No. PA201570773, mailed on Mar. 9, 2018, 2 pages.

Intention to Grant received for Danish Patent Application No. PA201570788, mailed on Mar. 27, 2017., 2 pages.

Intention to Grant received for Danish Patent Application No. PA201570791, mailed on Mar. 7, 2017., 2 pages.

Intention to Grant received for Danish Patent Application No. PA202070609, mailed on Jan. 14, 2021, 2 pages.

Intention to Grant received for European Patent Application No. 15712218.5, mailed on Jan. 24, 2018, 7 pages.

Intention to Grant received for European Patent Application No. 15787091.6, mailed on Apr. 23, 2020, 7 pages.

Intention to Grant received for European Patent Application No. 15787091.6, mailed on Sep. 30, 2020, 7 pages.

International Preliminary Report on Patentability received for PCT Patent Application No. PCT/US2014/027882, mailed on Sep. 24, 2015, 8 pages.

International Preliminary Report on Patentability received for PCT Patent Application No. PCT/US2015/019298, mailed on Mar. 16, 2017., 12 pages.

International Preliminary Report on Patentability received for PCT Patent Application No. PCT/US2015/041424, mailed on Feb. 2, 2017., 13 Pages.

International Preliminary Report on Patentability received for PCT Patent Application No. PCT/US2015/047507, mailed on Mar. 16, 2017, 16 pages.

International Preliminary Report on Patentability received for PCT Patent Application No. PCT/US2015/055165, mailed on Sep. 21, 2017, 15 pages.

International Preliminary Report on Patentability received for PCT Patent Application No. PCT/US2016/016621, mailed on Aug. 24, 2017, 8 pages.

International Preliminary Report on Patentability received for PCT Patent Application No. PCT/US2019/024792, mailed on Dec. 17, 2020, 9 pages.

International Preliminary Report on Patentability received for PCT Patent Application No. PCT/US2020/026044, mailed on Dec. 9, 2021, 18 pages.

International Preliminary Report on Patentability received for PCT Patent Application No. PCT/US2020/031536, mailed on Nov. 18, 2021, 11 pages.

International Preliminary Report on Patentability received for PCT Patent Application No. PCT/US2020/035446, mailed on Dec. 9, 2021, 14 pages.

International Search Report and written opinion received for PCT Application No. PCT/US2016/048582 mailed on Sep. 13, 2016, 11 pages.

International Search Report and Written Opinion received for PCT Patent Application No. PCT/US2013/032498, mailed on Feb. 10, 2014, 18 pages.

International Search Report and Written Opinion received for PCT Patent Application No. PCT/US2014/027882, mailed on Oct. 10, 2014, 11 pages.

International Search Report and Written Opinion received for PCT Patent Application No. PCT/US2016/016621, mailed on May 9, 2016, 12 pages.

International Search Report and Written Opinion received for PCT Patent Application No. PCT/US2019/024792, mailed on Jul. 18, 2019, 13 pages.

International Search Report and Written Opinion received for PCT Patent Application No. PCT/US2020/026044, mailed on Sep. 9, 2020, 26 pages.

International Search Report and Written Opinion received for PCT Patent Application No. PCT/US2020/031536, mailed on Sep. 23, 2020, 16 pages.

International Search Report and Written Opinion received for PCT Patent Application No. PCT/US2020/035446, mailed on Nov. 10, 2020, 20 pages.

International Search Report and Written Opinion received for PCT Patent Application No. PCT/US2022/030021, mailed on Nov. 9, 2022, 19 pages.

International Search Report and Written Opinion received for PCT Patent Application No. PCT/US2015/019298, mailed on Jul. 13, 2015, 17 pages.

International Search Report and Written Opinion received for PCT Patent Application No. PCT/US2015/041424, mailed on Mar. 31, 2016, 18 pages.

International Search Report and Written Opinion received for PCT Application No. PCT/US2015/047507, mailed on Feb. 22, 2016, 22 pages.

International Search Report and Written Opinion received for PCT Patent Application No. PCT/US2015/055165, mailed on Apr. 20, 2016, 22 pages.

International Search Report received for PCT Application No. PCT/US2015/042976 mailed on Aug. 18, 2015, 22 pages.

Invitation to Pay Additional Fees received for PCT Patent Application No. PCT/US2015/047507, mailed on Jan. 4, 2016, 8 pages.

Invitation to Pay Additional Fees received for PCT Patent Application No. PCT/US2015/055165, mailed on Jan. 18, 2016, 6 pages.

Invitation to Pay Additional Fees received for PCT Patent Application No. PCT/US2015/041424, mailed on Nov. 12, 2015, 6 pages.

Invitation to Pay Additional Fees and Partial International Search Report received for PCT Patent Application No. PCT/US2022/030021, mailed on Sep. 15, 2022, 13 pages.

Invitation to Pay Additional Fees received for PCT Patent Application No. PCT/US2014/027882, mailed on Aug. 5, 2014, 2 pages.

Invitation to Pay Additional Fees received for PCT Patent Application No. PCT/US2020/026044, mailed on Jun. 25, 2020, 12 pages.

Invitation to Pay Additional Fees received for PCT Patent Application No. PCT/US2020/031536, mailed on Jul. 31, 2020, 9 pages.

Invitation to Pay Additional Fees received for PCT Patent Application No. PCT/US2020/035446, mailed on Sep. 11, 2020, 12 pages.

Invitation to Pay Search Fees received for European Patent Application No. 15753796.0, mailed on Mar. 24, 2020, 3 pages.

Itjungles, "iPhone 6: How to Pair with Another Bluetooth Device", Available Online at: https://www.youtube.com/watch?v=9setanYtHAk, Aug. 5, 2015, 3 pages.

Jean, "Our Pact Parental Control Review", Available online at : https://www.bewebsmart.com/parental-controls/our-pact-parental-control-review/, Jun. 25, 2016, 25 pages.

Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.

Lee et al., "A Multi-Touch Three Dimensional Touch-Sensitive Tablet", CHI '85 Proceedings of the SIGCHI Conference on Human Factors in Computing Systems, Apr. 1985, pp. 21-25.

My Mate Vince, "Setting up the Fitbit Alta HR Activity Tracker on Apple iOS", Online available at:—<https://youtu.be/FdwRF4IfvFc>, Jun. 18, 2017, 3 pages.

Nikolov Anton, "Design principle: Consistency", Available online at: https://uxdesign.cc/design-principle-consistency-6b0cf7e7339f, Apr. 8, 2017, 9 pages.

Non-Final Office Action received for U.S. Appl. No. 14/839,913, mailed on Mar. 2, 2016, 11 pages.

Non-Final Office Action received for U.S. Appl. No. 14/864,011, mailed on Jan. 21, 2016, 10 pages.

Non-Final Office Action received for U.S. Appl. No. 16/679,967, mailed on Sep. 2, 2021, 12 pages.

Non-Final Office Action received for U.S. Appl. No. 14/805,403, mailed on Nov. 16, 2017, 21 pages.

Non-Final Office Action received for U.S. Appl. No. 14/616,573, mailed Jun. 16, 2016, 12 pages.

(56)         References Cited

OTHER PUBLICATIONS

Non-Final Office Action received for U.S. Appl. No. 14/616,573, mailed on Jun. 14, 2017, 13 pages.
Non-Final Office Action received for U.S. Appl. No. 14/774,664, mailed on Mar. 7, 2017, 23 pages.
Non-Final Office Action received for U.S. Appl. No. 14/839,897, mailed on May 18, 2017, 11 pages.
Non-Final Office Action received for U.S. Appl. No. 14/839,903, mailed on Feb. 26, 2018, 10 pages.
Non-Final Office Action received for U.S. Appl. No. 14/839,913, mailed on Jul. 28, 2016., 12 pages.
Non-Final Office Action received for U.S. Appl. No. 14/863,099, mailed on Dec. 2, 2015, 12 pages.
Non-final Office Action received for U.S. Appl. No. 14/864,011, mailed on Jun. 10, 2016, 10 pages.
Non-Final Office Action received for U.S. Appl. No. 14/973,573, mailed on Apr. 20, 2017, 34 pages.
Non-Final Office Action received for U.S. Appl. No. 15/038,419, mailed Dec. 21, 2016, 13 pages.
Non-Final Office Action received for U.S. Appl. No. 15/135,328 mailed on Apr. 11, 2018, 64 pages.
Non-Final Office Action received for U.S. Appl. No. 15/268,115, mailed on Apr. 13, 2017, 44 pages.
Non-Final Office Action received for U.S. Appl. No. 15/433,238, mailed on Nov. 3, 2017, 6 pages.
Non-Final Office Action received for U.S. Appl. No. 16/144,264, mailed on May 1, 2020, 30 pages.
Non-Final Office Action received for U.S. Appl. No. 16/147,523, mailed on Apr. 26, 2022, 22 pages.
Non-Final Office Action received for U.S. Appl. No. 16/147,523, mailed on Dec. 27, 2019, 11 pages.
Non-Final Office Action received for U.S. Appl. No. 16/147,523, mailed on Jul. 21, 2021, 20 pages.
Non-Final Office Action received for U.S. Appl. No. 16/281,838, mailed on Mar. 26, 2020, 18 pages.
Non-Final Office Action received for U.S. Appl. No. 16/407,584, mailed on Jul. 10, 2019, 8 pages.
Non-Final Office Action received for U.S. Appl. No. 16/583,981, mailed on Dec. 6, 2019, 14 pages.
Non-Final Office Action received for U.S. Appl. No. 16/583,994, mailed on Dec. 23, 2020, 17 pages.
Non-Final Office Action received for U.S. Appl. No. 16/583,994, mailed on Dec. 30, 2019, 14 pages.
Non-Final Office Action received for U.S. Appl. No. 16/653,857, mailed on Jul. 9, 2020, 35 pages.
Non-Final Office Action received for U.S. Appl. No. 16/653,857, mailed on Jul. 22, 2021, 45 pages.
Non-Final Office Action received for U.S. Appl. No. 16/679,967, mailed on Apr. 19, 2022, 13 pages.
Non-Final Office Action received for U.S. Appl. No. 16/723,583, mailed on Aug. 13, 2020, 13 pages.
Non-Final Office Action received for U.S. Appl. No. 16/749,929, mailed on May 13, 2020, 11 pages.
Non-Final Office Action received for U.S. Appl. No. 17/041,350, mailed on Jun. 10, 2021, 24 pages.
Non-Final Office Action received for U.S. Appl. No. 17/188,228, mailed on Dec. 21, 2021, 14 pages.
Non-Final Office Action received for U.S. Appl. No. 17/314,948, mailed on Aug. 1, 2022, 33 pages.
Non-Final Office Action received for U.S. Appl. No. 17/410,169, mailed on Sep. 16, 2022, 42 pages.
Non-Final Office Action received for U.S. Appl. No. 17/509,356, mailed on Dec. 22, 2022, 16 pages.
Notice of Acceptance received for Australian Patent Application No. 2015385757, mailed on Jul. 16, 2018, 3 pages.
Notice of Acceptance received for Australian Patent Application No. 2016218318, mailed on Jul. 3, 2019, 3 pages.
Notice of Acceptance received for Australian Patent Application No. 2018247345, mailed on May 15, 2019, 3 pages.

Notice of Acceptance received for Australian Patent Application No. 2020239670, mailed on Jul. 2, 2021, 3 pages.
Notice of Acceptance received for Australian Patent Application No. 2020285524, mailed on Dec. 17, 2021, 3 pages.
Notice of Acceptance received for Australian Patent Application No. 2021250863, mailed on Jan. 13, 2023, 3 pages.
Notice of Acceptance received for Australian Patent Application No. 2022201369, mailed on Mar. 17, 2022, 3 pages.
Notice of Allowance received for Chinese Patent Application No. 201580046237.6, mailed on Aug. 29, 2018, 4 pages (1 page of English Translation and 3 pages of Official copy).
Notice of Allowance received for Chinese Patent Application No. 201580077218.X, mailed on Nov. 13, 2020, 2 pages (1 page of English Translation and 1 page of Official Copy).
Notice of Allowance received for Chinese Patent Application No. 201610084974.1, mailed on Aug. 5, 2019, 2 pages (1 page of English Translation and 1 page of Official Copy).
Notice of Allowance received for Chinese Patent Application No. 201710657424.9, mailed on May 8, 2020, 2 pages (1 page of English Translation and 1 page of Official Copy).
Notice of Allowance received for Chinese Patent Application No. 201810321928.8, mailed on Sep. 11, 2019, 2 pages (1 page of English Translation and 1 page of Official Copy).
Notice of Allowance received for Chinese Patent Application No. 201910990432.4, mailed on Apr. 27, 2021, 2 pages (1 page of English Translation and 1 page of Official Copy).
Notice of Allowance received for Chinese Patent Application No. 201980036737.X, mailed on Apr. 20, 2021, 10 pages (5 pages of English Translation and 5 pages of Official Copy).
Notice of Allowance received for Chinese Patent Application No. 202110011509.6, mailed on Mar. 2, 2022, 2 pages (1 page of English Translation and 1 page of Official Copy).
Notice of Allowance received for Chinese Patent Application No. 202111612841.4, mailed on Jan. 5, 2023, 3 pages (2 pages of English Translation & 1 page of Official Copy).
Notice of Allowance received for Danish Patent Application No. PA201570771, mailed on Sep. 2, 2016, 2 pages.
Notice of Allowance received for Danish Patent Application No. PA201570773, mailed on Apr. 26, 2018, 2 pages.
Notice of Allowance received for Japanese Patent Application No. 2017-545733, mailed on Jun. 1, 2018, 4 pages (1 page of English Translation and 3 pages of Official copy).
Notice of Allowance received for Japanese Patent Application No. 2018-126311, mailed on Feb. 1, 2019, 4 pages (1 page of English Translation and 3 pages of Official copy).
Notice of Allowance received for Japanese Patent Application No. 2020-551465, mailed on Jun. 28, 2021, 4 pages (1 page of English Translation and 3 pages of Official Copy).
Notice of Allowance received for Japanese Patent Application No. 2021-122610, mailed on Aug. 5, 2022, 4 pages (1 page of English Translation and 3 pages of Official Copy).
Notice of Allowance received for Japanese Patent Application No. 2021-571464, mailed on May 30, 2022, 4 pages (1 page of English Translation and 3 pages of Official Copy).
Notice of Allowance received for Japanese Patent Application No. 2022-102840, mailed on Aug. 19, 2022, 4 pages (1 page of English Translation and 3 pages of Official Copy).
Notice of Allowance received for Japanese Patent Application No. 2022-139320, mailed on Jan. 6, 2023, 4 pages (1 page of English Translation and 3 pages of Official Copy).
Notice of Allowance received for Korean Patent Application No. 10-2020-7028759, mailed on Oct. 19, 2021, 4 pages (1 page of English Translation and 3 pages of Official Copy).
Notice of Allowance received for Korean Patent Application No. 10-2021-7039234, mailed on Dec. 20, 2021, 4 pages (1 page of English Translation and 3 pages of Official Copy).
Notice of Allowance received for Korean Patent Application No. 10-2022-7001721, mailed on Feb. 28, 2022, 5 pages (1 page of English Translation and 4 pages of Official Copy).
Notice of Allowance received for Korean Patent Application No. 10-2022-7008567, mailed on Jul. 4, 2022, 9 pages (2 pages of English Translation and 7 pages of Official Copy).

(56) References Cited

OTHER PUBLICATIONS

Notice of Allowance received for Taiwanese Patent Application No. 104107328, mailed on Jun. 12, 2017, 3 pages (Official Copy Only). {See Communication under 37 CFR § 1.98(a) (3)}.

Notice of Allowance received for Taiwanese Patent Application No. 104123593, mailed on Oct. 1, 2018, 4 pages (1 pages of English Translation and 3 pages Official Copy).

Notice of Allowance received for Taiwanese Patent Application No. 104128700, mailed on Mar. 27, 2017, 3 pages (Official Copy only) {See Communication under 37 CFR § 1.98(a) (3)}.

Notice of Allowance received for Taiwanese Patent Application No. 104133756, mailed on Nov. 30, 2017, 5 pages (2 pages of English Translation and 3 pages of Official Copy).

Notice of Allowance received for Taiwanese Patent Application No. 104133757, mailed on Jan. 18, 2017, 3 pages (Official Copy only). {See Communication under 37 CFR § 1.98(a) (3)}.

Notice of Allowance received for U.S. Appl. No. 14/641,251, mailed on May 18, 2016, 13 pages.

Notice of Allowance received for U.S. Appl. No. 14/805,403, mailed on Jul. 11, 2018, 15 pages.

Notice of Allowance received for U.S. Appl. No. 14/839,897, mailed on Jun. 8, 2018, 11 pages.

Notice of Allowance received for U.S. Appl. No. 14/839,903, mailed on Jan. 3, 2019, 7 pages.

Notice of Allowance received for U.S. Appl. No. 14/839,913, mailed on Aug. 11, 2016, 5 pages.

Notice of Allowance received for U.S. Appl. No. 14/864,011, mailed on Apr. 28, 2016, 5 pages.

Notice of Allowance received for U.S. Appl. No. 14/864,011, mailed on Oct. 5, 2016, 5 pages.

Notice of Allowance received for U.S. Appl. No. 14/973,573, mailed on Nov. 30, 2017, 8 pages.

Notice of Allowance received for U.S. Appl. No. 15/038,419, mailed on Apr. 3, 2017, 10 pages.

Notice of Allowance received for U.S. Appl. No. 15/135,328, mailed on Jul. 1, 2019, 25 pages.

Notice of Allowance received for U.S. Appl. No. 15/268,115, mailed on Mar. 7, 2018, 15 pages.

Notice of Allowance received for U.S. Appl. No. 15/366,607, mailed on Apr. 2, 2019, 2 pages.

Notice of Allowance received for U.S. Appl. No. 15/366,607, mailed on Feb. 21, 2019, 9 pages.

Notice of Allowance received for U.S. Appl. No. 15/433,238, mailed on May 17, 2018, 7 pages.

Notice of Allowance received for U.S. Appl. No. 15/975,581, mailed on Oct. 3, 2018, 25 pages.

Notice of Allowance received for U.S. Appl. No. 16/144,264, mailed on Nov. 16, 2020, 10 pages.

Notice of Allowance received for U.S. Appl. No. 16/147,523, mailed on Aug. 4, 2022, 9 pages.

Notice of Allowance received for U.S. Appl. No. 16/147,523, mailed on Nov. 28, 2022, 8 pages.

Notice of Allowance received for U.S. Appl. No. 16/147,523, mailed on Oct. 4, 2022, 8 pages.

Notice of Allowance received for U.S. Appl. No. 16/281,838, mailed on Aug. 26, 2020, 9 pages.

Notice of Allowance received for U.S. Appl. No. 16/281,838, mailed on May 20, 2021, 9 pages.

Notice of Allowance received for U.S. Appl. No. 16/407,584, mailed on Oct. 28, 2019, 5 pages.

Notice of Allowance received for U.S. Appl. No. 16/583,981, mailed on Mar. 26, 2021, 10 pages.

Notice of Allowance received for U.S. Appl. No. 16/583,994, mailed on Jun. 24, 2021, 10 pages.

Notice of Allowance received for U.S. Appl. No. 16/653,857, mailed on Feb. 16, 2022, 34 pages.

Notice of Allowance received for U.S. Appl. No. 16/679,967, mailed on Jun. 15, 2022, 7 pages.

Notice of Allowance received for U.S. Appl. No. 16/679,967, mailed on Nov. 2, 2022, 7 pages.

Notice of Allowance received for U.S. Appl. No. 16/749,929, mailed on Dec. 16, 2020, 2 pages.

Notice of Allowance received for U.S. Appl. No. 16/749,929, mailed on Nov. 4, 2020, 5 pages.

Notice of Allowance received for U.S. Appl. No. 16/867,002, mailed on Aug. 20, 2021, 12 pages.

Notice of Allowance received for U.S. Appl. No. 16/867,002, mailed on Mar. 1, 2022, 7 pages.

Notice of Allowance received for U.S. Appl. No. 17/041,350, mailed on Feb. 24, 2022, 6 pages.

Notice of Allowance received for U.S. Appl. No. 17/188,228, mailed on Oct. 19, 2022, 6 pages.

Nozawa et al., "iPad Perfect Manual for iOS 4", Jpn, Sotec Ltd., Yanagisawa Junichi, Dec. 31, 2010, pp. 189-190 (Official Copy Only) {See Communication under 37 CFR § 1.98(a) (3)}.

Ojeda-Zapata Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.

Office Action received for Australian Patent Application No. 2015385757, mailed on Sep. 11, 2017, 3 pages.

Office Action received for Australian Patent Application No. 2016218318, mailed on Aug. 24, 2018, 5 pages.

Office Action received for Australian Patent Application No. 2016218318, mailed on Sep. 26, 2018, 3 pages.

Office Action received for Australian Patent Application No. 2018247345, mailed on May 6, 2019, 2 pages.

Office Action received for Australian Patent Application No. 2020239670, mailed on Mar. 3, 2021, 4 pages.

Office Action received for Australian Patent Application No. 2021250863, mailed on Oct. 6, 2022, 6 pages.

Office Action received for Australian Patent Application No. 2016100155, mailed on May 4, 2016, 7 pages.

Office Action received for Chinese Patent Application No. 201580046237.6, mailed on Feb. 6, 2018, 10 pages (5 pages of English Translation and 5 pages of Official Copy).

Office Action received for Chinese Patent Application No. 201580077218.X, mailed on Feb. 3, 2020, 23 pages (8 pages of English Translation and 15 pages of Official Copy).

Office Action received for Chinese Patent Application No. 201610084974.1, mailed on Dec. 5, 2018, 6 pages (3 pages of English Translation and 3 pages of Official Copy).

Office Action received for Chinese Patent Application No. 201610084974.1, mailed on May 3, 2018, 12 pages (5 pages of English Translation and 7 pages of Official Copy).

Office Action received for Chinese Patent Application No. 201620119869.2, mailed on Jun. 3, 2016, 2 pages (1 page of English Translation and 1 page of Official copy).

Office Action received for Chinese Patent Application No. 201620119869.2, mailed on Nov. 22, 2016, 2 pages (Official Copy only). {See Communication under 37 CFR § 1.98(a) (3)}.

Office Action received for Chinese Patent Application No. 201710657424.9, mailed on Sep. 17, 2019, 23 pages (11 pages of English Translation and 12 pages of Official Copy).

Office Action received for Chinese Patent Application No. 201810321928.8, mailed on Jul. 2, 2019, 10 pages (5 pages of English Translation and 5 pages of Official Copy).

Office Action received for Chinese Patent Application No. 201910990432.4, mailed on Dec. 28, 2020, 6 pages (3 pages of English Translation and 3 pages of Official Copy).

Office Action received for Chinese Patent Application No. 201910990432.4, mailed on May 18, 2020, 15 pages (9 pages of English Translation and 6 pages of Official Copy).

Office Action received for Chinese Patent Application No. 202080039642.6, mailed on Sep. 5, 2022, 12 pages (6 pages of English Translation and 6 pages of Official Copy).

Office Action received for Chinese Patent Application No. 202110011509.6, mailed on Oct. 11, 2021, 10 pages (5 pages of English Translation and 5 pages of Official Copy).

Office Action received for Chinese Patent Application No. 202111612841.4, mailed on Jul. 22, 2022, 13 pages (7 pages of English Translation and 6 pages of Official Copy).

(56) References Cited

OTHER PUBLICATIONS

Office Action received for Danish Patent Application No. PA201570664, mailed on Mar. 15, 2016, 10 pages.

Office Action received for Danish Patent Application No. PA201570771, mailed on Mar. 17, 2016, 8 pages.

Office Action Received for Danish Patent Application No. PA201570773, mailed on Mar. 18, 2016, 9 pages.

Office action received for Danish Patent Application No. PA201570791, mailed on Apr. 6, 2016, 12 pages.

Office Action received for Danish Patent Application No. PA201670074, mailed on Apr. 7, 2016, 8 pages.

Office Action received for Danish Patent Application No. PA201570664, mailed on Dec. 14, 2016, 2 pages.

Office Action received for Danish Patent Application No. PA201570664, mailed on Jun. 3, 2016, 3 pages.

Office Action received for Danish Patent Application No. PA201570771, mailed on Jun. 13, 2016, 3 pages.

Office Action received for Danish Patent Application No. PA201570773, mailed on Aug. 28, 2017, 3 pages.

Office Action received for Danish Patent Application No. PA201570773, mailed on Feb. 15, 2017, 3 pages.

Office Action received for Danish Patent Application No. PA201570773, mailed on Sep. 12, 2016, 3 pages.

Office Action received for Danish Patent Application No. PA201570788, mailed on Apr. 8, 2016, 11 pages.

Office Action received for Danish Patent Application No. PA201570788, mailed on Sep. 13, 2016, 3 pages.

Office action received for Danish Patent Application No. PA201570791, mailed on Sep. 6, 2016, 4 pages.

Office Action received for Danish Patent Application No. PA201670074, mailed on Jun. 28, 2016, 5 pages.

Office Action received for Danish Patent Application No. PA201670074, mailed on Mar. 16, 2017, 2 pages.

Office Action received for Danish Patent Application No. PA201970533, mailed on Apr. 20, 2021, 2 pages.

Office Action received for Danish Patent Application No. PA201970533, mailed on Jul. 17, 2020, 6 pages.

Office Action received for Danish Patent Application No. PA202070609, mailed on Dec. 10, 2020, 8 pages.

Office Action received for Danish Patent Application No. PA202070610, mailed on Jun. 18, 2021, 8 pages.

Office Action received for Danish Patent Application No. PA202070610, mailed on Mar. 14, 2022, 7 pages.

Office Action received for European Patent Application No. 15712218.5, mailed on Aug. 3, 2017, 4 pages.

Office Action received for European Patent Application No. 15753796.0, mailed on Aug. 4, 2020, 9 pages.

Office Action received for European Patent Application No. 15753796.0, mailed on Jun. 2, 2022, 2 pages.

Office Action received for European Patent Application No. 15787091.6, mailed on Aug. 2, 2019, 8 pages.

Office Action received for European Patent Application No. 15787091.6, mailed on Oct. 8, 2018, 7 pages.

Office Action received for European Patent Application No. 16708003.5, mailed on Feb. 22, 2021, 10 pages.

Office Action received for European Patent Application No. 17184710.6, mailed on Dec. 21, 2018, 7 pages.

Office Action received for European Patent Application No. 19722280.5, mailed on Oct. 4, 2021, 7 pages.

Office Action received for European Patent Application No. 20192404.0, mailed on Dec. 2, 2020, 8 pages.

Office Action received for European Patent Application No. 20192404.0, mailed on Jun. 8, 2021, 7 pages.

Office Action received for European Patent Application No. 20720310.0, mailed on Oct. 4, 2022, 9 pages.

Office Action received for European Patent Application No. 20729346.5, mailed on Jan. 17, 2022, 8 pages.

Office Action received for European Patent Application No. 20729346.5, mailed on Jul. 28, 2022, 9 pages.

Office Action received for Indian Patent Application No. 202017041557, mailed on Dec. 8, 2021, 8 pages.

Office Action received for Japanese Patent Application No. 2018-126311, mailed on Nov. 2, 2018, 4 pages (2 pages of English Translation and 2 pages of official copy).

Office Action received for Japanese Patent Application No. 2017-545733, mailed on Feb. 13, 2018, 7 pages (3 pages of English Translation and 4 pages of Official Copy).

Office Action received for Korean Patent Application No. 10-2020-7028759, mailed on Jun. 29, 2021, 12 pages (5 pages of English Translation and 7 pages of Official Copy).

Office Action received for Korean Patent Application No. 10-2022-7008567, mailed on Mar. 28, 2022, 5 pages (2 pages of English Translation and 3 pages of Official Copy).

Office Action received for Taiwanese Patent Application No. 104123593, mailed on May 24, 2016, 57 pages (26 pages of English Translation and 31 pages of Official Copy).

Office Action received for Taiwanese Patent Application No. 104123593, mailed on Sep. 13, 2016, 8 pages (3 pages of English Translation and 5 pages of Official Copy).

Office Action received for Taiwanese Patent Application No. 104128700, mailed on Aug. 31, 2016, 13 pages (6 pages of English Translation and 7 pages of Official Copy).

Office Action received for Taiwanese Patent Application No. 104133756, issued on May 17, 2017, 13 pages (6 pages of English Translation and 7 pages of Official Copy).

Office Action received for Taiwanese Patent Application No. 104133757, issued on Jul. 6, 2016, 22 pages (9 pages of English Translation and 13 pages of Official Copy).

Office Action received for Taiwanese Patent Application No. 104107328, mailed on Dec. 28, 2016., 4 pages (1 page of Search Report and 3 pages of Official Copy).

"Pairing Your Apple Watch With Your AppleTV", Available online at: <https://www.youtube.com/watch?v=C418YFSJ-UY>, Apr. 27, 2015, 3 pages.

Playmemories Camera Apps, "PlayMemories Camera Apps Help Guide", available at <https://www.playmemoriescameraapps.com/portal/manual/IS9104-NPIA09014_00-F00002/en/index.html>, 2012, 3 pages.

"Remote Shot for SmartWatch 2", Available online at:—<https://play.google.com/store/apps/details?id=net.watea.sw2.rshot&hl=en>, Nov. 21, 2017, 3 pages.

Result of Consultation received for European Patent Application No. 17184710.6, mailed on Feb. 21, 2020, 6 pages.

Result of Consultation received for European Patent Application No. 17184710.6, mailed on Feb. 28, 2020, 3 pages.

Reuss et al., "Period Domain Analysis in Fetal Pulse Oximetry", Proceedings of t11e Second Joint EMBS/BMES Conference, Oct. 23-26, 2002, 2 pages.

Rubine Dean, "Combining Gestures and Direct Manipulation", CHI '92, May 3-7, 1992, pp. 659-660.

Rubine Deanh, "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.

Search Report and Opinion received for Danish Patent Application No. PA201970533, mailed on Oct. 25, 2019, 9 pages.

Search Report and Opinion received for Danish Patent Application No. PA202070610, mailed on Jan. 8, 2021, 9 pages.

Singh, Ajit, "Mytunz: Free Iphone Media Player App with Sleep Timer, Gesture Control", Available online at: <https://www.ilovefreesoftware.com/01/iphone/mytunz-free-iphone-media-player-app.html>, Jul. 1, 2014, 6 pages.

Summons to Attend Oral Proceedings received for European Patent Application 20729346.5, mailed on Jan. 23, 2023, 11 pages.

Summons to Attend Oral Proceedings received for European Patent Application No. 16708003.5, mailed on Dec. 13, 2022, 11 pages.

Summons to Attend Oral Proceedings received for European Patent Application No. 17184710.6, mailed on Sep. 17, 2019, 7 pages.

Summons to Attend Oral Proceedings received for European Patent Application No. 20192404.0, mailed on Feb. 2, 2022, 11 pages.

Supplemental Notice of Allowance received for U.S. Appl. No. 14/805,403, mailed on Oct. 4, 2018, 3 pages.

(56)     References Cited

OTHER PUBLICATIONS

Supplemental Notice of Allowance received for U.S. Appl. No. 15/433,238, mailed on Jun. 20, 2018, 2 pages.
Supplemental Notice of Allowance received for U.S. Appl. No. 16/147,523, mailed on Aug. 23, 2022, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Techsmith, "Snagit® 11 Snagit 11.4 Help", Jan. 2014, 146 pages.
Walker Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Wearablezone, "How to Set Up Your Fitbit Profile", Online available at:—<https://youtu.be/jsWPtcDWiJM>, Jun. 6, 2016, 3 pages.
Westerman Wayne, "Hand Tracking, Finger Identification and Chordic Manipulation on a Multi-Touch Surface", Doctoral Dissertation, 1999, 363 Pages.
Whitney Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.
Xdream, "TickTalk Video User Manual", YouTube [online] [video], Online available at: <https://youtu.be/jYhq3DwmVzo>, Mar. 17, 2017, 3 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Zhao et al., "Wireless Photoplethysmograph Knuckle Sensor System for Measuring Finger Motions", 2014 International Symposium on Optomechatronic Technologies, IEEE, 2014, pp. 205-209.
Zheng et al., "An Efficient User Verificat ion System via Mouse Movements", Computer am1 Communications Security, ACM, Dec. 17, 2011, pp. 139-150.
Final Office Action received for U.S. Appl. No. 18/122,625, mailed on Apr. 5, 2024, 12 pages.
International Preliminary Report on Patentability received for PCT Patent Application No. PCT/US2022/044236, mailed on Apr. 4, 2024, 12 pages.
Non-Final Office Action received for U.S. Appl. No. 18/088,309, mailed on Apr. 9, 2024, 14 pages.
Notice of Allowance received for Chinese Patent Application No. 202211558100.7, mailed on Mar. 29, 2024, 3 pages (2 pages of English Translation and 1 page of Official Copy).
Office Action received for Korean Patent Application No. 10-2022-7032414, mailed on Mar. 26, 2024, 11 pages (5 pages of English Translation and 6 pages of Official Copy).
Office Action received for Australian Patent Application No. 2023204647, mailed on Jul. 5, 2024, 3 pages.
Accessibility by design: An Apple Watch for everyone, Available Online at: https://developer.apple.com/videos/play/wwdc2021/10308/, Jun. 10, 2021, 2 pages.
Applicant-Initiated Interview Summary received for U.S. Appl. No. 17/746,807, mailed on Nov. 3, 2023, 2 pages.
Applicant-Initiated Interview Summary received for U.S. Appl. No. 17/975,141, mailed on Aug. 30, 2023, 4 pages.
Applicant-Initiated Interview Summary received for U.S. Appl. No. 18/088,309, mailed on Oct. 27, 2023, 2 pages.
Applicant-Initiated Interview Summary received for U.S. Appl. No. 18/109,808, mailed on Sep. 25, 2023, 5 pages.
Decision to Grant received for European Patent Application No. 16708003.5, mailed on Oct. 19, 2023, 2 pages.

Final Office Action received for U.S. Appl. No. 18/109,808, mailed on Oct. 31, 2023, 54 pages.
Intention to Grant received for European Patent Application No. 19722280.5, mailed on Sep. 26, 2023, 9 pages.
Non-Final Office Action received for U.S. Appl. No. 18/088,309, mailed on Sep. 21, 2023, 11 pages.
Non-Final Office Action received for U.S. Appl. No. 18/109,808, mailed on Sep. 12, 2023, 49 pages.
Notice of Allowance received for U.S. Appl. No. 17/950,943, mailed on Oct. 20, 2023, 18 pages.
Office Action received for European Patent Application No. 20746429.8, mailed on Sep. 20, 2023, 10 pages.
Applicant-Initiated Interview Summary received for U.S. Appl. No. 18/197,681. mailed on Mar. 18, 2024, 4 pages.
Communication for Board of Appeal received for European Patent Application No. 17184710.6, mailed on Feb. 29, 2024, 13 pages.
Advisory Action received for U.S. Appl. No. 18/197,681, mailed on Aug. 21, 2024, 5 pages.
Applicant-Initiated Interview Summary received for U.S. Appl. No. 18/088,309, mailed on Aug. 27, 2024, 2 pages.
Applicant-Initiated Interview Summary received for U.S. Appl. No. 18/109,808, mailed on Aug. 19, 2024, 6 pages.
Decision to Grant received for European Patent Application No. 22729964.1, mailed on Aug. 29, 2024, 3 pages.
International Preliminary Report on Patentability received for PCT Patent Application No. PCT/US2023/012260, mailed on Aug. 22, 2024, 15 pages.
Advisory Action received for U.S. Appl. No. 18/109,808, mailed on May 20, 2024, 6 pages.
Applicant-Initiated Interview Summary received for U.S. Appl. No. 17/410,169, mailed on May 8, 2024, 6 pages.
Applicant-Initiated Interview Summary received for U.S. Appl. No. 17/746,807, mailed on May 21, 2024, 2 pages.
Applicant-Initiated Interview Summary received for U.S. Appl. No. 18/088,309, mailed on Jun. 7, 2024, 2 pages.
Intention to Grant received for European Patent Application No. 15753796.0, mailed on Jun. 5, 2024, 8 pages.
Intention to Grant received for European Patent Application No. 20720310.0, mailed on Jun. 13, 2024, 13 pages.
Minutes of the Oral Proceedings received for European Patent Application No. 20720310.0, mailed on Jun. 7, 2024, 7 pages.
Office Action received for Indian Patent Application No. 202218027229, mailed on Jun. 13, 2024, 8 pages.
Result of Consultation received for European Patent Application No. 20720310.0, mailed on Jun. 4, 2024, 3 pages.
Applicant-Initiated Interview Summary received for U.S. Appl. No. 17/410,169, mailed on Jan. 26, 2024, 5 pages.
Applicant-Initiated Interview Summary received for U.S. Appl. No. 17/747,613, mailed on Dec. 14, 2023, 2 pages.
Applicant-Initiated Interview Summary received for U.S. Appl. No. 17/747,613, mailed on Jan. 31, 2024, 3 pages.
Applicant-Initiated Interview Summary received for U.S. Appl. No. 18/109,808, mailed on Jan. 23, 2024, 5 pages.
Applicant-Initiated Interview Summary received for U.S. Appl. No. 18/109,808, mailed on Nov. 22, 2023, 5 pages.
Applicant-Initiated Interview Summary received for U.S. Appl. No. 18/122,625, mailed on Jan. 19, 2024, 2 pages.
Decision to Grant received for European Patent Application No. 19722280.5, mailed on Feb. 1, 2024, 2 pages.
Decision to Grant received for European Patent Application No. 20729346.5, mailed on Nov. 16, 2023, 2 pages.
Final Office Action received for U.S. Appl. No. 17/747,613, mailed on Jan. 11, 2024, 28 pages.
Final Office Action received for U.S. Appl. No. 18/088,309, mailed on Jan. 9, 2024, 13 pages.
Intention to Grant received for European Patent Application No. 15753796.0, mailed on Jan. 12, 2024, 9 pages.
International Preliminary Report on Patentability received for PCT Patent Application No. PCT/US2022/030021, mailed on Nov. 30, 2023, 14 pages.
International Search Report and Written Opinion received for PCT Patent Application No. PCT/US2023/022410, mailed on Aug. 31, 2023, 21 pages.

(56)           References Cited

OTHER PUBLICATIONS

Non-Final Office Action received for U.S. Appl. No. 17/410,169, mailed on Dec. 5, 2023, 48 pages.
Non-Final Office Action received for U.S. Appl. No. 17/747,613, mailed on Nov. 16, 2023, 28 pages.
Non-Final Office Action received for U.S. Appl. No. 18/109,808, mailed on Jan. 4, 2024, 45 pages.
Non-Final Office Action received for U.S. Appl. No. 18/122,625, mailed on Nov. 15, 2023, 14 pages.
Non-Final Office Action received for U.S. Appl. No. 18/197,681, mailed on Jan. 30, 2024, 32 pages.
Notice of Allowance received for U.S. Appl. No. 17/975,141, mailed on Dec. 7, 2023, 10 pages.
Office Action received for Australian Patent Application No. 2023201920, mailed on Nov. 10, 2023, 2 pages.
Office Action received for Japanese Patent Application No. 2022-149476, mailed on Nov. 2, 2023, 9 pages (4 pages of English Translation and 5 pages of Official Copy).
Office Action received for Japanese Patent Application No. 2023-513867, mailed on Dec. 4, 2023, 6 pages (3 pages of English Translation and 3 pages of Official Copy).
Summons to Attend Oral Proceedings received for European Patent Application No. 20720310.0, mailed on Jan. 3, 2024, 12 pages.
Summons to Attend Oral Proceedings received for European Patent Application No. 22729964.1, mailed on Nov. 6, 2023, 7 pages.
Applicant-Initiated Interview Summary received for U.S. Appl. No. 18/228,597, mailed on Aug. 8, 2024, 4 pages.
Final Office Action received for U.S. Appl. No. 18/088,309, mailed on Aug. 1, 2024, 16 pages.
Notice of Allowance received for Japanese Patent Application No. 2022-149476, mailed on Aug. 2, 2024, 4 pages (1 page of English Translation and 3 pages of Official Copy).
Supplemental Notice of Allowance received for U.S. Appl. No. 17/975,141, mailed on Aug. 12, 2024, 2 pages.
Applicant-Initiated Interview Summary received for U.S. Appl. No. 18/088,309, mailed on Feb. 28, 2024, 2 pages.
Final Office Action received for U.S. Appl. No. 17/410,169, mailed on Feb. 23, 2024, 49 pages.
Final Office Action received for U.S. Appl. No. 18/109,808, mailed on Mar. 5, 2024, 52 pages.
Notice of Acceptance received for Australian Patent Application No. 2023201920, mailed on Feb. 9, 2024, 3 pages.
Supplemental Notice of Allowance received for U.S. Appl. No. 17/975,141, mailed on Feb. 26, 2024, 2 pages.
Advisory Action received for U.S. Appl. No. 17/747,613, mailed on Feb. 14, 2024, 3 pages.
Final Office Action received for U.S. Appl. No. 17/746,807, mailed on Feb. 20, 2024, 24 pages.
Office Action received for Chinese Patent Application No. 202211558100.7, mailed on Jan. 8, 2024, 12 pages (6 pages of English Translation and 6 pages of Official Copy).
Final Office Action received for U.S. Appl. No. 18/197,681, mailed on Jun. 27, 2024, 30 pages.
Non-Final Office Action received for U.S. Appl. No. 18/109,808, mailed on Jul. 5, 2024, 53 pages.
Non-Final Office Action received for U.S. Appl. No. 18/228,597, mailed on Jul. 8, 2024, 17 pages.
Notice of Allowance received for U.S. Appl. No. 17/746,807, mailed on Jul. 3, 2024, 23 pages.
Notice of Allowance received for U.S. Appl. No. 18/122,625, mailed on Jun. 21, 2024, 7 pages.
Brief Communication Regarding Oral Proceedings received for European Patent Application No. 22729964.1, mailed on Mar. 21, 2024, 1 page.
International Search Report and Written Opinion received for PCT Patent Application No. PCT/US2023/032794, mailed on Jan. 8, 2024, 19 pages.
Invitation to Pay Additional Fees and Partial International Search Report received for PCT Patent Application No. PCT/US2023/032794, mailed on Nov. 9, 2023, 12 pages.

Applicant Initiated Interview Summary received for U.S. Appl. No. 17/746,807, mailed on Jun. 9, 2023, 2 pages.
Applicant Initiated Interview Summary received for U.S. Appl. No. 17/746,807, mailed on Mar. 31, 2023, 2 pages.
Applicant-Initiated Interview Summary received for U.S. Appl. No. 16/773,536, mailed on Mar. 26, 2021, 4 pages.
Applicant-Initiated Interview Summary received for U.S. Appl. No. 17/410,169, mailed on Apr. 25, 2023, 6 pages.
Applicant-Initiated Interview Summary received for U.S. Appl. No. 17/509,356, mailed on Feb. 3, 2023, 3 pages.
Brief Communication regarding Oral Proceedings received for European Patent Application No. 16708003.5, mailed on May 8, 2023, 1 page.
Corrected Notice of Allowance received for U.S. Appl. No. 17/509,356, mailed on Jun. 13, 2023, 2 pages.
Corrected Notice of Allowance received for U.S. Appl. No. 17/509,356, mailed on May 24, 2023, 2 pages.
Corrected Notice of Allowance received for U.S. Appl. No. 17/950,943, mailed on Jul. 10, 2023, 2 pages.
Final Office Action received for U.S. Appl. No. 17/314,948, mailed on Mar. 7, 2023, 31 pages.
Final Office Action received for U.S. Appl. No. 17/410,169, mailed on Feb. 6, 2023, 47 pages.
Final Office Action received for U.S. Appl. No. 17/746,807, mailed on Apr. 26, 2023, 16 pages.
Han, Sangwoo, "AR Glasses Interaction Prototype", Available Online at: https://sangwoohan.cargo.site/AR-Glasses-interaction-prototype, Oct. 2020, 4 pages.
Intention to Grant received for European Patent Application No. 16708003.5, mailed on Jun. 14, 2023, 9 pages.
Intention to Grant received for European Patent Application No. 20729346.5, mailed on Jul. 10, 2023, 9 pages.
International Preliminary Report on Patentability received for PCT Patent Application No. PCT/US2018/038823, mailed on Jan. 23, 2020, 20 pages.
International Search Report and Written Opinion received for PCT Patent Application No. PCT/US2018/038823, mailed on Oct. 23, 2018, 30 pages.
International Search Report and Written Opinion received for PCT Patent Application No. PCT/US2022/044236, mailed on Mar. 27, 2023, 17 pages.
International Search Report and Written Opinion received for PCT Patent Application No. PCT/US2023/012260, mailed on Aug. 2, 2023, 22 pages.
Invitation to Pay Additional Fees and Partial International Search Report received for PCT Patent Application No. PCT/US2023/012260, mailed on Jun. 7, 2023, 11 pages.
Invitation to Pay Additional Fees received for PCT Patent Application No. PCT/US2018/038823, mailed on Sep. 5, 2018, 22 pages.
Minutes of the Oral Proceedings received for European Patent Application No. 20729346.5, mailed on Jul. 4, 2023, 6 pages.
Nishiya, et al., "Gesture Estimation Using Deep Learning from PPG Signal", Information Processing Society of Japan Kansai Branch Convention Proceedings [online], Japan, Information Processing Society of Japan, Available on: http:id.nii.ac.jp/1001/0020708, 2020, 4 pages (Official Copy only). {See Communication under 37 CFR § 1.98(a) (3)}.
Non-Final Office Action received for U.S. Appl. No. 15/937,716, mailed on Apr. 22, 2019, 28 pages.
Non-Final Office Action received for U.S. Appl. No. 16/773,536, mailed on Dec. 18, 2020, 19 pages.
Non-Final Office Action received for U.S. Appl. No. 17/746,807, mailed on Feb. 2, 2023, 14 pages.
Non-Final Office Action received for U.S. Appl. No. 17/746,807, mailed on Jul. 20, 2023, 14 pages.
Non-Final Office Action received for U.S. Appl. No. 17/975,141, mailed on Jul. 6, 2023, 22 pages.
Notice of Acceptance received for Australian Patent Application No. 2022204555, mailed on May 11, 2023, 3 pages.
Notice of Allowance received for Chinese Patent Application No. 202080039642.6, mailed on Apr. 17, 2023, 6 pages (2 pages of English Translation and 4 pages of Official Copy).

(56)                 References Cited

OTHER PUBLICATIONS

Notice of Allowance received for U.S. Appl. No. 15/937,716, mailed on Oct. 23, 2019, 19 pages.
Notice of Allowance received for U.S. Appl. No. 16/773,536, mailed on Apr. 8, 2021, 16 pages.
Notice of Allowance received for U.S. Appl. No. 17/188,228, mailed on Feb. 1, 2023, 5 pages.
Notice of Allowance received for U.S. Appl. No. 17/383,880, mailed on Aug. 29, 2022, 17 pages.
Notice of Allowance received for U.S. Appl. No. 17/383,880, mailed on Jun. 20, 2022, 17 pages.
Notice of Allowance received for U.S. Appl. No. 17/509,356, mailed on Apr. 7, 2023, 11 pages.
Notice of Allowance received for U.S. Appl. No. 17/950,943, mailed on Jul. 5, 2023, 18 pages.
Office Action received for Australian Patent Application No. 2022204555, mailed on Feb. 17, 2023, 5 pages.
Office Action received for European Patent Application No. 20720310.0, mailed on Apr. 11, 2023, 8 pages.
Office Action received for European Patent Application No. 20720310.0, mailed on Jul. 25, 2023, 11 pages.
Office Action received for European Patent Application No. 22729964.1, mailed on May 22, 2023, 9 pages.
Office Action received for Japanese Patent Application No. 2023-513867, mailed on Jul. 31, 2023, 11 pages (5 pages of English Translation and 6 pages of Official Copy).
Result of Consultation received for European Patent Application No. 16708003.5, mailed on Apr. 18, 2023, 9 pages.
Result of Consultation received for European Patent Application No. 20729346.5, mailed on Jun. 21, 2023, 3 pages.
Summons to Oral Proceedings received for European Patent Application No. 17184710.6, mailed on May 10, 2023, 3 pages.
Zhang, et al., "FinDroidHR: Smartwatch Gesture Input with Optical Heartrate Monitor", Proceedings of the ACM on Interactive Mobile, Wearable and Ubiquitous Technologies, Available Online at: https://dl.acm.org/doi/10.1145/3191788, vol. 2, No. 1, Mar. 2018, 42 pages.
Applicant-Initiated Interview Summary received for U.S. Appl. No. 18/109,808, mailed on Apr. 30, 2024, 5 pages.
Intention to Grant received for European Patent Application No. 22729964.1, mailed on Apr. 24, 2024, 9 pages.
Notice of Allowance received for U.S. Appl. No. 17/975,141, mailed on Apr. 29, 2024, 9 pages.
Office Action received for Chinese Patent Application No. 202080039832.8, mailed on Mar. 23, 2024, 22 pages (12 pages of English Translation and 10 pages of Official Copy).
Office Action received for Japanese Patent Application No. 2022-149476, mailed on Apr. 22, 2024, 8 pages (4 pages of English Translation and 4 pages of Official Copy).
Result of Consultation received for European Patent Application No. 20720310.0, mailed on Apr. 17, 2024, 9 pages.
Applicant-Initiated Interview Summary received for U.S. Appl. No. 17/410,169, mailed on Nov. 6, 2024, 5 pages.
Applicant-Initiated Interview Summary received for U.S. Appl. No. 18/499,970, mailed on Sep. 18, 2024, 3 pages.
Decision to Grant received for European Patent Application No. 15753796.0, mailed on Sep. 26, 2024, 3 pages.
Extended European Search Report received for European Patent Application No. 24194531.0, mailed on Nov. 12, 2024, 8 pages.
Intention to Grant received for European Patent Application No. 20720310.0, mailed on Oct. 7, 2024, 14 pages.
International Search Report and Written Opinion received for PCT Patent Application No. PCT/US2024/020743, mailed on Jul. 16, 2024, 19 pages.
Invitation to Pay Additional Fees and Partial International Search Report received for PCT Patent Application No. PCT/US2024/023602, mailed on Aug. 26, 2024, 11 pages.
Non-Final Office Action received for U.S. Appl. No. 18/499,970, mailed on Aug. 13, 2024, 8 pages.

Notice of Acceptance received for Australian Patent Application No. 2023204647, mailed on Oct. 28, 2024, 3 pages.
Notice of Allowance received for U.S. Appl. No. 17/746,807, mailed on Nov. 14, 2024, 6 pages.
Notice of Allowance received for U.S. Appl. No. 18/109,808, mailed on Oct. 10, 2024, 10 pages.
Notice of Allowance received for U.S. Appl. No. 18/511,778, mailed on Sep. 30, 2024, 17 pages.
Non-Final Office Action received for U.S. Appl. No. 17/410,169, mailed on Sep. 10, 2024, 53 pages.
Notice of Allowance received for U.S. Appl. No. 18/122,625, mailed on Sep. 20, 2024, 5 pages.
Office Action received for Australian Patent Application No. 2023204647, mailed on Sep. 19, 2024, 2 pages.
Office Action received for Chinese Patent Application No. 202310794146.7, mailed on Aug. 30, 2024, 18 pages (11 pages of English Translation and 7 pages of Official Copy).
Applicant-Initiated Interview Summary received for U.S. Appl. No. 17/747,613, mailed on Dec. 18, 2024, 2 pages.
Applicant-Initiated Interview Summary received for U.S. Appl. No. 17/747,613, mailed on Mar. 18, 2025, 2 pages.
Applicant-Initiated Interview Summary received for U.S. Appl. No. 18/228,597, mailed on Jan. 29, 2025, 4 pages.
Applicant-Initiated Interview Summary received for U.S. Appl. No. 18/499,970, mailed on Feb. 25, 2025, 4 pages.
Corrected Notice of Allowance received for U.S. Appl. No. 17/746,807, mailed on Feb. 26, 2025, 3 pages.
Decision to Grant received for European Patent Application No. 20720310.0, mailed on Dec. 5, 2024, 2 pages.
Extended European Search Report received for European Patent Application No. 24194994.0, mailed on Nov. 28, 2024, 9 pages.
Extended European Search Report received for European Patent Application No. 24211972.5, mailed on Jan. 2, 2025, 7 pages.
Final Office Action received for U.S. Appl. No. 17/410,169, mailed on Dec. 3, 2024, 56 pages.
Final Office Action received for U.S. Appl. No. 17/747,613, mailed on Mar. 6, 2025, 26 pages.
Final Office Action received for U.S. Appl. No. 18/228,597, mailed on Jan. 8, 2025, 19 pages.
Final Office Action received for U.S. Appl. No. 18/499,970, mailed on Dec. 23, 2024, 8 pages.
International Preliminary Report on Patentability received for PCT Patent Application No. PCT/US2023/022410, mailed on Nov. 28, 2024, 18 pages.
International Search Report and Written Opinion received for PCT Patent Application No. PCT/US2024/023602, mailed on Nov. 26, 2024, 17 pages.
Non-Final Office Action received for U.S. Appl. No. 17/747,613, mailed on Nov. 27, 2024, 27 pages.
Non-Final Office Action received for U.S. Appl. No. 18/228,597, mailed on Mar. 6, 2025, 20 pages.
Non-Final Office Action received for U.S. Appl. No. 18/499,970, mailed on Mar. 14, 2025, 7 pages.
Notice of Allowance received for Korean Patent Application No. 10-2022-7032414, mailed on Nov. 27, 2024, 7 pages (2 pages of English Translation and 5 pages of Official Copy).
Office Action received for Chinese Patent Application No. 202310794146.7, mailed on Nov. 13, 2024, 17 pages (11 pages of English Translation and 6 pages of Official Copy).
Decision to Grant received for European Patent Application No. 24211972.5, mailed on Jul. 31, 2025, 2 pages.
Final Office Action received for U.S. Appl. No. 18/499,970, mailed on Aug. 5, 2025, 10 pages.
International Preliminary Report on Patentability received for PCT Patent Application No. PCT/US2024/020743, mailed on Jul. 29, 2025, 15 pages.
Notice of Allowance received for U.S. Appl. No. 18/441,971, mailed on Aug. 5, 2025, 11 pages.
Office Action received for Japanese Patent Application No. 2024-147808, mailed on Aug. 1, 2025, 10 pages (5 pages of English Translation and 5 pages of Official Copy).
Advisory Action received for U.S. Appl. No. 18/228,597, mailed on Jul. 7, 2025, 3 pages.

(56) References Cited

OTHER PUBLICATIONS

Applicant-Initiated Interview Summary received for U.S. Appl. No. 17/747,613, mailed on Jul. 21, 2025, 2 pages.

Applicant-Initiated Interview Summary received for U.S. Appl. No. 18/441,971, mailed on Jul. 15, 2025, 4 pages.

Notice of Allowance received for U.S. Appl. No. 17/410,169, mailed on Jul. 17, 2025, 8 pages.

Interview Summary received for U.S. Appl. No. 18/197,681, mailed on Apr. 21, 2025, 4 pages.

Interview Summary received for U.S. Appl. No. 18/228,597, mailed on Apr. 1, 2025, 5 pages.

Interview Summary received for U.S. Appl. No. 18/228,597, mailed on Jun. 23, 2025, 4 pages.

Interview Summary received for U.S. Appl. No. 18/499,970, mailed on May 30, 2025, 4 pages.

Final Office Action received for U.S. Appl. No. 18/228,597, mailed on May 9, 2025, 22 pages.

Intention to Grant received for European Patent Application No. 24211972.5, mailed on Apr. 10, 2025, 9 pages.

Intention to Grant received for European Patent Application No. 24211972.5, mailed on Jun. 16, 2025, 9 pages.

International Preliminary Report on Patentability received for PCT Patent Application No. PCT/US2023/032794, mailed on Apr. 3, 2025, 13 pages.

Non-Final Office Action received for U.S. Appl. No. 17/747,613, mailed on Jun. 26, 2025, 28 pages.

Non-Final Office Action received for U.S. Appl. No. 18/197,681, mailed on Apr. 3, 2025, 30 pages.

Non-Final Office Action received for U.S. Appl. No. 18/441,971, mailed on Apr. 10, 2025, 39 pages.

Notice of Allowance received for U.S. Appl. No. 18/197,681, mailed on May 20, 2025, 18 pages.

Office Action received for Chinese Patent Application No. 202110481400.9, on Apr. 23, 2025, 24 pages (14 pages of English Translation and 10 pages of Official Copy).

Office Action received for Chinese Patent Application No. 202310794146.7, mailed on Apr. 10, 2025, 11 pages (6 pages of English Translation and 5 pages of Official Copy).

Office Action received for Japanese Patent Application No. 2024-023002, mailed on Apr. 11, 2025, 12 pages (6 pages of English Translation and 6 pages of Official Copy).

Written Opinion received for PCT Patent Application No. PCT/US2024/020743, mailed on Apr. 1, 2025, 14 pages.

Apple Support, "How to use AssistiveTouch on Apple Watch", Online available at: https://www.youtube.com/watch?v=869--vIUlv4&t=80s, May 18, 2023, 3 pages.

Applicant-Initiated Interview Summary received for U.S. Appl. No. 18/674,435, mailed on Sep. 29, 2025, 4 pages.

Corrected Notice of Allowance received for U.S. Appl. No. 17/747,613, mailed on Sep. 22, 2025, 4 pages.

Corrected Notice of Allowance received for U.S. Appl. No. 18/228,597, mailed on Nov. 5, 2025, 2 pages.

Corrected Notice of Allowance received for U.S. Appl. No. 18/228,597, mailed on Sep. 17, 2025, 2 pages.

Corrected Notice of Allowance received for U.S. Appl. No. 18/441,971, mailed on Aug. 21, 2025, 2 pages.

International Search Report and Written Opinion received for PCT Patent Application No. PCT/US2025/024587, mailed on Sep. 19, 2025, 19 pages.

Invitation to Pay Additional Fees and Partial International Search Report received for PCT Patent Application No. PCT/US2025/024587, mailed on Jul. 29, 2025, 12 pages.

Non-Final Office Action received for U.S. Appl. No. 18/674,435, mailed on Sep. 10, 2025, 29 pages.

Non-Final Office Action received for U.S. Appl. No. 18/957,386, mailed on Oct. 3, 2025, 18 pages.

Notice of Allowance received for Chinese Patent Application No. 202310794146.7, mailed on Sep. 29, 2025, 4 pages (1 page of English Translation and 3 pages of Official Copy).

Notice of Allowance received for Japanese Patent Application No. 2024-023002, mailed on Sep. 1, 2025, 5 pages (1 page of English Translation and 4 pages of Official Copy).

Notice of Allowance received for U.S. Appl. No. 17/747,613, mailed on Sep. 2, 2025, 10 pages.

Notice of Allowance received for U.S. Appl. No. 18/228,597, mailed on Sep. 10, 2025, 10 pages.

Restriction Requirement received for U.S. Appl. No. 18/242,694, mailed on Oct. 27, 2025, 6 pages.

Supplemental Notice of Allowance received for U.S. Appl. No. 17/747,613, mailed on Sep. 16, 2025, 5 pages.

Extended European Search Report received for European Patent Application No. 25186269.4, mailed on Nov. 17, 2025, 12 pages.

International Preliminary Report on Patentability received for PCT Patent Application No. PCT/US2024/023602, mailed on Nov. 20, 2025, 18 pages.

Notice of Allowance received for U.S. Appl. No. 17/410,169, mailed on Nov. 21, 2025, 8 pages.

Office Action received for Japanese Patent Application No. 2024-147808, mailed on Nov. 10, 2025, 6 pages (3 pages of English Translation and 3 pages of Official Copy).

* cited by examiner

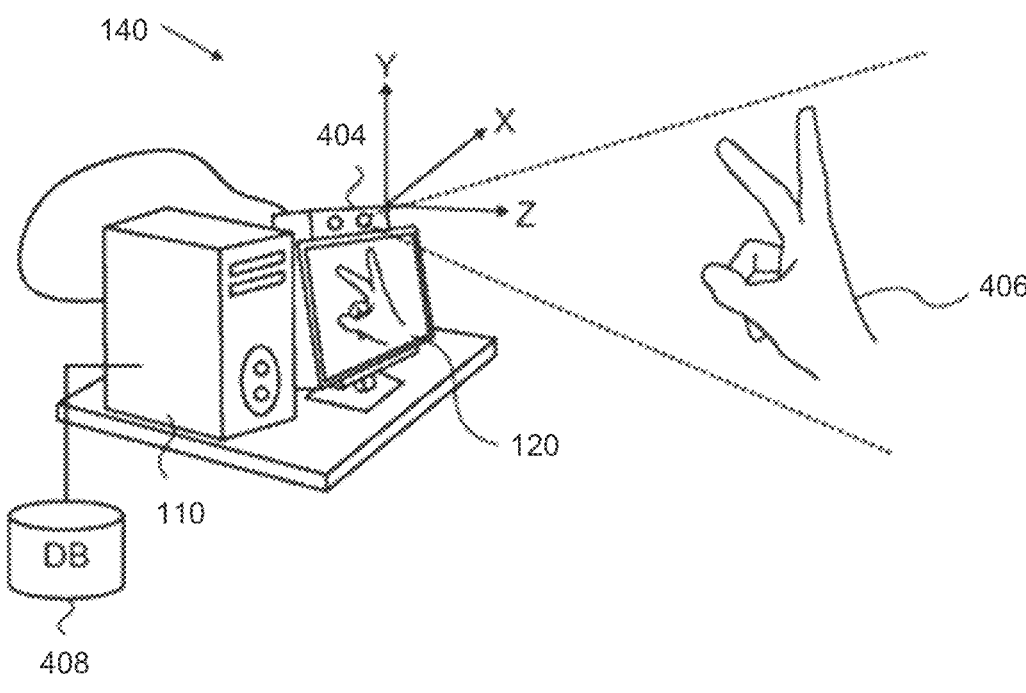
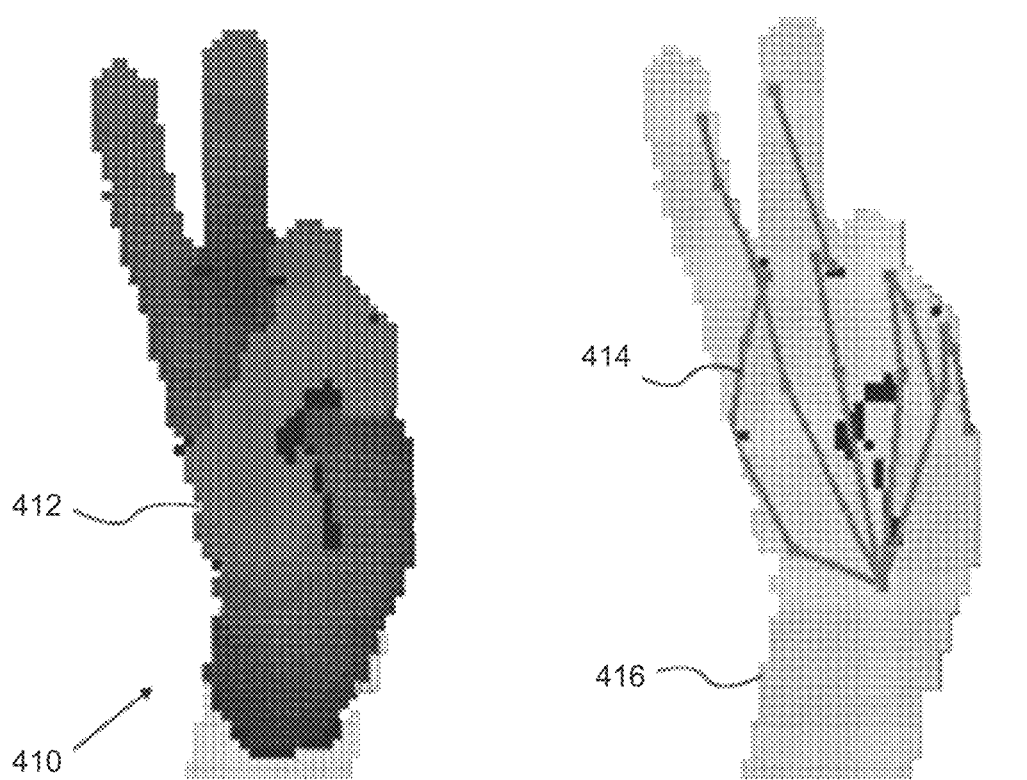
*FIG. 4*

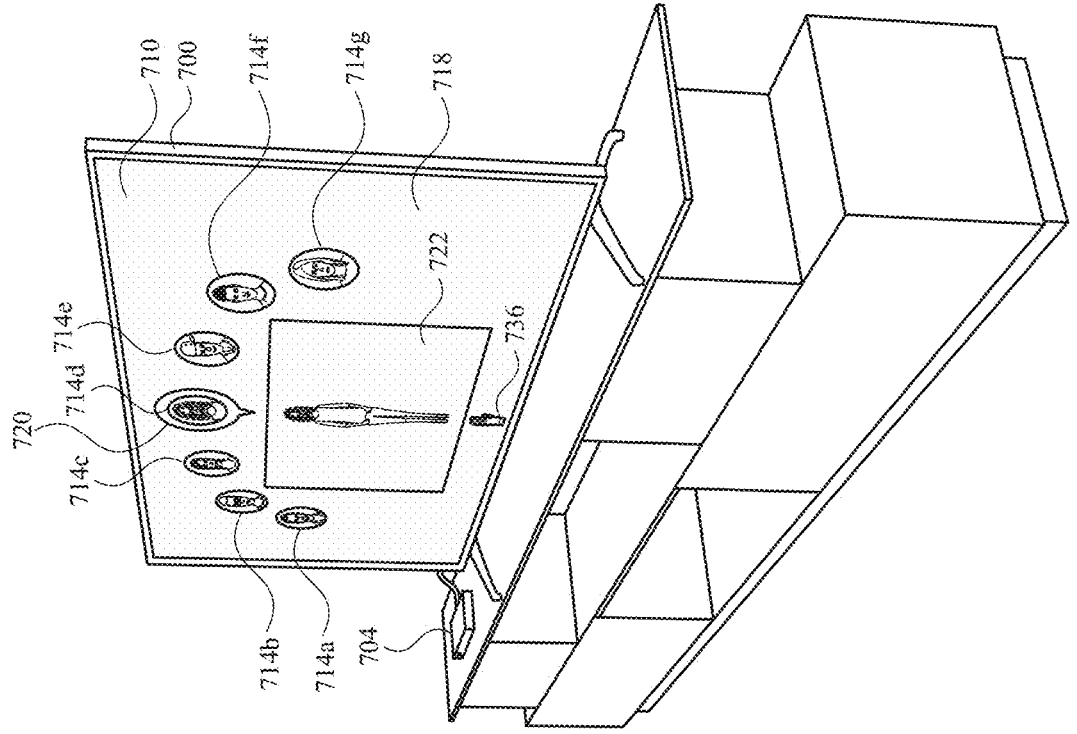
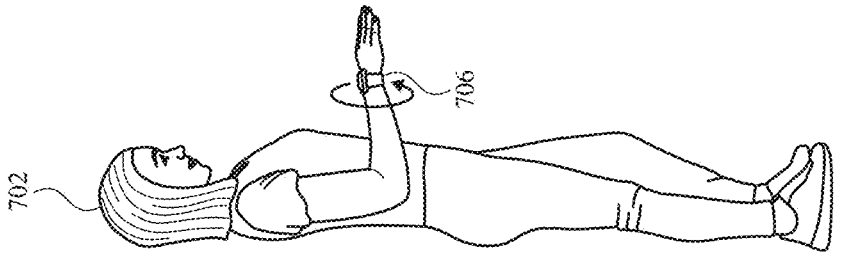
*FIG. 7A*

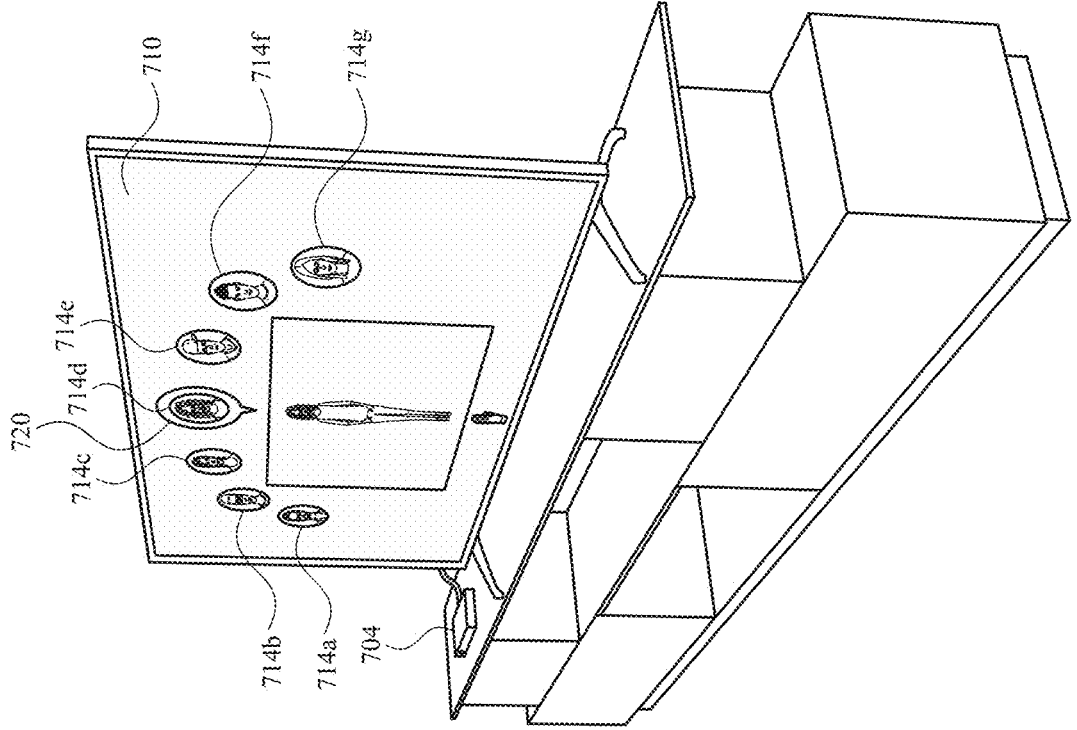
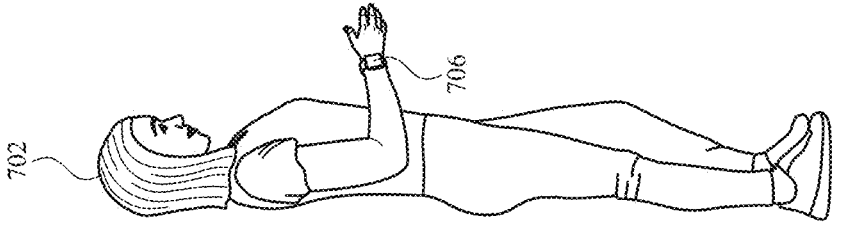
*FIG. 7B*

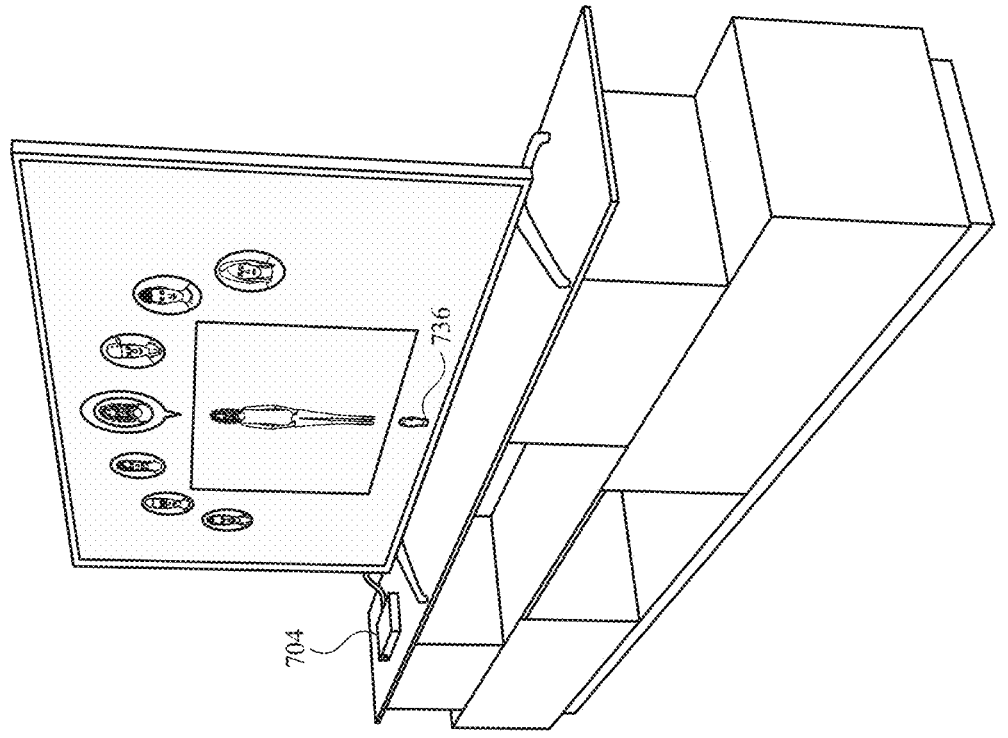
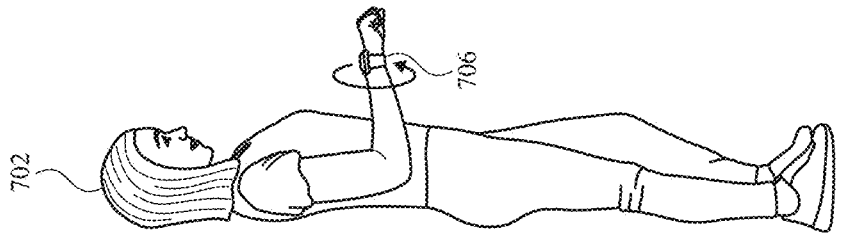
*FIG. 7C*

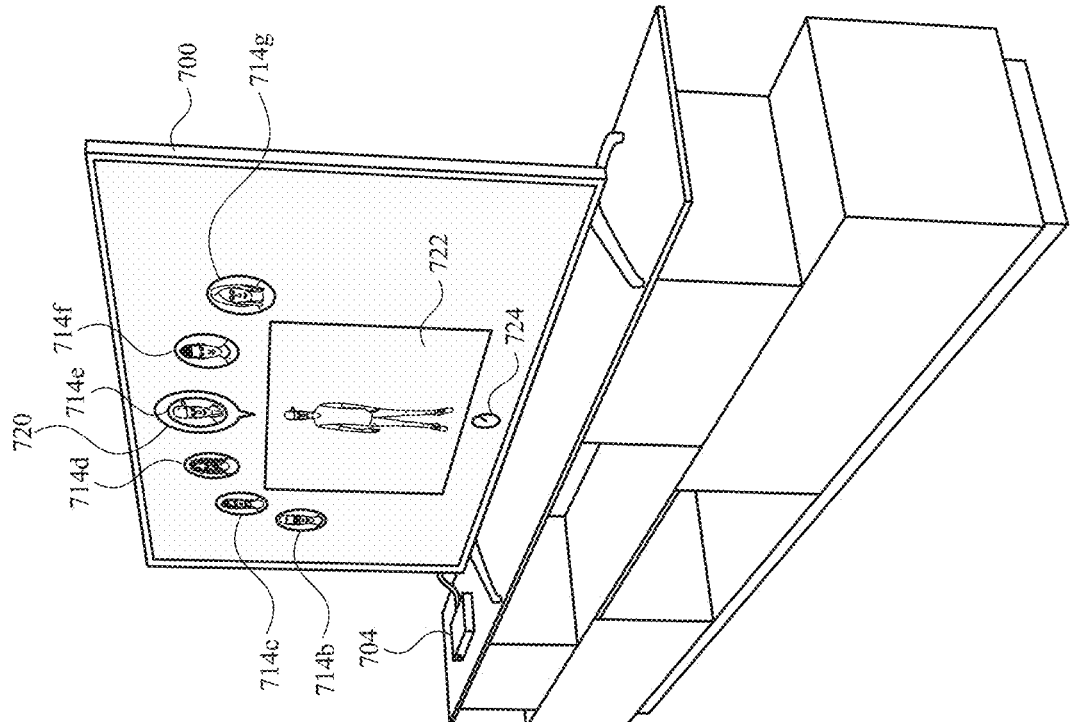
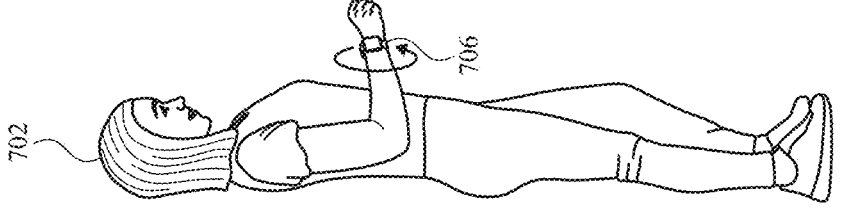
*FIG. 7D*

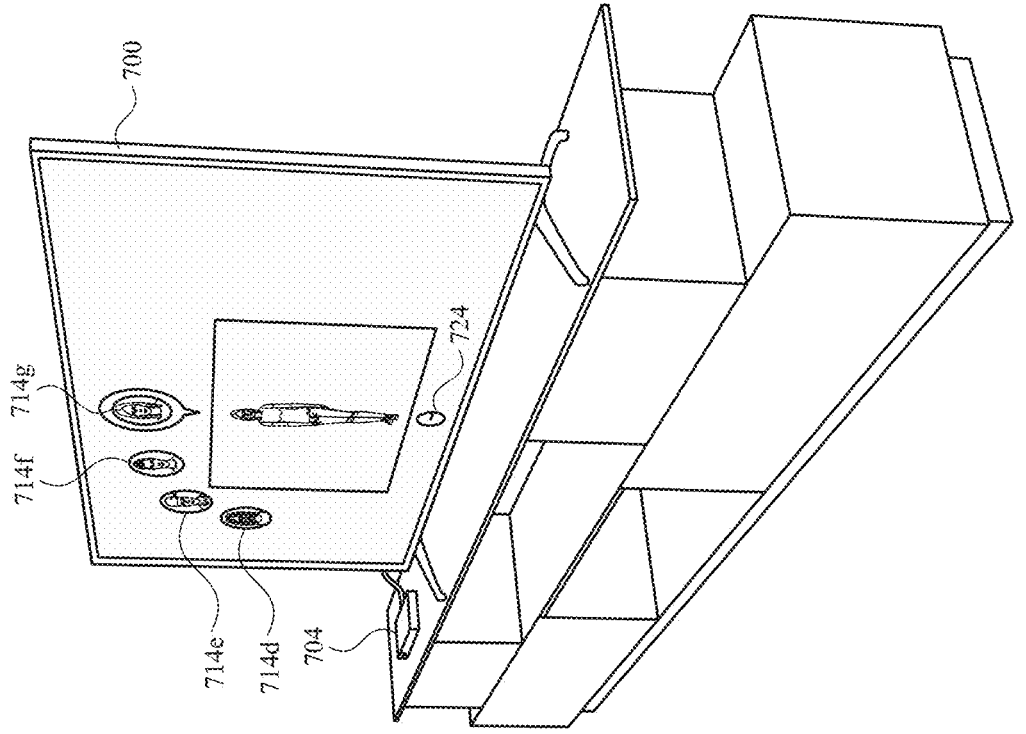
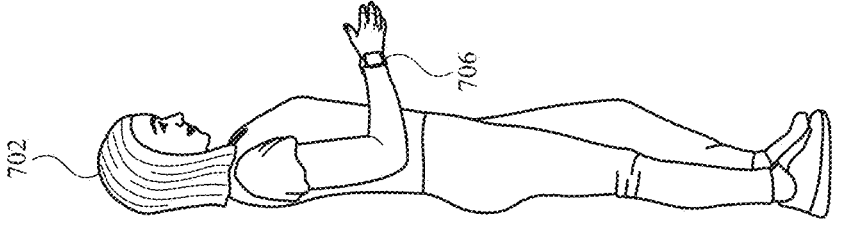
*FIG. 7E*

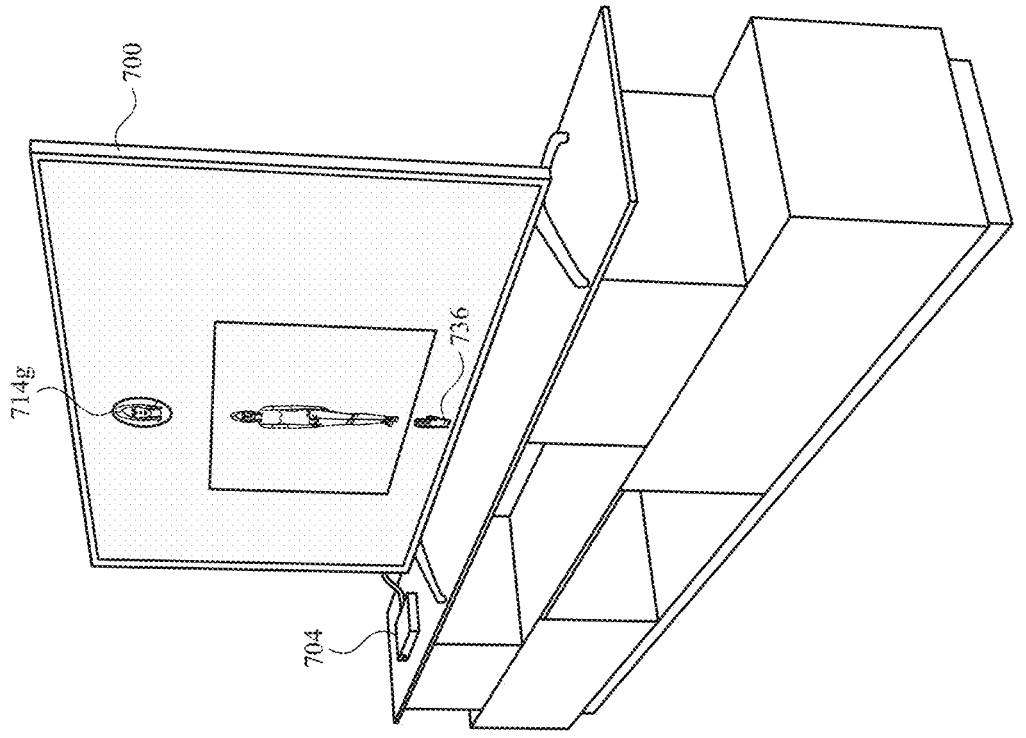
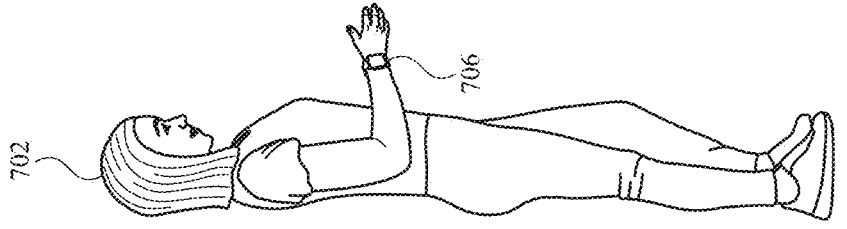
*FIG. 7F*

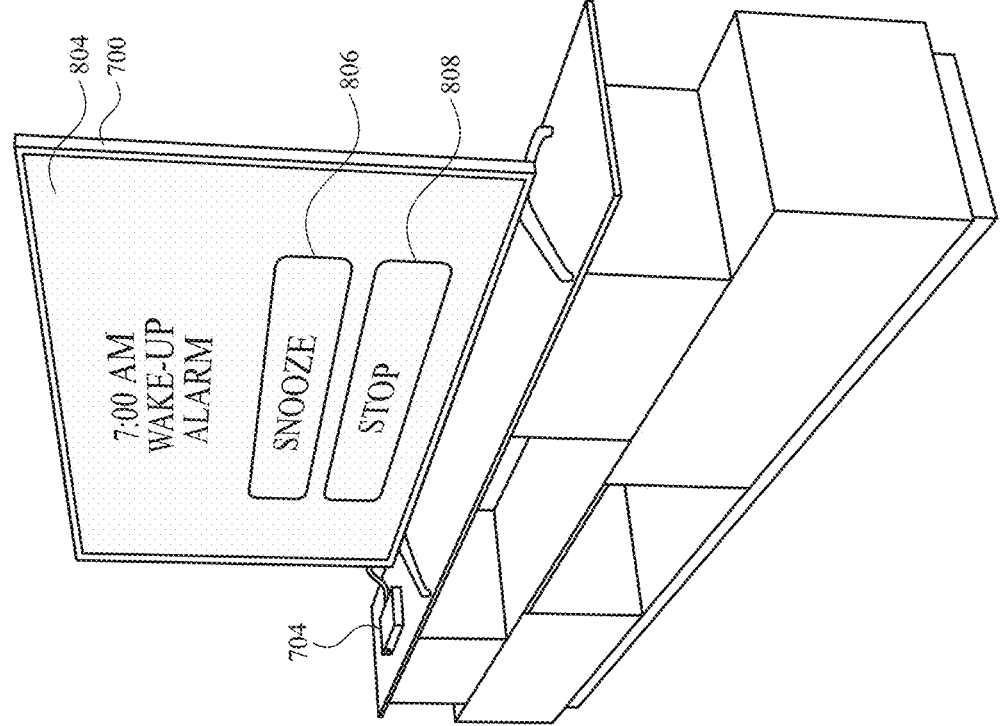
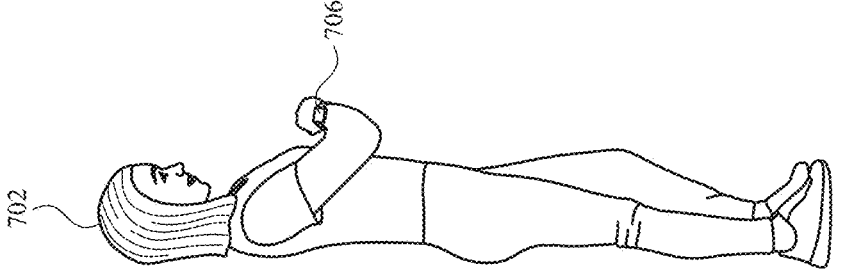
*FIG. 8A*

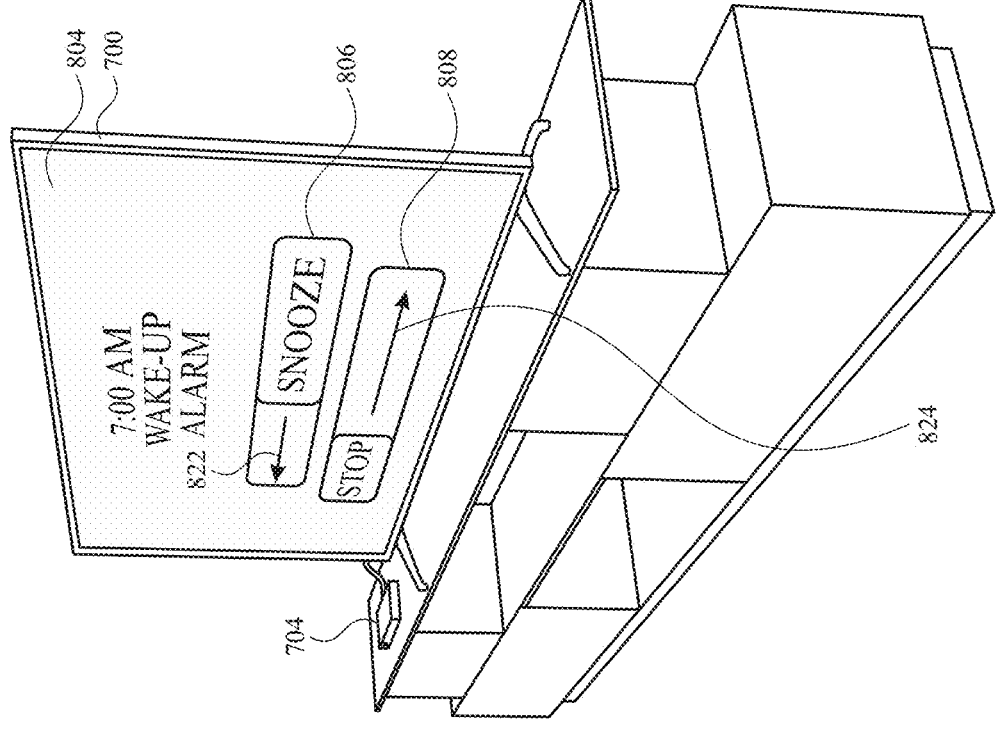
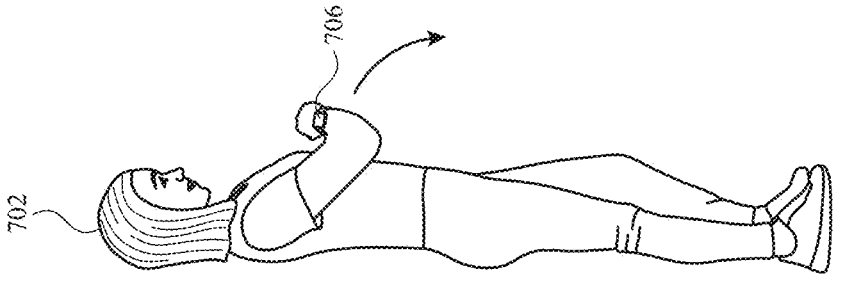
*FIG. 8B*

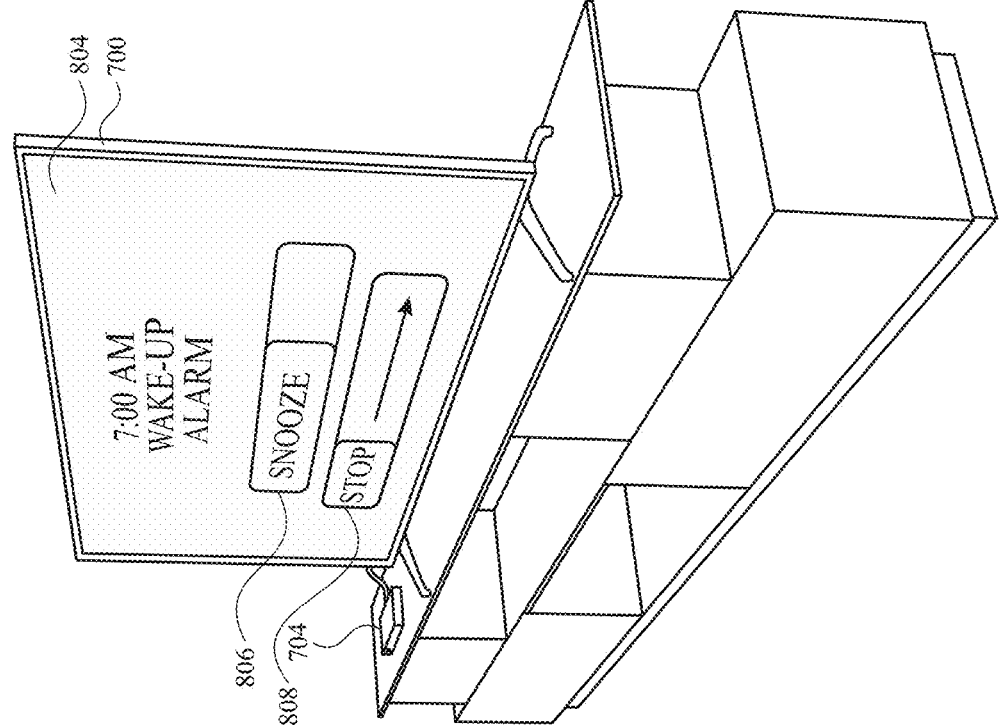
7:00 AM
WAKE-UP
ALARM
SNOOZE
STOP
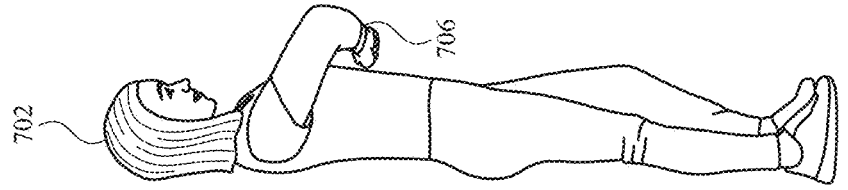
*FIG. 8C*

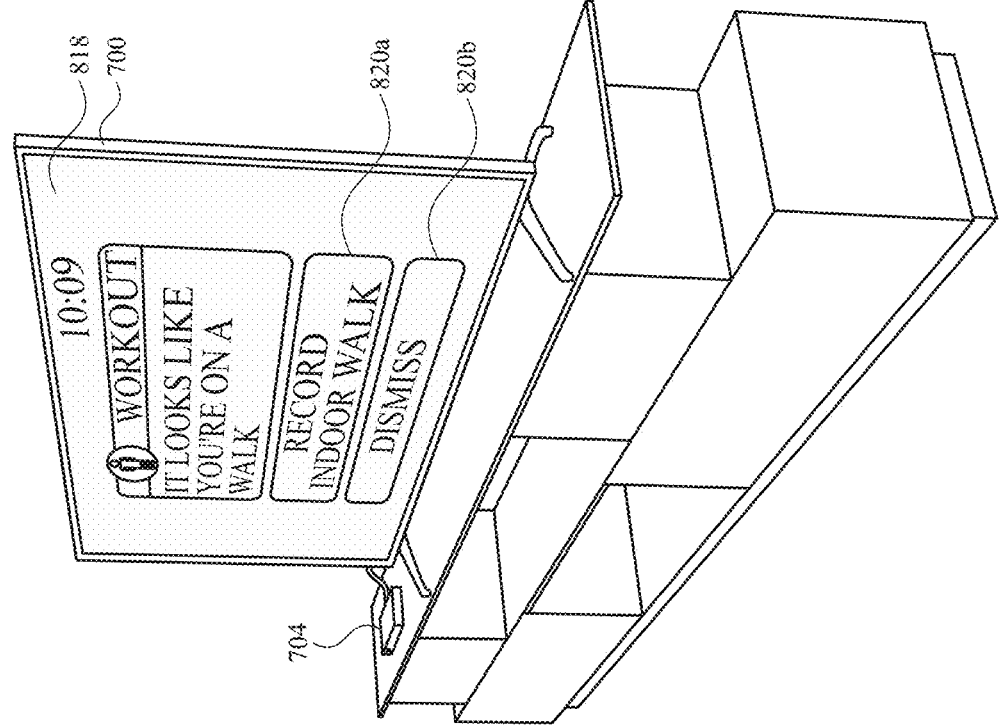
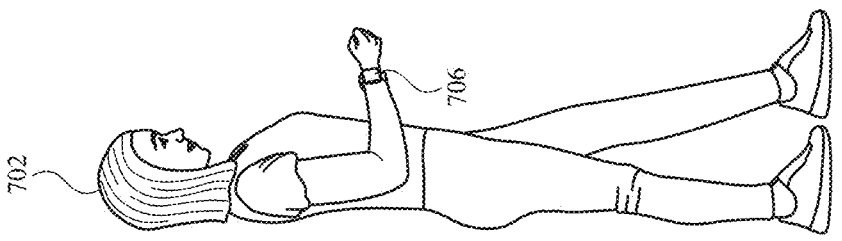
*FIG. 8D*

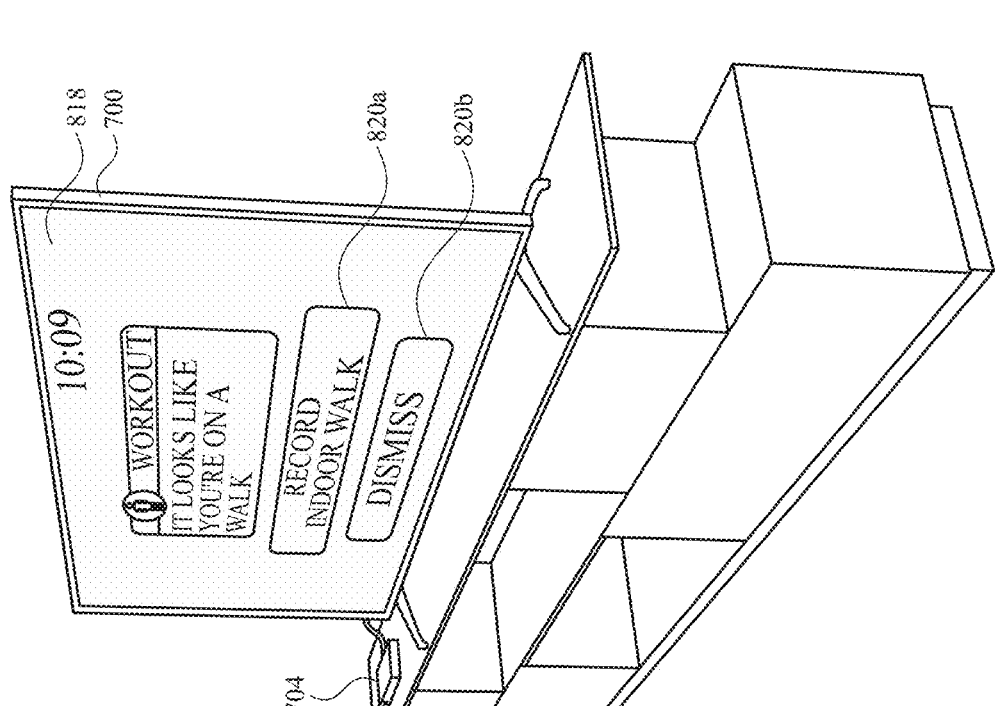
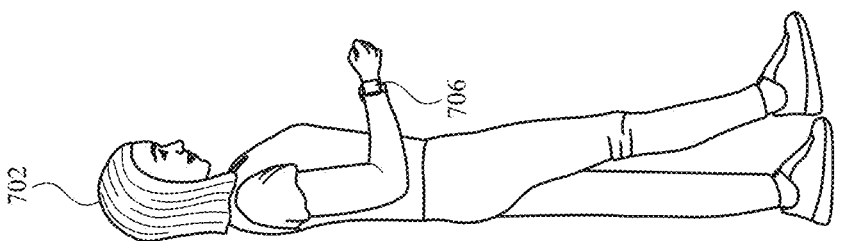
*FIG. 8E*

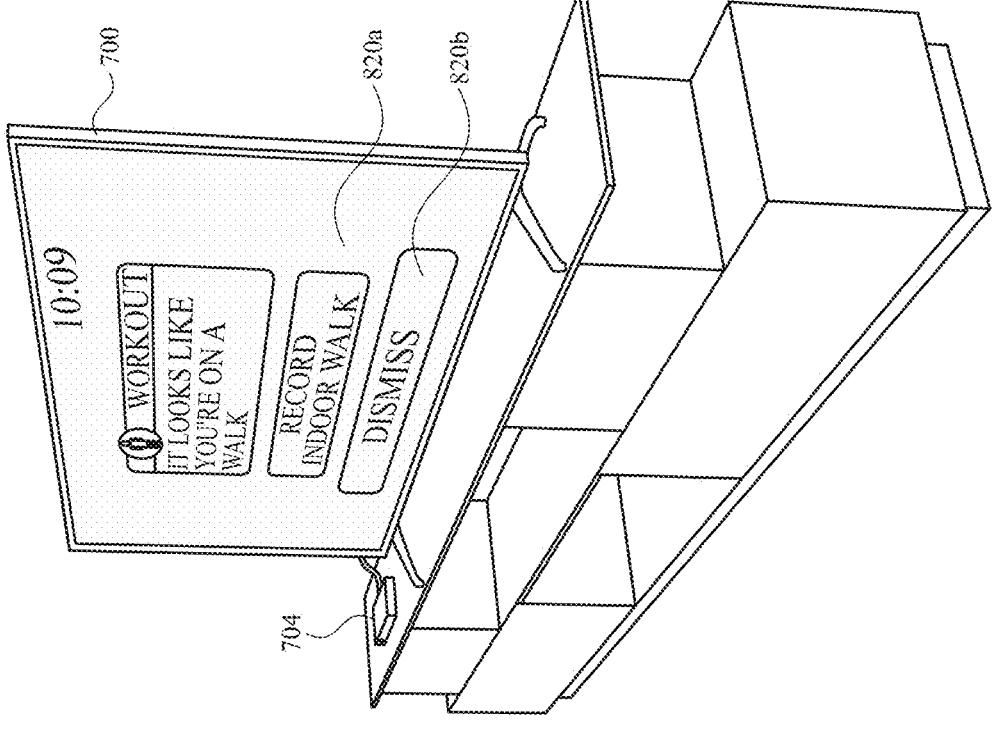
700
820a
820b
10:09
WORKOUT
IT LOOKS LIKE
YOU'RE ON A
WALK
RECORD
INDOOR WALK
DISMISS
704
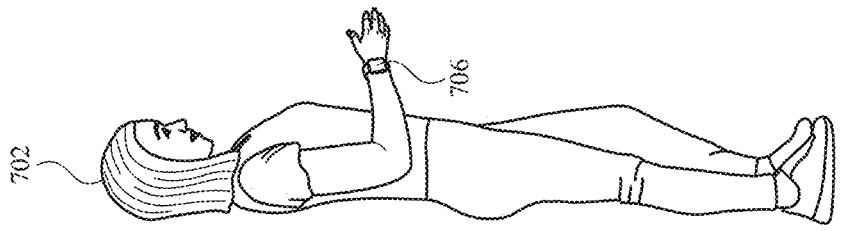
702
706
*FIG. 8F*

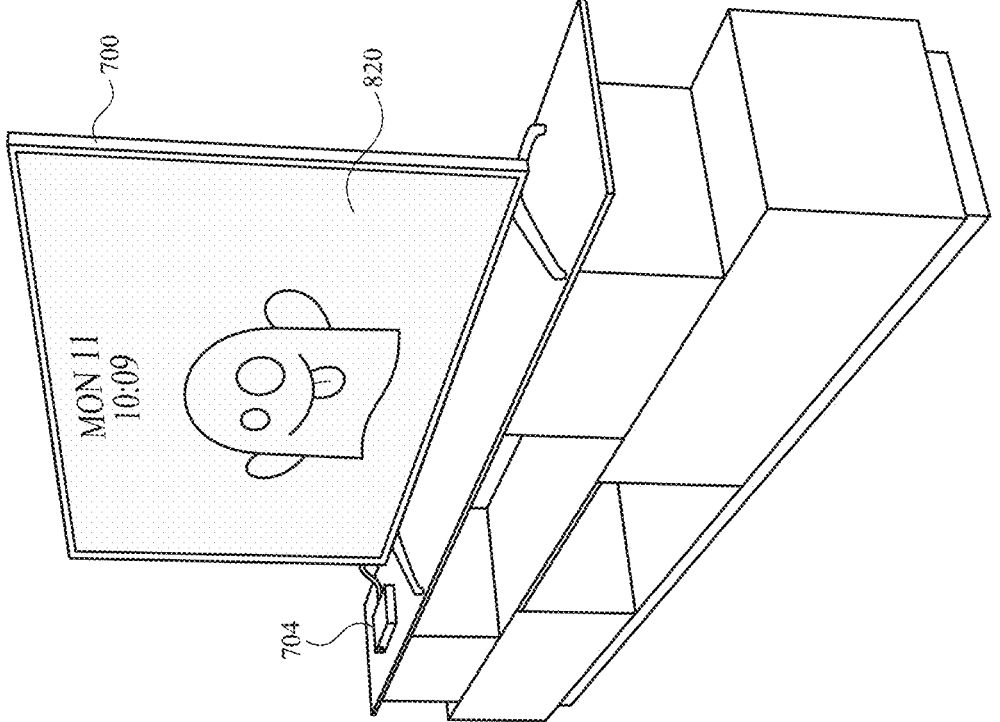
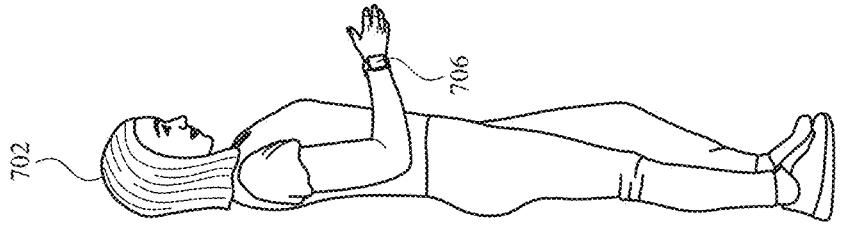
FIG. 8G

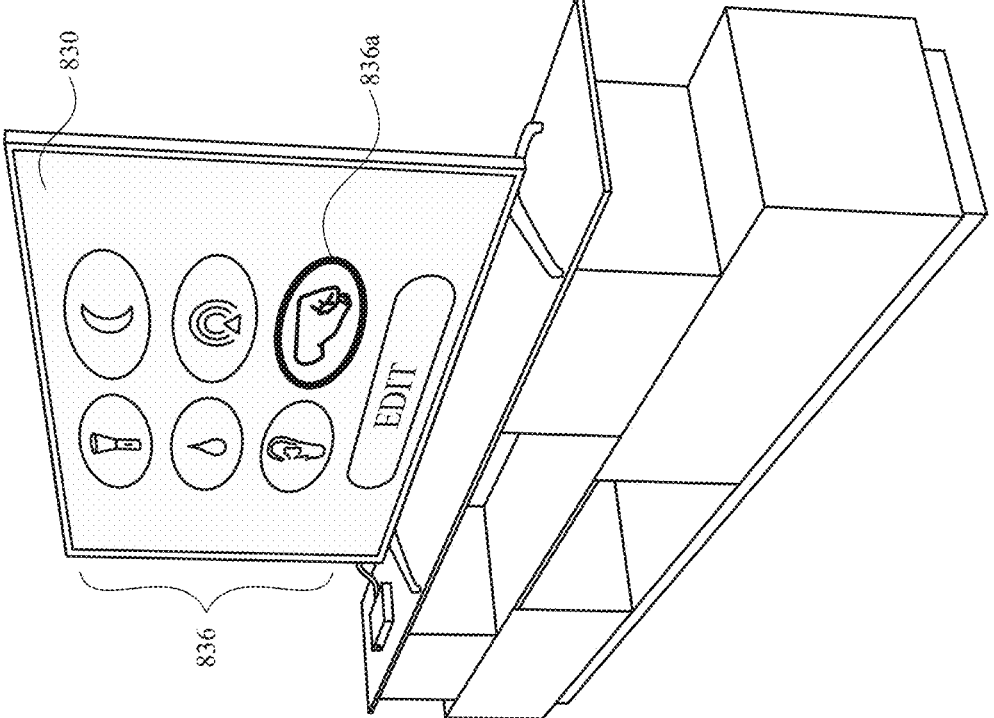
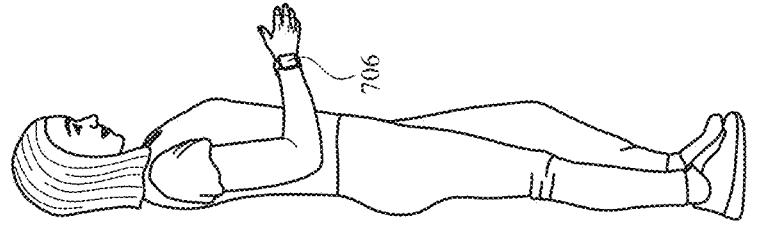
*FIG. 8H*

900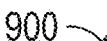

902
While a hand-worn device is being worn by a user, displaying, via the display generation component, a respective user interface that includes a first portion of the content and a second portion of the content that is different from the first portion of the content

904
While displaying the respective user interface that includes the first portion of the content and the second portion of the content, receiving an indication that the hand-worn device detected a hand input including a rotation of a hand

906
In response to receiving the indication that the hand-worn device detected the hand input including the rotation of the hand:

908
In accordance with a determination that the hand-worn device detected that the hand is clenched while the hand input was performed, navigating between the first portion of the content and the second portion of the content

910
In accordance with a determination that the hand-worn device did not detect that the hand is clenched while the hand input was performed, forgoing navigating between the first portion of the content and the second portion of the content

<u>1102</u>
Displaying, via the display generation component, a respective user interface, wherein displaying the respective user interface includes concurrently displaying:

<u>1104</u>
A first control virtual object that, when activated with a first type of input, causes the computer system to perform a first operation <u>1106</u>
A second control virtual object that, when activated with the first type of input, causes the computer system to perform a second operation different from the first operation <u>1108</u>
A first virtual object indicating that the first control virtual object can be activated in response to a second type of input being performed, wherein the second type of input is not directed to a location in the respective user interface <u>1110</u>
While displaying the first control virtual object, receiving an indication that a respective input has been performed

*FIG. 11A*

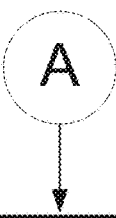

---

1112

In response to receiving the indication that the respective input has been performed:

---

1114

In accordance with a determination that the respective input is the first type of input directed to the location that corresponds to the first control virtual object, initiating a process for performing the first operation

---

1116

In accordance with a determination that the respective input is the first type of input directed to a location that corresponds to the second control virtual object, initiating a process for performing the second operation

---

1118

In accordance with a determination that the respective input is the second type of input, initiating the process for performing the first operation

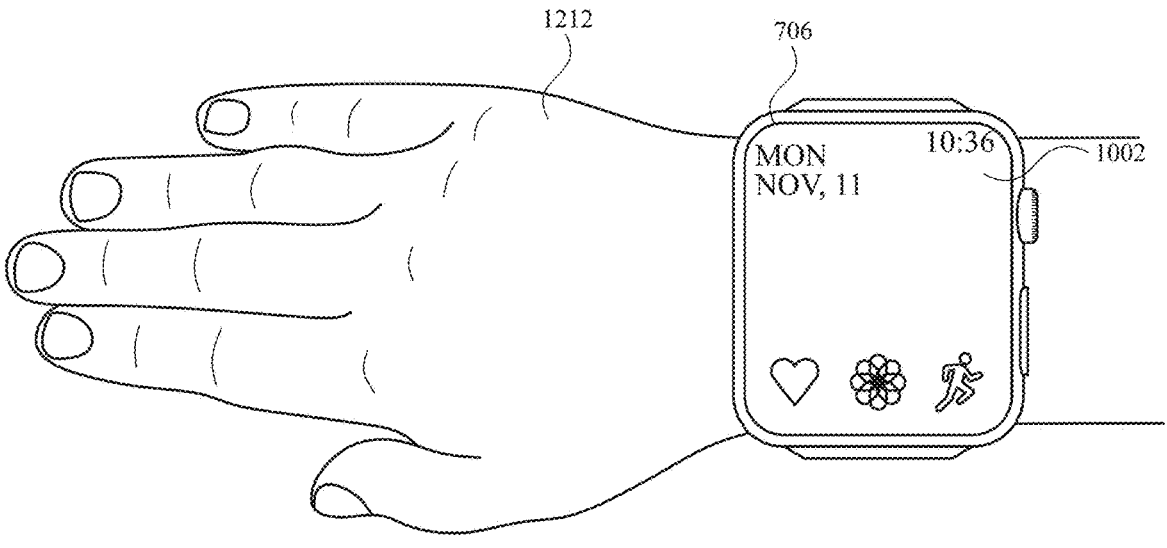
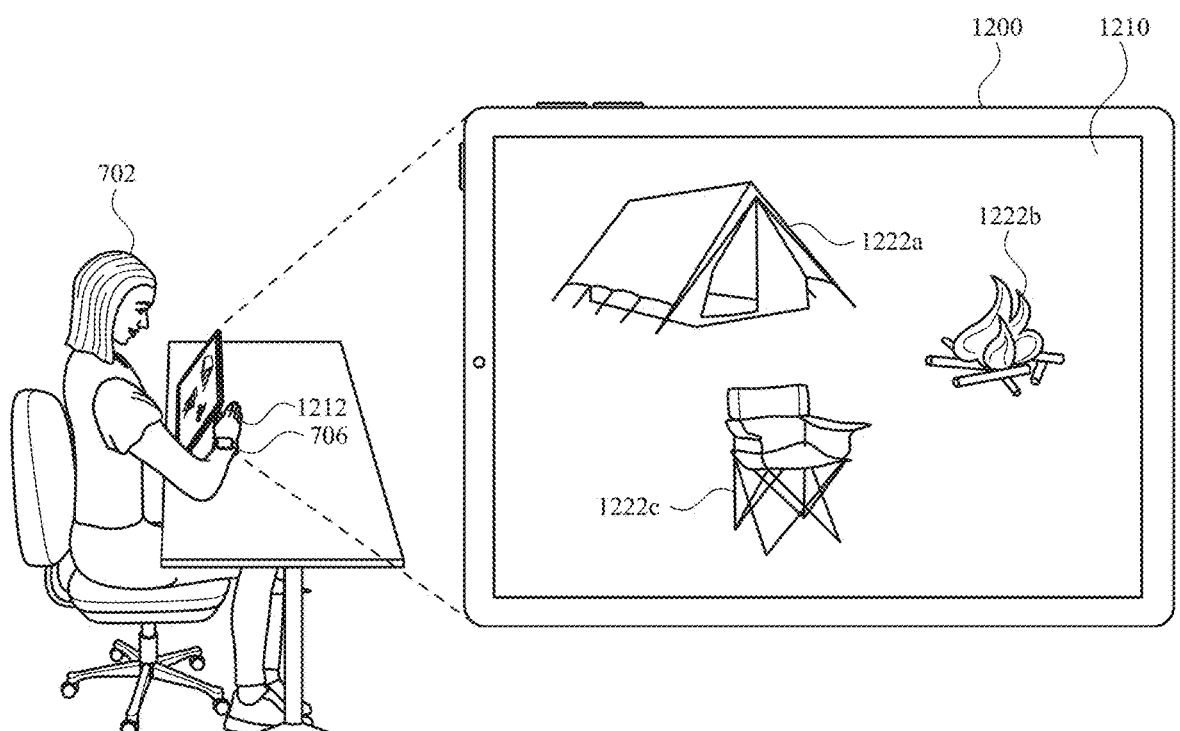
*FIG. 12B*

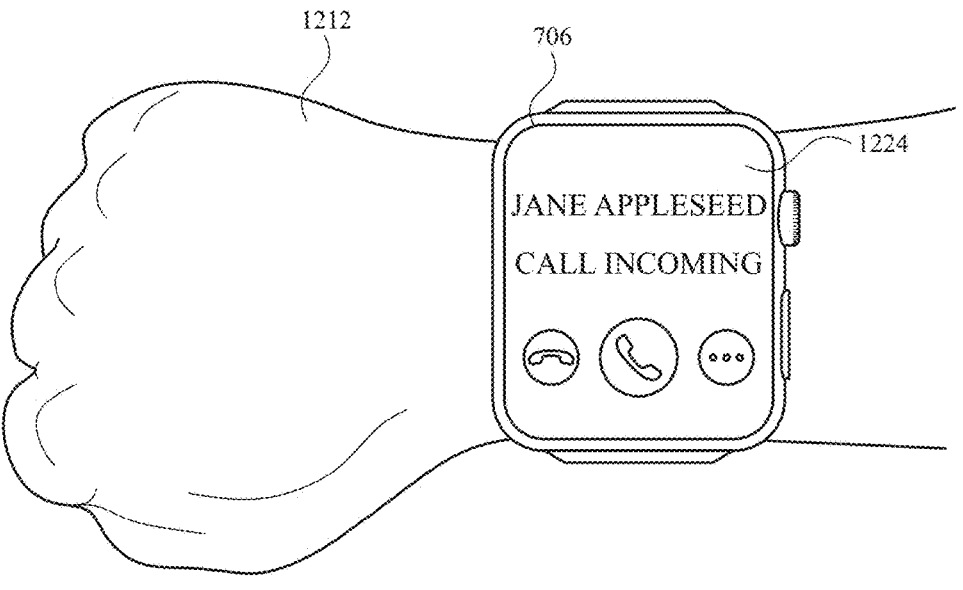
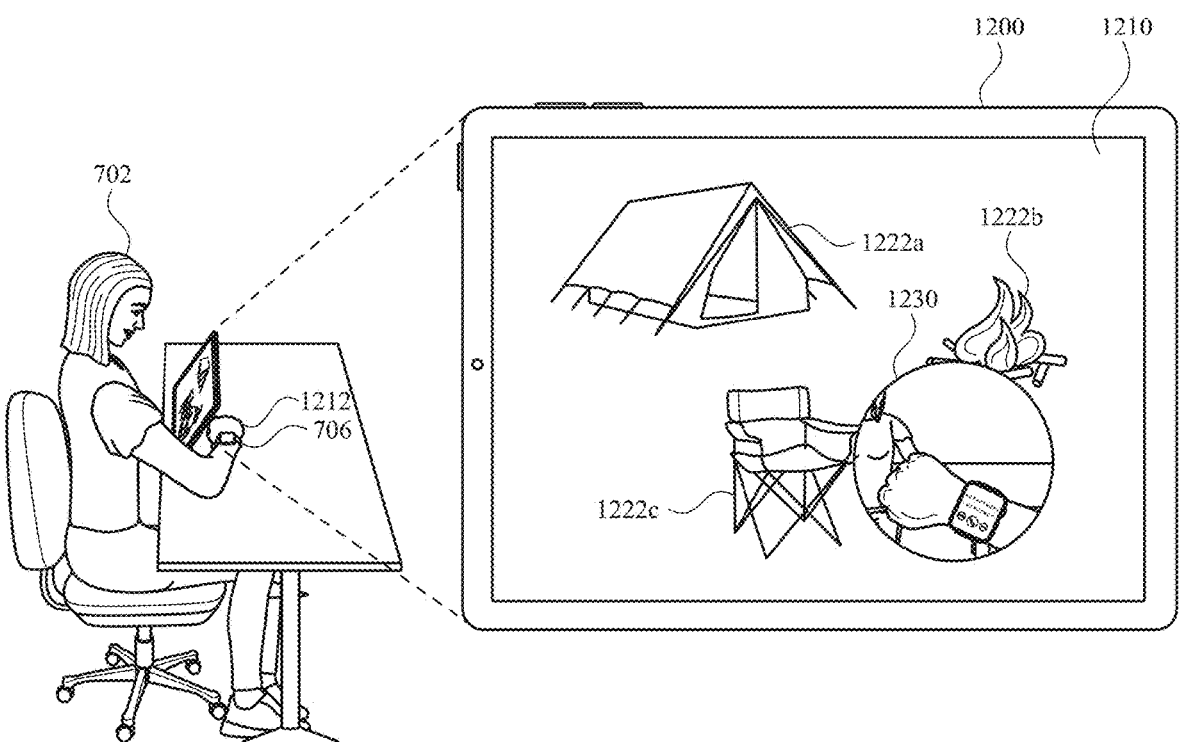
*FIG. 12C*

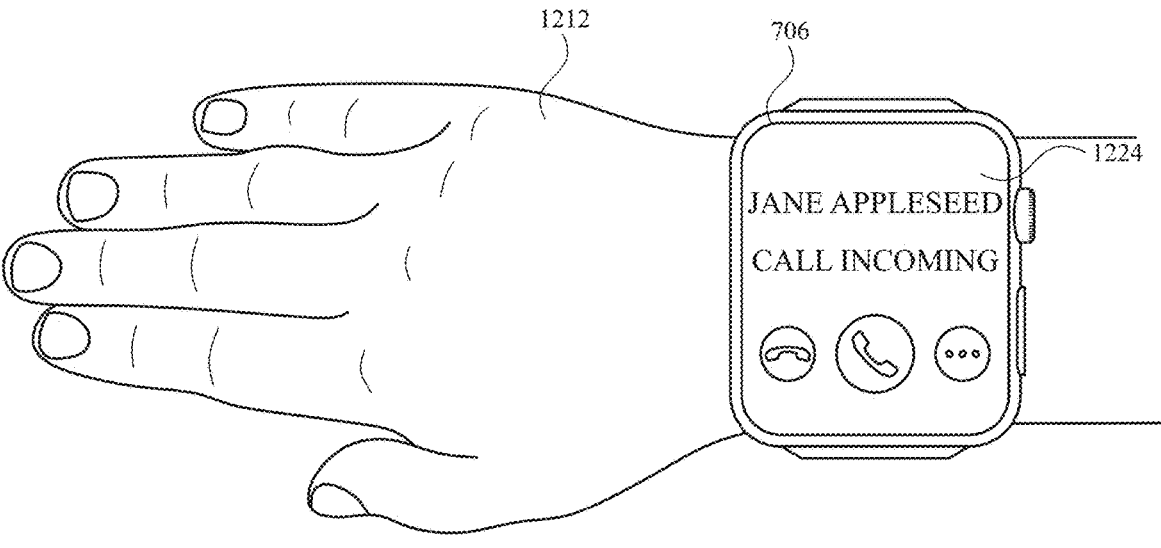
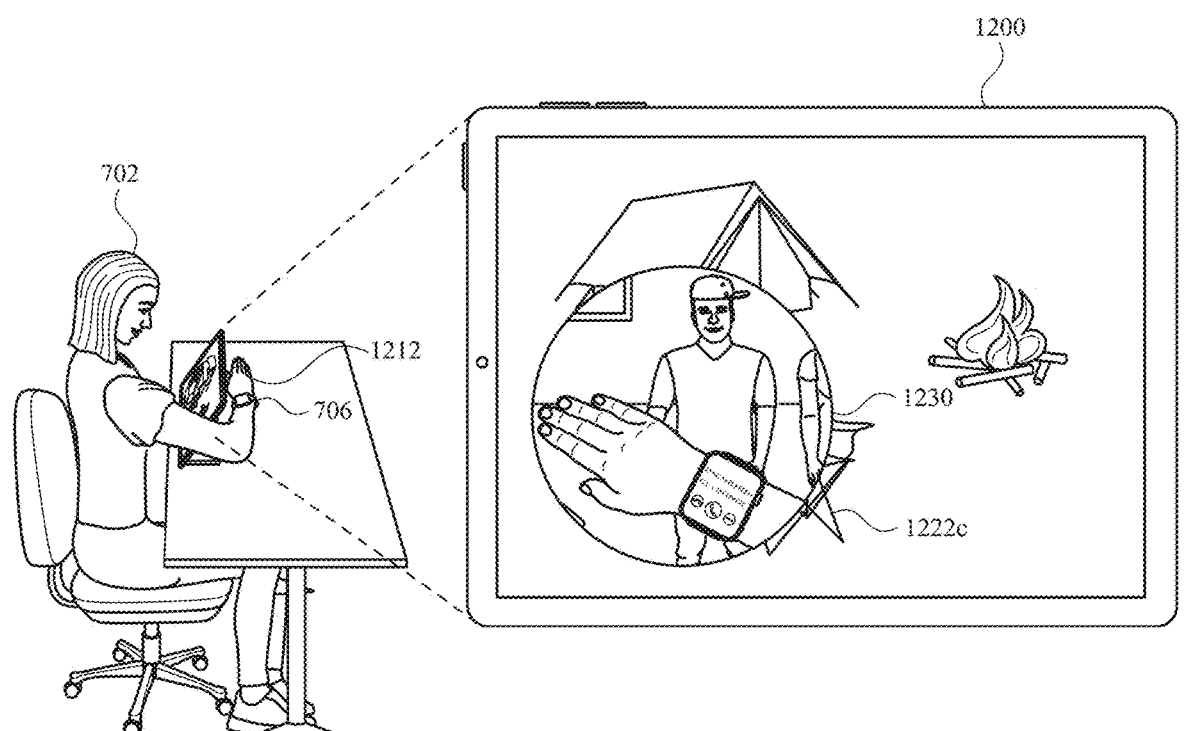
*FIG. 12D*

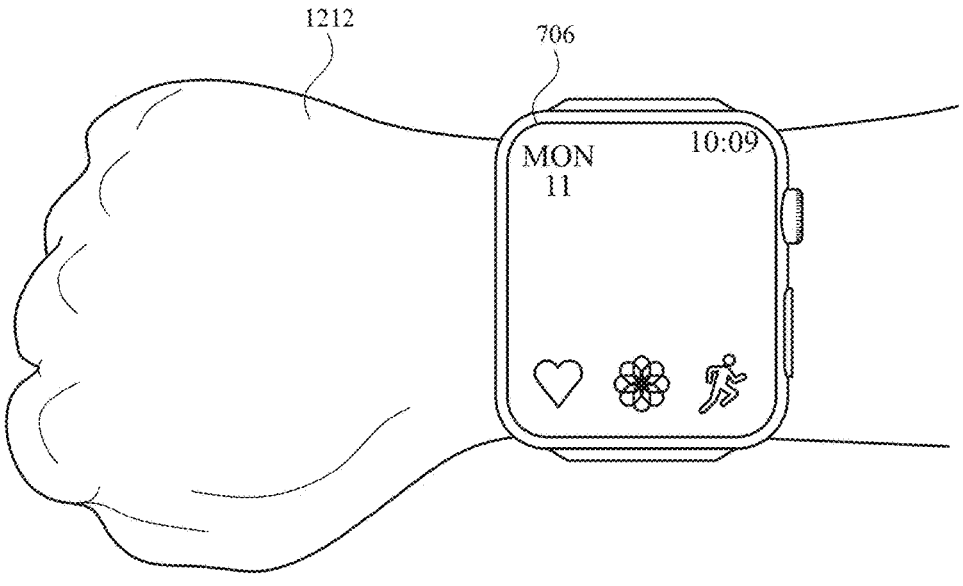
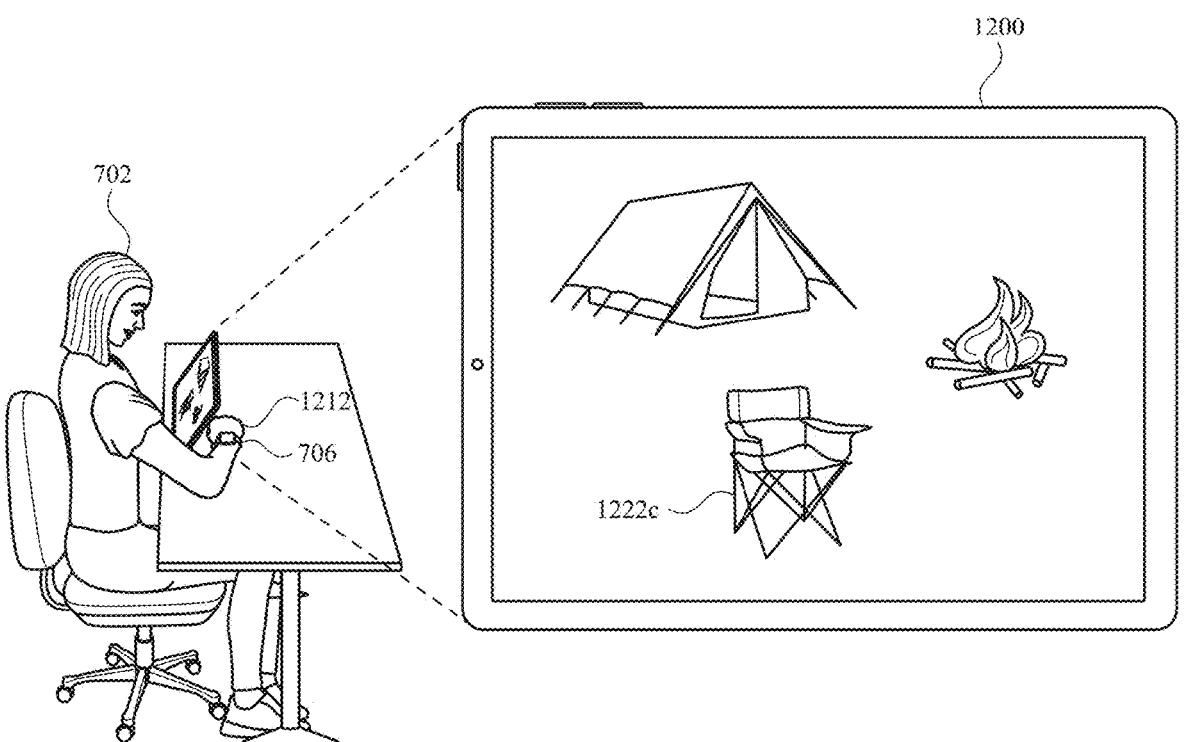
*FIG. 12E*

Figure 13:
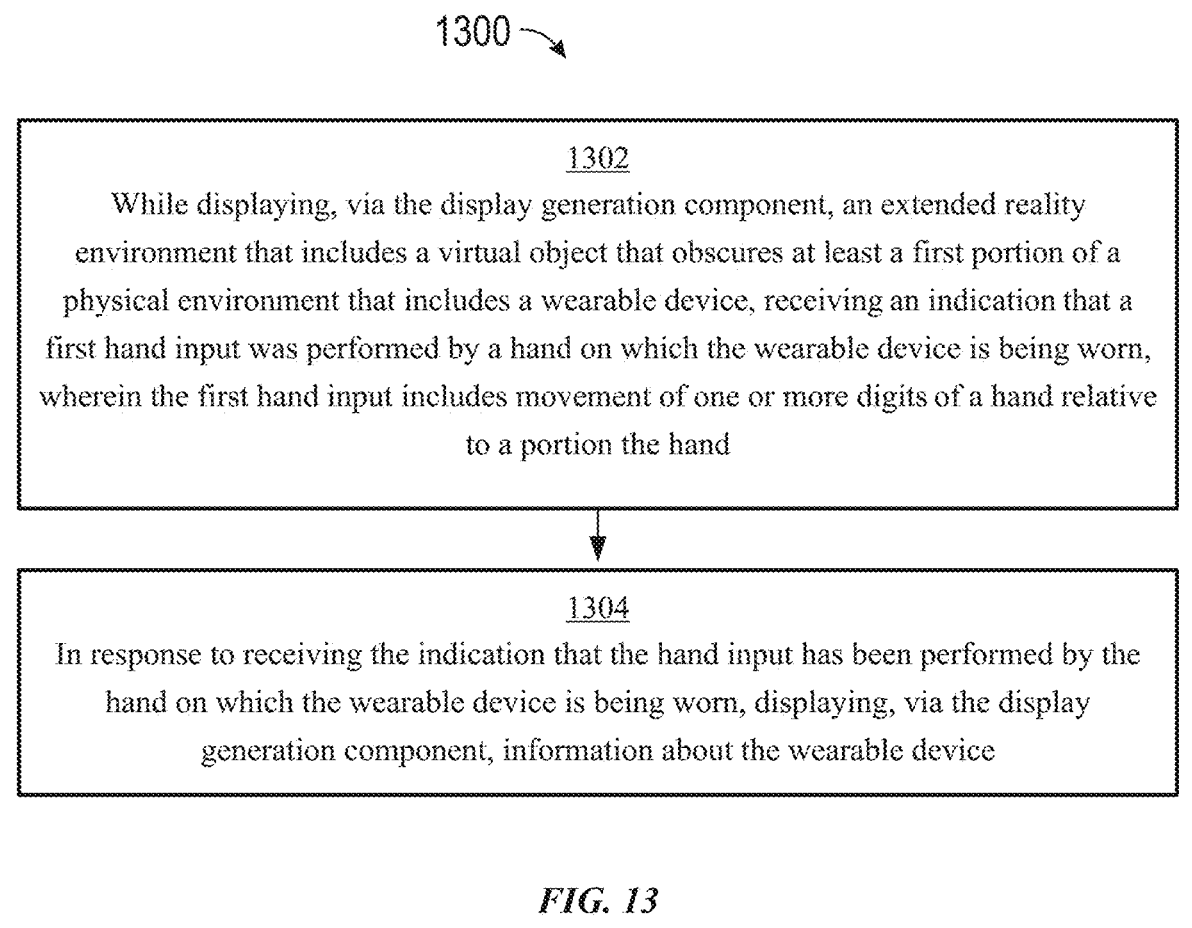

1300 —↘

---

1302

While displaying, via the display generation component, an extended reality environment that includes a virtual object that obscures at least a first portion of a physical environment that includes a wearable device, receiving an indication that a first hand input was performed by a hand on which the wearable device is being worn, wherein the first hand input includes movement of one or more digits of a hand relative to a portion the hand

---

1304

In response to receiving the indication that the hand input has been performed by the hand on which the wearable device is being worn, displaying, via the display generation component, information about the wearable device

1500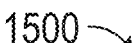

<u>1502</u>
While displaying, via the display generation component, an augmented reality environment user interface, receiving an indication that a first hand input was performed by a first hand of the user <u>1504</u>
In response to receiving the indication that the first hand input was performed by the first hand of the user:

<u>1506</u>
In accordance with a determination that the first hand input was performed while a second hand input was being performed by a second hand of the user, wherein the second hand of the user is different from the first hand, performing a first operation <u>1508</u>
In accordance with a determination that the first hand input was performed while the second hand input was not being performed by the second hand of the user, forgoing performing the first operation

*FIG. 15*

DEVICES, METHODS, AND GRAPHICAL USER INTERFACES FOR INTERACTING WITH VIRTUAL OBJECTS USING HAND GESTURES

CROSS-REFERENCE TO RELATED APPLICATIONS

This application claims priority to U.S. Patent Application No. 63/308,012, filed Feb. 8, 2022, "DEVICES, METH-ODS, AND GRAPHICAL USER INTERFACES FOR INTERACTING WITH VIRTUAL OBJECTS USING HAND GESTURES," the contents of which is hereby incorporated by reference in its entirety for all purposes.

TECHNICAL FIELD

The present disclosure relates generally to computer systems that are in communication with a display generation component and, optionally, a wearable device that provides computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for displaying and interacting with virtual objects using hand gestures are cumbersome, inefficient, and limited. For example, systems that provide insufficient control over virtual objects, systems that require a series of complex inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for displaying and interacting with virtual objects using hand gestures more efficient and intuitive for a user. Such methods and interfaces optionally complement or replace conventional methods for displaying and interacting with virtual objects using hand gestures. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for displaying and interacting with virtual objects using hand gestures. Such methods and interfaces may complement or replace conventional methods for displaying and interacting with virtual objects using hand gestures. Such methods and interfaces reduce the number, extent, and/or the nature of the inputs from a user and produce a more efficient human-machine interface. For battery-operated computing devices, such methods and interfaces conserve power and increase the time between battery charges.

In accordance with some embodiments, a method performed at a computer system that is in communication with a display generation component is described. The method comprises: while a hand-worn device is being worn by a user, displaying, via the display generation component, a respective user interface that includes a first portion of the content and a second portion of the content that is different from the first portion of the content; while displaying the respective user interface that includes the first portion of the content and the second portion of the content, receiving an indication that the hand-worn device detected a hand input including a rotation of a hand; and in response to receiving the indication that the hand-worn device detected the hand input including the rotation of the hand: in accordance with a determination that the hand-worn device detected that the hand is clenched while the hand input was performed, navigating between the first portion of the content and the second portion of the content; and in accordance with a determination that the hand-worn device did not detect that the hand is clenched while the hand input was performed, forgoing navigating between the first portion of the content and the second portion of the content.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while a hand-worn device is being worn by a user, displaying, via the display generation component, a respective user interface that includes a first portion of the content and a second portion of the content that is different from the first portion of the content; while displaying the respective user interface that includes the first portion of the content and the second portion of the content, receiving an indication that the hand-worn device detected a hand input including a rotation of a hand; and in response to receiving the indication that the hand-worn device detected the hand input including the rotation of the hand: in accordance with a determination that the hand-worn device detected that the hand is clenched while the hand input was performed, navigating between the first portion of the content and the second portion of the content; and in accordance with a determination that the hand-worn device did not detect that the hand is clenched while the hand input was performed, forgoing navigating between the first portion of the content and the second portion of the content.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while a hand-worn device is being worn by a user, displaying, via the display generation component, a respective user interface that includes a first portion of the content and a second portion of the content that is different from the first portion of the content; while displaying the respective user interface that includes the first portion of the content and the second portion of the content, receiving an indication that the hand-worn device detected a hand input including a rotation of a hand; and in response to receiving the indication that the hand-worn device detected the hand input including the rotation of the hand: in accordance with a determination that the hand-worn device detected that the hand is clenched while the hand input was performed, navigating between the first portion of the content and the second portion of the content; and in accordance with a determination that the hand-worn device did not detect that the hand is clenched while the hand input was performed, forgoing navigating between the first portion of the content and the second portion of the content.

In accordance with some embodiments, a computer system that is configured to communicate with a display generation component. The computer system comprises: one or more processors; and memory storing one or more programs configured to be executed by the one or more processors, the one or more programs including instructions for: while a hand-worn device is being worn by a user, displaying, via the display generation component, a respective user interface that includes a first portion of the content and a second portion of the content that is different from the first portion of the content; while displaying the respective user interface that includes the first portion of the content and the second portion of the content, receiving an indication that the hand-worn device detected a hand input including a rotation of a hand; and in response to receiving the indication that the hand-worn device detected the hand input including the rotation of the hand: in accordance with a determination that the hand-worn device detected that the hand is clenched while the hand input was performed, navigating between the first portion of the content and the second portion of the content; and in accordance with a determination that the hand-worn device did not detect that the hand is clenched while the hand input was performed, forgoing navigating between the first portion of the content and the second portion of the content.

In accordance with some embodiments, a computer system that is configured to communicate with a display generation component. The computer system comprises: means, while a hand-worn device is being worn by a user, for displaying, via the display generation component, a respective user interface that includes a first portion of the content and a second portion of the content that is different from the first portion of the content; means, while displaying the respective user interface that includes the first portion of the content and the second portion of the content, for receiving an indication that the hand-worn device detected a hand input including a rotation of a hand; and means, responsive to receiving the indication that the hand-worn device detected the hand input including the rotation of the hand, for: in accordance with a determination that the hand-worn device detected that the hand is clenched while the hand input was performed, navigating between the first portion of the content and the second portion of the content; and in accordance with a determination that the hand-worn device did not detect that the hand is clenched while the hand input was performed, forgoing navigating between the first portion of the content and the second portion of the content.

In accordance with some embodiments, a computer program product is described. The computer program product comprises one or more programs configured to be executed by one or more processors of a computer system that is in communication with a display generation component. The one or more programs include instructions for: while a hand-worn device is being worn by a user, displaying, via the display generation component, a respective user interface that includes a first portion of the content and a second portion of the content that is different from the first portion of the content; while displaying the respective user interface that includes the first portion of the content and the second portion of the content, receiving an indication that the hand-worn device detected a hand input including a rotation of a hand; and in response to receiving the indication that the hand-worn device detected the hand input including the rotation of the hand: in accordance with a determination that the hand-worn device detected that the hand is clenched while the hand input was performed, navigating between the first portion of the content and the second portion of the content; and in accordance with a determination that the hand-worn device did not detect that the hand is clenched while the hand input was performed, forgoing navigating between the first portion of the content and the second portion of the content.

In accordance with some embodiments, a method performed at a computer system that is in communication with a display generation component is described. The method comprises: displaying, via the display generation component, a respective user interface, wherein displaying the respective user interface includes concurrently displaying: a first control virtual object that, when activated with a first type of input, causes the computer system to perform a first operation; a second control virtual object that, when activated with the first type of input, causes the computer system to perform a second operation different from the first operation; and a first virtual object indicating that the first control virtual object can be activated in response to a second type of input being performed, wherein the second type of input is not directed to a location in the respective user interface; while displaying the first control virtual object, receiving an indication that a respective input has been performed; and in response to receiving the indication that the respective input has been performed: in accordance with a determination that the respective input is the first type of input directed to the location that corresponds to the first control virtual object, initiating a process for performing the first operation; in accordance with a determination that the respective input is the first type of input directed to a location that corresponds to the second control virtual object, initiating a process for performing the second operation; and in accordance with a determination that the respective input is the second type of input, initiating the process for performing the first operation.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a respective user interface, wherein displaying the respective user interface includes concurrently displaying: a first control virtual object that, when activated with a first type of input, causes the computer system to perform a first operation; a second control virtual object that, when activated with the first type of input, causes the computer system to perform a second operation different from the first operation; and a first virtual object indicating that the first control virtual object can be activated in response to a second type of input being performed, wherein the second type of input is not directed to a location in the respective user interface; while displaying the first control virtual object, receiving an indication that a respective input has been performed; and in response to receiving the indication that the respective input has been performed: in accordance with a determination that the respective input is the first type of input directed to the location that corresponds to the first control virtual object, initiating a process for performing the first operation; in accordance with a determination that the respective input is the first type of input directed to a location that corresponds to the second control virtual object, initiating a process for performing the second operation; and in accordance with a determination that the respective input is the second type of input, initiating the process for performing the first operation.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a respective user interface, wherein displaying the respective user interface includes concurrently displaying: a first control virtual object that, when activated with a first type of input, causes the computer system to perform a first operation; a second control virtual object that, when activated with the first type of input, causes the computer system to perform a second operation different from the first operation; and a first virtual object indicating that the first control virtual object can be activated in response to a second type of input being performed, wherein the second type of input is not directed to a location in the respective user interface; while displaying the first control virtual object, receiving an indication that a respective input has been performed; and in response to receiving the indication that the respective input has been performed: in accordance with a determination that the respective input is the first type of input directed to the location that corresponds to the first control virtual object, initiating a process for performing the first operation; in accordance with a determination that the respective input is the first type of input directed to a location that corresponds to the second control virtual object, initiating a process for performing the second operation; and in accordance with a determination that the respective input is the second type of input, initiating the process for performing the first operation.

In accordance with some embodiments, a computer system that is configured to communicate with a display generation component is described. The computer system comprises: one or more processors; and memory storing one or more programs configured to be executed by the one or more processors, the one or more programs including instructions for: displaying, via the display generation component, a respective user interface, wherein displaying the respective user interface includes concurrently displaying: a first control virtual object that, when activated with a first type of input, causes the computer system to perform a first operation; a second control virtual object that, when activated with the first type of input, causes the computer system to perform a second operation different from the first operation; and a first virtual object indicating that the first control virtual object can be activated in response to a second type of input being performed, wherein the second type of input is not directed to a location in the respective user interface; while displaying the first control virtual object, receiving an indication that a respective input has been performed; and in response to receiving the indication that the respective input has been performed: in accordance with a determination that the respective input is the first type of input directed to the location that corresponds to the first control virtual object, initiating a process for performing the first operation; in accordance with a determination that the respective input is the first type of input directed to a location that corresponds to the second control virtual object, initiating a process for performing the second operation; and in accordance with a determination that the respective input is the second type of input, initiating the process for performing the first operation.

In accordance with some embodiments, a computer system that is configured to communicate with a display generation component is described. The computer system comprises: means for displaying, via the display generation component, a respective user interface, wherein displaying the respective user interface includes concurrently displaying: a first control virtual object that, when activated with a first type of input, causes the computer system to perform a first operation; a second control virtual object that, when activated with the first type of input, causes the computer system to perform a second operation different from the first operation; and a first virtual object indicating that the first control virtual object can be activated in response to a second type of input being performed, wherein the second type of input is not directed to a location in the respective user interface; means, while displaying the first control virtual object, for receiving an indication that a respective input has been performed; and means, responsive to receiving the indication that the respective input has been performed, for: in accordance with a determination that the respective input is the first type of input directed to the location that corresponds to the first control virtual object, initiating a process for performing the first operation; in accordance with a determination that the respective input is the first type of input directed to a location that corresponds to the second control virtual object, initiating a process for performing the second operation; and in accordance with a determination that the respective input is the second type of input, initiating the process for performing the first operation.

In accordance with some embodiments, a computer program product is described. The computer program product comprises one or more programs configured to be executed by one or more processors of a computer system that is in communication with a display generation component. The one or more programs include instructions for: displaying, via the display generation component, a respective user interface, wherein displaying the respective user interface includes concurrently displaying: a first control virtual object that, when activated with a first type of input, causes the computer system to perform a first operation; a second control virtual object that, when activated with the first type of input, causes the computer system to perform a second operation different from the first operation; and a first virtual object indicating that the first control virtual object can be activated in response to a second type of input being performed, wherein the second type of input is not directed to a location in the respective user interface; while displaying the first control virtual object, receiving an indication that a respective input has been performed; and in response to receiving the indication that the respective input has been performed: in accordance with a determination that the respective input is the first type of input directed to the location that corresponds to the first control virtual object, initiating a process for performing the first operation; in accordance with a determination that the respective input is the first type of input directed to a location that corresponds to the second control virtual object, initiating a process for performing the second operation; and in accordance with a determination that the respective input is the second type of input, initiating the process for performing the first operation.

In accordance with some embodiments, a method performed at a computer system that is in communication with a display generation component is described. The method comprises: while displaying, via the display generation component, an extended reality environment that includes a virtual object that obscures at least a first portion of a physical environment that includes a wearable device, receiving an indication that a first hand input was performed by a hand on which the wearable device is being worn, wherein the first hand input includes movement of one or more digits of a hand relative to a portion the hand; and in response to receiving the indication that the hand input has been performed by the hand on which the wearable device is being worn, displaying, via the display generation component, information about the wearable device.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while displaying, via the display generation component, an extended reality environment that includes a virtual object that obscures at least a first portion of a physical environment that includes a wearable device, receiving an indication that a first hand input was performed by a hand on which the wearable device is being worn, wherein the first hand input includes movement of one or more digits of a hand relative to a portion the hand; and in response to receiving the indication that the hand input has been performed by the hand on which the wearable device is being worn, displaying, via the display generation component, information about the wearable device.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while displaying, via the display generation component, an extended reality environment that includes a virtual object that obscures at least a first portion of a physical environment that includes a wearable device, receiving an indication that a first hand input was performed by a hand on which the wearable device is being worn, wherein the first hand input includes movement of one or more digits of a hand relative to a portion the hand; and in response to receiving the indication that the hand input has been performed by the hand on which the wearable device is being worn, displaying, via the display generation component, information about the wearable device.

In accordance with some embodiments, a computer system that is configured to communicate with a display generation component is described. The computer system comprises: one or more processors; and memory storing one or more programs configured to be executed by the one or more processors, the one or more programs including instructions for: while displaying, via the display generation component, an extended reality environment that includes a virtual object that obscures at least a first portion of a physical environment that includes a wearable device, receiving an indication that a first hand input was performed by a hand on which the wearable device is being worn, wherein the first hand input includes movement of one or more digits of a hand relative to a portion the hand; and in response to receiving the indication that the hand input has been performed by the hand on which the wearable device is being worn, displaying, via the display generation component, information about the wearable device.

In accordance with some embodiments, a computer system that is configured to communicate with a display generation component is described. The computer system comprises: means, while displaying, via the display generation component, an extended reality environment that includes a virtual object that obscures at least a first portion of a physical environment that includes a wearable device, for receiving an indication that a first hand input was performed by a hand on which the wearable device is being worn, wherein the first hand input includes movement of one or more digits of a hand relative to a portion the hand; and means, responsive to receiving the indication that the hand input has been performed by the hand on which the wearable device is being worn, for displaying, via the display generation component, information about the wearable device.

In accordance with some embodiments, a computer program product is described. The computer program product comprises one or more programs configured to be executed by one or more processors of a computer system that is in communication with a display generation component. The one or more programs include instructions for: while displaying, via the display generation component, an extended reality environment that includes a virtual object that obscures at least a first portion of a physical environment that includes a wearable device, receiving an indication that a first hand input was performed by a hand on which the wearable device is being worn, wherein the first hand input includes movement of one or more digits of a hand relative to a portion the hand; and in response to receiving the indication that the hand input has been performed by the hand on which the wearable device is being worn, displaying, via the display generation component, information about the wearable device.

In accordance with some embodiments, a method performed at a computer system that is in communication with a display generation component and a wearable device is described. The method comprises: while displaying, via the display generation component, an augmented reality environment user interface, receiving an indication that a first hand input was performed by a first hand of the user; and in response to receiving the indication that the first hand input was performed by the first hand of the user: in accordance with a determination that the first hand input was performed while a second hand input was being performed by a second hand of the user, wherein the second hand of the user is different from the first hand, performing a first operation; and in accordance with a determination that the first hand input was performed while the second hand input was not being performed by the second hand of the user, forgoing performing the first operation.

In accordance with some embodiments, a non-transitory computer-readable storage medium is described. The non-transitory computer-readable storage medium stores one or more programs configured to be executed by one or more processors of a computer system that is in communication with a display generation component and a wearable device, the one or more programs including instructions for: while displaying, via the display generation component, an augmented reality environment user interface, receiving an indication that a first hand input was performed by a first hand of the user; and in response to receiving the indication that the first hand input was performed by the first hand of the user: in accordance with a determination that the first hand input was performed while a second hand input was being performed by a second hand of the user, wherein the second hand of the user is different from the first hand, performing a first operation; and in accordance with a determination that the first hand input was performed while the second hand input was not being performed by the second hand of the user, forgoing performing the first operation.

In accordance with some embodiments, a transitory computer-readable storage medium is described. The transitory computer-readable storage medium stores one or more programs configured to be executed by one or more processors of a computer system that is in communication with a display generation component and a wearable device, the one or more programs including instructions for: while displaying, via the display generation component, an augmented reality environment user interface, receiving an indication that a first hand input was performed by a first hand of the user; and in response to receiving the indication that the first hand input was performed by the first hand of the user: in accordance with a determination that the first hand input was performed while a second hand input was being performed by a second hand of the user, wherein the second hand of the user is different from the first hand, performing a first operation; and in accordance with a determination that the first hand input was performed while the second hand input was not being performed by the second hand of the user, forgoing performing the first operation.

In accordance with some embodiments, a computer system that is configured to communicate with a display generation component and a wearable device is described. The computer system comprises: one or more processors; and memory storing one or more programs configured to be executed by the one or more processors, the one or more programs including instructions for: while displaying, via the display generation component, an augmented reality environment user interface, receiving an indication that a first hand input was performed by a first hand of the user; and in response to receiving the indication that the first hand input was performed by the first hand of the user: in accordance with a determination that the first hand input was performed while a second hand input was being performed by a second hand of the user, wherein the second hand of the user is different from the first hand, performing a first operation; and in accordance with a determination that the first hand input was performed while the second hand input was not being performed by the second hand of the user, forgoing performing the first operation.

In accordance with some embodiments, a computer system that is configured to communicate with a display generation component and a wearable device is described. The computer system comprises: means, while displaying, via the display generation component, an augmented reality environment user interface, for receiving an indication that a first hand input was performed by a first hand of the user; and means, responsive to receiving the indication that the first hand input was performed by the first hand of the user, for: in accordance with a determination that the first hand input was performed while a second hand input was being performed by a second hand of the user, wherein the second hand of the user is different from the first hand, performing a first operation; and in accordance with a determination that the first hand input was performed while the second hand input was not being performed by the second hand of the user, forgoing performing the first operation.

In accordance with some embodiments, a computer program product is described. The computer program product comprises one or more programs configured to be executed by one or more processors of a computer system that is in communication with a display generation component and a wearable device. The one or more programs include instructions for: while displaying, via the display generation component, an augmented reality environment user interface, receiving an indication that a first hand input was performed by a first hand of the user; and in response to receiving the indication that the first hand input was performed by the first hand of the user: in accordance with a determination that the first hand input was performed while a second hand input was being performed by a second hand of the user, wherein the second hand of the user is different from the first hand, performing a first operation; and in accordance with a determination that the first hand input was performed while the second hand input was not being performed by the second hand of the user, forgoing performing the first operation.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIGS. 7A-7F illustrate example techniques for navigating content using hand gestures, in accordance with some embodiments.

FIGS. 8A-8H illustrate example techniques for using hand gestures to perform various operations, in accordance with some embodiments.

FIG. 9 is a flow diagram of methods of navigating content using hand gestures, in accordance with various embodiments.

FIGS. 11A-11B are flow diagrams of methods of activating virtual objects, in accordance with various embodiments.

FIGS. 12A-12E illustrate example techniques for displaying information, in accordance with some embodiments.

FIG. 13 is a flow diagram of methods of displaying objects, in accordance with various embodiments.

FIG. 15 is a flow diagram of methods of manipulating the display of virtual objects, in accordance with some embodiments.

DESCRIPTION OF EMBODIMENTS

Figure 1:
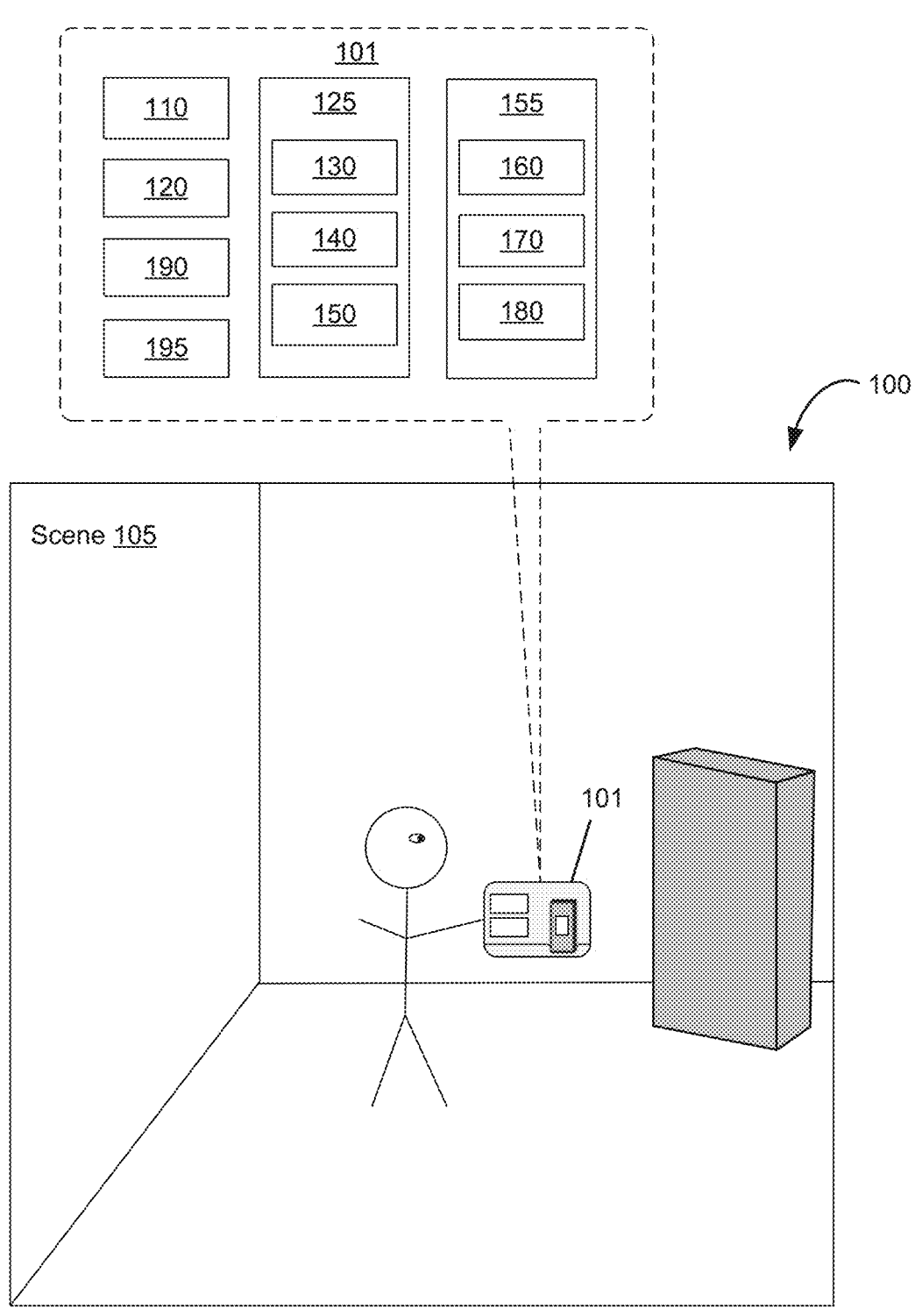
FIG. 1 is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

FIGS. 1-6 provide a description of example computer systems for providing XR experiences to users. FIGS. 7A-7F illustrate example techniques for navigating content using hand gestures, in accordance with some embodiments. FIGS. 8A-8H illustrate example techniques for using hand gestures to perform various operations. FIG. 9 is a flow diagram of methods of navigating content using hand gestures, in accordance with various embodiments. The user interfaces in FIGS. 7A-7F and FIGS. 8A-8H are used to illustrate the processes in FIG. 9. FIGS. 10A-10I illustrate example techniques for activating virtual objects, in accordance with some embodiments. FIGS. 11A-11B are flow diagrams of methods of activating virtual objects, in accordance with various embodiments. The user interfaces in FIGS. 10A-10I are used to illustrate the processes in FIGS. 11A-11B. FIGS. 12A-12E illustrate example techniques for displaying information, in accordance with some embodiments. FIG. 13 is a flow diagram of methods of displaying information, in accordance with various embodiments. The user interfaces in FIGS. 12A-12E are used to illustrate the processes in FIG. 13. FIGS. 14A-14G illustrate example techniques for manipulating the display of virtual objects, in accordance with some embodiments. FIG. 15 is a flow diagram of methods of manipulating the display of virtual objects. The user interfaces in FIGS. 14A-14G are used to illustrate the processes in FIG. 15.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display.

Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
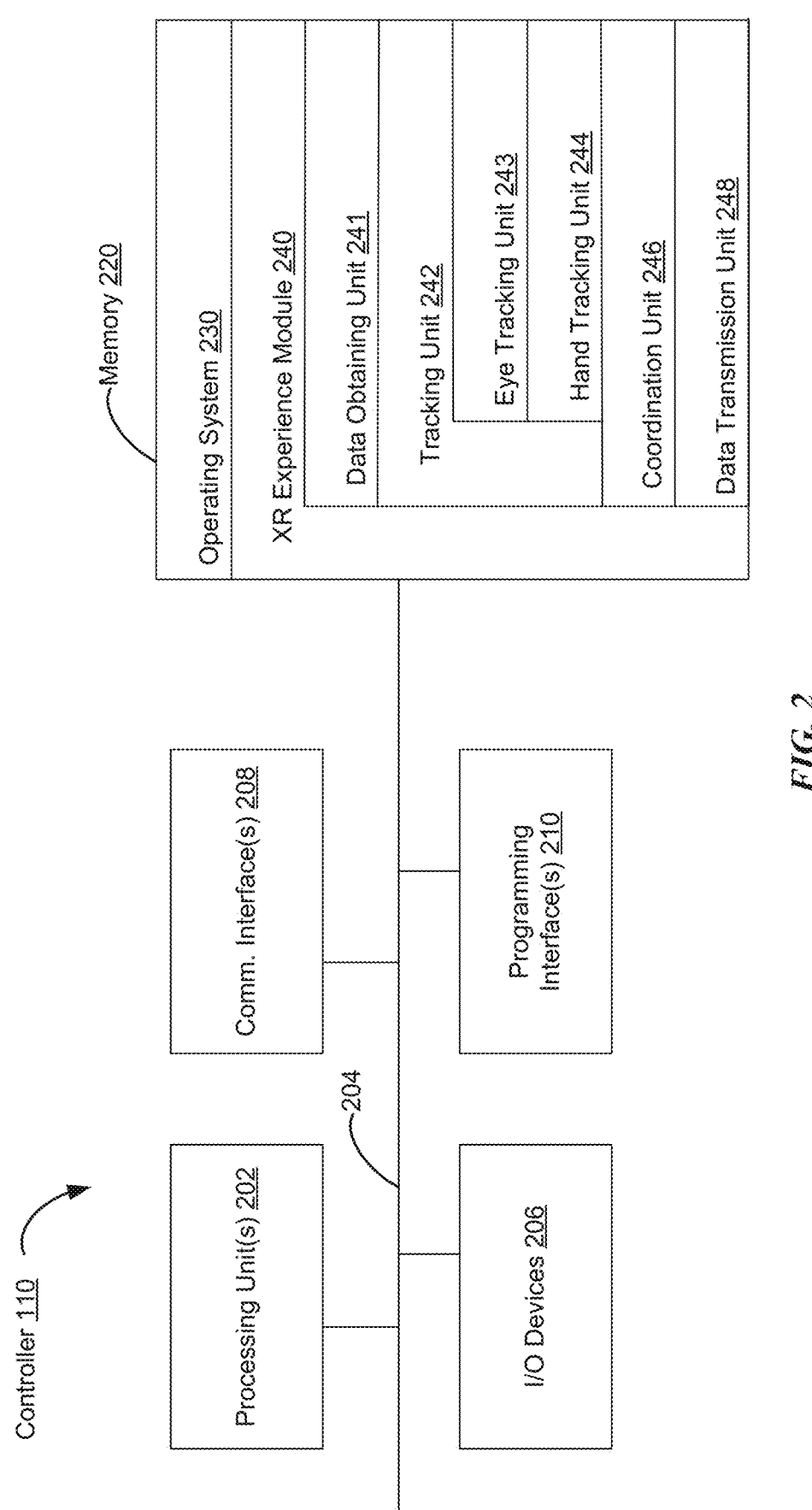
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
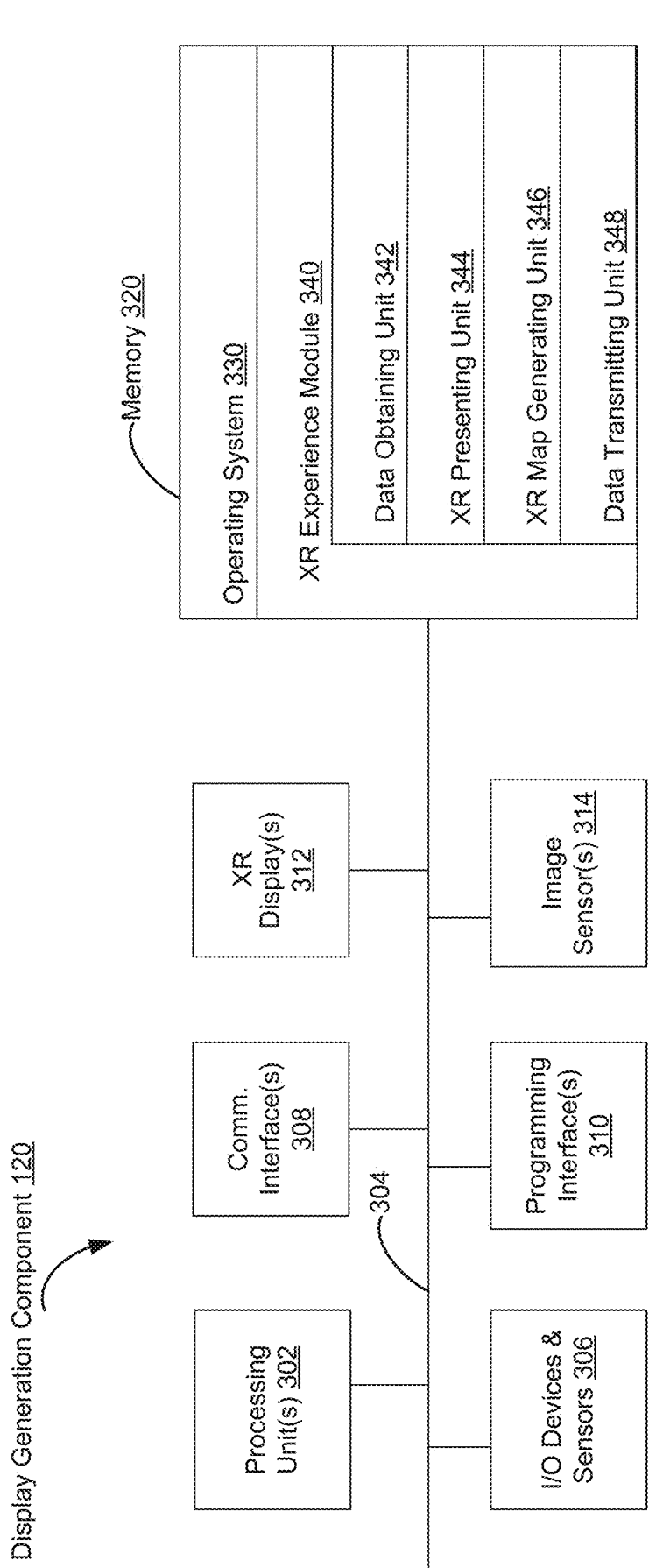
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation compo-nent 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
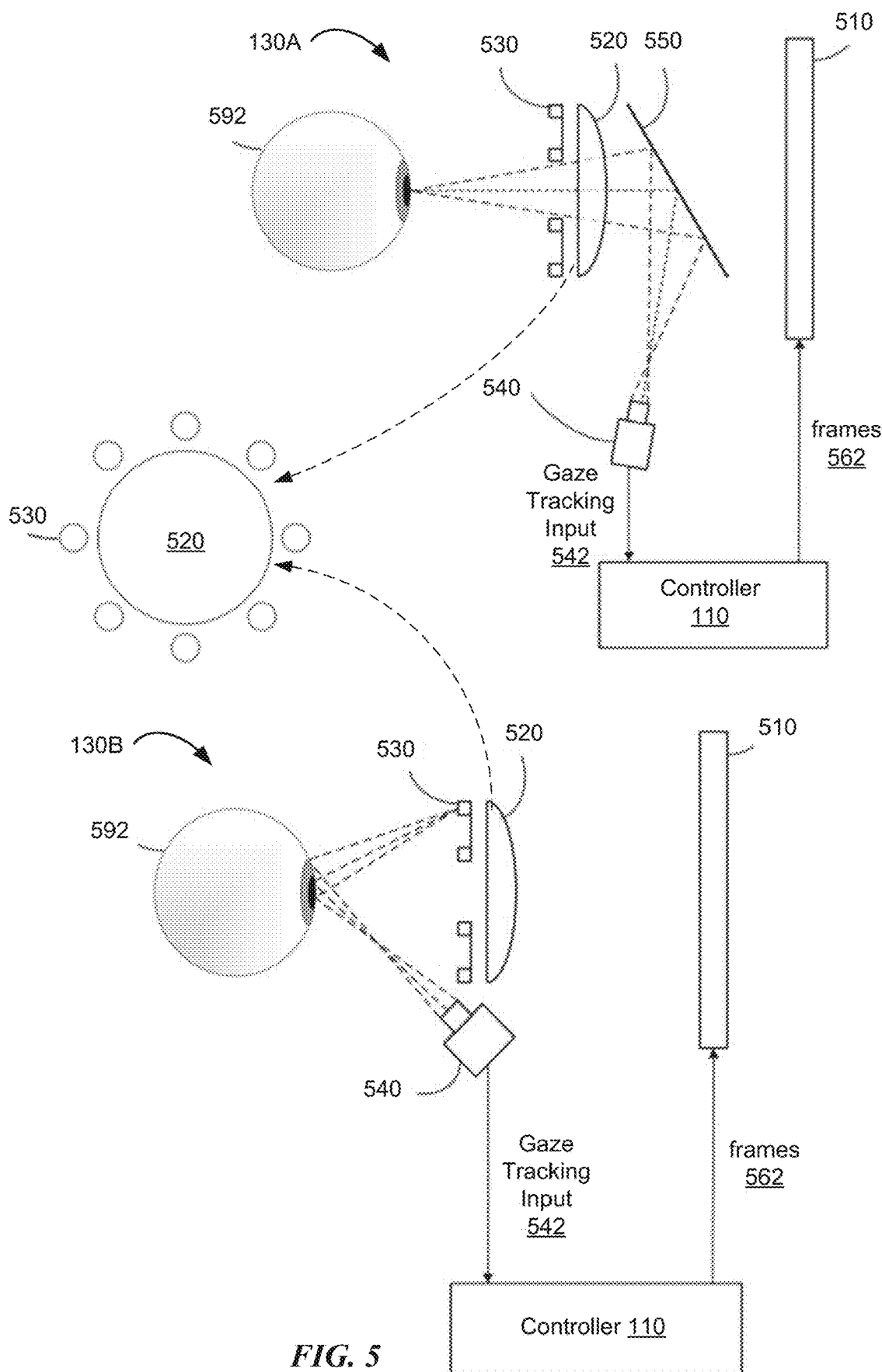
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
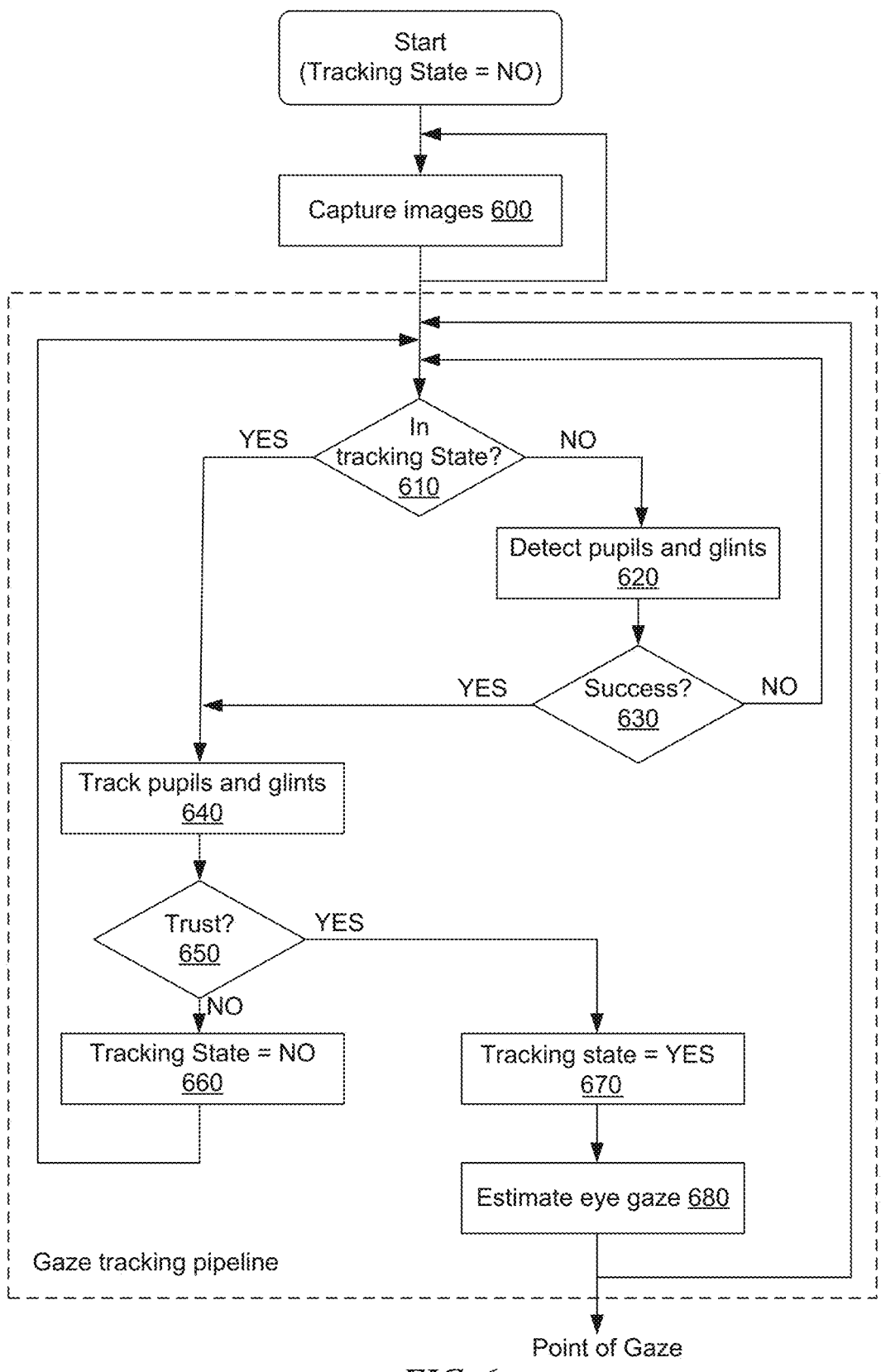
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, and (optionally) a wearable device.

FIGS. 7A-7F illustrate examples of navigating content using hand gestures. FIG. 9 is a flow diagram of an exemplary method 900 for navigating content using hand gestures. The user interfaces in FIGS. 7A-7F are used to illustrate the processes described below, including the processes in FIG. 9.

FIG. 7A illustrates user 702 wearing wearable device 706. Wearable device 706 is on the right hand of user 702. Wearable device 706 includes one or more sensors (e.g., one or more heart rate sensors, accelerometers and/or gyroscopes) that detect the movement (e.g., rotation and/or lateral movement), orientation, gestures, and positioning of the right hand of user 702. As illustrated in FIG. 7A, the right hand of user 702 is in a neutral position (e.g., the right hand of user 702 is not rotated) and is unclenched. Wearable device 706 is a smartwatch in FIG. 7A. However, in some embodiments, wearable device 706 is another device that is capable of being worn and tracking hand movement, such as a camera. In some embodiments, computer system 704 includes one or more components of computer system 101.

As illustrated in FIG. 7A, user 702 is standing in front of computer system 700. Computer system 700 includes display 718 and is in communication (e.g., wired communication and/or wireless communication) with computer system 704. Computer system 704 transmits instructions to computer system 700 to display user interface 710. In response to computer system 700 receiving the instructions from computer system 704, computer system 700 displays user interface 710. In some embodiments, computer system 700 is not in communication with computer system 704. In some embodiments, computer system 700 is a standalone system and displays user interface 710 via a processor that is integrated into computer system 700. In some embodiments, user interface 710 is a media user interface (e.g., a user interface for displaying video, audio data (e.g., music), and/or photo data) (e.g., a user interface for controlling the playback of video data and/or audio data). In some embodiments, user interface 710 is an augmented reality user interface that computer system 700 displays as a part of XR environment. In some embodiments, computer system 700 displays user interface 710 from an immersive perspective. In some embodiments, computer system 700 presents the content included in user interface 710 from a plurality of perspectives in response to detected changes in the orientation/location of computer system 700. In some embodiments, computer system 700 updates the content of user interface 710 based on the positioning and/or orientation of computer system 700 (e.g., computer system 700 displays additional content within and/or removes content from user interface 710 in response to computer system 700 being moved in a particular direction). In some embodiments, computer system 700 displays user interface 710 in response to receiving an indication (e.g., via computer system 704) that wearable device 706 has detected that the right hand of user 702 is clenched. In some embodiments, computer system 704 includes one or more components of computer system 101. In some embodiments, computer system 700 includes one or more components of computer system 101. In some embodiments, a hand gesture is an air gesture (e.g., as discussed above in relation to the description of input gestures). In some embodiments, a hand gesture is a hand input (e.g., air tap, air swipe, air pinch, and/or air de-pinch).

Wearable device 706 is in communication (e.g., wired and/or wireless communication) with computer system 704. Wearable device 706 transmits positioning and/or movement data regarding the right hand of user 702 to computer system 704. Computer system 704 transmits display instructions to computer system 700 based on the received positioning and/or movement data of the right hand of user 702. Accordingly, computer system 700 displays changes as wearable device 706 detects changes in the positioning and/or movement of the right hand of user 702. The above description of how computer system 702, computer system 704, and wearable device 706 communicate is optional other ways of communicating between computer system 702, computer system 704, and wearable device 706 can be contemplated. In some embodiments, wearable device 706 is in communication (e.g., direct and/or indirect communication) (e.g., wireless communication and/or wired communication) (e.g., Bluetooth communication, ultrawide band communication, and/or near field communication) with computer system 700 (e.g., computer system 704 does not act as an intermediary between wearable device 706 and computer system 700). In some embodiments, wearable device 706 transmits display instructions to computer system 700 based on the positioning and/or movement of the right hand of user 702. In some embodiments, wearable device 706 transmits positioning and/or movement data regarding the right hand of user 702 to computer system 700. As illustrated in FIG. 7A, computer system 700 is a television or large display device. In some embodiments, computer system 700 is one or more other devices, such as a handheld device (a smart phone) and/or an HMD. In embodiments where computer system 700 is an HMD device, user interface 710 is displayed within in an XR environment.

As illustrated in FIG. 7A, user interface 710 includes virtual objects 714a-714g, selection indicator virtual object 720, and hand indicator virtual object 736. As illustrated in FIG. 7A virtual objects 714a-714g are avatars, where each of the avatars represent a different individual. Virtual objects 714a-174g are selectable (e.g., selectable via an input that is performed by user 702). As illustrated in FIG. 7A, computer system 700 displays selection indicator virtual object 720 around virtual object 714d, which indicates that virtual object 714d is in focus. Notably, virtual objects 714a-714c and 714e-714g are not in focus (e.g., no selection indicator virtual object is displayed around virtual objects 714a-714c and 714e-714g). Because virtual object 714d is in focus, computer system 700 is configured to perform an operation with respect to virtual object 714d. However, computer system 700 is not configured to perform an operation with respect to virtual objects 714a-714c and 714e-714g because virtual objects 714a-714c and 714e-714g are not in focus. As illustrated in FIG. 7A, computer system 700 displays a representation of the individual that is represented by virtual object 714d within central display region 722. Hand indicator virtual object 736 indicates the state of the hand of user 702, as detected by wearable device 706. The state of the hand of user 702 includes one or more of the positions (e.g., whether the hand of the user is clenched and/or unclenched) and/or the displacement (e.g., rotation and/or lateral displacement) of the hand of user 702. At FIG. 7A, wearable device 706 detects the right hand of user 702 as being unclenched. In response to receiving an indication that the hand of user 702 is unclenched, computer system 700 displays hand indicator virtual object 736 as representative of an unclenched hand. At FIG. 7A, wearable device 706 detects that the right hand of user 702 is rotating in the clockwise direction while it is in an unclenched position.

At FIG. 7B, in response receiving an indication (e.g., via computer system 704) that the hand of user 702 is rotating (and/or was rotated) in the clockwise direction while the right hand of user 702 is unclenched, computer system 700 maintains display of selection indicator virtual object 720 around virtual object 714*d* (e.g., virtual object 714*d* remains in focus). Because wearable device 706 does not detect that the right hand of user 702 hand is clenched while wearable device 706 detects the rotation of the right hand of user 702, computer system 700 does not navigate the display of virtual objects 714*a*-714*g*. As illustrated in FIG. 7C, the right hand of user 702 is in the neutral position (e.g., the right hand of user 702 is not rotated) and is in the clenched position. In response to receiving an indication (e.g., via computer system 704) that the right hand of user 702 is clenched, computer system 700 displays hand indicator virtual object 736 as representative of a clenched hand. In some embodiments, computer system 700 animates hand indicator virtual object 736 in loop (e.g., such as how some Graphics Interchange Formats (e.g., GIFS) are displayed). In some embodiments, the animation of hand indicator virtual object 736 includes displaying an animation that loops between a clenched hand position and an unclenched hand position. In some embodiments, a looping animation is displayed with a first visual appearance (e.g., a graphical representation of a clenched hand) for a predetermined amount of time (e.g., 0.1 seconds, 0.3 seconds 0.5 seconds, 1 second, 3 seconds) and after the predetermined amount of time has elapsed, the looping animation is displayed with a second visual appearance (e.g., a graphical representation of an unclenched hand) for the predetermined amount of time before being displayed with the first visual appearance again. In some embodiments, the animation of hand indicator virtual object 736 includes displaying a hand (or another object) rotating (e.g., in either the clockwise or counter-clockwise direction) and/or moving. In some embodiments, the hand (or other object) rotates and/or moves based on an amount of rotation and/or movement of wearable device 706. At FIG. 7C, wearable device 706 detects that the right hand of user 702 is clenched in the neutral position and beginning to rotate in the clockwise direction.

At FIG. 7D, in response to receiving an indication (e.g., via computer system 704) that the hand of user 702 is clenched and is rotating in the clockwise direction, computer system 700 moves virtual objects 714*a*-714*g* in the counter-clockwise direction and navigates from virtual object 714*d* to virtual object 714*e*. By navigating from virtual object 714*d* to virtual object 714*e*, computer system 700 displays selection indicator virtual object 720 around virtual object 714*e* instead of virtual object 714*d* to indicate that virtual object 714*e* is in focus and virtual object 714*d* is out of focus. As illustrated in FIG. 7D, when computer system 700 navigates from virtual object 714*d* to virtual object 714*e*, computer system 700 moves virtual objects 714*b*-714*g* to positions that are counter-clockwise to the positions at which virtual objects 714*b*-714*g* are displayed in FIG. 7C. At FIG. 7D, computer system 700 ceases to display virtual object 714*a* of FIG. 7C (e.g., because of the number of limited positions at which computer system 700 has designated to display virtual objects 714*a*-714*g*). In some embodiments, computer system 700 moves the virtual objects in a first direction for as long as wearable device 706 detects that the right hand of user 702 is clenched and rotated in a second direction (and/or the first direction). In some embodiments, in response to receiving an indication that wearable device 706 detects that the hand of user 702 has rotated in the counter-clockwise direction, computer system 700 displays the navigation between the displayed virtual objects in the clockwise direction (e.g., computer system 700 displays the navigation from virtual object 714*d* to virtual object 714*c*). In some embodiments, in response to receiving an indication (e.g., via computer system 704) that the wearable device 706 detects that the right hand of user 702 is rotated in the clockwise direction while wearable device detects that the right hand of user 702 is clenched, computer system 700 moves the display of selection indicator virtual object 720 from a respective virtual object to a different respective virtual object based on the amount of rotation that wearable device 706 detects (e.g., the greater that amount of rotation that wearable device 706 detects, the greater the distance computer system 700 moves selection indicator virtual object 720) (e.g., and computer system 700 does not move the display of any of virtual object 714*a*, virtual object 714*b*, virtual object 714*c*, virtual object 714*d*, virtual object 714*e*, virtual object 714*f*, and/or virtual object 714*g*). In some embodiments, while computer system 700 moves the display of one or more of the virtual objects, computer system 700 displays an indication of an unclench gesture (e.g., a graphical representation of a hand performing an unclench gesture) to indicate that computer system 700 is configured to perform a respective operation corresponding to the virtual object that is in focus in response to receiving an indication that wearable device 706 has detected an unclench gesture. In some embodiments, the indication of the unclench gesture is a graphical representation of a hand that animates (e.g., loops) between a clenched hand position and an unclenched hand position. In some embodiments, computer system 700 scrolls in a first direction between virtual objects in response to receiving an indication (e.g., via computer system 704) that wearable device 706 has detected that the hand of user 702 is clenched and rotated along one or more Cartesian axes (e.g., the hand of user 702 rolls, pitches, and/or yaws) in a first direction and computer system 700 scrolls in a second direction (e.g., that is opposite of the first direction) in response to receiving an indication that wearable device 706 has detected that the hand of user 702 is clenched and rotated along one or more Cartesian Axes in a second direction that is opposite the first direction.

As illustrated in FIG. 7D, in response to receiving an indication that wearable device 706 has detected that the hand of user 702 is clenched and has rotated in the clockwise direction, computer system 700 displays rotation indicator virtual object 724. Rotation indicator virtual object 724 indicates an amount of rotation that wearable device 706 has detected. Rotation indicator virtual object 724 includes a radial line and a circle. The positioning of the radial line within the circle indicates an amount of rotation that wearable device 706 has detected. As the amount of rotation detected by wearable device 706 increases, the further computer system 700 displays the radial line from the twelve o'clock position of the circle (e.g., where the twelve o'clock position of the circle is the top of the circle). Additionally, the position of the radial line that is included in rotation indicator virtual object 724 indicates the direction of the rotation detected by wearable device 706. That is, when wearable device 706 detects that the right hand of user 702 is rotated in the clockwise direction, the radial line will be to the right of the twelve o'clock position of the circle (e.g., the top of the circle) and when wearable device 706 detects that the right hand of user 702 is rotated in the counterclockwise direction, the radial line will be to the left of the twelve o'clock position of the circle (e.g., the top of the circle). In some embodiments, computer system 700 concurrently displays rotation indicator virtual object 724 and hand indicator virtual object 736.

As illustrated in FIG. 7D, computer system 700 displays selection indicator virtual object 720 around virtual object 714*e*, which indicates that computer system 700 is configured to perform an operation that corresponds to virtual object 714*e* (e.g., in response to receiving an indication that one or more inputs have been performed). As illustrated in FIG. 7D, computer system 700 displays a representation of the individual that is represented by virtual object 714*e* within central display region 722 because virtual object 714*e* is in focus. At FIG. 7D, wearable device 706 detects that the right hand of user 702 is clenched and rotating further in the clockwise direction.

At FIG. 7E, in response to receiving an indication (via computer system 704) that that wearable device 706 has detected that the right hand of user 702 is clenched and rotating further in the clockwise direction, computer system 700 moves the virtual objects in the counter-clockwise direction and displays the navigation from virtual object 714*e* to virtual object 714*g*. At FIG. 7E, wearable device 706 detects that the right hand of user 702 is rotated at a greater degree of rotation than the hand of user 702 was rotated at FIG. 7D. In response to receiving an indication that the hand of user 702 is being rotated at a greater degree of rotation than the hand of user 702 at FIG. 7D, computer system 700 navigates between the virtual objects at a faster rate (e.g., computer system 700 navigates to the virtual object (e.g., virtual object 714*g*) that is one virtual object removed from virtual object 714*e* instead of navigating to the virtual object (e.g., virtual object 714*f*) that is directly next to virtual object 714*e*). Because computer system 700 navigated from virtual object 714*e* to virtual object 714*g*, computer system 700 displays virtual objects 714*d*-714*g* to the left of where computer system 700 displays virtual object 714*d*, virtual object 714*e*, virtual object 714*f*, and virtual object 714*g* at FIG. 7D. In some embodiments, computer system 700 is in communication with an external device (e.g., computer monitor, smartphone, and/or smart watch) that displays a virtual object. In some embodiments, computer system 700 transmits instructions to the external device to adjust the display of the virtual object based on at least the amount of rotation that wearable device 706 detects (e.g., the external device increases the size of the virtual object as wearable device 706 detects a greater amount of rotation by the right hand of user 702). In some embodiments, computer system 700 is in communication (e.g., wireless communication and/or wired communication) with one or more sensors that can detect hand motion. In some embodiments the right hand of user 702 is outside of the detectability range of the one or more sensors while the right hand of user 702 is clenched and rotated. In some embodiments, computer system 700 displays a user interface for controlling the playback of a media item. In some embodiments, user 702 may perform a discrete gesture (e.g., a clench and roll) to modify the playback status of the media item (e.g., pause the playback of the media item, initiate playback of the media item).

As explained above, as the amount of rotation detected by wearable device 706 increases, the further computer system 700 displays the radial line of rotation indicator virtual object 724 from the twelve o'clock position of the circle (e.g., where the twelve o'clock position of the circle is the top of the circle of rotation indicator virtual object 724). At FIG. 7E, because wearable device 706 detects that the right hand of user 702 is rotated at a greater degree of rotation, computer system 700 displays the radial line included in rotation indicator virtual object 724 as further removed from the 12 o'clock position (e.g., the top of the circle) of the circle that is included in rotation indicator virtual object 724 as compared to the position of the radial line in FIG. 7D. At FIG. 7E, wearable device 706 detects that the right hand of user 702 performs an unclench gesture.

At FIG. 7F, in response to receiving an indication (e.g., via computer system 704) that wearable device 706 has detected that the right hand of user 702 has performed an unclench gesture, computer system 700 performs an operation associated with virtual object 714*g*, which includes ceasing to navigating between the display virtual objects, ceasing to display the other virtual objects, and showing virtual object 714*g* as being selected. At FIG. 7F, computer system 700 displays virtual object 714*g* as being selected because virtual object 714*g* was in focus at the time that computer system 700 received the indication that the hand of user 702 performed an unclench gesture. As illustrated in FIG. 7F, in response to receiving an indication that the hand of user 702 performed an unclench gesture, computer system 700 displays hand indicator virtual object 736 that is representative of an unclenched hand. In some embodiments, computer system 700 performs one or more other operations using one or more techniques discussed above in relation to FIGS. 7A-7F. In some embodiments, computer system 700 displays a communication user interface. In some embodiments, in response to wearable device 706 (and/or computer system 700 or computer system 704) detecting a request to connect to a third-party device, computer system 700 displays an indication that the connection has been accepted (e.g., the phone call is answered) and/or wearable device 706 answers the phone call. In some embodiments, the request to connect to the third party device is detected based on a clench gesture being detected by wearable device 706. In addition, various descriptions of FIGS. 7A-7F have been described to state that computer system 700 receives an indication from wearable device 706. It should be understood (e.g., as alluded to in the description of FIG. 7A above) that computer system 704 can receive the indication from wearable device 706 and cause computer system 700 to perform one or more actions (e.g., one or more actions that computer system 700 performed, as described above in relation to FIGS. 7A-7F) in response to receiving the one or more indications from wearable device 706.

Additional descriptions regarding FIGS. 7A-7F are provided below in reference to method 900 described with respect to FIGS. 7A-7F.

FIGS. 8A-8H illustrate exemplary user interfaces for using hand gestures to perform various operations, in some embodiments. The user interfaces in FIGS. 8A-8H are used to illustrate the processes described below, including the processes in FIGS. 9 and 11.

FIGS. 8A-8C illustrate an exemplary scenario where one or more operations are performed after a hand input (e.g., and/or air gesture) is detected by wearable device 706. As illustrated in FIG. 8A, computer system 700 displays alarm notification 804. Alarm notification 804 includes snooze control virtual object 806 and stop control virtual object 808. At FIG. 8A, wearable device 706 detects that the right hand of user 702 is clenched.

At FIG. 8B, in response to receiving an indication (e.g., via computer system 704) that wearable device 706 has detected that the right hand of user 702 is clenched, computer system 700 moves the display of snooze control virtual object 806 to the right and displays leftward facing arrow 822 to the left of snooze control virtual object 806. Leftward facing arrow 822 indicates that snooze control virtual object 806 will be activated by sliding snooze control virtual object 806 to the left. Further, in response to receiving the indication that wearable device 706 has detected that the right hand of user 702 is clenched, computer system 700 moves the display of stop control virtual object 808 to the left and computer system 700 displays rightward facing arrow 824 to the right of stop control virtual object 808. Rightward facing arrow 824 indicates that stop control virtual object 808 will be activated by sliding stop control virtual object 808 to the right. At FIG. 8B, wearable device 706 detects that the right hand of user 702 is being tilted downwards.

At FIG. 8C, in response to receiving an indication that wearable device 706 has detected that the right hand of user 702 is tilted downwards, computer system 700 slides snooze control virtual object 806 to the left. By sliding snooze control virtual object 806 to the left, computer system 700 indicates that snooze control virtual object 806 is being activated. In some embodiments, wearable device 706 activates the control and/or performs a function that is associated with snooze control virtual object 806. In some embodiments, computer system 700 and/or computer system 704 performs the function that is associated with snooze control virtual object 806. In some embodiments, the function performed is to initiate a snooze function to temporarily snooze the "Wake-up" alarm. In some embodiments, wearable device 706 detects that the hand of user 702 is titled to the right, and in response to receiving an indication (e.g., via computer system 704) that the hand of user 702 is tilted to the right, computer system 700 slides stop control virtual object 708 to the right. In some embodiments, in response to receiving an indication (e.g., via computer system 704) that the hand of user 702 is tilted to the right, one or more of computer system 700, computer system 704, and/or wearable device 706 performs a function that stops the "Wake-up" alarm.

In some embodiments, where wearable device 706 displays a notification that corresponds to alarm notification 804, wearable device 706 moves a user interface object that corresponds to snooze control virtual object 806 or a user interface object that corresponds to stop control virtual object 808 based on whether the direction of the hand of user 702 is titled in the direction of the force of gravity or away from the direction of the force of gravity. In some embodiments, if the hand of user 702 is detected to be titled in the same direction as the force of gravity, wearable device 706 (and/or computer system 700 and/or computer system 704) will slide the user interface object corresponding to snooze control virtual object 806 to the left. In some embodiments, if the hand of user 702 is detected to be tilted in the opposite direction of the force of gravity, wearable device 706 will slide the user interface object corresponding to stop control virtual object 808 to the right.

FIGS. 8D-8F illustrate an exemplary scenario where virtual objects are selected after a hand input (e.g., and/or air gesture) is detected by wearable device 706. At FIG. 8D, wearable device 706 detects that user 702 is performing an indoor walking exercise. As illustrated in FIG. 8D, in response to computer system 700 receiving an indication (e.g., from computer system 704) that wearable device 706 detects that user 702 is performing an indoor walking exercise, computer system 700 displays physical activity notification 818. Physical activity notification 818 includes tracking function initiation virtual object 820a and dismiss virtual object 820b. Wearable device 706 initiates a tracking function that tracks metrics (e.g., heartbeat, calories burned, and/or time spent exercising) during the indoor walking exercise of user 702 in response to tracking function initiation virtual object 820a being activated. Wearable device 706 forgoes initiating the tracking function that corresponds to the indoor walking exercise of user 702 in response to dismiss virtual object being activated. In some embodiments, wearable device 706 displays physical activity notification 818 (e.g., and not computer system 700). In some embodiments, wearable device 706 and computer system 700 concurrently display user interface object and/or virtual objects that correspond to physical activity notification 818. At FIG. 8D, wearable device 706 detects that the right hand of user 702 is clenched.

As illustrated in FIG. 8E, in response to receiving an indication that wearable device 706 has detected that the right hand of user 702 is clenched, computer system 700 displays tracking function initiation virtual object 820a as visually emphasized (e.g., computer system 700 displays tracking function initiation virtual object 820a as larger than dismiss virtual object 820b). Wearable device 706 will activate tracking function initiation virtual object 820a if wearable device 706 detects that user 702 performs an unclench gesture while computer system 700 displays tracking function initiation virtual object 820a as visually emphasized. In some embodiments, computer system 700 visually emphasizes tracking function initiation virtual object 820a by bolding the border of tracking function initiation virtual object 820a. In some embodiments, computer system 700 visually emphasizes tracking function initiation virtual object 820a by displaying tracking function initiation virtual object 820a as a different color than dismiss virtual object 820b. In some embodiments, computer system 700 visually emphasizes tracking function initiation virtual object 820a by decreasing the size of dismiss virtual object 820b (e.g., and maintaining the size of the display of tracking function initiation virtual object 820a). At FIG. 8E, wearable device continues to detect that the right hand of user 702 is clenched.

At FIG. 8F, in response to receiving an indication that wearable device 706 continues to detect that the right hand of user 702 is clenched, computer system 700 ceases displaying tracking function initiation virtual object 820a as visually emphasized and computer system 700 displays dismiss virtual object 820b as visually emphasized. Computer system 700 alternates between displaying tracking function initiation virtual object 820a and dismiss virtual object 820b as visually emphasized for as long as wearable device 706 detects that the right hand of user 702. Wearable device 706 will activate dismiss virtual object 820b if wearable device 706 detects that user 702 performs an unclench gestures while computer system 700 displays dismiss virtual object 820b as visually emphasized. In some embodiments, computer system 700 alternates between displaying tracking function initiation virtual object 820a and dismiss virtual object 820b as visually emphasized on the basis of time (e.g., computer system 700 displays tracking function initiation virtual object 820a as visually emphasized for a predetermined amount of time (e.g., 1 second, 3 seconds, or 5 seconds), wherein after the predetermined amount of time has elapsed, computer system 700 ceases displaying tracking function initiation virtual 820a as visually emphasized and displays dismiss virtual object 820b as visually emphasized for the predetermined amount of time). At FIG. 8F, wearable device 706 detects that the right hand of user 702 has performed an unclench gesture.

At FIG. 8G, in response to wearable device 706 detecting that the right hand of user 702 has performed an unclench gesture, wearable device 706 activates dismiss virtual object 820*b*. In response to receiving an indication that wearable device 706 activates dismiss virtual object 820*b* (e.g., via computer system 704), computer system 700 ceases to display physical activity notification 818. As illustrated in FIG. 8G, computer system 700 displays user interface 820. At FIG. 8G, wearable device 706 detects that user 702 has performed a request (e.g., user 702 performs an air tap, hand rotation, air swipe, air pinch, and/or air de-pinch that is detected by wearable device 706) for computer system 700 to display control center user interface 830.

As illustrated in FIG. 8H, in response to receiving an indication that wearable device 706 has detected that user 702 has performed a request to display control center user interface 830, computer system 700 displays control center user interface 830. As illustrated in FIG. 8H, control center user interface 830 includes plurality of virtual objects 836. Wearable device 706 performs a respective operation (e.g., enter a do not disturb mode, adjust the volume of a pair of external speakers, eject water that is within wearable device 706, and/or activate a light source on wearable device 706) in response to detecting that a respective virtual object is selected. Plurality of virtual objects 836 includes hand gesture detection virtual object 836*a*. At FIG. 8H, hand gesture detection virtual object 836*a* is activated (e.g., toggled on). While hand gesture detection virtual object 836*a* is activated, computer system 700 receives instructions (e.g., from computer system 704) to perform various operations (e.g., as discussed above) in response to wearable device 706 detecting an air gesture of the right hand of user 702. In some embodiments, wearable device 706 detects request to deactivate hand gesture detection virtual object 836*a* (e.g., user 702 performs an air tap, hand rotation, air swipe, air pinch, and/or air de-pinch that is detected by wearable device 706). In embodiments where hand gesture detection virtual object 836*a* is deactivated, computer system 700 will not receive instructions to perform various operations in response to wearable device 706 detecting that the right hand of user 702 has performed an air gesture. In addition, various descriptions of FIGS. 8A-8H have been described to state that computer system 700 receives an indication from wearable device 706. It should be understood (e.g., as alluded to in the description of FIG. 7A above) that computer system 704 can receive the indication from wearable device 706 and cause computer system 700 to perform one or more actions (e.g., one or more actions that computer system 700 performed, as described above in relation to FIGS. 8A-8H) in response to receiving the one or more indications from wearable device 706.

Additional descriptions regarding FIGS. 8A-8H are provided below in reference to methods 900 and 1100 described with respect to FIGS. 8A-8H.

FIG. 9 is a flow diagram of an exemplary method 900 for navigating content using hand gestures, in accordance with some embodiments. In some embodiments, method 900 is performed at a computer system (e.g., computer system 101 in FIG. 1 and/or computer system 700) including a display generation component (e.g., display generation component 120 in FIGS. 1, 3, and 4) (e.g., a heads-up display, a display, a touchscreen, a projector, etc.) and, optionally, one or more sensors. In some embodiments, the computer system is in communication with one or more input devices (e.g., a touch-sensitive surface). In some embodiments, the method 900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

While a hand-worn device (e.g., 706) is being worn by a user (e.g., 702), the computer system (e.g., 700) displays (902), via the display generation component, a respective user interface (e.g., a virtual user interface or an AR user interface) that includes a first portion (e.g., one or more virtual objects and/or virtual content) of the content (e.g., 714*a*-714*g*) and a second portion (e.g., one or more virtual objects and/or virtual content) of the content (e.g., 714*a*-714*g*) that is different from the first portion of the content. In some embodiments, the first portion of the content and second portion of the content are selectable. In some embodiments, the first portion of the content has a visual appearance (e.g., size, color, shape) that is different from the visual appearance of the second portion of the content. In some embodiments, the first portion of the content and the second portion of the content are displayed in an array, in a vertical/horizontal line, in a circle, a semi-circle, and/or any other suitable configuration. In some embodiments, the first portion of the content and the second portion of the content are concurrently displayed. In some embodiments, the first portion of the content or the second portion of the content is displayed with a visual emphasis that indicates that the respective portion of the content is presently selectable. In some embodiments, the first portion of the content and the second portion of the content are displayed in an augmented reality environment.

While displaying the respective user interface that includes the first portion of the content and the second portion of the content, the computer system receives (904) an indication (e.g., generated by the computer system) that the hand-worn device (e.g., 706) detected a hand input including a rotation (e.g., clockwise, counter-clockwise, forward, and/or backward rotation of the user's hand) of a hand (e.g., as shown by right hand of user 702 at FIGS. 7B and 7D) (e.g., a hand of a user). In some embodiments, the hand input is detected by one or more sensors (e.g., a gyroscope, an accelerometer, a heart rate sensor, or the like) of an external device (e.g., smartwatch) that is worn by the user. In some embodiments, the external device is in communication (e.g., wireless communication) with the computer system. In some embodiments, one or more cameras that are integrated into the computer system detect the hand input.

In response to receiving (906) the indication that the hand-worn device (e.g., 706) detected the hand input including the rotation of the hand and in accordance with (908) a determination that the hand-worn device detected that the hand (e.g., the right hand of user 702) (e.g., user's hand) (e.g., hand that is being rotated) is clenched while the hand input (e.g., at least a portion of the hand input) was performed (e.g., right hand of user at FIG. 7D), the computer system navigates between the first portion of the content and the second portion of the content (e.g., as discussed above in relation to FIGS. 7D and 7E) (e.g., in the direction of the rotation that the hand input was performed) and in accordance with (910) a determination that the hand-worn device (e.g., 702) did not detect that the hand (e.g., right hand of user 702) is clenched while the hand input (e.g., at least a portion of the hand input) was performed, the computer system (e.g., 700) forgoes navigating between the first portion of the content and the second portion of the content (e.g., as discussed above in relation to FIG. 7A) (e.g., in the direction of the rotation that the hand input was performed). In some embodiments, navigating between the first portion of the content and the second portion of the content includes performing a scrolling operation (e.g., horizontal scrolling, vertical scrolling, and/or diagonal scrolling) (e.g., updating/ changing which portion of the content is displayed as visually emphasized (e.g., enlarged, changed color, bolding, and/or animating differently when compared other portions of content)) to the user interface (e.g., scrolling the first portion of the content (and/or the second portion of the content) to display the second portion of the content and/or an additional portion of the content that is different from the second portion of the content and/or the first portion of the content). In some embodiments, navigating between the first portion of the content and the second portion of the content includes moving a selection indicator between the first portion of the content and the second portion of the content (e.g., from the first portion of the content to the second portion of the content and/or vice-versa). In some embodiments, navigating between the first portion of the content and the second portion of the content includes alternating between which portion content is visually emphasized. In some embodiments, navigating between the first portion of the content and the second portion of the content includes changing a size of either the first portion of the content or the second portion of the content. In some embodiments, navigating between the first portion of the content and the second portion of the content includes changing a size of both the first portion of the content and the second portion of the content (e.g., making the first portion of the content smaller and making the second portion of the content bigger). In some embodiments, navigating between the first portion of the content and the second portion of the content includes ceasing to display either the first portion of the content or the second portion of the content. In some embodiments, navigating between the first portion of the content and the second portion of the content includes animating the first portion of the content and/or ceasing to animate one of the second portion of the content, or vice-versa. In some embodiments, navigating between the first portion of the content and the second portion of the content includes outputting, via one or more speakers that are in communication with the computer system, an audio signal that corresponds to either the first portion of the content and/or the second portion of the content. In some embodiments, navigating between the first portion of the content and the second portion of the content includes displaying the first portion of the content in the background of the respective user interface and displaying the second portion of the content in the foreground of the respective user interface, or vice-versa. In some embodiments, navigating between the first portion of the content and the second portion of the content includes visually blurring the first portion of the content or the second portion of the content. In some embodiments, the determination that the hand is clenched while the hand input was made is performed at an external device (e.g., smartwatch) (e.g., that is in communication (e.g., wireless communication) with the computer system)), at the computer system, and/or at another computer system (e.g., server) that is different from the computer system and/or the external device. In some embodiments, the determination that the hand is clenched while the hand input was made is performed by the computer system based on data that is received from an external device (e.g., smartwatch) being worn by the user. In some embodiments, the determination that the hand is clenched while the hand input was made is made by one or more cameras that are in communication with the computer system. Navigating between a first portion of the content and a second portion of the content in response to receiving the indication that the hand-worn device detected the hand input including the rotation of the hand was performed and in accordance with a determination that the hand-worn device detected that the hand is clenched while the hand input was performed provides a user with greater control over the computer system by allowing the user to browse between content that the computer system displays without the user touching the computer system and without the computer system displaying additional controls, which provides additional control options without cluttering the user interface. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the computer system (e.g., 700) is in communication (e.g., wired communication, wireless communication) with one or more sensors (e.g., one or more accelerometers, gyroscopes, and/or heart rate sensors) (e.g., for detecting hand motion) (e.g., one or more cameras) that have a detectability range (e.g., a range of distance (e.g., 0-5 inches or 10-24 inches,) that a user's respective body party motion must be within with respect to the one or more sensors such that the one or more sensors can detect the motion of the respective body part), and wherein the hand is not within the detectability range of the one or more sensors when the hand-worn device detects the hand input. Detecting the hand input with the hand-worn device while the hand is not within the detectability range of the one or more sensors improves the usability of the hand-worn device for certain users when the user's hand is out of range of the one or more sensors.

In some embodiments, navigating between the first portion of the content (e.g., 714*a*-714*g*) and the second portion of the content (e.g., 714*a*-714*g*) includes visually emphasizing the second portion of the content relative to the first portion of the content (e.g., as described above in relation to FIGS. 7C-7E) (e.g., the second portion of the content is larger than the first portion of the content, the second portion of the content is surrounded by a selection indicator virtual object and the first portion of the content is not surrounded by a selection indicator virtual object, the second portion of the content is displayed as a first color and the first portion of the content is displayed as a second color that is different from the first color, and/or the first portion of the content is visually obscured and the second portion of the content is not visually obscured). In some embodiments, while visually emphasizing the second portion of the content, the computer system receives an indication (e.g., generated by the computer system and/or generated by the hand-worn device) that the hand-worn device detected that the hand is unclenched (e.g., as described above in FIGS. 7E and 7F). In some embodiments, in response to receiving the indication that the hand-worn device detected that the hand is unclenched, the computer system performs an operation that corresponds to the second portion of the content (e.g., as described above in relation to FIG. 7F) (e.g., select the second portion of the content, launch media associated with the second portion of the content, and/or transmit to the second portion of the content to an external device). In some embodiments, the operation that corresponds to the second portion of the content is performed while the second portion of the content is displayed. In some embodiments, performing the operation that corresponds to the second portion of the content causes the computer system to cease to display the second portion of the content. Performing an operation that corresponds to the second portion of the content in response to receiving an indication that the hand-worn device detected that the hand is unclenched provides a user with control over the operations that the computer system performs without displaying additional controls on a user interface, which provides additional control options without cluttering the user interface. Visually emphasizing the second portion of the content relative to the first portion of the content provides improved visual feedback by allowing the user to visually differentiate the first portion of content from the second portion of content, which can lead to a more efficient control of the user interface for some users.

In some embodiments, navigating between the first portion of the content (e.g., 714a-714g) and the second portion of the content (e.g., 714a-714g) is based on a duration (e.g., time (e.g., milliseconds, seconds, or minutes) (e.g., 1 second, 3 seconds, or 5 seconds) the hand-worn device detects a portion (e.g., a clenched portion of the hand input) of the hand input) (e.g., as described above in relation to FIGS. 7D-7E) (e.g., navigating between the first portion of the content and the second portion of the content occurs for as long as the hand input is detected). In some embodiments, the navigation between the first portion of the content and the second portion of the content is based on a combination of parameters (e.g., duration of hand input, magnitude of hand input) of the hand input. In some embodiments, in accordance with a determination that a portion of the hand input is detected for a first period of time, navigating between the first portion of then content and the second portion of the content occurs over a second period of time (e.g., that has a predefined relationship to the first period of time (e.g., the second period of time is 0.5×, 2×, or 4× the first period of time)). In some embodiments, in accordance with a determination that the portion of the hand input is detected for a third period of time that is longer than the first period of time, navigating between the first portion of the content and the second portion of the content occurs over a fourth period of time that is longer than the second period of time. Navigating between the first portion of the content and the second portion of the content for a duration of a hand input provides a user with visual feedback with respect to the duration for which the hand-worn device detects the hand input, which provides improved visual feedback and can lead to more efficient control of the user interface for some users.

In some embodiments, navigating between the first portion (e.g., 714a-714g) of the content and the second portion of the content (e.g., 714a-714g) is based on a degree of rotation (e.g., 5°, 10°, 15°, or 25°) of the hand input (e.g., as described above in relation to FIGS. 7D-7E) (e.g., while the hand input is clenched) (e.g., the greater the degree of rotation the quicker the computer system navigates between the first portion of the content and the second portion of the content). In some embodiments, in accordance with a determination that the degree of rotation is positive, the navigation between the first portion of the content and the second portion of the content occurs in a first direction. In some embodiments, in accordance with a determination that the degree of rotation is negative, the navigation between the first portion of the content and the second portion of the content occurs in a second direction that is opposite of the first direction. In some embodiment, the navigation between the first portion of the content and the second portion of the content is based on a combination of parameters (e.g., duration of hand input, magnitude of hand input of the hand input). Navigating between the first portion of the content and the second portion of the content based on a degree of rotation of the hand input provides a user with visual feedback with respect to the degree of rotation that hand input is being performed at, which provides improved visual feedback and can lead to more efficient control of the user interface for some users.

In some embodiments, navigating between the first portion of the content (e.g., 714a-714g) and the second portion of the content (e.g., 714a-714g) is based on a direction of rotation (e.g., counter-clockwise and/or clockwise) of the hand input (e.g., as described above in relation to FIGS. 7D-7E) (e.g., while the hand input is clenched) (e.g., the navigation between the first portion of the content and the second portion of the content occurs in a first direction when the direction of rotation of the hand input is in clockwise direction and the navigation between the first portion of the content and the second portion of the content occurs in a second direction, opposite the first direction when the rotation of the hand input is in a counter-clockwise direction. In some embodiments, the navigation between the first portion of the content and the second portion of the content is based on a combination of parameters (e.g., duration of hand input, magnitude of hand input) of the hand input). Navigating between a first portion of the content and a second portion of the content based on the direction of rotation of the hand input provides a user with visual feedback with respect to the direction in which the hand input is being performed, which provides improved visual feedback and can lead to more efficient control of the user interface for some users.

In some embodiments, in response to receiving the indication that the hand-worn device (e.g., 706) detected the hand input including the rotation of the hand and in accordance with a determination that the hand-worn device did not detect that the hand is clenched while the hand input was performed, the computer system displays (e.g., concurrently with the display of the first portion of the content and the second portion the content), via the display generation component, a first hand input virtual object (e.g., 736 at FIG. 7C) that is representative of (e.g., the first hand input virtual object is a graphical indication of the first type of hand input) a clenched hand. In some embodiments, the first hand input virtual object is representative of a clenched hand that is rotated. In some embodiments, the first hand input virtual object is displayed in response to receiving an indication that the hand is clenched. Displaying a first hand input virtual object representative of a clenched hand in response to receiving an indication that the hand-worn device detected that the hand input including the rotation of the hand was performed provides the user with visual feedback regarding whether the hand-worn device detected that the hand is clenched while the hand input was performed, which improves visual feedback and can lead to more efficient control of the user interface for some users.

In some embodiments, displaying the first hand input virtual object (e.g., 736) includes displaying an animation of the first hand input virtual object changing from displaying a virtual object that represents a clenched hand position to displaying a virtual object that represents an unclenched hand position (e.g., as described above in relation to FIG. 7C). In some embodiments, displaying the first hand input virtual object includes displaying a looping animation (e.g., a looping pattern). In some embodiments, the looping animation loops between a clenched hand position and an unclenched hand position (e.g., the first hand input virtual object has a first visual appearance (e.g., a clenched hand) for a first amount of time and a second a visual appearance (e.g., an unclenched hand) for a second amount of time (e.g., the second amount of time is the same amount of time as the first amount of time)). Displaying a first hand input virtual object as changing between a virtual object that represents a clenched hand position and a virtual object that represents an unclenched hand position provides the user with visual feedback regarding the hand gesture that is required to be detected such that the computer system navigates between the first portion of the content (e.g., 714a-714g) and the second portion (e.g., 714a-714g) of the content, which improves visual feedback and can lead to more efficient control of the user interface for some users.

In some embodiments, before receiving the indication that the hand-worn device detected the hand input including the rotation of the hand, the computer system receives an indication (e.g., a computer generated indication) (e.g., an indication generated by the hand-worn device) that the hand-worn device detected the hand is clenched (e.g., as described above in relation to FIG. 7C) (e.g., clenched without being rotated). In some embodiments, in response to receiving the indication that the hand-worn device detected the hand is clenched (e.g., while the hand-worn device detects that the hand is clenched), the computer system displays, via the display generation component, a second hand input virtual object (e.g., 736 as described above in relation to FIG. 7C) (e.g., a graphical indication of a clenched hand that is rotated) representative of a clenched hand that is rotated. In some embodiments, the first hand input virtual object ceases to be displayed in response to the second hand input virtual object being displayed. In some embodiments, the second hand input virtual object ceases to be displayed in response to receiving the indication that the hand-worn device detected that that hand input including the rotation of the hand was performed. Displaying a second hand input virtual object representative of a clenched hand that is rotated in response to receiving the indication that the hand-worn device detected the hand is clenched provides the user with visual feedback regarding a requisite type of input (e.g., a clenched rotated hand) that is required in order to navigate between the first portion of the content and the second portion of the content, which provides improved visual feedback and can lead to more efficient control of the user interface for some users.

In some embodiments, displaying the second hand input virtual object (e.g., 736) includes displaying an animation of the second hand input virtual object as changing between a first amount of rotation (e.g., 5°, 10°, 15°, or 25°) and a second amount of rotation that is different from the first amount of rotation (e.g., as described above in relation to FIG. 7C). In some embodiments, the animation (e.g., a looping pattern) loops between the first amount of rotation (e.g., 5°, 10°, 15°, or 25°) and a second amount of rotation, that is different from that first amount of rotation. In some embodiments, the second hand input virtual object is displayed as looping between rotating in a first direction (e.g., clockwise) and a second direction (e.g., counter-clockwise). In some embodiments, the first amount of rotation is in the same direction (e.g., clockwise and/or counterclockwise) as the second amount of rotation. Displaying a second hand input virtual object as changing between a first amount of rotation and a second amount of rotation provides the user with visual feedback regarding the type of hand gesture that is required to be performed such that the computer system navigates between the first portion of the content (e.g., 714a-714g) and the second portion of the content (e.g., 714a-714g), which provides improved visual feedback and can lead to more efficient control of the user interface for some users.

In some embodiments, before receiving the indication that the hand-worn device detected the hand input including the rotation of a hand, the computer system displays a selection indicator virtual object (e.g., 720 at FIG. 7A) at a first location on the respective user interface (e.g., selection indicator virtual object indicates that a virtual object that is displayed within the virtual selection indicator object can be selected). In some embodiments, in response to receiving the indication that the hand-worn device detected the hand input including rotation and in accordance with a determination that the hand-worn device detected that the hand was clenched while the hand input was performed, the computer system moves the display of the selection indicator virtual object from the first location to a second location (e.g., as described above in relation to FIG. 7D) (e.g., different from the first location) (e.g., the second location is positioned to the right, left, above, and/or below the first location) on the respective user interface, wherein display of the selection indicator virtual object is moved based on a degree of rotation of the hand (e.g., the distance between the first location and the second location is based on the degree of rotation of the hand (e.g., the larger the degree of the rotation of the hand the further the second location is from the first location)) (e.g., the greater the degree of the rotation of the hand input the further the second location is from the first location). In some embodiments, the selection indicator virtual object is displayed around the first portion of the content and/or the second portion of the content. In some embodiments, the selection indicator virtual object is moved in a direction based on the rotation of the hand (e.g., the selection indicator virtual object is moved to the right when the hand rotates in a clockwise direction and the selection indicator virtual object is moved to the left when the hand rotates in a counterclockwise direction). Moving the display of the selection indicator virtual object from a first location to a second location in response to receiving an indication that the hand-worn device detected a hand input including rotation provides a user with the ability to control the location at which the computer system displays the selection indicator virtual object without displaying additional controls, which provides additional control options without cluttering the user interface.

In some embodiments, navigating between the first portion of the content (e.g., 714a-714g) and the second portion of the content (e.g., 714a-714g) includes scrolling (e.g., horizontal scrolling, vertical scrolling, and/or diagonal scrolling) between the first portion of the content and the second portion of the content. In some embodiments, the speed of the scrolling between the first portion of the content and the second portion of the content is based on the degree of rotation of the hand (e.g., the larger the degree of rotation of the hand the faster the scrolling operation). In some embodiments, the direction of the scrolling between the first portion of the content and the second portion of the content is based on the direction (e.g., counter-clockwise and/or clockwise) of the rotation of the hand (e.g., the scrolling includes rightward scrolling when the rotation of the hand is in a clockwise direction and the scrolling includes leftward scrolling when the rotation of the hand is in a counterclockwise direction).

In some embodiments, the first portion of the content (e.g., 714a-714g) (at least a subset of) and the second portion of the content (e.g., 714a-714g) (at least a subset of) are selectable (e.g., as described above in relation to FIG. 7A). In some embodiments, selection of the first portion of the content causes the computer system to perform a first operation (e.g., display a media item, playback an audio file, change the mode of the computer system) and selection of the second portion of the content causes the computer system to perform a second operation that is different from the first operation. In some embodiments, only the first portion of the content or the second portion of the content is selectable any point in time. Navigating between a first portion of the content that is selectable and second portion of the content that is selectable in accordance with a determination that the hand-worn device detected that the hand is clenched while the hand input was performed provides the user with the ability to browse between a number of selectable content options and decide to select one or more of the selectable content options without displaying additional controls, which provides additional control options without cluttering the user interface.

In some embodiments, while navigating between the first portion of the content and the second portion of the content (e.g., and while the hand is clenched), the computer system receives an indication (e.g., that is generated by the computer system) (e.g., that is generated by the hand-worn device) that the hand is unclenched (e.g., as described above in relation to FIG. 7E) (e.g., the hand-worn device detects (e.g., using one or more sensors (e.g., accelerometer and/or gyroscope) that the hand is unclenched)). In some embodiments, in response to receiving the indication that the hand is unclenched, the computer system (e.g., 700) ceases to navigate (e.g., scrolling) between the first portion of the content and the second portion of the content (e.g., as described above in relation to FIG. 7F). In some embodiments, in response to ceasing navigating between the first portion of the content and the second portion of the content, the second portion of the content becomes selectable. In some embodiments, in response to ceasing navigating between the first portion of the content and the second portion of the content, the computer system selects the second portion of the content (e.g., the computer system performs an operation that corresponds to the second portion of the content). Ceasing navigating between the first portion of the content and the second portion of the content in response to receiving an indication that the hand was unclenched allows a user to control the navigation operation that the computer system performs without displaying additional controls, which provides additional control options without cluttering the user interface.

In some embodiments, while navigating between the first portion of the content and the second portion of the content, the computer system displays, via the display generation component, a third hand input virtual object (e.g., 736 at FIG. 7A) (e.g., graphical indication) representative of an unclenched hand (e.g., the third hand input virtual object depicts an unclenched hand). In some embodiments, the third hand input virtual object is displayed in response receiving an indication that the hand is unclenched. In some embodiments, the third hand input virtual object is displayed as looping between an unclenched hand gesture and a clenched hand gesture. In some embodiments, the first amount of rotation is in the same direction (e.g., clockwise and/or counterclockwise) as the second amount of rotation. Displaying a third hand input virtual object while the first portion of the content and the second portion of the content is being navigated provides the user with visual feedback regarding the state of the computer system (e.g., the computer system has detected the hand input that includes rotation while the hand is clenched), which provides improved visual feedback and can lead to more efficient control of the user interface for some users.

In some embodiments, displaying the third hand input virtual object (e.g., 736) includes displaying an animation (e.g., looping animation that loops through a pattern) of the third hand input changing from a virtual object that represents a clenched hand position to a virtual object that represents an unclenched hand position (as described above in relation to FIG. 7D) (e.g., the third hand input virtual object has a first visual appearance (e.g., a clenched hand) for a first amount of time and a second a visual appearance (e.g., an unclenched hand) for a second amount of time (e.g., the second amount of time is the same amount of time as the first amount of time)). Displaying a third hand input virtual object as an animation that changes from a virtual object that represents a clenched hand position to a virtual object that represents an unclenched hand position provides the user with visual feedback regarding the hand gesture that is required to be detected in order for the computer system to perform a desired operation (e.g., a selection of a virtual object or cease navigating between the first portion of the content and the second portion of the content), which provides improved visual feedback and can lead to more efficient control of the user interface for some users.

In some embodiments, the computer system is in communication (e.g., wired communication and/or wireless communication) with an external device (e.g., television, computer monitor, smart phone, and/or smart watch that is separate from the computer system), and wherein the external device causes display of a virtual object (e.g., 720) (e.g., a selectable virtual object) with a first visual appearance (e.g., first size, first color). In some embodiments, after receiving the indication that the hand-worn device (e.g., 706) detected the hand input including the rotation of the hand, the computer system receives a second indication (e.g., generated by the computer system) (e.g., generated by the hand-worn device) that the hand-worn device detected a fourth hand input (e.g., air swipe and/or air drag) including a second rotation (e.g., clockwise, counter-clockwise, forward, and/or backward rotation of the user's hand) of the hand while the hand is clenched, wherein the fourth hand input includes a first amount of rotation (e.g., 5°, 10°, 15°, or 25°). In some embodiments, in response to receiving the second indication that the hand-worn device detected the fourth hand input including a second rotation of the hand, the computer system transmits instructions to the external device to cause the virtual object to be displayed with a second visual appearance (e.g., increase the size of the virtual object, display the virtual object with a different color, display the virtual object with a different shade and/or tone of the same color) different from the first visual appearance (e.g., as described above in relation to FIG. 7E). In some embodiments, while displaying the virtual object with a second visual appearance, the computer system receives a third indication (e.g., generated by the computer system) that the hand-worn device detected that the fourth hand input includes a second amount of rotation (e.g., greater than the first amount of rotation). In some embodiments, in response to receiving the third indication that the hand-worn device detects that the fourth hand input includes a second amount of rotation (e.g., in the same direction as the first amount of rotation), the computer system transmits instructions to the external device to cause the virtual object to be displayed with a third visual appearance different than the second visual appearance e.g., as described above in relation to FIG. 7E) (e.g., and the first visual appearance) (e.g., increase the size of the virtual object and/or display the virtual object with a different shade and/or tone of the same color). In some embodiments, after receiving the third indication, the computer system transmits instructions to the external device to display the virtual object with the second visual appearance in response to the hand-worn device detecting that the second hand input includes the first amount of rotation. In some embodiments, after receiving the second indication, the computer system transmits instructions to the external device to display the virtual object with the first visual appearance in response to the hand-worn detecting that the second hand input includes no rotation. In some embodiments, the second hand input is detected by one or more cameras that are integrated into the computer system. Causing the visual appearance of the virtual object to be changed in response to receiving an indication the amount of rotation of a hand input has changed allows the user the ability to change the visual appearance of a virtual object without displaying additional controls, which provides additional control options without cluttering the user interface. Causing the visual appearance of the virtual object to be changed provides the user with visual feedback regarding that status of the hand-worn device (e.g., that the hand-worn device has detected a change in rotation), which provides improved visual feedback and can lead to more efficient control of the user interface for some users.

In some embodiments, the respective user interface (e.g., 710) is a media user interface (e.g., as described above in relation to FIG. 7E) (e.g., a media user interface that associated with a tv application) (e.g., a user interface that includes one or more representations of media (e.g., video, photo, and/or audio media)).

In some embodiments, the respective user interface (e.g., 710) is an augmented reality user interface (e.g., as described above in FIG. 7A).

In some embodiments, after receiving the hand indication that the hand-worn device (e.g., 706) detected the hand input including the rotation of the hand, the computer receives an indication (e.g., generated by the computer system) (e.g., generated by the hand-worn device) that the hand-worn device detected (e.g., using one or more sensors that are integrated into the hand-worn device) a respective hand input (e.g., as described above in relation to FIG. 7E) (e.g., a discrete hand input) (e.g., a clench and rotation, a clench, a rotation and/or an unclench gesture) (e.g., a gesture that is separate and distinct from the hand input that includes rotation of the hand) (e.g., the respective hand input is performed by the hand that is wearing the hand-worn device). In some embodiments, in response to receiving the indication that the hand-worn device detected the respective hand input, the computer system performs a second operation (e.g., as described above in relation to FIG. 7E) (e.g., initiating the playback of a video media item, modifying the playback status of an audio media item, and/or initiate a photo capturing process). In some embodiments, the second operation is performed while the computer system navigates between the first portion of the content and the second portion of the content. In some embodiments, performing the second operation causes the computer system to cease to navigate between the first portion of the content and the second portion of the content. In some embodiments, performing the second operation causes the computer system to cease to display the respective user interface. Performing an operation in response to receiving an indication that the hand-worn device detected a respective hand input allows a user to control when the computer system performs various operations without displaying additional controls, which provides additional control options without cluttering the user interface.

In some embodiments, displaying the respective user interface (e.g., 710) includes displaying a playback of a video (e.g., a video media item that is stored on the computer system) (e.g., a movie, and/or television show), wherein the respective hand input includes a clench and roll (e.g., a gesture that includes the user clenching and rotating their clenched hand in one or more directions (e.g., clockwise, counter-clockwise, up, and/or down) input, and wherein performing the operation includes pausing the playback of the video media item (e.g., as described above in relation to 7E)). In some embodiments, while the playback of the video media item is paused and in response to receiving an indication that the hand-device detected the respective hand input, the playback of the video media item is resumed. In some embodiments, pausing the playback of the video media item causes the computer system to display a plurality of playback controls. Pausing playback of video media in response to receiving an indication that a hand-worn device detected a respective hand gesture allows a user to modify the playback status of a video media item without displaying additional controls, which provides additional control options without cluttering the user interface.

In some embodiments, the respective hand input includes a clench and roll input (e.g., a gesture that includes the user clenching their hand together and rotating their clenched hand in one or more directions (e.g., clockwise, counter-clockwise, up, and/or down), and wherein performing the operation includes scrolling between the first portion of the content and the second portion of the content (e.g., as described above in relation to FIG. 7D) (e.g., direction of the clench and roll gesture determines the direction of the scrolling). In some embodiments, scrolling between the first portion of the content and the second portion of the content occurs in a combination of directions (e.g., scrolling between the first portion of the content and the second portion of the content includes scrolling in two or more directions (e.g., the vertical, horizontal, and/or diagonal directions)). In some embodiments, the scrolling is performed based on a parameter (e.g., direction of roll, angle of rotation, and/or duration of clench gesture) of the clench and roll gesture. Scrolling between the first portion of the content and the second portion of the content in response to receiving an indication that a hand-worn device detected a clench and roll gesture allows a user to control a display operation of the computer system without displaying additional controls, which provides additional control options without cluttering the user interface.

In some embodiments, aspects/operations of methods 1100, 1300, 1500 may be interchanged, substituted, and/or added between these methods. For example, the using hand gestures to navigate between displayed virtual objects, as described in method 900, is optionally used to navigate the displayed virtual objects in method 1100. For brevity, these details are not repeated here.

FIGS. 10A-10I illustrate examples of activating virtual objects. FIGS. 11A-11B are flow diagrams of an exemplary method 1100 for activating virtual objects. The user interfaces in FIGS. 10A-10I are used to illustrate the processes described below, including the processes in FIGS. 11A-11B.

Figure 10A:
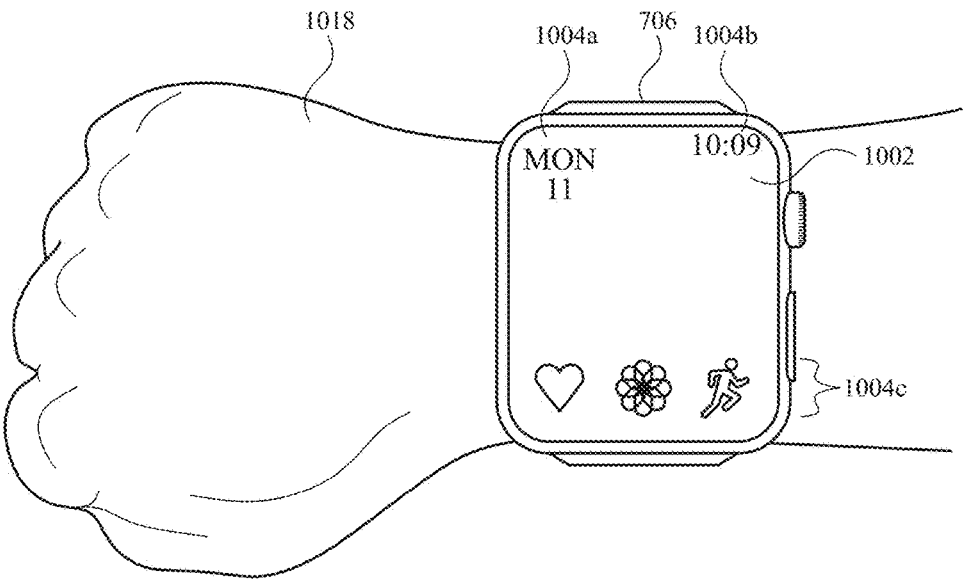
FIGS. 10A-10I illustrate example techniques for activating virtual objects, in accordance with some embodiments.

As illustrated in FIG. 10A wearable device 706 (e.g., as described above in relation to FIG. 7A) displays complication 1002. Complication 1002 includes a first set of information that includes date information 1004a, time information 1004b, and selectable icons 1004c. Wearable device 706 launches a respective application in response to detecting that a respective icon of selectable icons 1004c is selected. It should be understood that the display of complication 1002 on wearable device 706 is only exemplary. While wearable device 706 displays complication 1002 at FIG. 10A, in some embodiments, a device (e.g., television, computer monitor, smart phone, and/or display generation component of an HMD) external to wearable device 706 displays complication 1002. In embodiments where an external device displays complication 1002, wearable device 706 transmits display instructions to the external device in response to wearable device 706 detecting one or more hand gestures (e.g., one or more air gestures or inputs on hardware or touch-sensitive input elements of the HMD). It should be further understood that the configuration of the first set of information as illustrated in FIG. 10A is exemplary. In some embodiments, the first set of information includes additional information not illustrated in FIG. 10A (e.g., weather information, fitness information, and/or news information) or the first set of information includes less than the information that is illustrated in FIG. 10A. At FIG. 10A, wearable device 706 detects that hand 1018 is clenched.

Figure 10B:
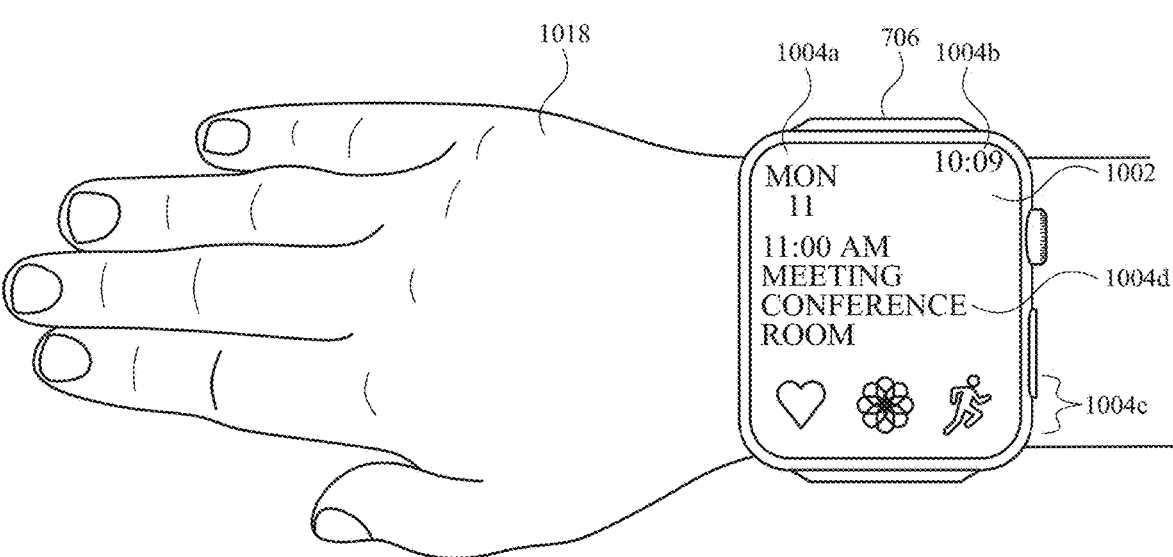

At FIG. 10B, in response to detecting that hand 1018 is clenched, wearable device 706 updates the display of complication 1002 to include a second set of information. The second set of information includes date information 1004a, time information 1004b, selectable icons 1004c, and event information 1004d. The second set of information includes more information than the first set of information described above in relation to FIG. 10A. In some embodiments, wearable device 706 displays the second set of information for as long as wearable device 706 detects that hand 1018 is clenched. In some embodiments, in response to detecting that hand 1018 is no longer clenched, wearable device 706 ceases to display the second set of information and redisplays the first set of information. In some embodiments, displaying the second set of information does not include one or more portions of information and/or any information that is included in the first set of information. In some embodiments, displaying the second set of information includes displaying a subset of information that is included in the first set of information.

Figure 10C:
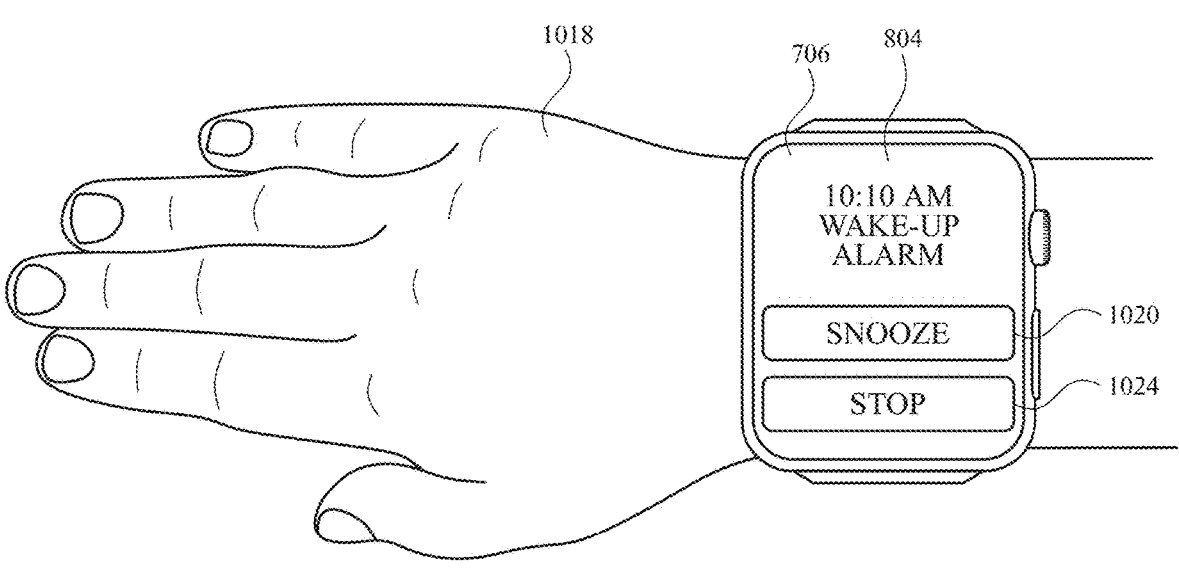

As illustrated in FIG. 10C, wearable device 706 displays alarm notification 804 (e.g., as described above in relation to FIG. 8A) that includes snooze control virtual object 1020 and stop control virtual object 1024. Alarm notification 804 is generated by a timer/clock application that is installed on wearable device 706 and wearable device 706 displays alarm notification 804 because a determination has been made that a time criterion has been satisfied (e.g., the current time of day coincides with a time that wearable device 706 has been programmed to generate alarm notification 804). As illustrated in FIG. 10C, snooze control virtual object 1020 includes the word "snooze" within the boundary of snooze control virtual object 1020 and stop control virtual object 1024 includes the word "stop" within the boundary of stop control virtual object 1024. In some embodiments, wearable device 706 performs an operation in response to detecting a tap gesture on snooze control virtual object 1020. In some embodiments, wearable device 706 performs an operation in response to detecting a tap gesture on stop control virtual object 1024.

Figure 10D:
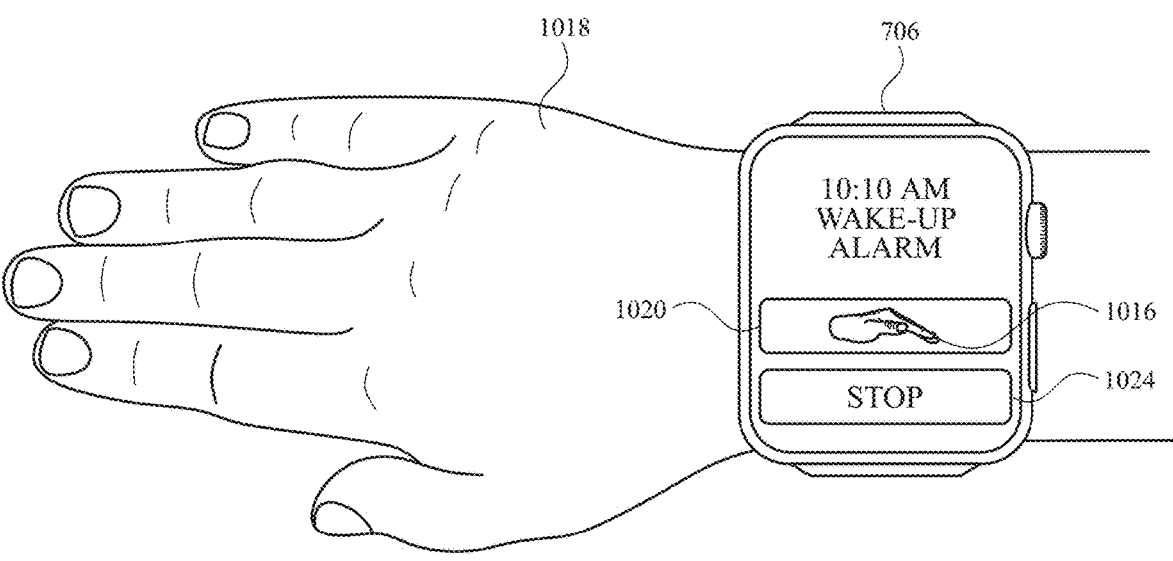

As illustrated in FIG. 10D, wearable device 706 displays hand gesture virtual object 1016 within snooze control virtual object 1020. At FIG. 10D, hand gesture virtual object 1016 corresponds to a clench gesture. As illustrated in FIG. 10D, wearable device 706 displays hand gesture virtual object 1016 with a first appearance (e.g., an appearance that is representative of an unclenched hand). The display of hand gesture virtual object 1016 within snooze control virtual object 1020 indicates that, in response to wearable device 706 detecting a clench gesture, wearable device 706 will perform an operation that corresponds to snooze control virtual object 1020 (e.g., place the alarm that is associated with alarm notification 804 in a snooze mode). In some embodiments, wearable device 706 displays snooze control virtual object 1020 as visually emphasized (e.g., snooze control virtual object 1020 is larger than stop control virtual object 1024, snooze control virtual object 1020 is displayed as a different color (e.g., highlighted) than stop control virtual object 1024) while wearable device 706 displays hand gesture virtual object 1016 within snooze control virtual object.

Wearable device 706 ceases to display the word "snooze" while wearable device 706 displays hand gesture virtual 1016 within snooze control virtual object 1020. In some embodiments, wearable device 706 displays both (e.g., concurrently) the word "snooze" and hand gesture virtual object 1016 within the boundary of snooze control virtual object 1020. In some embodiments, wearable device 706 displays hand gesture virtual object 1016 adjacent to (e.g., outside of) snooze control virtual object 1020. In some embodiments, hand gesture virtual object 1016 represents a different type of gesture (e.g., a different type of air gesture) (e.g., a pinch gesture, an unclench gesture, a de-pinch gesture, and/or an air tap) that is detectable by wearable device 706. In some embodiments, wearable device 706 displays hand gesture virtual object 1016 next to the control (e.g., snooze control virtual object 1020 and/or stop control virtual object 1024) that is in focus (e.g., the control that is the preferred control and/or primary option) and wearable device 706 does not display hand gesture virtual object next to control that is not in focus.

Figure 10E:
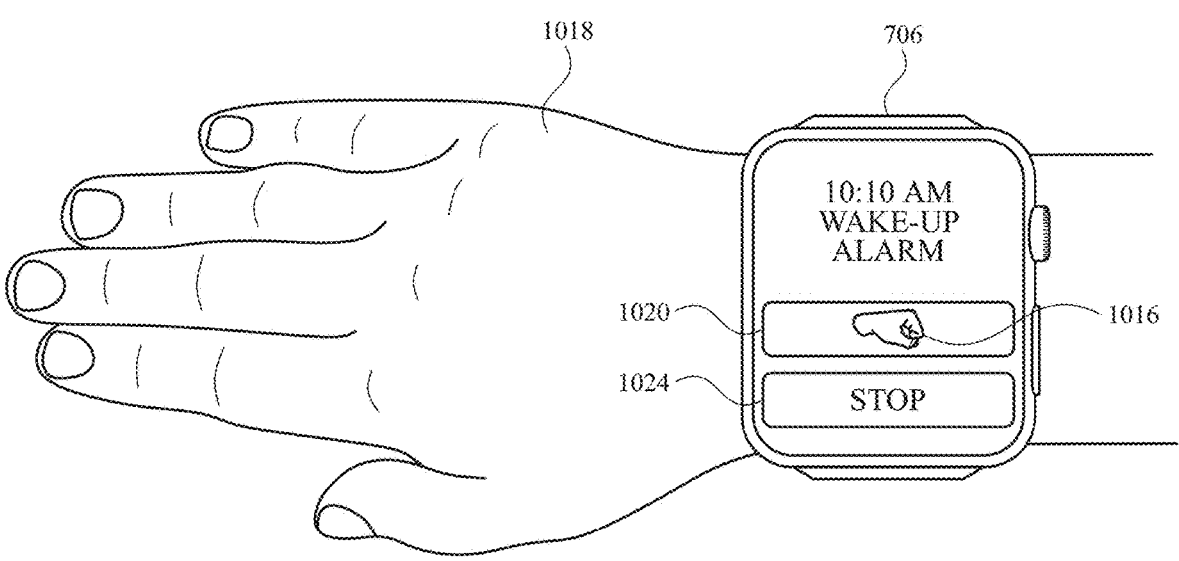
Figure 10F:
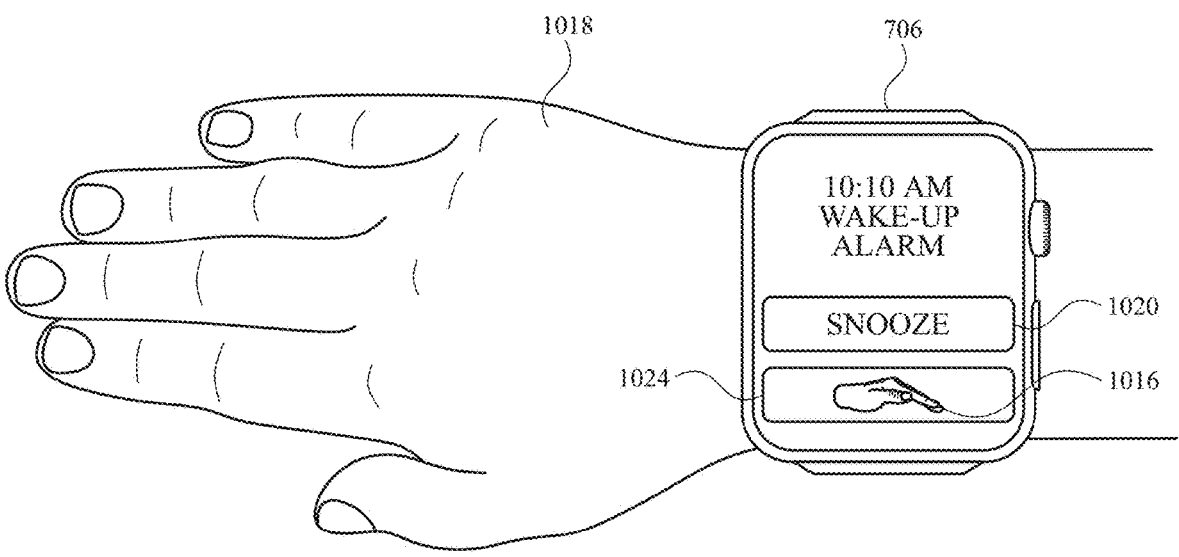

As illustrated in FIG. 10E, wearable device 706 displays hand gesture virtual object 1016 with a second visual appearance (e.g., an appearance that is representative of a clenched hand) that is different than the first appearance (e.g., an appearance that is representative of an unclenched hand as described above in relation to FIG. 10D). Wearable device 706 animates hand gesture virtual object 1016 (e.g., as a looping animation) that animates the type of gesture that wearable device 706 must detect in order to activate snooze control virtual object 1020. In some embodiments, a looping animation is displayed with a first visual appearance for a predetermined amount of time (e.g., 0.1 seconds, 0.3 seconds, 0.5 seconds, 1 second, or 3 seconds) and after the predetermined amount of time has elapsed, the looping animation is displayed with a second visual appearance for the predetermined amount of time (e.g., such as how some Graphics Interchange Formats (e.g., GIFS) are displayed). As illustrated in FIG. 10F, wearable device 706 displays hand gesture virtual object 1016 with the first visual appearance within stop control virtual object 1024. Wearable device 706 alternates between displaying hand gesture virtual object 1016 within snooze control virtual object 1020 and stop control virtual object 1024. Wearable device 706 alternates between displaying hand gesture virtual object 1016 within snooze control virtual object 1020 and stop control virtual object 1024 based on one or more factors or a combination of factors. In some embodiments, wearable device 706 alternates between displaying hand gesture virtual object 1016 within snooze control virtual object 1020 and stop control virtual object 1024 based on time. In some embodiments, wearable device 706 displays hand gesture virtual object 1016 within snooze control virtual object 1020 for a predetermined amount of time (e.g., 0.3, seconds, 0.5 seconds, 1 second, 5 seconds, 15 seconds or 20 seconds). In some embodiments, after the predetermined amount of time has elapsed, wearable device 706 displays hand gesture virtual object 1016 within stop control virtual object 1024 for the predetermined amount of time. In some embodiments, after displaying hand gesture virtual object 1016 within stop control virtual object 1024 for the predetermined amount of time, wearable device 706 repeats the process (e.g., displays hand gesture virtual object 1016 in snooze control virtual object 1020 for the predetermined period of time and, after the predetermined period of time has elapsed, displays hand gesture virtual object 1016 within stop control virtual object 1024 for the predetermined amount of time). In some embodiments, wearable device 706 alternates between displaying hand gesture virtual object 1016 within snooze control virtual object 1020 and stop control virtual object 1024 based on wearable device 706 detecting a hand gesture. In some embodiments, wearable device 706 alternates between displaying hand gesture virtual object 1016 within snooze control virtual object 1020 or stop control virtual object 1024 in response to wearable device 706 detecting a hand gesture (e.g., a hand gesture that is represented by hand gesture virtual object 1016 and/or a hand gesture that is different than the hand gesture that is represented by hand gesture virtual object 1016). In some embodiments, wearable device 706 alternates between displaying hand gesture virtual object 1016 within snooze control virtual object 1020 and stop control virtual object 1024 based on wearable device 706 animating hand gesture virtual object 1016 as completing one rotation between hand gesture virtual object 1016 having the first appearance object 1016 and hand gesture virtual object 1016 having the second appearance. In some embodiments, wearable device 706 alternates between the display of hand gesture virtual object 1016 and a second hand gesture virtual object. In some embodiments, wearable device 706 only displays one of hand gesture virtual object 1016 or the second hand gesture virtual object at any given point in time. In some embodiments, hand gesture virtual object 1016 represents a first type of hand gesture (e.g., clench gesture, pinch gesture, and/or rotation gesture) and corresponds to a first control (e.g., stop control virtual object 1024 and/or snooze control virtual object 1020). In some embodiments, the second hand gesture virtual object represents a second type of hand gesture, that is different than the first type of hand gesture, and corresponds to a second control, that is different than the first control. In some embodiments, wearable device 706 alternates between the display of hand gesture virtual object 1016 and the second hand gesture virtual object on the basis of time (e.g., wearable device 706 displays hand gesture virtual object 1016 for a predetermined period of time and, after the predetermined period of time has elapsed, wearable device 706 displays the second hand gesture virtual object for the predetermined amount of time). In some embodiments, wearable device 706 alternates between the display of hand gesture virtual object and the second hand gesture virtual object in response to wearable device 706 detecting a hand gesture. In some embodiments, a hand gesture is an air gesture (e.g., as described above in relation to the description of input gestures).

At FIG. 10F, wearable device 706 ceases to display the word "stop" within stop control virtual object 1024 while wearable device 706 displays hand gesture virtual object 1016 within stop control virtual object 1024. Wearable device 706 redisplays the word "snooze" within snooze control virtual object 1020 while wearable device 706 displays hand gesture virtual object 1016 within stop control virtual object 1024 At FIG. 10F, hand gesture virtual object 1016 indicates that, while wearable device 706 displays hand gesture virtual object 1016 within stop control virtual object 1024, wearable device 706 will perform an operation that corresponds to stop control virtual object 1024 (e.g., stop the alarm) in response to wearable device 706 detecting that hand 1018 has performed a clench gesture.

Figure 10G:
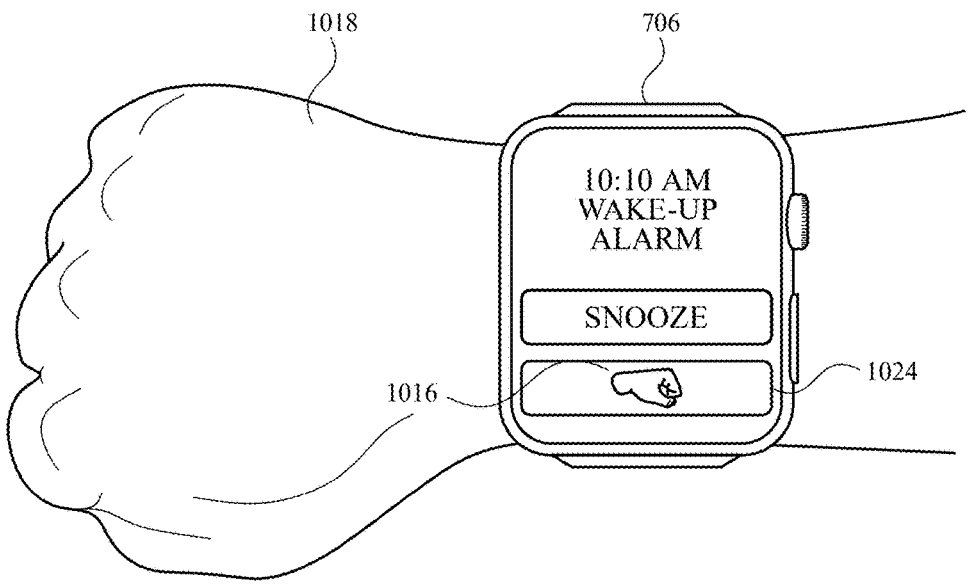

As illustrated in FIG. 10G, wearable device 706 displays hand gesture virtual object 1016 within stop control virtual object 1024 with the second visual appearance (e.g., a hand in the clenched position). As explained above, wearable device 706 displays hand gesture virtual object 1016 in a looping pattern between the first visual appearance (e.g., a hand in the unclenched position) and the second visual appearance (e.g., a hand in the clenched position). At FIG. 10G, wearable device 706 detects that hand 1018 has performed a clench gesture while wearable device 706 displays hand gesture virtual object 1016 within stop control virtual object 1024.

Figure 10H:
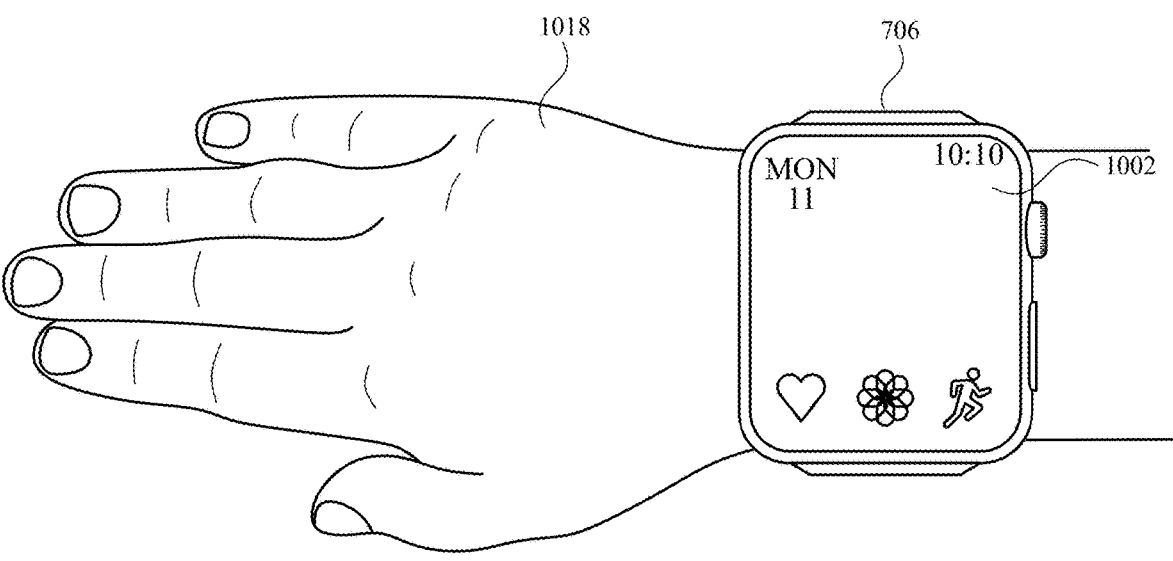

At FIG. 10H, in response to wearable device 706 detecting that hand 1018 has performed a clench gesture while wearable device 706 displays hand gesture virtual object 1016 within stop control virtual object 1024, wearable device 706 ceases to display alarm notification 804 and stops the alarm operation and wearable device 706 displays complication 1002.

Figure 10I:
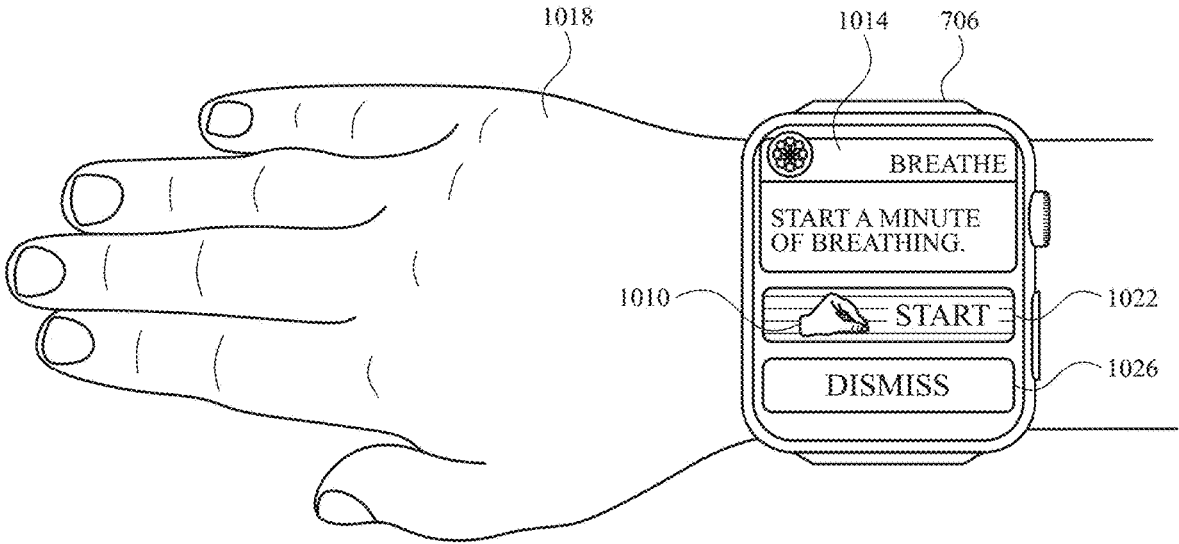

As illustrated in FIG. 10I, wearable device 706 displays meditation notification 1014 that is associated with a meditation application that is installed on wearable device 706. Meditation notification 1014 includes start control virtual object 1022 and dismiss control virtual object 1026. As illustrated in FIG. 10I, wearable device 706 displays hand gesture virtual object 1010 within start control virtual object 1022. Hand gesture virtual object 1010 includes the same features and characteristics as hand gesture virtual object 1016 as described above. However, hand gesture virtual object 1010 is representative of a pinch gesture. That is, wearable device 706 performs an operation that corresponds to start control virtual object 1022 (e.g., initiate a meditation exercise), in response to wearable device 706 detecting a pinch gesture while wearable device 706 displays hand gesture virtual object 1010 within start control virtual object 1022. As illustrated in FIG. 10I, wearable device 706 displays start control virtual object 1022 with a first color scheme (e.g., horizontal hatching). At FIG. 10I, start control virtual object 1022 is the default control (e.g., the control that the user has the option to select (e.g., via wearable device 706 detecting that the user has performed a pinch gesture)) when wearable device 706 initially displays meditation notification 1014. Wearable device 706 displays hand gesture virtual object 1010 within start control virtual object (e.g., and not dismiss control virtual object 1026) because start control virtual object 1022 is the default control for meditation notification 1014. Wearable device 706 displays default controls with a color scheme based on which application is associated with the notification. Because meditation notification 1014 is associated with the meditation application, wearable device 706 displays start control virtual object 1022 (e.g., the default control for media notification 1014) with the first color scheme. That is, wearable device 706 will display default controls that are included in notifications that are associated with the meditation application with the first color scheme. Wearable device 706 will display default controls that are included in notifications that are associated with other applications (e.g., e-mail application, text message application, or weather application) with a second color scheme that is different from the first color scheme.

Additional descriptions regarding FIGS. 10A-10I are provided below in reference to method 1100 described with respect to FIGS. 10A-10I.

FIGS. 11A-11B are flow diagrams of an exemplary method 1000 for activating virtual objects, in accordance with some embodiments. In some embodiments, method 1100 is performed at a computer system (e.g., 706) (e.g., a smartwatch, a smartphone, a desktop computer, a laptop, a tablet a heads-up display unit, a head-mounted display unit, an optical head-mounted display unit, and/or a wearable device) (e.g., computer system 101 in FIG. 1) including a display generation component (e.g., display generation component 120 in FIGS. 1, 3, and 4) (e.g., a heads-up display, a display, a touchscreen, a projector, etc.). In some embodiments, the method 1000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1000 are, optionally, combined and/or the order of some operations is, optionally, changed.

The computer system (e.g., 706) displays (1102), via the display generation component, a respective user interface (e.g., 804), wherein displaying the respective user interface includes concurrently displaying: a first control virtual object (1104) (e.g., 1020) that, when activated with a first type of input, causes the computer system (e.g., 706) to perform a first operation (e.g., cease the playback of an audio tone, initiate the playback of an audio tone, answer a phone call, decline a phone call, view a notification, and/or launch an application); a second control virtual object (e.g., 1106) (e.g., 1024) that, when activated with the first type of input, causes the computer system to perform a second operation different from the first operation (e.g., cease the playback of an audio tone, initiate the playback of an audio tone, answer a phone call, decline a phone call, view a notification, and/or launch an application); and a first virtual object (1108) (e.g., 1016 and/or 1010) (e.g., a visual indication (e.g., a graphic) (e.g., a looping animation) (e.g., the visual indication is displayed as part of the first control virtual object)) indicating that the first control virtual object can be activated in response to a second type of input being performed (e.g., detected), wherein the second type of input is not directed to a location in the respective user interface (e.g., when the first input is detected and/or performed) (e.g., an air pinch, a hand clench, hand swipe, movement of digits (e.g., one or more fingers and/or thumb) in air) (e.g., the virtual object includes an animation of a gesture being performed). In some embodiments, a second virtual object that indicates that a second control can be activated in response to a second input being detected is concurrently displayed along with the virtual object. In some embodiments, in response to detecting the first input, the virtual object ceases to be displayed. In some embodiments, displaying the virtual object replaces a description (e.g., a description of an operation that is associated with the first control virtual object) of the first control virtual object. In some embodiments, the first control virtual object and the virtual object are displayed in response to a change in orientation of the computer system (e.g., a wrist raise). In some embodiments, the first control virtual object and the virtual object are displayed in response to detecting a tactile input. In some embodiments, the first control virtual object and the virtual object are displayed in response to receiving a notification from an external device. In some embodiments, the virtual object and a description of the first control virtual object are displayed concurrently.

While displaying the first control virtual object, the computer system (e.g., 706) receives (1110) an indication (e.g., generated by the computer system) that a respective input has been performed (e.g., and/or detected) (e.g., an air pinch, a hand clench, hand swipe, movement of digits (e.g., one or more fingers and/or thumb), an air tap, tap, and/or mouse click).

In response to (1112) receiving the indication that the respective input has been performed (e.g., and/or detected) and in accordance with (1114) a determination that the respective input is the first type of input directed to the location that corresponds to the first control virtual object (e.g., 1020) (and/or in accordance with a determination that the second input is a direct input (e.g., an input that is directed to a location that corresponds to a virtual object)) (e.g., when the second input (e.g., a portion of the second input) was performed), the computer system initiates a process for performing the first operation (e.g., as described above in relation to FIG. 10C) and in accordance with (1116) a determination that the respective input is the first type of input directed to a location that corresponds to the second control virtual object (e.g., 1024) (and/or in accordance with a determination that the respective input is a direct input (e.g., an input that is directed to a location that corresponds to a virtual object)) (e.g., when the respective input (e.g., a portion of the respective input) was performed), the computer system initiates initiating a process for performing the second operation (e.g., as described above in relation to FIG. 10C) and in accordance with (1118) a determination that the respective input is the second type of input (and/or in accordance with a determination that the second input is a particular indirect input (e.g., an input that is not directed to a location that corresponds to a virtual object)) (e.g., when the second input (e.g., a portion of the second input) was performed), the computer system initiates the process for performing the first operation (e.g., as described above in relation to FIG. 10D). In some embodiments, in response to receiving the indication that the second input has been detected and in accordance with a determination that the second input is not the first input, the computer system does not initiate (e.g., forgoes) initiating the process for performing the first operation). In some embodiments, the second control virtual object and/or the virtual object ceases to be displayed in response to initiating the process for performing the second operation. In some embodiments, the first control virtual object and/or the virtual object ceases to be displayed in response to initiating the process for performing the first operation. In some embodiments, in response to receiving the indication that the second input has been detected and in accordance with a determination that the second input is a third input (e.g., an input that is not directed the location that corresponds to the first virtual object and an input that is different from the first input), the computer system does not initiate (e.g., forgoes initiating) the process for performing the first operation). Initiating a process for performing the first operation in response to receiving the indication that the respective input has been performed, wherein the respective input is the second type of input, provides the user with greater control over the computer system by allowing the user to control when the computer system performs the first operation without the user touching the computer system and without the computer system displaying additional controls, which provides additional control options without cluttering the user interface. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying a virtual object that indicates that the first control virtual object can be activated in response to a second type of input being performed provides the user with visual feedback regarding the type of gesture that is required to be performed such that the first control virtual object is activated, which provides improved visual feedback and can lead to more efficient control of the user interface for some users.

In some embodiments, while displaying the respective user interface (e.g., 804), the computer system (e.g., 706) displays an animation that alternates (e.g., transitions (e.g., transitions back and forth)) between displaying the first virtual object (e.g., 1016) and displaying a second virtual object (e.g., 1010) (e.g., either the first virtual object is displayed on the respective user interface or the second virtual object is displayed on the respective user interface at any given point in time), wherein the second virtual object indicates that the second control virtual object can be activated in response to a third type of input (e.g., pinch gestures, de-pinch gesture, air tap, and/or air swipe), and wherein the second type of input is different (e.g., correspond to a different gesture) from the third type of input (e.g., as discussed above in relation to FIG. 10F). In some embodiments, the first virtual object and the second virtual object are displayed at different locations on the respective user interface. In some embodiments, the first virtual object and the second virtual object are display at the same location on the respective user interface. In some embodiments, the second type of input is the same as the third type of input. Alternating between the display of the first virtual object and the second virtual object provides the user with visual feedback regarding the type of inputs that are required to activate a variety of controls the computer system is capable of performing, which provides improved visual feedback and can lead to more efficient control of the user interface for some users.

In some embodiments, alternating between the display of the first virtual object (e.g., 1016) and the display of the second virtual object (e.g., 1010) is performed on the basis of time (e.g., as described above in relation to FIG. 10F) (e.g., milliseconds, seconds, or minutes) (e.g., 0.1 seconds, 0.3 seconds, 0.5 seconds 1 second, 3, seconds, or 10 seconds) (e.g., the display of the first virtual object alternates with the display of the second virtual object after a predetermined amount of time has elapsed and vice versa (e.g., the first virtual object is displayed for a predetermined amount of time while the second virtual object is not displayed and after the predetermined amount of time has elapsed the first virtual object ceases to be displayed and the second virtual object is displayed for the predetermined amount of time)). Alternating between the display of the first virtual object and the display of the second virtual object on the basis of times provides the user with visual feedback regarding the type of input that is required to activate the first control virtual object and the type of input that is required to activate the second control virtual object, which provides improved visual feedback and can lead to more efficient control of the user interface for some users.

In some embodiments, alternating between the display of the first virtual object and the display of the second virtual object is performed based on the detection of (e.g., detecting via one or more sensors that in communication (e.g., wireless communication and/or wired communication) with the computer system) a first input (e.g., a hand input) (e.g., a gesture that corresponds to the second type of input and/or the third type of input) (e.g., the display of the first virtual object alternates with the display of the second virtual object in response to detecting a gesture) (e.g., as described above in relation to FIG. 10F). Alternating between the display of the first virtual object and the display of the second virtual object based on the detection of a first input provides the user with visual feedback regarding the state of the computer system (e.g., whether the computer system has detected a gesture), which provides improved visual feedback and can lead to more efficient control of the user interface for some users.

In some embodiments, displaying the first virtual object (e.g., 1016) includes displaying a second animation that alternates (e.g., on the basis of time) between a first location (e.g., a location that is within the boundary of the first virtual control object) that corresponds to the first control virtual object (e.g., 1020) and a second location (e.g., a location that is within the boundary of the second control virtual object) (e.g., the second location is different than the first location) that corresponds to the second control virtual object (e.g., 1024) (e.g., as described above in relation to FIG. 10F). In some embodiments, the computer system initiates a process for performing the second operation when the computer system receives the indication that the second type of input is performed while the first virtual object is displayed at the second location. In some embodiments, the computer system forgoes initiating a process for performing the first operation when the computer system receives the indication that the second type of input is performed while the first virtual object is displayed at the second location. Alternating the display of the first virtual object between a first location and a second location provides the user with the ability to activate at least two different controls without displaying additional controls, which provides additional control options without cluttering the user interface. Alternating the display of the first virtual object between a first location that corresponds to the first control virtual object and a second location that corresponds to the second control virtual object provides the user with more control over the operations that that computer system performs without touching the computer system, which can lead to more efficient control of the computer system for some users.

In some embodiments, while displaying the respective user interface, the computer system (e.g., 706) displays (e.g., concurrently with the first control virtual object, second control virtual object and/or the first virtual object), via the display generation component, a third virtual object (e.g., 1010) that indicates that the second operation can be activated in response to a fourth type of input (e.g., air tap gesture, air pinch gesture, air swipe gesture, and/or air de-pinch gesture), being performed, wherein the fourth type of input is not directed to a location in the respective user interface (e.g., as described above in relation to FIG. 10F). In some embodiments, the third virtual object is displayed concurrently with the first virtual object. In some embodiments, the computer system alternates between the display of the first virtual object and the third virtual object. In some embodiments, the fourth type of input is the same as the second type of input. In some embodiments, the fourth type of input is different than the second type of input. Displaying a third virtual object that indicates that the second operation can be activated in response to a fourth type of input (e.g., while the first virtual object is displayed) provides the user with visual feedback regarding the type of input that is required to be detected to activate both the first control virtual object and the second control virtual object, which provides improved visual feedback and can lead to more efficient control of the user interface for some users. Concurrently displaying the first virtual object with the third virtual object provides the user with greater control over the computer system by allowing the user to cause the computer system to perform either the first operation or the second operation without the user touching the computer system, which can lead to more efficient control of the computer system for some users.

In some embodiments, the first control virtual object (e.g., 1016) corresponds to a first default control option (e.g., as described above in relation to FIG. 10I) (e.g., a control that is preselected (e.g., by the computer system or by the manufacturer of the computer system) over other displayed controls as the default control) (e.g., a user can only initially select the default control and not other controls that are included in the respective user interface). In some embodiments, the second control virtual object corresponds to the default control option. Displaying a first virtual object that indicates that a default control object can be activated in response to performing a second type of input provides the user with visual feedback regarding which control virtual object is the default control option, which provides improved visual feedback and can lead to more efficient control of the user interface for some users.

In some embodiments, displaying the first virtual object (e.g., 1016) includes visually emphasizing the first control virtual object (e.g., 1020) (e.g., as described above in relation to FIG. 10D) (e.g., the first control virtual object is highlighted, and the second control virtual object is not highlighted) (e.g., the first control virtual object is displayed as a larger size than the second control virtual object). In some embodiments, the second control virtual object is visually emphasized when the first virtual object indicates that the second control virtual object can be activated in response to the second type of input. Displaying the first control virtual object as visually emphasized provides the user with visual feedback regarding which control will be activated in response to the second type of input being performed, which provides improved visual feedback and can lead to more efficient control of the user interface for some users.

In some embodiments, the respective user interface (e.g., 1014) corresponds to a first application (e.g., an e-mail application, a weather application, and/or a map application) (e.g., a third-party application previously installed on the computer system) (e.g., a default application (e.g., an application that is installed by the manufacturer of the computer system), and wherein the first control virtual object (e.g., 1022) is a second default virtual object (e.g., the preselected control virtual object that a user is provided the option of selecting upon the respective user interface initially being displayed) and is displayed with a first color scheme (e.g., 1022 at FIG. 10I) (e.g., the computer system displays the first control virtual object as filled in with one or more colors) (e.g., the computer system displays the first control virtual with a hatching of a first color). In some embodiments, after receiving the indication that the respective input has been performed, the computer system receives a request (e.g., one or more inputs (e.g., air tap, air swipe, air tap, swipe, and/or tap)) to display a second respective user interface. In some embodiments, in response to receiving the request to display the second respective user interface, the computer system displays, via the display generation component, the second respective user interface, wherein the second respective user interface corresponds to a second application (e.g., an e-mail application, a weather application, and/or a map application) (e.g., an application that is different from the first application) (e.g., stored on the computer system and/or an external device) that is different from the first application, and wherein displaying the second respective user interface includes displaying a third control virtual object, wherein the third control virtual object is the second default virtual object and is displayed with a second color scheme that is different than the first color scheme (e.g., the second color scheme includes different colors than the first color scheme) (e.g., as described above in relation to FIG. 10I). In some embodiments, displaying the second respective user interface causes the computer system to cease to display the first respective user interface. In some embodiments, the second respective user interface is displayed concurrently with the first respective user interface.

In some embodiments, displaying the first virtual object (e.g., 1016) includes displaying a graphical (e.g., an indication) representation of the second type of input (e.g., as described above in relation to FIGS. 10D and 10E) (e.g., the graphic depicts the second type of input). Displaying the first virtual object with a graphical representation of the second type of input provides the user with visual feedback regarding the gesture that needs to be detected to activate the first control virtual object, which provides improved visual feedback and can lead to more efficient control of the user interface for some users.

In some embodiments, displaying the first virtual object (e.g., 1016) includes displaying an animation representative of the second type of input (e.g., the first virtual object is displayed in a looping pattern that animates the second type of input) (e.g., as described above in relation to FIGS. 10D and 10E). Displaying an animation that is representative of the second type of input provides the user with visual feedback regarding the type gesture that needs to be detected such that the first control virtual object is activated, which provides improved visual feedback and can lead to more efficient control of the user interface for some users.

In some embodiments, the first virtual object (e.g., 1016) is displayed adjacent (e.g., next to, on top of, within, and/or touching) to the first control virtual object (e.g., 1020) (e.g., as described above in relation to FIG. 10D) (e.g., displaying the first control virtual object includes displaying a boundary (e.g., a continuous line and/or a dashed line) around the first control virtual object, and wherein the first virtual object is displayed within a threshold distance of the boundary (e.g., the first virtual object is displayed adjacent to the first virtual control object and/or the first virtual object is displayed within the boundary that surrounds the first control virtual object)). In some embodiments, the first control virtual object includes first information (e.g., text (e.g., text indicative of the first operation)) that is static, and the first control virtual object includes second information (e.g., the first virtual object) that is dynamic (e.g., the first virtual object is displayed in a looping animation). Displaying the first virtual object adjacent to the first control virtual object provides with user with visual feedback regarding which operation will be activated if the second type of input is detected, which provides improved visual feedback and can lead to more efficient control of the user interface for some users.

In some embodiments, the first type of input is a tap input (e.g., as described above in relation to FIG. 10C) (e.g., an air tap or an air pinch) (e.g., that is performed by the user) (e.g., a tap input directed to the display of the first control virtual object and/or the second control virtual object). In some embodiments, the first type of input is a non-tap input, such as a mouse click, swipe input, and/or press-and-hold input.

In some embodiments, displaying the respective user interface includes displaying a first complication (e.g., 1002) (e.g., a watch complication) with a first set of information (e.g., 1004a-1004c at FIG. 10A) (e.g., weather information event information, time information, date information, and/or exercise information). In some embodiments, after receiving the indication that the respective input has been performed, the computer system (e.g., 706) receives an indication (e.g., an indication that is generated by the computer system) that a second respective input (e.g., clench gesture, hand rotation, and/or unclench gesture) has been performed (e.g., performed by the user). In some embodiments, in response to receiving the indication that the second respective input has been performed (e.g., while the second respective input is being performed), the computer system updates the display of the first complication to include a second set of information (e.g., 1004a-1004d at FIG. 10B) (e.g., the complication concurrently includes the first set of information and the second set of information) (e.g., weather information event information, time information, date information, and/or exercise information) that is different from the first set of information. In some embodiments, updating the display of the first complication to include the second set of information includes moving the display location of the first set of information. In some embodiments, the second set of information ceases to be displayed after the computer receives an indication that the respective input is no longer being performed. In some embodiments, the display of the of complication is updated while the first operation and/or the second operation is performed. Updating the display of the first complication to include the second set of information in response to receiving an indication that the second respective input has been performed provides a user with control over the amount of information that the computer system displays without displaying additional controls, which provides additional control options without cluttering the user interface.

In some embodiments, in accordance with a determination that the first control virtual object (e.g., 1020) is in focus (e.g., the first control virtual object is displayed as visually emphasized (e.g., displayed as a larger than the second control virtual object, displayed with a different color than the second control virtual object, e.g., displayed with a border)) (e.g., the first control virtual object is the preferred control and/or the primary control), displaying the first virtual object includes displaying the first virtual object (e.g., 1016) adjacent to the first control virtual object (e.g., as described above in relation to FIG. 10D) (e.g., the first virtual object is not displayed next to the second control virtual object). In some embodiments, in accordance with a determination that the second control virtual object (e.g., 1024) is in focus (e.g., the second control virtual object is the preferred control and/or the primary control), displaying the first virtual object includes displaying the first virtual object adjacent to the second control virtual object (e.g., the first virtual object is not displayed next to the first control virtual object) (e.g., as described above in relation to FIG. 10D). In some embodiments, in accordance with a determination that the first control virtual object is in focus, the first virtual object is displayed within a boundary of the first control virtual object. In some embodiments, when neither the first virtual control object nor the second virtual control object is in focus, the first virtual object is displayed not adjacent to both the first virtual control object and the second virtual control object. In some embodiments, when neither the first virtual control object nor the second virtual control object is in focus, the first virtual object is displayed adjacent to both the first virtual control object and the second virtual control object. Displaying the first virtual object next to either the first control virtual object or the second control virtual object when a set of prescribed conditions are satisfied allows the computer system to automatically indicate to the user which control virtual object is in focus, which performs an operation when a set of conditions has been met without requiring further user input. Displaying the first virtual object next to the control virtual object that is in focus provides the user with visual feedback with respect to which control virtual object is the default/primary option, which provides improved visual feedback and can lead to more efficient control of the user interface for some users.

In some embodiments, the respective user interface is displayed in response to receiving a request to connect to an external device (e.g., a telephone, and/or external computer system that is separate from the computer system) (e.g., the respective user interface is displayed in response receiving a phone call). In some embodiments, in accordance with a determination that the respective input is the second type of input (e.g., a clench gesture, a pinch gesture, and/or a rotation gesture) and in accordance with a determination that the respective input is being performed, initiating the process for performing the first operation includes connecting to the external device (e.g., as described above in relation to FIG. 7F) (e.g., answering a phone call). In some embodiments, performing the first operation also includes displaying an animation of the first control virtual object (e.g., activation of the first control virtual object) expanding from the first size to a second size that is different from the first size. Connecting to the external device in response to receiving the indication that the respective input has been performed provides a user with the ability to answer a phone call without displaying additional controls, which provides additional control options without cluttering the user interface.

In some embodiments, the first control virtual object (e.g., 806 at FIG. 8A) is displayed at a third location on the respective user interface and the second control virtual object (e.g., 808 at FIG. 8A) is displayed at a fourth location (e.g., that is different than the first location) on the respective user interface. In some embodiments, while displaying the first control virtual object at the third location on the respective user interface and the second control virtual object at the fourth location on the respective user interface, the computer system (e.g., 700) receives an indication (e.g., generated by the computer system) (e.g., generated by the wearable device) that a clench gesture has been performed (e.g., by the user) (e.g., by the hand on which the wearable device is being worn). In some embodiments, in response to receiving the indication the clench gesture has been performed, the computer system displays the first control virtual object at a fifth location (e.g., 806 at FIG. 8B) (e.g., that is different from the third location) (e.g., that is horizontally displaced from the third location) on the respective user interface and the computer system displays the second control virtual object (e.g., 808 at FIG. 8B) at a sixth location (e.g., that is different from the fourth location) (e.g., that is horizontally displaced from the third location) on the respective user interface. In some embodiments, while displaying the first control virtual object at the fifth location on the respective user interface and displaying the second control virtual object at the sixth location on the respective user interface, the computer system receives an indication (e.g., generated by the computer system) (e.g., generated by the wearable device) that the computer system has been tilted (e.g., tilted relative to the ground) (e.g., e.g., tilted upwards away from the ground and/or tilted downwards towards the ground). In some embodiments, in response to receiving the indication that the computer system has been tilted and in accordance with a determination that the computer system has been titled in a first direction, the computer system displays the first control object at the third location on the respective user interface (e.g., 806 at FIG. 8C) (e.g., animating the first control virtual object as sliding from the fifth location to the third location) (e.g., maintaining the display of the second control object at the sixth location on the respective user interface) and in accordance with a determination that the computer system has been tilted in a second direction, different from first direction, the computer system displays (e.g., animating the second control object as sliding from the sixth location to the fourth location) the second control object at the second location on the respective user interface (e.g., as described above in relation to FIGS. 8A-8C) (e.g., and maintaining the display of the first control object at the fifth location). Moving the display of the first control object in response to receiving an indication that the computer system has been tilted allows the user to modify a display operation of the computer system without displaying additional controls, which provides additional control options without cluttering the user interface. Moving the display of the first control object in response to receiving an indication that the computer system has been tilted helps the user navigate the user interface without touching the computer system, which can lead to more efficient control of the user interface for some users.

In some embodiments, aspects/operations of methods 900, 1300, and 1500 may be interchanged, substituted, and/or added between these methods. For example, the hand gestures used to activate virtual objects in method 1100 may be used to activate virtual objects displayed as a part of method 900. For brevity, these details are not repeated here.

FIGS. 12A-12E illustrate examples of displaying information. FIG. 13 is a flow diagram of an exemplary method 1300 for displaying information. The user interfaces in FIGS. 12A-12E are used to illustrate the processes described below, including the processes in FIG. 13.

Figure 12A:
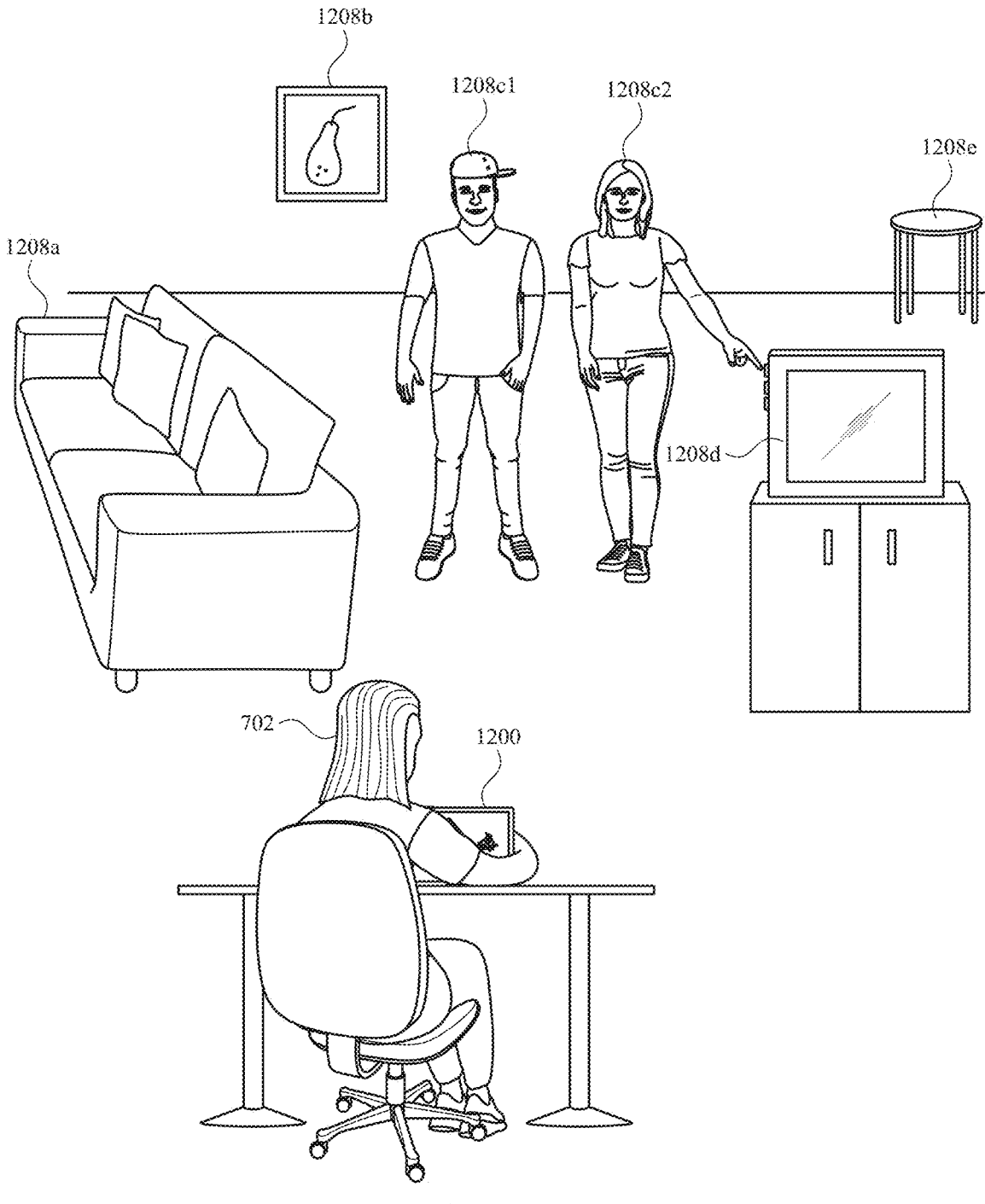
Figure 14A:
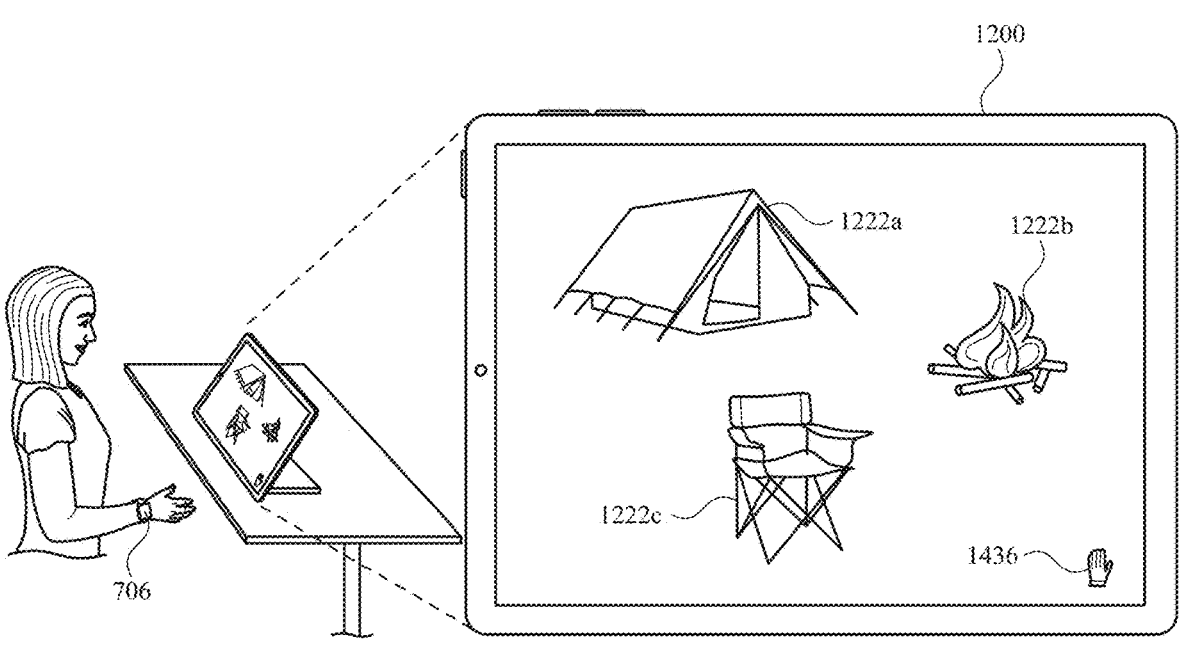
FIGS. 14A-14G illustrate example techniques for manipulating the display of virtual objects, in accordance with some embodiments.

FIG. 12A illustrates user 702 sitting at a table with computer system 1200 resting on the table. User 702 and computer system 1200 are positioned within a physical environment (e.g., a room in a home). The physical environment includes couch 1208*a*, picture 1208*b*, first individual 1208*c*1, second individual 1208*c*2, television 1208*d*, and table 1208*e*. Computer system 1200 is in communication (e.g., wired communication and/or wireless communication) with one or more cameras. The one or more cameras that are in communication with computer system 1200 have a field of view such that couch 1208*a*, picture 1208*b*, user 702, first individual 1208*c*1, and second individual 1208*c*2 are within the field of view of the one or more cameras that are in communication with computer system 1200 (e.g., the one or more cameras that are in communication with computer system 1200 are integrated into the front side of computer system 1200 (e.g., facing user 702) and/or integrated into the back side of computer system 1200 (e.g., facing the physical environment). As illustrated in FIG. 14A, computer system 1200 is a tablet. However, it should be understood that the depiction of computer system 1200 as a tablet is merely exemplary. In some embodiments, computer system 1200 is one or more other devices, such as a handheld device (a smart phone) and/or a display generation component of an HMD. In embodiments when computer system 1200 is a display generation component of an HMD, wearable device 706 transmits display instructions to the HMD in response to wearable device 706 detecting one or more hand gestures (e.g., one or more air gestures or inputs on hardware or touch-sensitive input elements of the HMD). In some embodiments, computer system 1200 includes a transparent display where representation of physical environment 1230 is visible because light can "pass through" the transparent display (e.g., like a pair of glasses). In some embodiments, couch 1208*a*, picture 1208*b*, user 702, first individual 1208*c*1, and second individual 1208*c*2 are within the viewpoint of the user, such that each of these subjects could be visible through the display of computer system 1200 when computer system 1200 is not displaying one or more virtual objects and/or one or more portions of an XR user interface over these subjects. For ease of discussion, the following description below will describe FIGS. 12C-12E with respect to computer system 1200 displaying representation of physical environment 1230 based on receiving visual content that is being captured by one or more cameras that are in communication with computer system 1200.

At FIG. 12A, the right hand (e.g., hand 1212 as indicated in FIG. 12B below) of user 702 is positioned on the backside of computer system 1200 and is within the field of view of the one or more rear-facing cameras that are in communication with computer system 1200. The right hand of user 702 includes wearable device 706 (e.g., as described above in relation to FIGS. 7A-7F). Wearable device 706 is in communication (e.g., wireless communication (Bluetooth communication, ultrawide band communication, near field communication) and/or wired communication) with computer system 1200. As illustrated in FIG. 12A, computer system 1200 is a tablet. In some embodiments, computer system 1200 is one or more other devices, such as a handheld device (e.g., a smart phone), laptop, and/or a head-mounted device. In some embodiments, computer system 1200 includes one or more components of computer system 101.

As illustrated in FIG. 12B, computer system 1200 displays user interface 1210, which is an XR user interface that is overlaid a representation of the physical environment. As illustrated in FIG. 12B, user interface 1210 includes tent virtual object 1222*a*, fire virtual object 1222*b*, and chair virtual object 1222*c*. In some embodiments, user interface 1210 is displayed from an immersive perspective (e.g., the content included in user interface 1210 is presented from a plurality of perspectives in response to detected changes in the orientation/location of computer system 1200). In some embodiments, computer system 1200 updates the content of user interface 1210 based on the positioning and/or orientation of computer system 1200 (e.g., computer system 1200 displays additional content and/or removes content in response to computer system 1200 being moved in a particular direction). In some embodiments, user interface 1210 is not overlaid on a representation of the physical environment because computer system 1200 is not displaying the representation of the physical environment. In some embodiments, user interface 1210 includes a transparent display, and user interface 1210 is overlaid on a portion of the physical environment that pass-through the transparent display of computer system 1200.

FIGS. 12B-12E includes an enlarged representation of hand 1212 (e.g., top portion of FIGS. 12B-12E) and wearable device 706. The enlarged representation of hand 1212 is provided in FIGS. 12B-12E a visual aid to illustrate the positioning and orientation of hand 1212 (e.g., the right hand of user 702) at a particular instance in time. As illustrated in FIG. 12B, wearable device 706 displays complication 1002 (e.g., as described above in relation to FIG. 10A).

As illustrated in FIG. 12C, wearable device 706 displays user interface 1224 that indicates that user 702 is receiving a phone call. In some embodiments, wearable device 706 is in communication with an external device (e.g., a smart phone). In some embodiments, in response to receiving instructions from the external device to display user interface 1224, wearable device 706 displays user interface 1224. In some embodiments, wearable device 706 displays user interface 1224 in response to receiving instructions from computer system 1200 to display user interface 1224.

At FIG. 12C, wearable device 706 detects that hand 1212 has performed a clench gesture (e.g., as illustrated by hand 1212). In response to receiving an indication (e.g., from wearable device 706) that hand 1212 has performed a clench gesture, computer system 1200 ceases to display a portion of user interface 1210 and displays representation of physical environment 1230 in the place of the portion of user interface 1210 (e.g., representation of physical environment 1230 "breaks through" the display of user interface 1210). Representation of physical environment 1230 includes image data that is captured by the one or more cameras that are in communication with computer system 1200. At FIG. 12C, representation of physical environment 1230 is an actual representation of the physical environment that is being captured by the one or more cameras of computer system 1200. That is, representation of physical environment 1230 is a live feed (e.g., and/or a delayed feed) from the one or more cameras of computer system 1200. As illustrated in FIG. 12C, the representation of physical environment includes wearable device 706 that is in the field-of-view of the one or more cameras of computer system 1200. In some embodiments, computer system 1200 displays a respective virtual object that corresponds to a portion of the physical environment that is included in representation of the physical environment 1230. In some embodiments, the respective virtual object is a virtual representation (e.g., not an actual representation of the portion of the physical environment) that is included in representation of the physical environment 1230. In some embodiments, the respective virtual object is one or more graphical objects (e.g., an avatar, an avatar of wearable device 706, an avatar wearing wearable device 706, text (e.g., time displayed on wearable device 706 and/or information concerning the incoming call) that indicate one or more subjects (e.g., objects, people, animals, and/or items) in the representation of the physical environment 1230. In some embodiments, the respective virtual object is dynamic (e.g., changing as one or more representative objects and/or the physical environment changes). In some embodiments, the respective virtual object is static (e.g., not changing as one or more representative objects and/or the physical environment changes). As discussed above in relation to FIG. 12A, in some embodiments, computer system 1200 includes a transparent display where representation of physical environment 1230 is visible because light can "pass through" the transparent display (e.g., like a pair of glasses). Thus, in some of these embodiments, computer system 1200 does not display the representation of physical environment 1230; rather, representation of physical environment 1230 is visible through the display of computer system 1200. In some embodiments, computer system 1200 allows the physical environment that is included in representation of the physical environment 1230 (e.g., as illustrated in FIG. 12C) to be visible in response to receiving the indication that hand 1212 has performed a clench gesture. Thus, in some embodiments, the portion of the physical environment that is allowed to be visible (e.g., in response to receiving the indication that hand 1212 has performed a clench gesture) breaks through the XR user interface (e.g., user interface 1210) and/or a portion of the XR user interface.

As illustrated in FIG. 12C, computer system 1200 displays representation of physical environment 1230, such that representation of physical environment 1230 obscures chair virtual object 1222c and a portion of fire virtual object 1222b. However, while displaying representation of physical environment 1230, other portions (e.g., 1220a) of user interface 1210 are visible on the display of computer system 1200. Thus, in some embodiments, computer system 1200 displays representation of physical environment 1230 concurrently with one or more portions of an XR user interface that were displayed before representation of physical environment 1230 was displayed. In some embodiments, the representation of wearable device 706 that is included in representation of physical environment 1230 includes respective information that was most recently displayed by wearable device 706 (e.g., and not currently displayed by wearable device 706). In some embodiments, the respective information is displayed within a control user interface portion that is overlaid on the display of computer system 1200. In some embodiments, the control user interface portion includes one or more selectable virtual objects. In some embodiments, in response to detecting selection of the one or more selectable virtual objects, computer system 1200 performs one or more respective operations (e.g., adjusts the volume of audio output, launches a camera application, and/or modifies (e.g., pause, or play) the playback status of a media item). In some embodiments, computer system 1200 displays representation of physical environment 1230 in response to receiving an indication that wearable device 706 detects that user 702 is double clenching (e.g., and/or has performed a double clench gesture). In some embodiments, computer system 1200 displays representation of physical environment 1230 in response to computer system 1200 detecting (e.g., by the one or more cameras that are in communication with computer system 122) a hand gesture (e.g., a single clench gesture, a double clench gesture, a de-pinch gesture, and/or an unclench gesture) and/or an air gesture. In some embodiments, representation of physical environment 1230 includes a virtual representation (e.g., a virtual object) of wearable device 706 (e.g., and not an actual representation of wearable device 706), a virtual representation of hand 1212, and a virtual representation of the information that is displayed by wearable device 706. In some embodiments, computer system 1200 ceases to display the virtual representation of wearable device 706 and maintains the display of the virtual representation of hand 1212 in response to receiving an indication that wearable device 706 detects that hand 1212 has performed an air gesture. In some embodiments, the display of representation of physical environment 1230 obscures the display of tent virtual object 1222a, fire virtual object 1222b, and chair virtual object 1222c. In some embodiments, representation of physical environment 1230 includes a virtual representation of wearable device 706 on a virtual representation of the wrist of user 702.

The positioning of representation of physical environment 1230 on computer system 1200 is based on at least the positioning of wearable device 706 (e.g., as tracked by the one or more cameras that are in communication with computer system 1200). At FIG. 12C, computer system 1200 detects (e.g., the one or more cameras that are in communication with computer system 1200) that wearable device 706 is positioned in front of the lower, right corner of computer system 1200. Because computer system 1200 detects that wearable device 706 is positioned in front of the lower, right corner of computer system 1200, computer system 1200 displays representation of physical environment 1230 in the lower, right corner of the display of computer system 1200. At FIG. 12C, computer system 1200 detects that wearable device 706 has moved such that wearable device 706 is positioned in front of the lower left hand corner of computer system 1200. In some embodiments, computer system 1200 detects that the wearable device has moved via one or more cameras that are in communication with computer system 1200. In some embodiments, computer system 1200 detects that the wearable device has moved based on receiving information (e.g., location information) from the wearable device.

As illustrated in FIG. 12D, in response to detecting that wearable device 706 has moved (e.g., to being positioned in front of the lower left hand corner of computer system 1200), computer system 1200 moves representation of physical environment 1230 to the lower left hand corner of the display of computer system 1200 (e.g., from the position that it was displayed in at FIG. 12C). As explained above, the positioning (e.g., location) of representation of physical environment 1230 is based at least on the detected (e.g., by the one or more cameras that are in communication with computer system 1200) location of wearable device 706 in the physical environment. In some embodiments, computer system 1200 moves the representation of the physical environment 1230 in response to detecting that computer system 1200 has moved. In some embodiments, computer system 1200 moves the representation of the physical environment 1230 in response to detecting that computer system 1200 and wearable device 706 have moved. In some embodiments, computer system 1200 does not move the representation of the physical environment 1230 in response to detecting that computer system 1200 and wearable device 706 has moved.

At FIG. 12D, representation of physical environment 1230 includes a portion of the physical environment that is different that the portion of the physical environment that is included in representation of physical environment 1230 in FIG. 12C. At FIG. 12D, because computer system 1200 detects that wearable device 706 is positioned in front of the lower left hand corner of computer system 1200, representation of physical environment 1230 includes a portion of the left side of the physical environment (e.g., described in FIG. 12A) instead of the right side of the physical environment. In some embodiments, representation of physical environment 1230 is a representation of a virtual environment (e.g., such as a home environment inside of a virtual world) and not a representation of the physical environment that is visible from the viewpoint of computer system 1200 and/or a representation that is being captured by one or more cameras that are in communication with computer system 1200. In some embodiments, the representation of the virtual environment is displayed over a portion of user interface 1210 (e.g., using one or more similar techniques as described herein in relation to representation of physical environment 1230). In some embodiments, the representation of the virtual environment is an actual representation of the virtual environment. In some embodiments, the representation of the virtual environment is not an actual representation of the virtual embodiments but includes one or more characteristics and/or information concerning the virtual environment.

At FIG. 12D, computer system 1200 increases the size of representation of physical environment 1230, such that representation of physical environment 1230 is larger than representation of physical environment 1230 of FIG. 12C. In some embodiments, computer system 1200 increases (e.g., gradually increases) the size of representation of physical environment 1230 over a predetermined period of time (e.g., 1-30 seconds). At FIG. 12D, wearable device 706 detects that hand 1212 has performed an unclench gesture (e.g., is back in the neutral position). As illustrated in FIG. 12D, in response receiving an indication that hand 1212 has performed an unclench gesture, computer system 1200 continues to display representation of physical environment 1230. In some embodiments, computer system 1200 ceases to display representation of physical environment 1230 in response to receiving the indication that hand 1212 has performed an unclench gesture.

At FIG. 12E, wearable device 706 detects that hand 1212 has performed a clench gesture. As illustrated in FIG. 12E, in response to receiving an indication that hand 1212 has performed a clench gesture, computer system 1200 ceases to display representation of physical environment 1230. Notably, the portions (e.g., chair virtual object 1222c) of user interface 1210 that were obstructed by the representation of the physical environment 1230 in FIG. 12D are visible in FIG. 12E because the representation of the physical environment 1230 is no longer displayed at FIG. 12E. In some embodiments, computer system 1200 displays representation of physical environment 1230 and ceases to display representation of physical environment 1230 in response to receiving an indication that the same type (or, in other embodiments, a different type) of gesture (e.g., clench gesture) has been detected by wearable device 706. In some embodiments, in response to receiving the indication that hand 1212 has performed a clench gesture, computer system 1200 gradually ceases to display representation of physical environment 1230. In some embodiments, computer system 700 gradually decreases the size of the representation of physical environment 1230 before ceasing to display representation of physical environment 1230.

Additional descriptions regarding FIGS. 12A-10E are provided below in reference to method 1300 described with respect to FIGS. 12A-12E.

FIG. 13 is a flow diagram of an exemplary method 1300 for displaying information, in accordance with some embodiments. In some embodiments, method 1100 is performed at a computer system (e.g., 1200) (e.g., a smartwatch, a smartphone, a desktop computer, a laptop, a tablet a heads-up display unit, a head-mounted display unit, an optical head-mounted display unit, and/or a wearable device) (e.g., computer system 101 in FIG. 1) including a display generation component (e.g., display generation component 120 in FIGS. 1, 3, and 4) (e.g., a display controller, a touch-sensitive display system; a display (e.g., integrated and/or connected), a 3D display, a transparent display, a projector, a heads-up display, and/or a head-mounted display). In some embodiments, the computer system is in communication with an external device (e.g., an external device (e.g., a device that is separate from the computer system) (e.g., a smartwatch), (e.g., a wearable device and/or another device being worn by the user (e.g., on the body of the user) of the computer system). In some embodiments, the computer system is in communication with one or more input devices (e.g., a touch-sensitive surface). In some embodiments, the method 1300 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1300 are, optionally, combined and/or the order of some operations is, optionally, changed.

While displaying, via the display generation component, an extended reality environment (e.g., 1210) that includes a virtual object (e.g., 1222*a*-1222*c*) that obscures at least a first portion of a physical environment that includes a wearable device (e.g., 706) (e.g., an external device (e.g., a device that is separate from the computer system) (e.g., a smartwatch), (e.g., a wearable device and/or another device being worn by the user (e.g., on the body of the user) of the computer system)), the computer system (e.g., 1200) receives (1302) an indication (e.g., generated by the computer system) that a first hand input was performed by a hand on which the wearable device is being worn (e.g., via a set of one or more sensors (e.g., a gyroscope, an accelerometer, a heart rate sensor, or the like) integrated into the wearable device) (e.g., as described above in relation to FIG. 12C), wherein the first hand input includes movement of one or more digits (e.g., fingers and/or thumb) of a hand relative to a portion the hand (e.g., palm and/or wrist) (e.g., a clench of the user's hand, a snap of one or more of the user's digits, and/or pinch of the user's digits).

In response to receiving the indication that the hand input has been performed by the hand on which the wearable device is being worn, the computer system displays (1304) (e.g., displaying within the augmented reality environment user interface), via the display generation component, information (e.g., 1230 in FIGS. 12C and 12D) (e.g., information relating to the current state of the external device) (e.g., information relating to data (e.g., notifications from third party applications, messages (e.g., text messages, e-mail messages)) received by the external device from other external devices, and/or alerts generated by the external device) about the wearable device (e.g., 706) (e.g., as described above in relation to FIGS. 12C and 12D) (e.g., on the augmented reality user interface). In some embodiments, displaying the information includes displaying a depiction of the physical environment of where the computer system is presently located. In some embodiments, in response to displaying the information about the wearable device, a portion of the augmented reality environment user interface ceases to be displayed. In some embodiments, the information is overlaid on top of the augmented reality environment user interface. In some embodiments, displaying the information includes displaying a representation of a body part (e.g., the wrist of the user) of the user. In some embodiments, in response to not receiving the indication that the hand input has been performed, forgoing displaying the virtual object that includes information about the external device. In some embodiments, the information about the external device is overlaid on a representation of a portion of the environment. Displaying information about the wearable device in response to receiving an indication that the hand input has been performed by the hand on which the wearable device is being worn provides the user with greater control over the computer system by allowing the user to control what information is displayed by the computer system without the user touching the computer system and without the computer system displaying additional controls, which provides additional control options without cluttering the user interface. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying information about the wearable device provides the user with visual feedback regarding the state of the computer system (e.g., the computer system has received the indication that the hand input has been performed by the hand on which the wearable device is being worn), which provides improved visual feedback and can lead to more efficient control of the user interface for some users.

In some embodiments, displaying the information about the wearable device (e.g., 1230) includes ceasing to display at least a portion of the virtual object (e.g., 1222*a*, 1222*b*, and/or 1222*c*) (e.g., displaying the information about the wearable device includes "breaking through" (e.g., ceasing to display a portion of the extended reality environment and displaying the information about the wearable device in place of the portion of the extended reality environment that is no longer visible) a portion of the extended reality environment). Ceasing to display at least a portion of the virtual object while information about the wearable device is displayed provides the user with visual feedback by allowing the user to simultaneously view the information about the wearable device while viewing at least a portion of the virtual object, which provides improved visual feedback and can lead to more efficient control of the user interface for some users.

In some embodiments, ceasing to display the portion of the virtual object (e.g., 1222*a*-1222*c* at FIG. 12C) causes the first portion of the physical environment to be visible (e.g., 1230 at FIG. 12C) (e.g., the portion of the physical environment is not obscured by the virtual user interface object any longer) (e.g., displaying the information about the wearable device includes displaying a real-time representation of at least a portion of the physical environment). In some embodiments, the first portion of the physical environment that is visible after ceasing to display the portion of the virtual project is updated in response to the location of the wearable device in the physical environment changing (e.g., the portion of the physical environment that is visible depends on the location of the wearable device). Having the first portion of the physical environment be visible provides the user with visual feedback with respect to the physical environment that surrounds the user which allows to user to navigate safely within the physical environment, which provides improved visual feedback and can lead to more efficient control of the user interface for some users. Having the first portion of the physical environment be visible in response to receiving the indication that the hand input has been performed allows the user to control when various portions of the physical environment are visible and when various portions physical environment are not visible without displaying additional controls, which provides additional control options without cluttering the user interface.

In some embodiments, before ceasing to display the portion of the virtual object, a second portion of the physical environment, that is different (e.g., the second portion of the physical environment is representative of a different area of the physical environment) than the first portion of the environment than the first portion of the physical environment, is not visible, and wherein after ceasing to display the portion of the virtual object, the second portion of the physical environment is not visible (e.g., as described above in relation to FIGS. 12C-12D). In some embodiments, the content within the second portion of the physical environment overlaps with content that is within the first portion of the physical environment.

In some embodiments, while displaying the information about the wearable device (e.g., 1230), the computer system (e.g., 1200) receives an indication (e.g., an indication that is generated by the computer system) (e.g., received from an external computer system) of a location of the hand (e.g., 1212) on which the wearable device (e.g., 706) is being worn (e.g., the indication of the location of the hand on which the wearable device is being worn is detected via, one or more cameras that are integrated into the computer system, one or more cameras that are external to the computer system, and/or one or more sensors that are integrated into the wearable device) (e.g., the location of the hand on which the wearable device is being worn corresponds to the location of the wearable device). In some embodiments, in response to receiving the indication of the location of the hand (e.g., 1212) on which the wearable device is being worn and in accordance with a determination that the location of the hand on which the wearable device is being worn is at a first location (e.g., a first location in the physical environment), the computer system (e.g., 1200) displays the information about the external device includes displaying the information at a second location in the extended reality environment that corresponds to the first location (e.g., the first location and the second location have a spatial relationship (e.g., as the first location changes within the physical environment, the second location changes correspondingly)) and in accordance with a determination that the location of the hand on which the wearable device is being worn is at a third location (e.g., a different location in the physical environment than the first location), the computer system the information about the external device includes displaying the information at a fourth location (e.g., different from the second location) in the extended reality environment that corresponds to the third location (e.g., as described above in reference to FIGS. 12C and 12D). (e.g., the display of the information about the wearable device is dependent on the location of the wearable device (e.g., user's hand) in the physical environment). In some embodiments, the indication of the location of the hand on which the wearable device is being worn is received while the first hand input is being performed. Displaying the information about the external device at a particular location in the extended reality environment that corresponds to a location of the users hand in the physical environment when a set of prescribed conditions are met allows the computer system to automatically display the information at a location in the extended reality environment that is of interest to the user and allows the computer system to automatically display the information at a convenient location such that the user may easily view and analyze the information, which performs an operation when a set of conditions has been met without requiring further user input.

In some embodiments, in accordance with a determination that the location of the hand on which the wearable device is being worn is at the first location (e.g., a first location in the physical world), displaying the information (e.g., 1230) includes displaying the information as changing from a first size (e.g., size of 1230 at FIG. 12C) (e.g., 0.25 inch diameter, 0.5 inch diameter, or 1 inch diameter) to a second size (e.g., size of 1230 at FIG. 12D) (e.g., 0.75 inch diameter, 1.25 inch diameter, or 2 inch diameter) (e.g., the size of the display of the information increases from the first size to the second size) (e.g., the diameter of the circle that the information is displayed gradually increases) over a first amount of time (e.g., 1 second, 3 seconds, or 5 seconds) at the second location in the extended reality environment (e.g., the location of second location in the extended reality environment corresponds to the location of first location). In some embodiments, in accordance with a determination that the location of the hand on which the wearable device is being worn is at the third location (e.g., a third location in the physical world), displaying the information includes displaying the information as changing from the first size (e.g., size of 1230 at FIG. 12C) to the second size (e.g., size of 1230 at FIG. 12D) over the first amount of time at the fourth location in the extended reality environment (e.g., the location of fourth location in the extended reality environment corresponds to the location of third location). In some embodiments, the information is displayed as changing from the first size to a second size at a plurality of locations in the extended reality environment in response to the hand on which the wearable device is being worn moving within the physical environment. Displaying the information as changing from a first size to a second over an amount of time at a location in the extended reality environment based on the location of the wearable device allows the computer system to automatically display the information at a location in the extended reality environment that is of interest to the user such that the user may easily view and analyze the information, which performs an operation when a set of conditions has been met without requiring further user input. Displaying the information as changing size from the first size to the second size provides the user with visual feedback regarding the state of the computer system (e.g., the computer system has received the indication that the hand input has been performed by the hand on which the wearable device is being worn), which provides improved visual feedback and can lead to more efficient control of the user interface for some users.

In some embodiments, the information about the wearable device is a virtual representation of the wearable device (e.g., as discussed above in relation to FIG. 12C) (e.g., the information includes an avatar of the wrist of the user and a digital representation of the wearable device).

In some embodiments, the information includes one or more notifications (e.g., 1224 at FIG. 12C) (e.g., a notification that is received by wearable device from an external device), (a notification that is generated by a third-party application that is installed on the wearable device, and/or a notification that is generated by a non-third-party application (e.g., an application that is initially installed on the wearable device by the manufacturer) that is installed on the wearable device) that correspond to the wearable device (e.g., as described above in relation to FIG. 12C) (e.g., the information includes a notification that was more recently received by the wearable device) (e.g., the information mimics one or more notifications that are displayed by the wearable device in the physical environment). Displaying one or more notifications that corresponds to the wearable device provides the user with visual feedback regarding the operating state of the wearable device (e.g., whether the wearable device has recently received a notification), which provides improved visual feedback and can lead to more efficient control of the user interface for some users.

In some embodiments, the information (e.g., 1230 at FIGS. 12C and 12D) is displayed on a representation (e.g., a digital representation of the wrist and/or an optical representation of the wrist) of a wrist of the hand (e.g., 1212) (e.g., a wrist of the hand of the user) on which the wearable device (e.g., 706) is being worn. In some embodiments, the information is displayed on a digital representation of the wearable device and the representation of the wearable device is displayed on the representation of the wrist of the hand. Displaying the information on a representation of a wrist of the hand on which the wearable device is being worn provides the user with visual feedback regarding the positioning of the information relative to the positioning of the user's hand, which provides improved visual feedback and can lead to more efficient control of the user interface for some users.

In some embodiments, in response to receiving the indication that the hand input was performed by the hand (e.g., 1212) on which the wearable device (e.g., 706) is worn, the computer system (e.g., 1200) displays a control user interface (e.g., a user interface that includes a plurality of selectable virtual objects (e.g., selection of a respective selectable virtual object of the plurality of selectable virtual objects causes the computer system to perform a respective operation (e.g., adjust the volume of audio output, launch a camera application, and/or modify (e.g., pause or play) the playback status of a media item), wherein the information is displayed within the control user interface (e.g., as described above in relation to FIG. 12C) (e.g., the information is displayed as a part of the control user interface) (e.g., the information is concurrently displayed with a plurality of selectable virtual objects). In some embodiments, the information is displayed within the boundaries of the control user interface. In some embodiments, the display of the information is dependent upon the display of the control user interface (e.g., changing the location of the display of the control user interface will result in the location of the display of the information changing). Displaying a control user interface in response to receiving an indication that the hand input was performed allows the user to control when the computer system displays the control user interface without displaying additional controls, which provides additional control options without cluttering the user interface. Displaying the information within the control user interface provides the user with additional information (e.g., the information that is included in the control user interface that is not displayed as part of the information about the wearable device) regarding the state of the computer system, which provides improved visual feedback and can lead to more efficient control of the user interface for some users.

In some embodiments, the extended reality environment includes a virtual representation of the hand (e.g., 1212) on which the wearable device is being worn (e.g., a virtual avatar representation of the hand of the user on which the wearable device is being worn), and wherein displaying the information (e.g., 1230) includes displaying the information on the virtual representation of the hand (e.g., the information is displayed on a virtual representation of the wearable device (e.g., a digital representation of the wearable device) that is displayed on the virtual representation of the hand). In some embodiments, while displaying the information on the virtual representation of the hand, the computer receives (e.g., 1200) an indication (e.g., the indication is received from the wearable device) (e.g., an indication that was generated by the computer system) that a second hand input (e.g., a clench gesture and/or a unclench gesture) (e.g., the second hand input is the same as the first hand input) has been performed. In some embodiments, in response to receiving the indication that the second hand input has been performed the computer system ceases to display the information on the virtual representation of the hand on which the wearable device is being worn and the computer system maintains the display of the virtual representation of the hand on which the wearable device is being worn (e.g., as described above in relation to FIG. 12C). In some embodiments, while the information is displayed, the virtual object is not visible and ceasing to display the information causes the virtual object to be visible. In some embodiments, maintaining display of the virtual representation of the hand on which the wearable device is being worn includes maintaining the display of a virtual representation of the wearable device on the virtual representation of the hand. Ceasing to display the information on the virtual representation of the hand on which the wearable device is being worn in response to receiving an indication that a second hand input has been performed provides the user with the ability to control what information is being displayed by the computer system without displaying additional controls, which provides additional control options without cluttering the user interface.

In some embodiments, the first hand input includes a double clench gesture (e.g., as described above in relation to FIG. 12C) (e.g., consecutive clench gestures are detected (e.g., by the wearable device)) (e.g., the first hand input includes two hand clench gestures in rapid succession of each other (e.g., the second clench gesture is detected within a predetermined amount of time of the first clench gesture)). Displaying information about the wearable device in response to receiving the indication that a double clench gesture has been performed allows the user to control when the information about the wearable device is displayed without displaying additional controls, which provides additional control options without cluttering the user interface. Displaying information about the wearable device in response to receiving the indication that a double clench gesture has been performed reduces the cognitive burden imposed on a user in directing the computer system to display the information about the wearable is displayed.

In some embodiments, while displaying the information about the wearable, the computer system receives an indication that a third hand input has been detected by the wearable device (e.g., a third hand input that is performed by the hand on which the wearable device is being worn) (e.g., the wearable device detects the third hand input using one or more sensors that are integrated into the wearable device) (e.g., the third hand input is detected by one or more cameras that are in communication with the computer system) (e.g., the third hand input is the same type of gesture and the first hand input) (e.g., the third hand input is a different type of gesture and the first hand input). In some embodiments, in response to receiving the indication that the third hand input was performed by the hand on which the wearable device is being worn, the computer system ceases to display the information about the wearable device (e.g., as described above in relation to FIG. 12E). In some embodiments, the virtual object is not visible while the information is displayed and ceasing to display the information causes the virtual object to be visible. Ceasing to display the information about the wearable device in response to receiving the indication that the third hand input was performed by the hand on which the wearable device is being worn provides the user with the ability to control what information is being displayed by the computer system without displaying additional controls, which provides additional control options without cluttering the user interface.

In some embodiments, the first hand input is a first type of gesture (e.g., a clench gesture), and wherein the third hand input is the first type of gesture (e.g., as described above in relation to FIG. 12E) (e.g., the first hand input includes the same gesture(s) as the third hand input). Ceasing to display the information in response to receiving an indication that the same gesture that caused the information to be initially displayed was performed provides the user with feedback regarding the state of the computer system (e.g., that the computer system detected the same type of input that caused the information to be initially displayed), which provides improved visual feedback and can lead to more efficient control of the user interface for some users. Ceasing to display the information in response to receiving an indication that the user performed the gesture that caused the information to be initially displayed reduces the cognitive burden placed on the user when the user wishes to cease display of the information.

In some embodiments, the first hand input is a second type of gesture (e.g., a clench gesture), and wherein the third hand input is a third type of gesture (e.g., a rotation of the wrist of the hand on which the wearable device is being worn) that is different from the second type of gesture (e.g., as discussed above in relation to FIG. 12E) (e.g., the second type of gesture and the third type of gesture are different types of gestures). Ceasing to display the information in response to receiving an indication that a gesture, that is different than the gesture that caused the information to be initially displayed, was received provides the user with feedback regarding the state of the computer system (e.g., that the computer system detected the same type of input that caused the information to be initially displayed), which provides improved visual feedback and can lead to more efficient control of the user interface for some users.

In some embodiments, aspects/operations of methods 900, 1100, and 1500 may be interchanged, substituted, and/or added between these methods. For example, the hand gesture that performed to display a representation of the physical environment in method 1300 is optionally used to display a representation of the physical environment in method 1500. For brevity, these details are not repeated here.

FIGS. 14A-14G illustrate examples of manipulating the display of virtual objects, in accordance with some embodiments. FIG. 15 is a flow diagram of an exemplary method 1500 manipulating the display of virtual objects, in accordance with some embodiments. The user interfaces in FIGS. 14A-14G are used to illustrate the processes described below, including the processes in FIG. 15.

As illustrated in FIG. 14A, computer system 1200 displays user interface 1210 (e.g., as described above in relation to FIG. 12B). User interface 1210 includes tent virtual object 1222a, fire virtual object 1222b, chair virtual object 1222c and hand position virtual object 1436 (e.g., hand position virtual object 1436 is displayed using one or more techniques as discussed above in relation to displaying hand position virtual object 736 in FIG. 7A). As illustrated in FIG. 14A, user 702 is wearing wearable device 706 (e.g., as described above in relation to FIG. 7A) on the right hand of user 702. As discussed above in relation to FIG. 12A, computer system 1200 is in communication with one or more cameras. The one or more cameras are front facing (e.g., facing towards user 702) and/or rear facing (e.g., facing away from user 702). The one or more cameras that are in communication with computer system 1200 can track the positioning of the hands (e.g., both the right hand and the left hand) of user 702. As illustrated in FIG. 14A, computer system 1200 is a tablet. However, it should be understood that the depiction of computer system 1200 as a tablet is merely exemplary. In some embodiments, computer system 1200 is one or more other devices, such as a handheld device (a smart phone) and/or a display generation component of an HMD. In embodiments when computer system 1200 is a display generation component of an HMD, wearable device 706 transmits display instructions to the HMD in response to wearable device 706 detecting one or more hand gestures (e.g., one or more air gestures or inputs on hardware or touch-sensitive input elements of the HMD). In some embodiments, the one or more cameras that are in communication with computer system 1200 only detect the positioning of the dominant hand of user 702 (e.g., the hand of user 702 that does not wear wearable device 706). In some embodiments, the one or more cameras that are in communication with computer system 1200 are either on the frontside of computer system 1200 or the backside of computer system 1200.

Figure 14B:
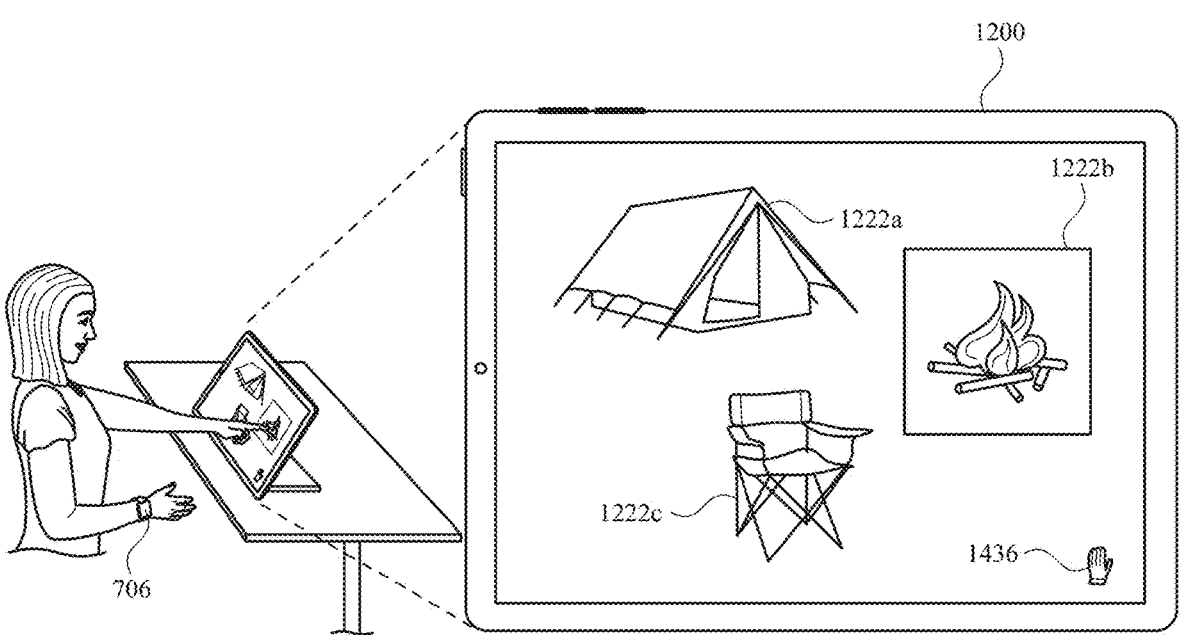

At FIG. 14B, the right hand of user 702 is detected as being unclenched and the left hand of user 702 is detected as performing an air gesture, such as an air tap (e.g., as described above) directed to a point in space that corresponds to the display of one of virtual objects 1222a-1222c. In some embodiments, wearable device 706 detects (e.g., via one or more sensors that are integrated into wearable device 706) that the right hand of user 702 is unclenched. In some embodiments, computer system 700 detects that the right hand of user 702 is unclenched (e.g., via one or more cameras that are in communication with computer system 700). In some embodiments, computer system 700 detects (e.g., from wearable device 706) that the right hand of user 702 is unclenched while detecting that the left hand of user 702 is detected as performing an air gesture.

As illustrated in FIG. 14B, in response to receiving an indication (e.g., generated by computer system 1200 and/or generated by wearable device 706) that the right hand of user 702 is detected as being unclenched while the left hand of user 702 is detected as performing an air gesture, computer system 1200 displays fire virtual object 1222b as being selected (e.g., computer system 1200 displays a box around fire virtual object 1222b). Computer system 1200 performs an operation (e.g., selection of a virtual object) in response to receiving an indication that the right hand of user is detected as unclenched while the left hand of user 702 is detected as performing an air gesture. In some embodiments, computer system 1200 ceases to display tent virtual object 1222a and chair virtual object 1222c while computer system 1200 displays fire virtual object 1222b as being selected. In some embodiments, computer system 1200 displays multiple virtual objects as being selected. In some embodiments, while computer system 1200 displays fire virtual object 1222b as being selected, computer system 1200 manipulates the display of fire virtual object 1222b (e.g., increase the size of fire virtual object 1222b, decrease the size of fire virtual object 1222b, rotate (e.g., clockwise and/or counter-clockwise) the display of fire virtual object 1222b) in response to receiving an indication that wearable device 706 has detected one or more hand gestures and/or air gesture. In some embodiments, computer system 1200 cannot manipulate the display of tent virtual object 1222a and chair virtual object 1222c while computer system 1200 displays fire virtual object 1222b as being selected. In some embodiments, computer system 1200 displays fire virtual object 1222b as being selected in response to receiving an indication that that the gaze of user 702 is detected (e.g., as detected by the one or more cameras that are in communication with computer system 1200) as being directed towards the display of fire virtual object 1222b and that the left hand of user 702 has performed an air gesture (e.g., as detected by the one or more cameras that are in communication with computer system 1200 and/or by wearable device 706).

As illustrated in FIG. 14B, computer system 1200 displays hand position virtual object 1436 (e.g., as described above in relation to FIG. 7A). Because computer system 1200 receives an indication that the right hand of user is unclenched, computer system 1200 displays hand position virtual object 1436 as representative of an unclenched hand. At FIG. 14C, the right hand of user 702 is detected as being unclenched while the left hand of user 702 is detected as having moved to the left (e.g., such that the left hand of user 702 is pointing to the area on computer system 1200 that is to the left of chair virtual object 1222c). In some embodiments, wearable device 706 detects (e.g., via one or more sensors that are integrated into wearable device 706) that the right hand of user 702 is unclenched. In some embodiments, computer system 700 detects that the right hand of user 702 is unclenched (e.g., via one or more cameras that are in communication with computer system 700). In some embodiments, computer system 700 detects that the right hand of user 702 is unclenched while detecting the movement of the left hand of user 702.

Figure 14C:
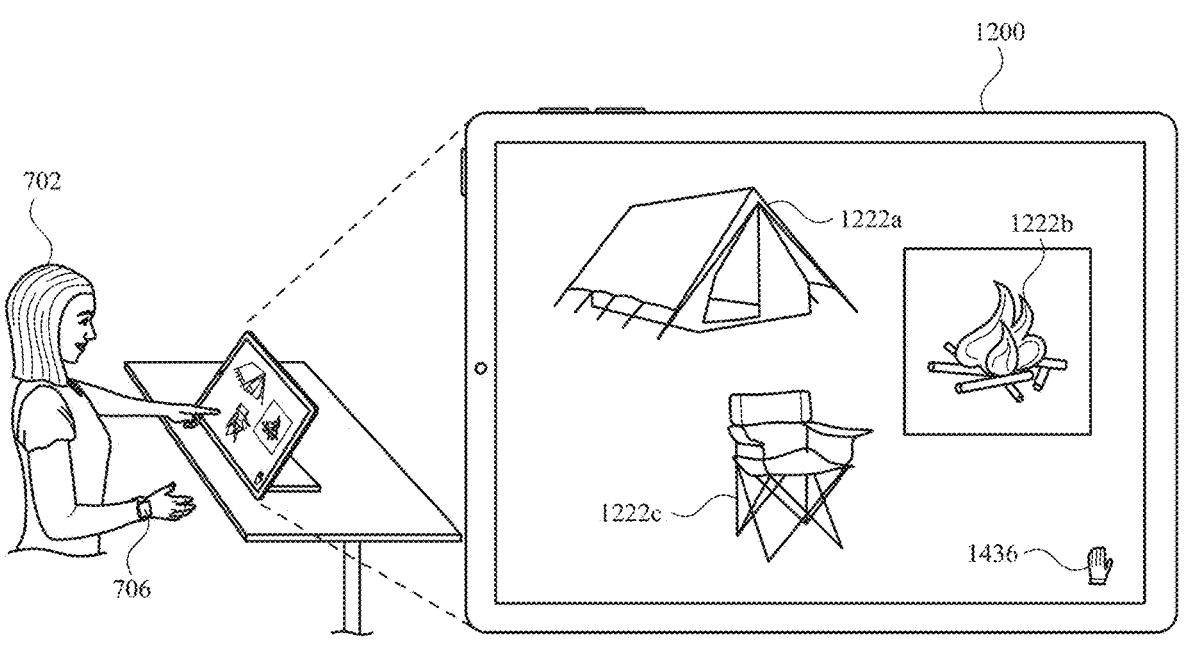

At FIG. 14C, in response to receiving an indication (e.g., generated by computer system 1200 and/or generated by wearable device 706) that the right hand of user 702 is detected as being unclenched while the left hand of user 702 is detected as having moved to the left computer system 1200 maintains the display of fire virtual object 1222b at the same location (e.g., the location of fire virtual object 1222b in FIG. 14B). Although computer system 1200 displays fire virtual object 1222b as being selected and computer system 1200 received an indication that the left hand of user 702 has moved, computer system 1200 does not change the location at which fire virtual object 1222b is displayed because computer system 1200 did not receive an indication that the right hand of user 702 was clenched while the left hand of user 702 was detected as being moved. In some embodiments, computer system 1200 deselects fire virtual object 1222b in response to receiving the indication that the left hand of user 702 has moved.

As illustrated in FIG. 14C, because computer system 1200 receives an indication that the right hand of user 702 is unclenched, computer system 1200 maintains the display of hand position virtual object 1436 as representative of an unclenched hand. At FIG. 14D, the right hand of user 702 is detected as being clenched while the left hand of user 702 is detected as performing an air gesture. In some embodiments, wearable device 706 detects (e.g., via one or more sensors that are integrated into wearable device 706) that the right hand of user 702 is clenched. In some embodiments, computer system 700 detects that the right hand of user 702 is clenched (e.g., via one or more cameras that are in communication with computer system 700). In some embodiments, computer system 700 detects that the right hand of user 702 is clenched while detecting the left hand is performing an air gesture.

Figure 14D:
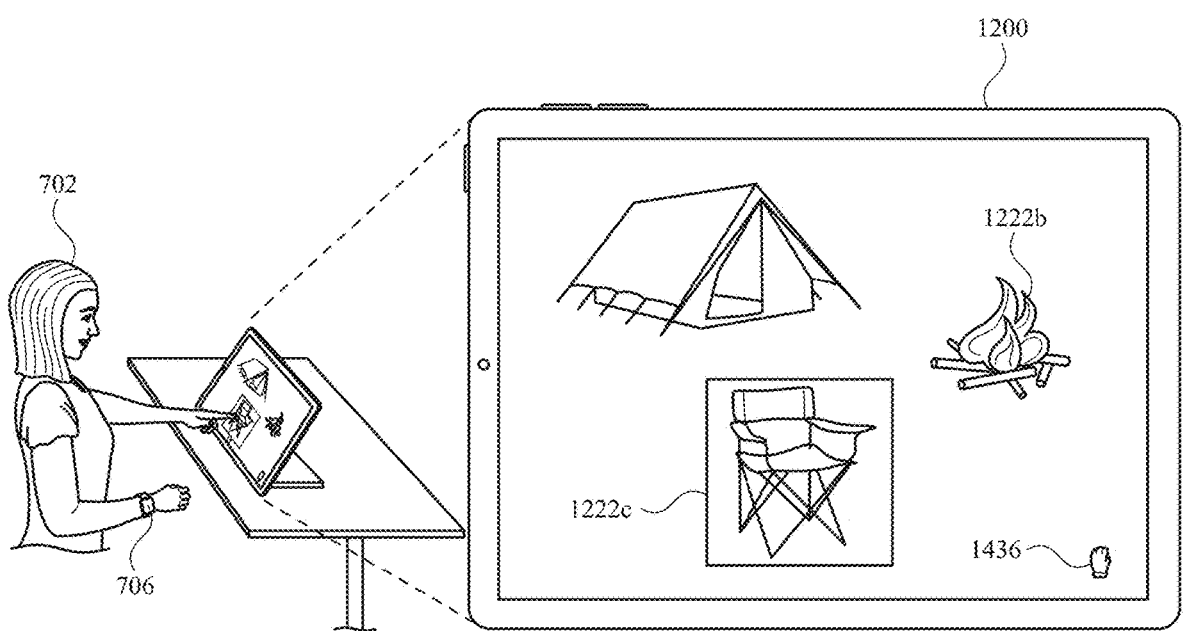

At FIG. 14D, in response to receiving an indication (e.g., generated by computer system 1200 and/or generated by wearable device 706) that the right hand of user 702 is detected as being clenched while the left hand of user 702 is detected as performing an air gesture, computer system 1200 displays chair virtual object 1222c as being selected. Computer system 1200 ceases to display fire virtual object 1222b as being selected while computer system 1200 displays chair virtual object 1222c as being selected. As discussed above, in some embodiments, computer system 1200 manipulates the display of chair virtual object 1222c while computer system 1200 displays chair virtual object 1222c as being selected. As illustrated in FIG. 14D, in response to receiving an indication that the right hand of user 702 is detected as being clenched, computer system 1200 displays hand position virtual object 1436 as representative of a clenched hand. In some embodiments, computer system 1200 concurrently displays both chair virtual object 1222c and fire virtual object 1222b as being selected.

Figure 14E:
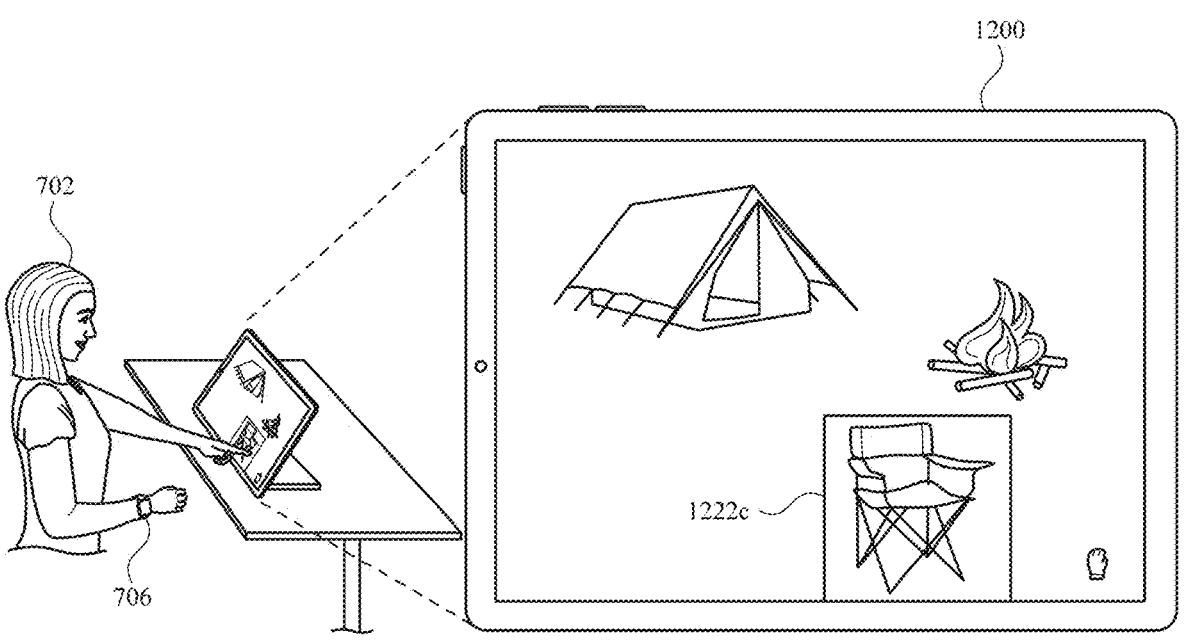

At FIG. 14E, the left hand of user 702 is detected as having moved to the right while computer system 1200 displays chair virtual object 1222c as being selected and while the right hand of user 702 is detected as being clenched. In some embodiments, wearable device 706 detects (e.g., via one or more sensors that are integrated into wearable device 706) that the right hand of user 702 is clenched. In some embodiments, computer system 700 detects that the right hand of user 702 is clenched (e.g., via one or more cameras that are in communication with computer system 700). In some embodiments, computer system 700 detects that the right hand of user 702 is clenched while detecting movement of the left hand of user 702.

Figure 14F:
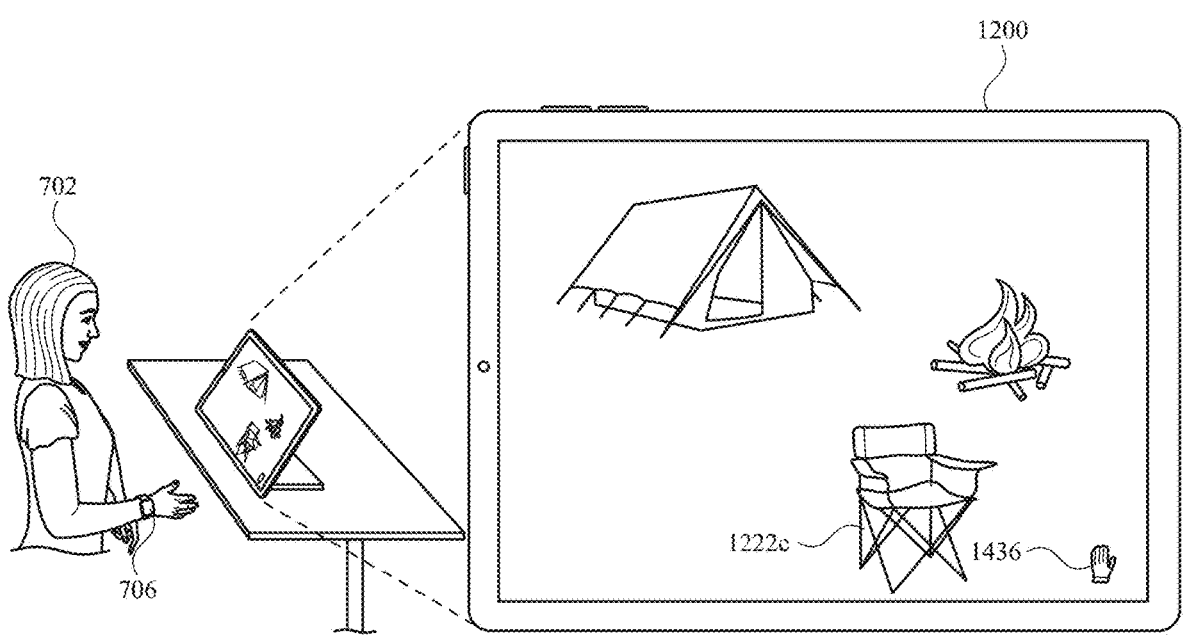

At FIG. 14E, in response to receiving an indication that the left hand of user 702 is detected as having moved to the right while computer system 1200 displays chair virtual object 1222c as being selected and while right hand of user 702 is detected as being clenched, computer system 1200 moves the display of chair virtual object 1222c. In some embodiments, the amount that computer system 1200 moves the display of chair virtual object 1222c corresponds to the amount of movement that the left hand of user 702 is detected as having moved (e.g., the greater the amount of distance the left hand of user 702 is detected as moving, the greater the displacement of computer system's 1200 display of chair virtual object 1222c). In some embodiments, computer system 1200 displays a context menu that includes selectable virtual objects in response to receiving an indication that the left hand of user 702 has performed an air gesture while the right hand of user 702 is detected as being clenched. In some embodiments, computer system 1200 performs a respective operation (e.g., move a virtual object that is displayed, cease displaying a virtual object, and/or rotate a virtual object that is displayed) in response to receiving an indication that the right hand of user 702 is clenched and that the left hand of user 702 has performed an air gesture, such as an air tap, directed at a point in space that corresponds to the display of a virtual object that is included in the context menu is selected. In some embodiments, computer system 1200 moves the display of multiple virtual objects in response to receiving an indication that the left hand of user 702 is detected as moving while the right hand of user 702 is detected as clenched. At FIG. 14F, wearable device 706 detects (e.g., via one or more sensors that are integrated into wearable device 706) that the right hand of user 702 is unclenched. As illustrated in FIG. 14F, in response to receiving an indication that the right hand of user 702 is unclenched, computer system 1200 displays chair virtual object 1222c as being unselected. As illustrated in FIG. 14F, in response to receiving an indication that the right hand of user 702 is unclenched, computer system 1220 displays chair virtual object 1222c at the position that chair virtual object 1222c was moved to in FIG. 14E (e.g., a user has "dropped" chair virtual object at the position). As illustrated in FIG. 14F, in response to receiving the indication that the right hand of user 702 is unclenched, computer system 1200 displays hand position virtual object 1436 as representative of an unclenched hand. In some embodiments, computer system 1200 moves and selects (e.g., "picks up") chair virtual object 1222c in response to receiving an indication (e.g., from the one or more cameras that are in communication with computer system 1200) that the left hand of user 702 is detected as being clenched. In some embodiments, computer system 1200 locks chair virtual object 1222c to a position and deselects (e.g., "drops") chair virtual object 1222c in response to receiving an indication (e.g., from the one or more cameras that are in communication with computer system 1200) that the left hand of user 702 is detected as being unclenched.

Figure 14G:
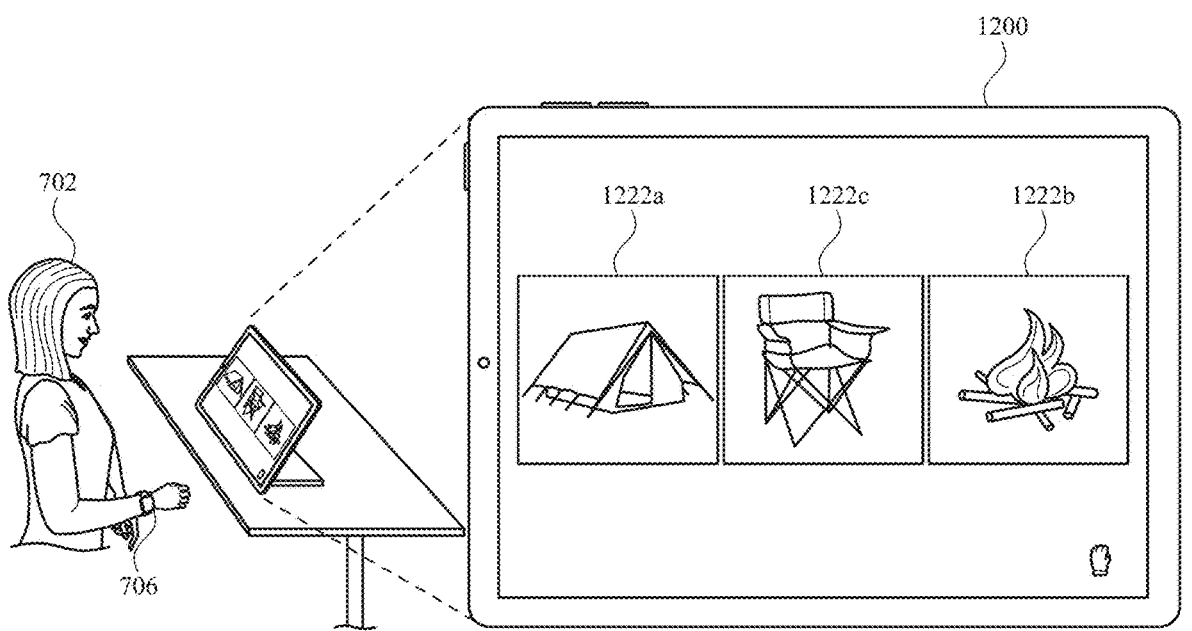

At FIG. 14G, wearable device 706 detects (e.g., via one or more sensors that are integrated into wearable device 706) that the right hand of user 702 is clenched. In response to receiving an indication that the right hand of user 702 is clenched, computer system 1200 displays tent virtual object 1222a, chair virtual object 1222c, and fire virtual object 1222b in a horizontal line. That is, computer system 1200 can perform an operation in response to receiving an indication that the right hand of user 702 has performed a hand gesture (e.g., clench gesture, unclench gesture, and/or hand rotation) without receiving an indication that the left hand of user 702 has performed an air gesture and/or while receiving an indication that the left hand of user 702 is not performing an air gesture. In some embodiments, in response to receiving an indication that the right hand of user 702 is detected as being clenched while the left hand of user 702 is detected as performing an air gesture, such as an air tap gesture, computer system 1200 displays a multitasking user interface. In some embodiments, in response to receiving an indication that the right hand of user 702 is detected as being clenched while the left hand of user 702 is detected as performing an air gesture, such as an air tap gesture, computer system 1200 displays a media player user interface (e.g., a user interface with virtual objects (e.g., computer system 1200 modifies a playback status of a media item in response to receiving an indication that a respective virtual object is selected (e.g., selected via the one or more cameras detecting that the left hand of user 702 has performed an air gesture. In some embodiments, in response to receiving an indication that the right hand of user 702 is detected as being clenched while the left hand of user 702 is detected as performing an air gesture, such as an air tap gesture, computer system 1200 displays a palette with tool options (e.g., computer system 1200 modifies the display of a respective virtual object in response to receiving an indication that one or more of the tool options have been selected (e.g., selected via one or more cameras detecting that the left hand of user 702 has performed an air gesture)). In some embodiments, computer system 1200 ceases to display a user interface that includes selectable options (e.g., as described above) in response to receiving an indication that the right hand of user 702 has performed an unclench gesture.

Additional descriptions regarding FIGS. 14A-14G are provided below in reference to method 1500 described with respect to FIGS. 14A-14G.

FIG. 15 is a flow diagram of an exemplary method 1500 for manipulating the display of virtual objects, in accordance with some embodiments. In some embodiments, method 1500 is performed at a computer system (e.g., 1200) (e.g., a smartphone, a desktop computer, a laptop, a tablet, a smartwatch, a heads-up display unit, a head-mounted display unit, an optical head-mounted display unit, and/or a wearable device) (e.g., computer system 101 in FIG. 1) that is in communication with a display generation component (e.g., display generation component 120 in FIGS. 1, 3, and 4) (e.g., a display controller, a touch-sensitive display system; a display (e.g., integrated and/or connected), a 3D display, a transparent display, a projector, a heads-up display, and/or a head-mounted display) and a wearable device (e.g., an external device (e.g., a device that is separate from the computer system) (e.g., smartwatch) being worn by the user (e.g., on the body of the user) of the computer system). In some embodiments, the method 1500 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1500 are, optionally, combined and/or the order of some operations is, optionally, changed.

While displaying, via the display generation component, an augmented reality environment user interface, the computer system (e.g., 1200) receives (1502) an indication (e.g., generated by the computer system) that a first hand input (e.g., an air tap, air pinch, air swipe, air pointing gesture, and/or air drag and drop gesture) was performed (e.g., using one or more cameras that are integrated into the computer system) (e.g., a gesture that interacts (e.g., selects) a virtual object that is within the augmented reality environment) by a first hand of the user (e.g., the left hand of user 702) (e.g., the user's dominant hand). In some embodiments, a representation of the first hand input is displayed within the augmented reality environment user interface. In some embodiments, the first hand input corresponds to selection of one or more virtual objects that are displayed within the augmented reality environment user interface.

In response to receiving (1504) the indication that the first hand input was performed by the first hand of the user and in accordance with a determination that the first hand input was performed while a second hand input (e.g., a clench, air-pinch, and/or air-swipe) was being performed (e.g., at an external device such as a smartwatch) (e.g., the second hand input is detected by the external device (e.g., detected using a set of one or more sensors (e.g., a gyroscope, an accelerometer, a heart rate sensor, or the like) that are integrated into the external device) by a second hand of the user (e.g., the right hand of user 702), wherein the second hand of the user is different from the first hand (e.g., second hand of the user is the user's dominant hand and the first hand of the user is the user's non-dominant hand), the computer system (e.g., 1200) performs (e.g., 1506) a first operation (e.g., as described above in relation to FIGS. 14D—14E) (e.g., an operation (e.g., move, rotate, resize) corresponding to a virtual object that is displayed as part of the augmented reality environment user interface) (e.g., an operation that is performed based on a detected location of the first hand input) and in accordance with a determination that the first hand input was performed while the second hand input was not being performed by the second hand of the user (e.g., the external device did not detect the second hand input), the computer system forgoes (1508) performing the first operation (e.g., as described above in relation to FIG. 14C). In some embodiments, the first operation is performed while the first hand input and the second hand input are being performing and/or after the first hand input and the second hand input are performed. In some embodiments, the determination that the first hand input was performed while the second hand input was being performed at the external device is made by one or more cameras that are integrated into the computer system. In some embodiments, the determination that the first hand input was performed while the second hand input was being performed at the external device is made by the external device. In some embodiments, the external device is in communication (e.g., wireless communication) with the computer system. In some embodiments, the external device detects the hand input via one or more sensors (e.g., one or more heart rate sensors, gyroscopes, and/or accelerometers). In some embodiments, the indication is received after and/or before the second hand input is performed at the external device. In some embodiments, the indication is received while the second hand input is being performed at the external accessory device. Performing an operation in response to receiving the indication that the first hand input was performed by the first hand of the user and in accordance with a determination that the first hand input was performed while a second hand input provides the user with greater control over the computer system by allowing the user to control the operations that the computer system performs without the user touching the computer system and without the computer system displaying additional controls, which provides additional control options without cluttering the user interface. Providing additional control of the system without cluttering the UI with additional displayed controls enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to receiving the indication that the first hand input was performed by the first hand of the user (e.g., the left hand of user 702 at FIG. 14B) and in accordance with a determination that the first hand input was performed while the second hand input was not being performed by the second hand of the user (e.g., the right hand of user 702 at FIG. 14B), the computer system (e.g., 1200) performs a second operation (e.g., as described above in relation to FIG. 14B) (e.g., an operation (e.g., move, rotate, and/or resize) corresponding to a virtual object that is displayed as part of the augmented reality environment user interface) (e.g., a selection operation)(e.g., that is different from the first operation) (e.g., an operation that causes the computer system to display a virtual object (e.g., a selectable virtual object) that was not displayed prior to the determination that the first hand input was performed). Performing a second operation in response to receiving the indication that the first hand input was performed by first hand of the user when certain prescribed conditions are satisfied allows the computer the system to perform an operation without requiring performing additional inputs, which performs an operation when a set of conditions has been met without requiring further user input. Performing a second operation in response to receiving the indication that the first hand input was performed by the first hand of the user and in accordance with a determination that the first hand input was performed while the second hand input was not being performed provides the user with visual feedback regarding the state of the computer system (e.g., the computer system has detected the first hand input without detecting the second hand input), which provides improved visual feedback and can lead to more efficient control of the user interface for some users.

In some embodiments, the second operation is a selection operation (e.g., as described above in FIG. 14B) (e.g., performing the second operation includes selecting one or more virtual objects that are displayed as part of the augmented reality environment user interface). In some embodiments, performing the selection operation includes changing the appearance of one or more virtual objects that are displayed (e.g., selecting a respective virtual object causes the respective virtual object to be displayed with a visual emphasis (e.g., the respective virtual object is displayed as larger, and/or displayed with a different color than other virtual objects that are displayed)). In some embodiments, selection of a respective virtual object causes a presently selected virtual object to be deselected.

In some embodiments, performing the first operation includes displaying, via the display generation component, a context menu (e.g., as described above in relation to FIG. 14E) (e.g., a menu that includes virtual objects, that, when selected, cause the computer system to perform a respective operation (e.g., move a virtual object that is displayed, cease displaying a virtual object, and/or rotate a virtual object that is displayed), and wherein the first hand input includes an air tap gesture (e.g., a tap gesture (e.g., a tap gesture directed to a point in space of the physical environment) using one or more digits of the first hand of the user) or an air pinch gesture (e.g., a pinch gesture using two or more digits of the first hand of the user). Displaying a context menu in response to receiving an indication that an air tap gesture or a pinch gesture was performed provides the user with the ability to control what information is displayed by the computer system without displaying additional controls, which provides additional control options without cluttering the user interface. Displaying a context menu in response to receiving an indication that an air tap gesture or a pinch gesture was performed helps the user navigate the computer system without touching the computer system, which can lead to more efficient control of the user interface for some users.

In some embodiments, the first hand input includes moving (e.g., moving from a first point in space in the physical environment to a second point in space in the physical environment) the first hand (e.g., the left hand of user 702 in FIGS. 14D-14E) of the user (e.g., 702) in a first direction (e.g., left to right, right to left, vertically upwards, vertically downwards) in the physical environment, and wherein performing the first operation includes dragging a virtual object (e.g., 1222c in FIGS. 14D-14F) that is displayed in the augmented reality environment user interface from a first location (e.g., location of 1222c in FIG. 14D) to a second location (e.g., location of 1222c in FIG. 14C) (e.g., the second location is removed from the first location) (e.g., the direction that the hand moves in the physical environment corresponds to the direction in which the virtual object is dragged). Dragging a virtual object in an augmented reality environment user interface from a first location to a second location in response to receiving an indication that the hand of the user has moved in a first direction in a physical environment allows the user to control the location at which the computer system displays a virtual object without displaying additional controls, which provides additional control options without cluttering the user interface.

In some embodiments, displaying the augmented reality environment user interface includes displaying a first virtual object (e.g., 1444a-1444c), (e.g., a selectable virtual object) and a second virtual object (e.g., 1444a-1444c) (e.g., that is different from the first virtual object). In some embodiments, in accordance with a determination that a user's attention (e.g., the computer system detects (e.g., detects using one or more gaze-tracking sensors (e.g., an optical and/or IR camera configured to track a direction of a gaze of a user of the computer system) that the user is gazing in the direction of the display of the first virtual object) is directed towards the first virtual object, performing the first operation includes performing the first operation on the first virtual object (e.g., as described above in relation to FIG. 14B) (e.g., the first operation is performed with respect to the first virtual object) (e.g., the first virtual object is selected, the first virtual object is moved, and/or the first virtual object is resized) (e.g., the first operation is not performed on the second virtual object). In some embodiments, in accordance with a determination that the user's attention is directed towards the second virtual object, performing the first operation includes performing the first operation on the second virtual object (e.g., as described above in relation to FIG. 14B) (e.g., the first operation is performed with respect to the second virtual object) (e.g., the first operation is not performed on the first virtual object). In some embodiments, in accordance with a determination that the user's attention is directed towards both the first virtual object and the second virtual object, the first operation is performed on both the first virtual object and the second virtual object. In some embodiments, in accordance with a determination that the user's attention is directed towards both the first virtual object and the second virtual object, the first operation is performed to the first virtual object for a first period of time and the first operation is performed to the second virtual object for a second period of time. Performing an operation on a virtual object in accordance with a determination that the user's attention is directed towards the virtual object provides the user with the ability to cause the computer system to perform an operation without displaying additional controls, which provides additional control options without cluttering the user interface. Performing an operation on a virtual object when certain prescribed conditions are met allows the computer system to automatically perform an operation on a virtual object that the user has expressed interest in and is of particular interest to the user, which performs an operation when a set of conditions has been met without requiring further user input.

In some embodiments, the first hand input includes a clench gesture, and wherein performing the first operation includes selecting a third virtual object (e.g., picking up the virtual object) that is displayed within the augmented realty environment user interface. In some embodiments, while the third virtual object is selected and while the first hand of the user (e.g., the left hand of user 702) is clenched (e.g., clenched from performing the first hand input), the computer system receives an indication (e.g., generated by the computer system) (e.g., generated by an external device (e.g., a smart watch) that the first hand of the user has performed a third hand input (e.g., an unclench gesture). In some embodiments, in response to receiving the indication that the first hand of the user has performed the third hand input (e.g., unclench), the computer system deselects the third virtual object (e.g., as described above in relation to FIG. 14E) (e.g., dropping the virtual object). In some embodiments, the third virtual object has a first visual appearance (e.g., the virtual object is displayed with a border and/or the size of the display of the virtual object is larger while it is selected in contrast to when the virtual object is not selected) while it is selected and the third virtual object has a second visual appearance when it is deselected. In some embodiments, the first operation includes selecting multiple virtual objects and multiple virtual objects are deselected in response to receiving the indication that the second hand of the user has performed the third hand input. Deselecting a virtual object in response to receiving an indication that second hand of the user has performed a third hand input allows a user to modify the selection state of virtual objects that are displayed by the computer system without displaying additional controls, which provides additional control options without cluttering the user interface.

In some embodiments, displaying the augmented reality environment user interface includes displaying a hand input virtual object (e.g., 1436) (e.g., a virtual object whose visual appearance changes based on whether a clench gesture is detected or not detected). In some embodiments, while displaying the augmented reality environment and in accordance with a determination (e.g., made by a device that is external to the computer system (e.g., a smart watch that is worn on the second hand of the user)) that the second hand of the user has performed a clench gesture, displaying the hand input virtual object includes displaying the hand input virtual object with a first visual appearance (e.g., 1436 at FIG. 14D) (e.g., the first visual appearance of the hand is representative of a clenched hand (e.g., the first visual appearance of the hand depicts a fist)) (e.g., the hand input virtual object is displayed with the first visual appearance while the second hand of the user is clenched). In some embodiments, while displaying the augmented reality environment and in accordance with a determination that the second hand input was not performed by the second hand of the user, displaying the hand input virtual object includes displaying the hand input virtual object with a second visual appearance (e.g., 1436 in FIG. 14C) (e.g., the second visual appearance hand input virtual object is representative of an unclenched hand) (e.g., the second visual appearance of the hand depicts a hand, where the digits of the hand are separated), that is different from than first visual appearance (e.g., the display of the hand input virtual object is dynamic in that the hand input virtual object will dynamically change between the first visual appearance and the second visual appearance based on whether a clench gesture is detected or not detected). In some embodiments, the hand input virtual object is displayed with the first appearance/second appearance while the first hand of the user performs the first hand input. In some embodiments, the hand input virtual object is displayed with the first appearance/second appearance while the first hand of the user does not perform the first hand input. Displaying a hand virtual object with varying visual appearances based on whether the second hand of the user has performed a clench gesture provides the user with visual feedback regarding the state of the computer system (e.g., whether the computer system has detected that the user's hand is clenched), which provides improved visual feedback and can lead to more efficient control of the user interface for some users.

In some embodiments, after receiving the indication that the first hand input was performed by the first hand of the user, the computer system receives an indication (e.g., generated by the computer system) (e.g., generated by an external device (e.g., a smart watch and/or one or more cameras that are in communication with the computer system) that a fourth hand input (e.g., a clench gesture, unclench gesture, and/or rotation gesture) was performed by the second hand of the user (e.g., the right hand of user 702 in FIG. 14G). In some embodiments, in response to receiving the indication that the fourth hand input was performed by the second hand of the user and in accordance with a determination that the fourth hand input was performed while the first hand was not performing a hand input, the computer system (e.g., 1200) performs a third operation (e.g., as described above in relation to FIG. 14G) (e.g., an operation that is different from the first operation) (e.g., displaying a selection user interface that includes one or more virtual objects that can be selected by the first hand of the user (e.g., the first hand can select the one or more virtual objects that are displayed on the selection user interface by performing one or more air gestures)). In some embodiments, the computer system performs the third operation while the computer system performs the first operation. In some embodiments, the first operation ceases to be performed in response to the third operation being performed. Performing a third operation in response to receiving an indication that the fourth hand input was performed by the second hand of the user and in accordance with a determination that the fourth hand input was performed while the first hand input was not being performed by the first hand of the user allows the user to control which operation the computer system performs without displaying additional controls, which provides additional control options without cluttering the user interface.

In some embodiments, performing the third operation includes displaying a multitasking user interface (e.g., as described above in relation to FIG. 14G). In some embodiments, displaying the multitasking user interface includes making the multitasking user interface visible for the first time (e.g., the multitasking user interface ran in the background prior to the multitasking user interface being displayed). Displaying a multitasking user interface in response to receiving the indication that the fourth hand input was performed by the second hand of the user and in accordance with a determination that the fourth hand input was performed while the first hand of the user was not performing a hand input provides the user with visual feedback regarding the state of the computer system (e.g., the computer system received the indication that the fourth hand input was performed), which provides improved visual feedback and can lead to more efficient control of the user interface for some users. Displaying a multitasking user interface in response to receiving the indication that the fourth hand input was performed by the second hand of the user and in accordance with a determination that the fourth hand input was performed while the first hand of the user was not performing a hand input helps the user navigate the computer system without touching the computer system, which can lead to more efficient control of the user interface for some users.

In some embodiments, performing the third operation includes displaying a media player user interface (e.g., as described above in relation to FIG. 14G) (e.g., a user interface that includes one or more media controls that when selected cause the computer system to modify a playback status (e.g., pause the playback of video media, fast forward the playback of video media, rewind the playback of video media and/or initiate the playback of video media) of video media). Displaying a media user interface in response to receiving the indication that the fourth hand input was performed by the second hand of the user and in accordance with a determination that the fourth hand input was performed while the first hand of the user was not performing a hand input, provides the user with visual feedback regarding the state of the computer system (e.g., the computer system received the indication that the fourth hand input was performed), which provides improved visual feedback and can lead to more efficient control of the user interface for some users.

In some embodiments, performing the third operation includes displaying a plurality of selectable tool option virtual objects (e.g., as described above in relation to FIG. 14G) (e.g., a tool option that, when selected, causes the computer system to change the color of a virtual object that is displayed), wherein, the plurality of selectable tool option virtual objects can be selected using the first hand of the user (e.g., a respect tool option of the plurality of selectable tool options is selected in response to detecting that the first hand has performed an air gesture (e.g., an air tap, air pinch, air swipe, air de-pinch) in space that corresponds to a location of the display of the respect tool option). Displaying a plurality of selectable tool option virtual objects in response to receiving the indication that the fourth hand input was performed by the second hand of the user and in accordance with a determination that the fourth hand input was performed while the first hand of the user was not performing a hand input provides the user with visual feedback regarding the state of the computer system (e.g., the computer system received the indication that the fourth hand input was performed), which provides improved visual feedback and can lead to more efficient control of the user interface for some users. Displaying a plurality of selectable tool option virtual objects in response to receiving the indication that the fourth hand input was performed by the second hand of the user and in accordance with a determination that the fourth hand input was performed while the first hand of the user was not performing a hand input helps the user navigate the computer system without touching the computer system, which can lead to more efficient control of the user interface for some users.

In some embodiments, while displaying the plurality of selectable tool option virtual objects, the computer system (e.g., 1200) receives an indication (e.g., generated by the computer system) (e.g., generated by an external device (e.g., smart watch and/or one or more cameras)) that a fifth hand input was performed by the first hand of the user (e.g., the left hand of user 702) (e.g., air pinch gesture, de-pinch air gesture, air tap and/or air swipe) (e.g., the fourth hand input corresponds to a selection of a respective tool option of the plurality of tool options). In some embodiments, in response to receiving the indication that the fifth hand input was performed by the first hand of the user, selecting one or more tool options of the plurality of tool option virtual objects (e.g., as described above in relation to FIG. 14G). In some embodiments, selecting the one or more tool options causes the visual appearance of the one or more selected tool options to change (e.g., the selected one or more tool options are displayed with a border and/or the size of the display of the selected one or more tool options increases). Selecting one or more tool options of the plurality of tool options in response to receiving an indication that the fourth hand input was performed by the first hand of the user provides the user with the ability to select various tool options without displaying additional controls, which provides additional control options without cluttering the user interface.

In some embodiments, while displaying the plurality of selectable tool option virtual objects and while the fourth hand input is performed by the second hand (e.g., the right hand of user 702) of the user, the computer system (e.g., 1200) receives an indication (e.g., generated by the computer system) (e.g., generated by an external device (e.g., a smart watch and/or one or more cameras that are in communication with the computer system)) that a sixth hand input (e.g., unclench gesture, clench gesture, and/or rotation gesture) was performed by the second hand of the user. In some embodiments, in response to receiving the indication that the sixth hand input was performed by the second hand of the user, the computer system ceases the display of the plurality of selectable tool option virtual objects (e.g., as described above in relation to FIG. 14G). Ceasing display of the plurality of selectable tool options in response to receiving an indication that the second hand of the user performed a sixth hand input allows the user to control what information and options are displayed by the computer system without displaying additional controls, which provides additional control options without cluttering the user interface.

In some embodiments, the first hand of the user (e.g., the dominant hand of the user) is tracked (e.g., the spatial positioning of the first hand, the angle of the first hand) with one or more cameras (e.g., as described above in relation to FIG. 14A) (e.g., one or more cameras in communication (e.g., wireless communication and/or direct communication) with the computer system) (e.g., one or more cameras that are integrated into the computer system) (e.g., the one or more cameras do not track the second hand of the user), and wherein the second hand of the user (e.g., the non-dominant hand of the user) is tracked with one or more sensors that are integrated into the wearable device (e.g., the one or more sensors do not track the first hand of the user). In some embodiments, the one or more cameras track both the first hand of the user and the second hand of the user.

In some embodiments, aspects/operations of methods 900, 1100, and 1300 may be interchanged, substituted, and/or added between these methods. For example, the hand gesture that is used to move the display of virtual objects in method 1500 is optionally used to move the display of virtual objects in method 1300. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide movement and position data for customization of services. In yet another example, users can select to limit the length of time movement and position data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring the position and orientation of the user based on non-personal information data or a bare minimum amount of personal information, such as the content being requested by the device associated with a user, other non-personal information available to the service, or publicly available information.

What is claimed is:

1. A computer system configured to communicate with a display generation component, the computer system comprising:

one or more processors; and memory storing one or more programs configured to be executed by the one or more processors, the one or more programs including instructions for:

while the computer system is worn on a first hand of a user, displaying, via the display generation component, a respective user interface, wherein displaying the respective user interface includes concurrently displaying:

a first control virtual object that, when activated with a first type of hand input, causes the computer system to perform a first operation;

a second control virtual object that, when activated with the first type of hand input, causes the computer system to perform a second operation different from the first operation; and a first virtual object indicating that the first control virtual object can be activated in response to a second type of hand input being performed, wherein the second type of hand input is not directed to a location in the respective user interface, and wherein the second type of hand input is performed by the first hand of the user;

while displaying the first control virtual object, receiving an indication that a respective hand input has been performed; and in response to receiving the indication that the respective hand input has been performed:

in accordance with a determination that the respective hand input is the first type of hand input directed to a location that corresponds to the first control virtual object, initiating a process for performing the first operation;

in accordance with a determination that the respective hand input is the first type of hand input directed to a location that corresponds to the second control virtual object, initiating a process for performing the second operation; and in accordance with a determination that the respective hand input is the second type of hand input, initiating the process for performing the first operation.

2. The computer system of claim 1, wherein the one or more programs further include instructions for:

while displaying the respective user interface, displaying an animation that alternates between displaying the first virtual object and displaying a second virtual object, wherein the second virtual object indicates that the second control virtual object can be activated in response to a third type of input, and wherein the second type of hand input is different from the third type of input.

3. The computer system of claim 2, wherein alternating between the display of the first virtual object and the display of the second virtual object is performed on the basis of time.

4. The computer system of claim 2, wherein alternating between the display of the first virtual object and the display of the second virtual object is performed based on the detection of a first input.

5. The computer system of claim 1, wherein displaying the first virtual object includes displaying a second animation that alternates between a first location that corresponds to the first control virtual object and a second location that corresponds to the second control virtual object.

6. The computer system of claim 1, wherein the one or more programs further include instructions for:

while displaying the respective user interface, displaying, via the display generation component, a third virtual object that indicates that the second operation can be activated in response to a fourth type of hand input being performed, wherein the fourth type of hand input is not directed to a location in the respective user interface.

7. The computer system of claim 1, wherein the first control virtual object corresponds to a first default control option.

8. The computer system of claim 1, wherein displaying the first virtual object includes visually emphasizing the first control virtual object.

9. The computer system of claim 1, wherein the respective user interface corresponds to a first application, and wherein the first control virtual object is a second default virtual object and is displayed with a first color scheme, and wherein the one or more programs further include instructions for:

after receiving the indication that the respective hand input has been performed, receiving a request to display a second respective user interface; and in response to receiving the request to display the second respective user interface, displaying, via the display generation component, the second respective user interface, wherein the second respective user interface corresponds to a second application that is different from the first application, and wherein displaying the second respective user interface includes displaying a third control virtual object, wherein the third control virtual object is the second default virtual object and is displayed with a second color scheme that is different than the first color scheme.

10. The computer system of claim 1, wherein displaying the first virtual object includes displaying a graphical representation of the second type of hand input.

11. The computer system of claim 1, wherein displaying the first virtual object includes displaying an animation representative of the second type of hand input.

12. The computer system of claim 1, wherein the first virtual object is displayed adjacent to the first control virtual object.

13. The computer system of claim 1, wherein the first type of hand input is a tap.

14. The computer system of claim 1, wherein displaying the respective user interface includes displaying a first complication with a first set of information, and wherein the one or more programs further include instructions for:

after receiving the indication that the respective hand input has been performed, receiving an indication that a second respective hand input has been performed; and in response to receiving the indication that the second respective hand input has been performed, updating the display of the first complication to include a second set of information that is different from the first set of information.

15. The computer system of claim 1, wherein:

in accordance with a determination that the first control virtual object is in focus, displaying the first virtual object includes displaying the first virtual object adjacent to the first control virtual object; and in accordance with a determination that the second control virtual object is in focus, displaying the first virtual object includes displaying the first virtual object adjacent to the second control virtual object.

16. The computer system of claim 1, wherein the respective user interface is displayed in response to receiving a request to connect to an external device, and wherein:

in accordance with a determination that the respective hand input is the second type of hand input and in accordance with a determination that the respective hand input is being performed, initiating the process for performing the first operation includes connecting to the external device.

17. The computer system of claim 1, wherein the first control virtual object is displayed at a third location on the respective user interface and the second control virtual object is displayed at a fourth location on the respective user interface, and wherein the one or more programs further include instructions for:

while displaying the first control virtual object at the third location on the respective user interface and the second control virtual object at the fourth location on the respective user interface, receiving an indication that a clench gesture has been performed;

in response to receiving the indication the clench gesture has been performed, displaying the first control virtual object at a fifth location on the respective user interface and displaying the second control virtual object at a sixth location on the respective user interface; and while displaying the first control virtual object at the fifth location on the respective user interface and displaying the second control virtual object at the sixth location on the respective user interface, receiving an indication that the computer system has been titled:

in accordance with a determination that the computer system has been titled in a first direction, displaying the first control object at the third location on the respective user interface; and in accordance with a determination that the computer system has been tilted in a second direction, different from first direction, displaying the second control object at the fourth location on the respective user interface.

18. The computer system of claim 1, wherein the one or more programs further include instructions for:

in response to receiving the indication that the respective hand input has been performed, and in accordance with the determination that the respective hand input is the second type of hand input, ceasing to display, via the display generation component, the first control virtual object and the first virtual object.

19. The computer system of claim 1, wherein:

the first type of hand input is a touch input detected via one or more touch sensors; and the second type of hand input is movement input detected via one or more sensors selected from the list comprising: one or more heart rate sensors, one or more accelerometers, and one or more gyroscopes.

20. A non-transitory computer-readable storage medium storing one or more programs configured to be executed by one or more processors of a computer system that is in communication with a display generation component, the one or more programs including instructions for:

while the computer system is worn on a first hand of a user, displaying, via the display generation component, a respective user interface, wherein displaying the respective user interface includes concurrently displaying:

a first control virtual object that, when activated with a first type of hand input, causes the computer system to perform a first operation;

a second control virtual object that, when activated with the first type of hand input, causes the computer system to perform a second operation different from the first operation; and a first virtual object indicating that the first control virtual object can be activated in response to a second type of hand input being performed, wherein the second type of hand input is not directed to a location in the respective user interface, and wherein the second type of hand input is performed by the first hand of the user;

while displaying the first control virtual object, receiving an indication that a respective hand input has been performed; and in response to receiving the indication that the respective hand input has been performed:

in accordance with a determination that the respective hand input is the first type of hand input directed to a location that corresponds to the first control virtual object, initiating a process for performing the first operation;

in accordance with a determination that the respective hand input is the first type of hand input directed to a location that corresponds to the second control virtual object, initiating a process for performing the second operation; and in accordance with a determination that the respective hand input is the second type of hand input, initiating the process for performing the first operation.

21. The non-transitory computer-readable storage medium of claim 20, wherein the one or more programs further include instructions for:

while displaying the respective user interface, displaying an animation that alternates between displaying the first virtual object and displaying a second virtual object, wherein the second virtual object indicates that the second control virtual object can be activated in response to a third type of input, and wherein the second type of hand input is different from the third type of input.

22. The non-transitory computer-readable storage medium of claim 20, wherein displaying the first virtual object includes displaying a second animation that alternates between a first location that corresponds to the first control virtual object and a second location that corresponds to the second control virtual object.

23. The non-transitory computer-readable storage medium of claim 20, wherein the one or more programs further include instructions for:

while displaying the respective user interface, displaying, via the display generation component, a third virtual object that indicates that the second operation can be activated in response to a fourth type of hand input being performed, wherein the fourth type of hand input is not directed to a location in the respective user interface.

24. The non-transitory computer-readable storage medium of claim 20, wherein the first control virtual object corresponds to a first default control option.

25. The non-transitory computer-readable storage medium of claim 20, wherein displaying the first virtual object includes visually emphasizing the first control virtual object.

26. The non-transitory computer-readable storage medium of claim 20, wherein the respective user interface corresponds to a first application, and wherein the first control virtual object is a second default virtual object and is displayed with a first color scheme, and wherein the one or more programs further include instructions for:

after receiving the indication that the respective hand input has been performed, receiving a request to display a second respective user interface; and in response to receiving the request to display the second respective user interface, displaying, via the display generation component, the second respective user interface, wherein the second respective user interface corresponds to a second application that is different from the first application, and wherein displaying the second respective user interface includes displaying a third control virtual object, wherein the third control virtual object is the second default virtual object and is displayed with a second color scheme that is different than the first color scheme.

27. The non-transitory computer-readable storage medium of claim 20, wherein the first virtual object is displayed adjacent to the first control virtual object.

28. The non-transitory computer-readable storage medium of claim 20, wherein the first type of hand input is a tap.

29. The non-transitory computer-readable storage medium of claim 20, wherein:

in accordance with a determination that the first control virtual object is in focus, displaying the first virtual object includes displaying the first virtual object adjacent to the first control virtual object; and in accordance with a determination that the second control virtual object is in focus, displaying the first virtual object includes displaying the first virtual object adjacent to the second control virtual object.

30. The non-transitory computer-readable storage medium of claim 20, wherein the respective user interface is displayed in response to receiving a request to connect to an external device, and wherein:

in accordance with a determination that the respective hand input is the second type of hand input and in accordance with a determination that the respective hand input is being performed, initiating the process for performing the first operation includes connecting to the external device.

31. A method, comprising:

at a computer system that is in communication with a display generation component:

while the computer system is worn on a first hand of a user, displaying, via the display generation component, a respective user interface, wherein displaying the respective user interface includes concurrently displaying:

a first control virtual object that, when activated with a first type of hand input, causes the computer system to perform a first operation;

a second control virtual object that, when activated with the first type of hand input, causes the computer system to perform a second operation different from the first operation; and a first virtual object indicating that the first control virtual object can be activated in response to a second type of hand input being performed, wherein the second type of hand input is not directed to a location in the respective user interface, and wherein the second type of hand input is performed by the first hand of the user;

while displaying the first control virtual object, receiving an indication that a respective hand input has been performed; and in response to receiving the indication that the respective hand input has been performed:

in accordance with a determination that the respective hand input is the first type of hand input directed to a location that corresponds to the first control virtual object, initiating a process for performing the first operation;

in accordance with a determination that the respective hand input is the first type of hand input directed to a location that corresponds to the second control virtual object, initiating a process for performing the second operation; and in accordance with a determination that the respective hand input is the second type of hand input, initiating the process for performing the first operation.

32. The method of claim 31, further comprising:

while displaying the respective user interface, displaying an animation that alternates between displaying the first virtual object and displaying a second virtual object, wherein the second virtual object indicates that the second control virtual object can be activated in response to a third type of input, and wherein the second type of hand input is different from the third type of input.

33. The method of claim 31, wherein displaying the first virtual object includes displaying a second animation that alternates between a first location that corresponds to the first control virtual object and a second location that corresponds to the second control virtual object.

34. The method of claim 31, further comprising:

while displaying the respective user interface, displaying, via the display generation component, a third virtual object that indicates that the second operation can be activated in response to a fourth type of hand input being performed, wherein the fourth type of hand input is not directed to a location in the respective user interface.

35. The method of claim 31, wherein the first control virtual object corresponds to a first default control option.

36. The method of claim 31, wherein displaying the first virtual object includes visually emphasizing the first control virtual object.

37. The method of claim 31, wherein the respective user interface corresponds to a first application, and wherein the first control virtual object is a second default virtual object and is displayed with a first color scheme, and wherein the method further comprises:

after receiving the indication that the respective hand input has been performed, receiving a request to display a second respective user interface; and in response to receiving the request to display the second respective user interface, displaying, via the display generation component, the second respective user interface, wherein the second respective user interface corresponds to a second application that is different from the first application, and wherein displaying the second respective user interface includes displaying a third control virtual object, wherein the third control virtual object is the second default virtual object and is displayed with a second color scheme that is different than the first color scheme.

38. The method of claim 31, wherein the first virtual object is displayed adjacent to the first control virtual object.

39. The method of claim 31, wherein the first type of hand input is a tap.

40. The method of claim 31, wherein:

in accordance with a determination that the first control virtual object is in focus, displaying the first virtual object includes displaying the first virtual object adjacent to the first control virtual object; and in accordance with a determination that the second control virtual object is in focus, displaying the first virtual object includes displaying the first virtual object adjacent to the second control virtual object.

41. The method of claim 31, wherein the respective user interface is displayed in response to receiving a request to connect to an external device, and wherein:

in accordance with a determination that the respective hand input is the second type of hand input and in accordance with a determination that the respective hand input is being performed, initiating the process for performing the first operation includes connecting to the external device.

* * * * *